US011531462B2

(12) United States Patent
Gomi et al.

(10) Patent No.: US 11,531,462 B2
(45) Date of Patent: Dec. 20, 2022

(54) PSEUDO FORCE SENSE GENERATION APPARATUS

(71) Applicant: NIPPON TELEGRAPH AND TELEPHONE CORPORATION, Chiyoda-ku (JP)

(72) Inventors: Hiroaki Gomi, Atsugi (JP); Sho Ito, Atsugi (JP); Shinya Takamuku, Atsugi (JP); Tomohiro Amemiya, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/093,898

(22) PCT Filed: Apr. 12, 2017

(86) PCT No.: PCT/JP2017/014992
§ 371 (c)(1),
(2) Date: Oct. 15, 2018

(87) PCT Pub. No.: WO2017/183537
PCT Pub. Date: Oct. 26, 2017

(65) Prior Publication Data

US 2019/0087063 A1 Mar. 21, 2019

(30) Foreign Application Priority Data

Apr. 19, 2016 (JP) ............................ JP2016-083713
Sep. 26, 2016 (JP) ............................ JP2016-187088
Dec. 28, 2016 (JP) ............................ JP2016-255580

(51) Int. Cl.
*H04B 3/36* (2006.01)
*G06F 3/0488* (2022.01)
(Continued)

(52) U.S. Cl.
CPC .............. *G06F 3/0488* (2013.01); *B06B 1/04* (2013.01); *H02K 7/1876* (2013.01); *H02K 16/00* (2013.01);
(Continued)

(58) Field of Classification Search
CPC ....... G06F 3/0488; B06B 1/04; H02K 7/1876; H02K 16/00; H02K 33/16; H02K 35/02; H02K 35/04; H02K 2201/18; H04M 19/04
See application file for complete search history.

(56) References Cited

U.S. PATENT DOCUMENTS 5,979,242 A * 11/1999 Hobbs ..................... G01M 7/06 73/666
6,697,043 B1 * 2/2004 Shahoian ............. A63F 13/285 345/156

(Continued)

FOREIGN PATENT DOCUMENTS

EP 3 187 968 A1 7/2017
JP 2005-190465 A 7/2005

(Continued)

OTHER PUBLICATIONS

Choi et al., Grabity A Wearable Haptic Interface for Simulating Weight and Grasping in Virtual Reality (Year: 2017).*

(Continued)

*Primary Examiner* — Quang Pham
(74) *Attorney, Agent, or Firm* — Oblon, McClelland, Maier & Neustadt, L.L.P.

(57) ABSTRACT

For efficient presentation of pseudo force sense, a pseudo force sense generation apparatus includes: a base mechanism; and a contact mechanism that performs periodical asymmetric motion relative to the base mechanism and gives force based on the asymmetric motion to skin or mucous
(Continued)

membrane with which the contact mechanism is in direct or indirect contact. A mass of the contact mechanism is smaller than a mass of the base mechanism, or the mass of the contact mechanism is smaller than a sum of the mass of the base mechanism and a mass of a mechanism that is attached to the base mechanism.

12 Claims, 81 Drawing Sheets

(51) Int. Cl.

| | |
|---|---|
| ***H04M 19/04*** | (2006.01) |
| ***H02K 33/16*** | (2006.01) |
| ***H02K 16/00*** | (2006.01) |
| ***B06B 1/04*** | (2006.01) |
| ***H02K 7/18*** | (2006.01) |
| ***H02K 35/02*** | (2006.01) |
| ***H02K 35/04*** | (2006.01) |

(52) U.S. Cl.
CPC ............ *H02K 33/16* (2013.01); *H02K 35/02* (2013.01); *H02K 35/04* (2013.01); *H04M 19/04* (2013.01); *H02K 2201/18* (2013.01)

(56) References Cited

U.S. PATENT DOCUMENTS

| | | | | |
|---|---|---|---|---|
| 7,151,348 | B1 * | 12/2006 | Ueda | H02K 33/04<br>318/114 |
| 7,569,952 | B1 * | 8/2009 | Bono | H02K 35/02<br>310/15 |
| 8,169,402 | B2 * | 5/2012 | Shahoian | G06F 3/016<br>345/161 |
| 8,937,603 | B2 * | 1/2015 | Flanagan | G06F 3/04886<br>345/173 |
| 8,977,376 | B1 * | 3/2015 | Lin | H04R 1/1091<br>381/326 |
| 9,764,357 | B2 * | 9/2017 | Houston | B06B 1/166 |
| 9,830,782 | B2 * | 11/2017 | Morrell | G06F 3/016 |
| 9,880,626 | B2 * | 1/2018 | Hajati | G06F 3/014 |
| 9,891,651 | B2 * | 2/2018 | Jackson | G06F 3/016 |
| 10,156,649 | B2 * | 12/2018 | Niemar | G01V 1/181 |
| 2001/0035854 | A1 * | 11/2001 | Rosenberg | G06F 3/0338<br>345/156 |
| 2004/0169425 | A1 * | 9/2004 | Aihara | B06B 1/045<br>310/15 |
| 2006/0255683 | A1 * | 11/2006 | Suzuki | G06F 3/0362<br>310/317 |
| 2007/0091063 | A1 * | 4/2007 | Nakamura | G06F 3/011<br>345/156 |
| 2009/0036212 | A1 * | 2/2009 | Provancher | G06F 3/016<br>463/30 |
| 2009/0295552 | A1 * | 12/2009 | Shahoian | G06F 3/016<br>340/407.1 |
| 2009/0309825 | A1 * | 12/2009 | Sodergren | G06F 3/016<br>345/156 |
| 2010/0033030 | A1 * | 2/2010 | Amemiya | H02K 35/04<br>310/12.16 |
| 2010/0153845 | A1 * | 6/2010 | Gregorio | G06F 3/016<br>715/702 |
| 2010/0213773 | A1 * | 8/2010 | Dong | H02K 33/16<br>310/25 |
| 2010/0281440 | A1 * | 11/2010 | Underkoffler | G06V 10/96<br>715/863 |
| 2011/0075835 | A1 * | 3/2011 | Hill | G06F 3/016<br>340/407.1 |
| 2011/0090153 | A1 * | 4/2011 | Park | G06F 3/016<br>345/173 |
| 2011/0143706 | A1 * | 6/2011 | Oue | H04W 4/90<br>455/404.1 |
| 2011/0266892 | A1 * | 11/2011 | Wauke | H02K 33/18<br>310/25 |
| 2012/0049660 | A1 * | 3/2012 | Park | B06B 1/045<br>310/25 |
| 2012/0169151 | A1 * | 7/2012 | Dong | H02K 33/16<br>310/25 |
| 2012/0232780 | A1 * | 9/2012 | Delson | A63F 13/285<br>340/407.1 |
| 2013/0002411 | A1 * | 1/2013 | Henderson | H02N 2/023<br>340/407.1 |
| 2013/0135794 | A1 * | 5/2013 | Wang | H04M 1/026<br>361/679.01 |
| 2013/0201127 | A1 * | 8/2013 | Abe | G06F 3/016<br>345/173 |
| 2013/0285801 | A1 * | 10/2013 | Jung | H04M 1/0266<br>340/407.2 |
| 2013/0335085 | A1 * | 12/2013 | Arimitsu | H02N 2/163<br>324/318 |
| 2013/0335209 | A1 * | 12/2013 | Cruz-Hernandez | G08B 6/00<br>340/407.1 |
| 2013/0342484 | A1 * | 12/2013 | Bae | G06F 1/1656<br>345/173 |
| 2014/0085065 | A1 * | 3/2014 | Biggs | G08B 6/00<br>340/407.2 |
| 2014/0232646 | A1 * | 8/2014 | Biggs | H01L 41/193<br>345/156 |
| 2015/0081110 | A1 * | 3/2015 | Houston | G05D 19/02<br>700/280 |
| 2015/0130730 | A1 * | 5/2015 | Harley | G06F 3/016<br>345/173 |
| 2015/0277562 | A1 * | 10/2015 | Bard | G06F 3/016<br>345/177 |
| 2015/0349619 | A1 * | 12/2015 | Degner | H04M 19/047<br>310/12.21 |
| 2016/0018891 | A1 * | 1/2016 | Levesque | H05K 999/99<br>345/174 |
| 2016/0144404 | A1 * | 5/2016 | Houston | H02K 33/00<br>318/114 |
| 2016/0231815 | A1 * | 8/2016 | Moussette | G06F 3/016 |
| 2016/0233012 | A1 * | 8/2016 | Lubinski | H01F 41/02 |
| 2016/0241119 | A1 * | 8/2016 | Keeler | H02J 7/14 |
| 2016/0258758 | A1 * | 9/2016 | Houston | G01D 5/145 |
| 2016/0259480 | A1 * | 9/2016 | Augenbergs | G01L 5/0028 |
| 2016/0371942 | A1 * | 12/2016 | Smith, IV | G06F 1/163 |
| 2017/0038863 | A1 * | 2/2017 | Hajati | G06F 3/016 |
| 2017/0070131 | A1 * | 3/2017 | Degner | H02K 33/00 |
| 2017/0084138 | A1 * | 3/2017 | Hajati | G08B 6/00 |
| 2017/0144063 | A1 * | 5/2017 | Alghooneh | G06F 3/016 |
| 2017/0153703 | A1 * | 6/2017 | Yun | G06F 3/016 |
| 2017/0168571 | A1 * | 6/2017 | Levesque | G06F 3/016 |
| 2017/0254662 | A1 * | 9/2017 | Takenaka | G06F 3/01 |
| 2017/0255266 | A1 * | 9/2017 | Holenarsipur | G06F 3/016 |
| 2017/0285747 | A1 * | 10/2017 | Chen | G08B 6/00 |
| 2017/0289694 | A1 * | 10/2017 | Choi | H04R 7/045 |
| 2018/0061192 | A1 * | 3/2018 | Chen | G06F 1/1694 |
| 2018/0107378 | A1 * | 4/2018 | Rosenberg | G06F 3/04883 |
| 2018/0204426 | A1 * | 7/2018 | Nagisetty | G08B 6/00 |
| 2019/0027674 | A1 * | 1/2019 | Zhang | H01L 41/09 |
| 2019/0039092 | A1 * | 2/2019 | Kim | G06F 3/01 |
| 2019/0041986 | A1 * | 2/2019 | Rihn | G06F 3/016 |
| 2019/0087063 | A1 * | 3/2019 | Gomi | H02K 35/04 |
| 2019/0363622 | A1 * | 11/2019 | Kim | G06F 3/016 |

FOREIGN PATENT DOCUMENTS

| | | | |
|---|---|---|---|
| JP | 4551448 | B2 | 9/2010 |
| JP | 2013-161384 | A | 8/2013 |
| JP | WO2015/151380 | A1 | 10/2015 |
| JP | 2015-223563 | A | 12/2015 |
| JP | 2015-225521 | A | 12/2015 |
| WO | WO 2011/099554 | A1 | 8/2011 |
| WO | WO 201 6/031118 | A1 | 3/2016 |

OTHER PUBLICATIONS

Michael Motola-Barnes, Haptic Actuators Comparing Piezo to ERM and LRA (Year: 2019).*

(56) References Cited

OTHER PUBLICATIONS

Barrow et al., High Bandwidth Large Workspace Haptic Interaction (Year: 2008).*
Hulin et al., Stability Boundary for Haptic Rendering Influence of Physical Damping (Year: 2006).*
Cani et al., Controlling Anisotropy in Mass-Spring Systems (Year: 2000).*
B. Hutchinson, Critical Assessment 16 Anisotropy in metals (Year: 2015).*
Rudykh, Stability of anisotropic electroactive polymers with application to layered media (Year: 2011).*
Hossain, Modelling electro-active polymers with a dispersion-type anisotropy (Year: 2018).*
Hsissou et al., Polymer composite materials: A comprehensive review (Year: 2021).*
Qiu et al., A Moisture-Resistant Soft Actuator with Low Driving Voltages for Haptic Stimulations in Virtual Games (Year: 2022).*
Yang et al., Recent Advances and Opportunities of Active Materials for Haptic Technologies in Virtual and Augmented Reality (Year: 2021).*
Combined Chinese Office Action and Search Report dated Nov. 21, 2019 Chinese Patent Application No. 201780024035.0 (with English translation),21 pages.
Office Action dated Oct. 29, 2019 in corresponding Japanese Patent Application No. 2018-513131 (with English Translation), 15pages.
International Search Report dated Jul. 11, 2017 in PCT/JP2017/014992 filed Apr. 12, 2017.
Amemiya, et al., “Buru-Navi3: A device that creates a sense of being pulled when pinched by fingers”, 2014, vol. 26, No. 9, pp. 23-26 (with English translation).
Amemiya, et al., “Buru-Navi3 Gives You a Feeling of Being Pulled”, 2014, NTT Technical Review, vol. 12, No. 11, pp. 1-6.
Combined Taiwanese Office Action and Search Report dated Apr. 9, 2019 in corresponding Taiwanese Patent Application No. 106112609 (with English Translation), 15 pages.
Office Action dated Aug. 30, 2019 in Korean Patent Application No. 10-2018-7029914 (with English translation) 11 pages.
Combined Chinese Office Action and Search Report dated Jun. 10, 2020 in Patent Application No. 201780024035.0 (with English language translation), 29 pages.
Korean Office Action dated Feb. 5, 2020, in Patent Application No. 10-2018-7029914, 12 pages (with English translation).

* cited by examiner

PSEUDO FORCE SENSE GENERATION APPARATUS

TECHNICAL FIELD

The present invention relates to techniques for causing a user to perceive pseudo force sense.

BACKGROUND ART

A pseudo force sense generation apparatus that causes perception of pseudo force sense such as illusion of pulling force by controlling an actuator (for example, a linear actuator) based on control signals has been proposed (see Non-patent Literature 1, for instance). In an existing scheme, the actuator is mounted in a housing case. By asymmetrically vibrating a mover (the inner side) of the actuator while the housing case (the outer side) is being gripped by the user, a stress (reaction force) generated on the housing case side can be transmitted to the user's skin, causing the user to perceive pseudo force sense.

PRIOR ART LITERATURE

Non-Patent Literature

Non-patent Literature 1: Tomohiro Amemiya, Shinya Takamuku, Sho Ito, Hiroaki Gomi, "Yubi de tsumamu to hipparareru kankaku wo umidasu souchi Buru-Navi3 (Buru-Navi3: A device that creates a sense of being pulled when pinched by fingers)", 2014, NTT Gijyutsu Jyanaru, Vol. 26, No. 9, pp. 23-26. (in Japanese)

SUMMARY OF THE INVENTION

Problems to be Solved by the Invention

In the conventional scheme, vibration of the actuator is conveyed to the skin via the housing case. Thus, if the actuator is mounted in the housing case of an object with a large mass, such as a smartphone terminal device, sufficient vibration is not transmitted to the skin, failing to cause perception of sufficient force sense or requiring an actuator having large stroke and high power consumption.

An objective of the present invention is to present pseudo force sense more efficiently than conventionally done.

Means to Solve the Problems

A pseudo force sense generation apparatus according to the present invention includes: a base mechanism; and a contact mechanism that performs periodical asymmetric motion relative to the base mechanism and gives force based on the asymmetric motion to skin or mucous membrane with which the contact mechanism is in direct or indirect contact. Here, a mass of the contact mechanism is smaller than a mass of the base mechanism, or the mass of the contact mechanism is smaller than a sum of the mass of the base mechanism and a mass of a mechanism that is attached to the base mechanism.

Effects of the Invention

This enables more efficient presentation of pseudo force sense than conventionally done.

BRIEF DESCRIPTION OF THE DRAWINGS

FIG. 1B is a schematic plan view of the pseudo force sense generation apparatus according to the embodiment, and FIG. 1A is a schematic cross-sectional view at 1A-1A in FIG. 1B.

FIG. 7B is a schematic plan view of the pseudo force sense generation apparatus according to the embodiment, and FIG. 7A is a schematic cross-sectional view at 7A-7A in FIG. 7B.

FIG. 8B is a schematic plan view of the pseudo force sense generation apparatus according to the embodiment, FIG. 8A is a schematic cross-sectional view at 8A-8A in FIG. 8B, and FIG. 8C is a schematic cross-sectional view at 8C-8C in FIG. 8B.

FIG. 9B is a schematic plan view of the pseudo force sense generation apparatus according to the embodiment, FIG. 9A is a schematic cross-sectional view at 9A-9A in FIG. 9B, and FIG. 9C is a schematic cross-sectional view at 9C-9C in FIG. 9B.

FIG. 11B is a schematic plan view of the pseudo force sense generation apparatus according to the embodiment, and FIG. 11A is a schematic cross-sectional view at 11A-11A in FIG. 11B.

FIG. 25B is a schematic plan view of the pseudo force sense generation apparatus according to the embodiment, and FIG. 25A is a schematic cross-sectional view at 25A-25A in FIG. 25B.

FIGS. 27A and 27D illustrate time-series data for the input waveform [V] of a driving control signal for the pseudo force sense generation apparatus, FIGS. 27B and 27E illustrate time-series data for force [N] applied from the pseudo force sense generation apparatus to skin, and FIGS. 27C and 27F illustrate time-series data for the position [m] of the pseudo force sense generation apparatus.

FIGS. 28A and 28D illustrate time-series data for the input waveform [V] of a driving control signal for the pseudo force sense generation apparatus, FIGS. 28B and 28E illustrate time-series data for force [N] applied from the pseudo force sense generation apparatus to skin, and FIGS. 28C and 28F illustrate time-series data for the position [m] of the pseudo force sense generation apparatus.

FIGS. 29A and 29D illustrate time-series data for the input waveform [V] of a driving control signal for the pseudo force sense generation apparatus, FIGS. 29B and 29E illustrate time-series data for force [N] applied from the pseudo force sense generation apparatus to skin, and FIGS. 29C and 29F illustrate time-series data for the position [m] of the pseudo force sense generation apparatus.

DETAILED DESCRIPTION OF THE EMBODIMENTS

Figure 1A:
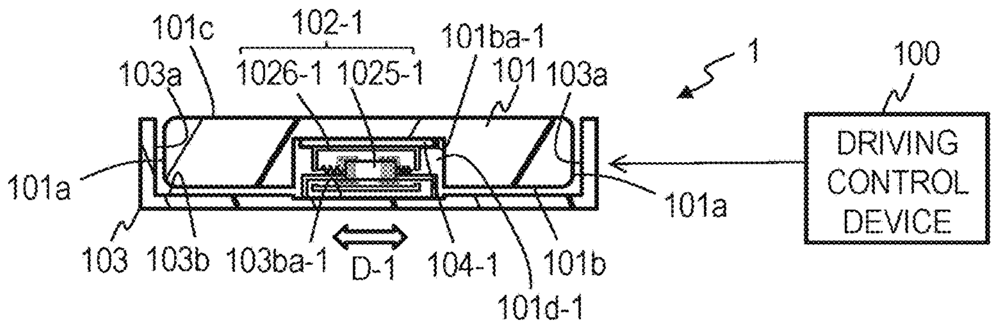
FIGS. 1A and 1B are conceptual diagrams illustrating a configuration of a pseudo force sense generation apparatus according to an embodiment.
Figure 1B:
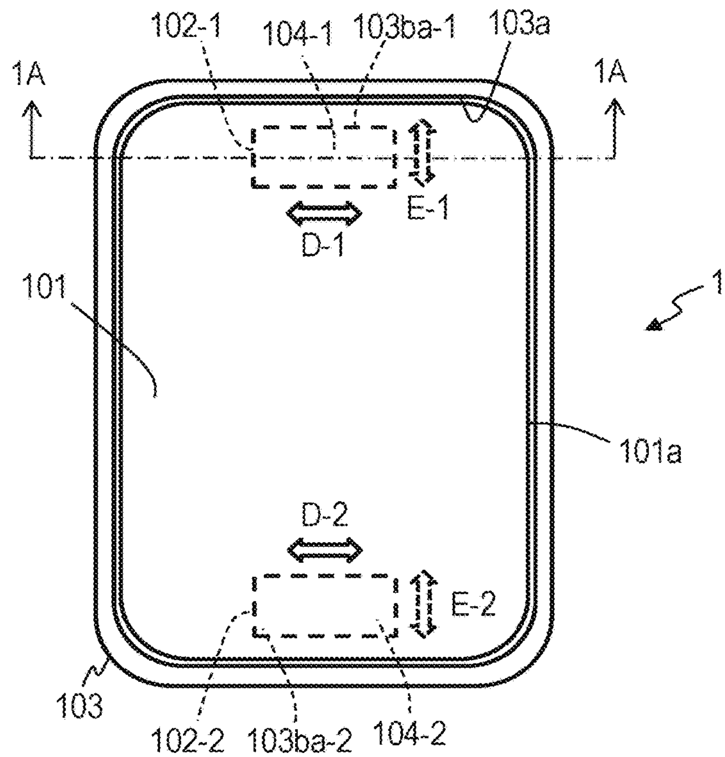
Figure 1C:
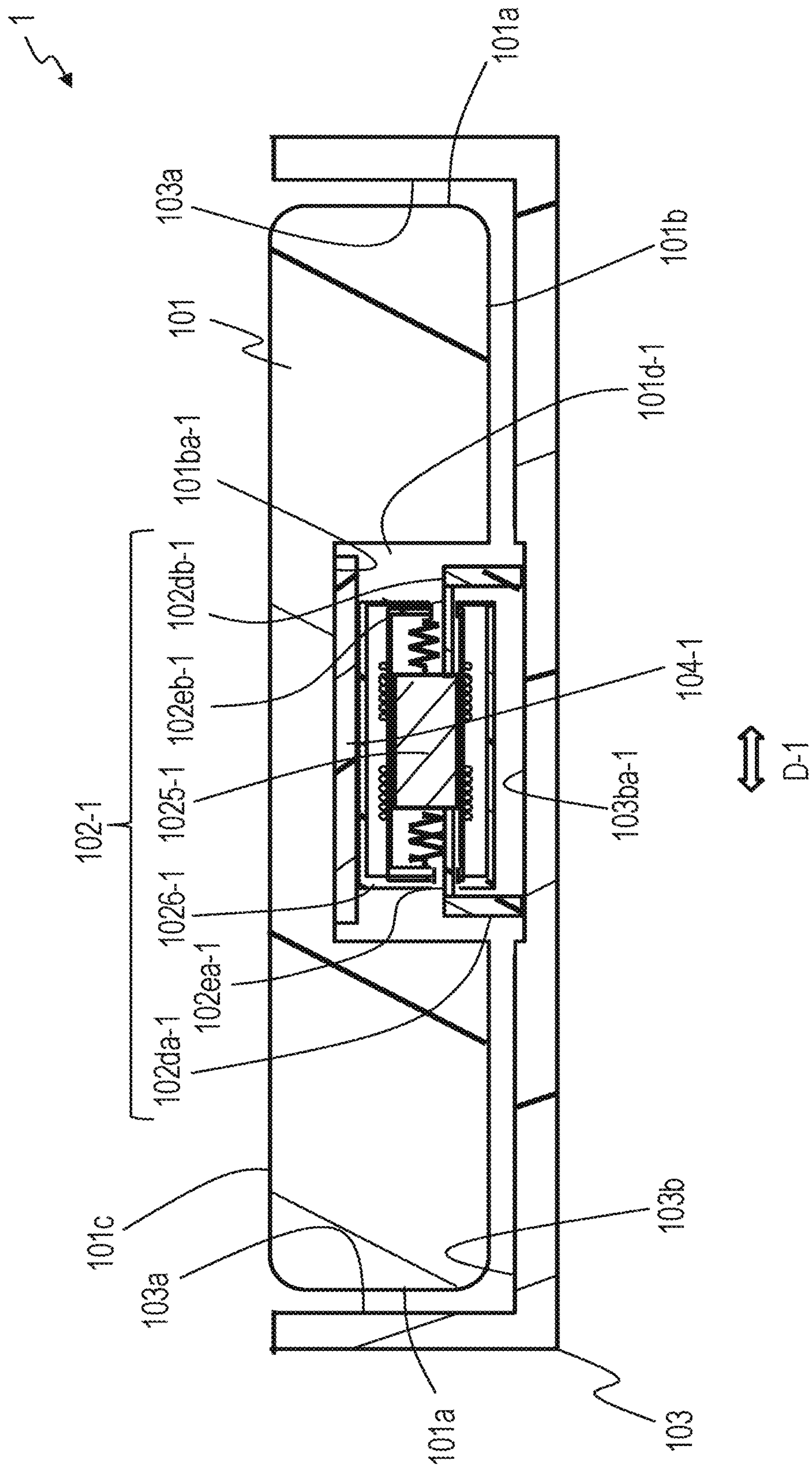
FIG. 1C is an enlarged cross-sectional view at 1A-1A in FIG. 1B.

Embodiments of the present invention will be now described.

Overview of First to Ninth Embodiments

The pseudo force sense generation apparatuses according to first to ninth embodiments have a "base mechanism", and a "contact mechanism" that performs periodical "asymmetric motion" relative to the "base mechanism" and gives force based on the "asymmetric motion" to skin or mucous membrane with which the contact mechanism is in direct or indirect contact. Here, the mass of the "contact mechanism" is smaller than the mass of the "base mechanism", or the mass of the "contact mechanism" is smaller than the sum of the mass of the "base mechanism" and the mass of a "mechanism that is attached to the base mechanism". In such a configuration, the mass of the "contact mechanism", which is a system that vibrates with a "contact portion", is small even when the mass of the entire system is large, so force of a sufficient magnitude is transferred from the "contact mechanism" to the skin or mucous membrane. This enables clearer presentation of force sense even with an actuator having the same stroke and output as the conventional scheme. Alternatively, even with an actuator having smaller stroke and output than the conventional scheme, force sense of a level close to the conventional scheme can be presented. That is, these embodiments can present force sense more efficiently than conventionally done.

The periodical "asymmetric motion" is such periodic motion that causes pseudo force sense to be perceived with force given from the "contact mechanism" to skin or mucous membrane based on that motion, and is periodic motion in which a time-series waveform of motion in a "predetermined direction" is asymmetric with the time-series waveform of motion in the opposite direction to the "predetermined direction". The "asymmetric motion" may be periodical translational motion for presenting pseudo force sense in a translational direction, or periodical rotary motion for presenting pseudo force sense in a rotational direction. An example of the periodical "asymmetric motion" is asymmetric vibration. Preferably, the "asymmetric motion" is such that a "waveform pattern" of force given by the "contact mechanism" to skin or mucous membrane based on the "asymmetric motion" represents force that is in the predetermined direction and has an absolute value equal to or higher than a "first threshold" in a "first time segment", and represents force that is in the opposite direction to the "predetermined direction" and has an absolute value within a "second threshold" smaller than the "first threshold" in a "second time segment" different from the "first time segment", where the "first time segment" is shorter than the "second time segment". In other words, it is desirably such an "asymmetric motion" that performs the "waveform pattern" a rectangular pattern or a pattern close to a rectangular pattern because this enables clearer presentation of pseudo force sense.

For example, (1) the "base mechanism" includes a "base mechanism-side component", and (2) the "contact mechanism" includes a "contact mechanism-side component" that performs "asymmetric vibration" relative to the "base mechanism-side component", and a "contact portion" which is given force based on the "asymmetric vibration" and which gives force based on the "asymmetric vibration" to the skin or mucous membrane with which the contact portion is in direct or indirect contact. At least a part of the "contact portion" is positioned outside the "contact mechanism-side component" and the "contact portion" performs "asymmetric motion" based on the "asymmetric vibration" of the "contact mechanism-side component". That is, the "contact portion" is not entirely positioned inside the "contact mechanism-side component" but at least a part of the "contact portion" is positioned outside the "contact mechanism-side component". The mass of the "contact mechanism", which is a system that vibrates with the "contact portion", is smaller than the mass of a system supporting the system that vibrates with the "contact portion" (the mass of the "base mechanism", or the sum of the mass of the "base mechanism" and the mass of the "mechanism that is attached to the base mechanism"). The "asymmetric vibration" is vibration for causing perception of pseudo force sense with force given from the "contact mechanism" to skin or mucous membrane, meaning vibration in which the time-series waveform of vibration in the "predetermined direction" is asymmetric with the time-series waveform of vibration in the opposite direction to the "predetermined direction". The "asymmetric vibration" is, for example, vibration of the "contact mechanism-side component" in which the time-series waveform of a "physical quantity" of the "contact mechanism-side component" in the "predetermined direction" is asymmetric with the time-series waveform of the "physical quantity" of the "contact mechanism-side component" in the opposite direction to the "predetermined direction". Examples of the "physical quantity" include force given to the "base mechanism-side component" supporting the "contact mechanism-side component", the acceleration, velocity, or position of the "base mechanism-side component", force given by the "contact mechanism-side component" to the "base mechanism-side component", the acceleration, velocity, or position of the "contact mechanism-side component", force given to skin or mucous membrane from the "contact mechanism-side component", or the acceleration, velocity, or position of the "contact mechanism-side component".

The "base mechanism" may be configured in a shape that can be attached to a "body portion" which is a separate object (a shape to be supported), or may not be configured in a shape that can be attached to a separate object (a shape to be supported). With the attachment of the former "base mechanism" to the "body portion", the "base mechanism" is supported by the "body portion". That "α is supported by β" means that α is supported by β directly or indirectly. In other words, "α is supported by β" means part or all of the motion of α is limited by β; for example, the degree of freedom of the motion of α is partially or entirely limited by β. Not only in a case where α is fixed to β but even in a case where α is able to move or rotate relative to β, "α is supported by β" is applicable if some movement of α is limited by β. That "α is being supported by β" and "have α supported by β" mean a state in which "α is supported by β".

The "skin or mucous membrane with which the "contact mechanism" is in direct or indirect contact" means either skin or mucous membrane that is in contact with the "contact mechanism" with no intervening object therebetween, or skin or mucous membrane that is in contact with the "contact mechanism" via an intervening object. That "α makes contact with γ via β" means entering a state in which force can be given to γ from α via β. That "α makes contact with γ via β" means, for example, entering a state in which α is in direct contact with β, β is in direct contact with γ, and force can be given to γ from α via β. The intervening object may be a rigid body, an elastic body, a plastic body, fluid, or any object having at least some of their characteristics in combination; however, it has to be able to transfer force from the "contact mechanism" to the skin or mucous membrane.

For example, the "contact mechanism" is a mechanism for supporting the weight of the "pseudo force sense generation apparatus" (force associated with gravity, that is, weight). In other words, the reaction force of the weight of the "pseudo force sense generation apparatus" is given only to the "contact mechanism", for example. That is, the "contact mechanism" can be said to be a mechanism for supporting the reaction force of the weight of the "pseudo force sense generation apparatus". The "pseudo force sense generation apparatus" is gripped by or attached to the user directly or indirectly via the "contact mechanism". It is desirable that only the "contact mechanism" (for example, only the "contact portion") is the part that makes direct or indirect contact with skin or mucous membrane. That is, it is desirable that the pseudo force sense generation apparatus according to the embodiments makes direct or indirect contact with the user's skin or mucous membrane through parts of the "contact mechanism", but parts other than the "contact mechanism", such as the "base mechanism" or a "mechanism that is attached to the base mechanism", do not make direct or indirect contact with the user's skin or mucous membrane. In other words, it is desirable that no external force such as reaction force is given to parts other than the "contact mechanism", because this allows force for causing perception of pseudo force sense to be efficiently transmitted to the user's skin or mucous membrane. For example, it is desirable that the "contact portion" is configured in a shape to be positioned outside the "body portion" supporting the "base mechanism-side component" thereon. For example, it is desirable that the "contact portion" is configured in a shape that covers at least part of an external area of the "body portion" supporting the "base mechanism-side component" thereon. For example, the "contact portion" may be configured in a shape that covers not less than 50% of the external area of the "body portion", or the "contact portion" may be configured in a shape that covers all of the external area of the "body portion". The "contact portion" may be a "grip portion" of the pseudo force sense generation apparatus or an "attachment portion" for attachment to the user. The "body portion" may be a mechanism (a separate object) that is attached to the "base mechanism" as mentioned above, or a mechanism included in the "base mechanism". An example of the "body portion" is a mobile terminal device, such as a smartphone terminal device, tablet terminal device, electronic book reader device, mobile phone terminal device, notebook personal computer, and portable game console. A keyboard, a mouse, a controller, or other electronic unit may be the "body portion" or a component other than an electronic unit may be the "body portion". The "body portion" may also include a mobile terminal device such as a mobile phone terminal device and other components. The pseudo force sense generation apparatus may be incorporated as a part of the "body portion" in advance. The "body portion" may include a "mobile terminal device", and the "contact portion" may be a case that covers at least part of an external area of the "mobile terminal device" (for example, an area including at least one of the outer surfaces).

As mentioned above, a clear force sense can be presented when the mass of the "contact mechanism" as the system that vibrates with the "contact portion" is smaller than the mass of the system supporting the system that vibrates with the "contact portion" (the mass of the "base mechanism", or the sum of the mass of the "base mechanism" and the mass of a "mechanism that is attached to the base mechanism"). However, it is more preferable that the mass of the system that vibrates with the "contact portion" is greater than zero and not more than one third of the mass of the system supporting the system that vibrates with the "contact portion". In other words, the ratio of the mass of the "system that vibrates with the contact portion" to the mass of the "system supporting the system that vibrates with the contact portion" is greater than zero and not more than one third. This enables pseudo force sense to be perceived more efficiently.

The "contact portion" is attached to the "contact mechanism-side component" or integral with the "contact mechanism-side component", and is capable of vibrating relative to the "base mechanism-side component", for example. For example, the "contact mechanism-side component" performs "asymmetric vibration" while being supported by the "base mechanism-side component", which in turn causes the "contact portion" connected or integral with the "contact mechanism-side component" to also vibrate relative to the "base mechanism-side component". Note that "α being attached to β" means one of: α being fixed to β, α being connected with β, α being removably held on β, and α being held on β with some "play (clearance)" or "backlash". Also, "α being attached to β" is a concept that encompasses not only α being directly attached to β but α being indirectly attached to β via an intervening object.

As mentioned above, the mass of the "system that vibrates with the contact portion" is smaller than the mass of the "system supporting the system that vibrates with the contact portion". In this case, an average amplitude of vibration of the "system that vibrates with the contact portion" (an average amplitude of vibration of the "contact mechanism") is greater than an average amplitude of vibration of the "system supporting the system that vibrates with the contact portion" (an average amplitude of vibration of the "base mechanism" or an average amplitude of vibration of the "base mechanism" and a mechanism that is attached to the "base mechanism"). The "average amplitude of vibration of the system that vibrates with the contact portion" means a time average (absolute value) of the average amplitudes (absolute values) of the components constituting the "system that vibrates with the contact portion (the contact mechanism)". Likewise, the "average amplitude of vibration of the system supporting the system that vibrates with the contact portion" means a time average (absolute value) of the average amplitudes (absolute values) of the components constituting the "system supporting the system that vibrates with the contact portion (the "base mechanism", or the "base mechanism" and the "mechanism that is attached to the base mechanism")". In other words, the magnitude of vibration of the "system that vibrates with the contact portion" is larger than the magnitude of vibration of the "system supporting the system that vibrates with the contact portion". For example, the "system supporting the system that vibrates with the contact portion" does not vibrate with the "system that vibrates with the contact portion" or vibrates with a smaller average amplitude than that of the "system that vibrates with the contact portion".

All of the "system supporting the system that vibrates with the contact portion" may be included in the "pseudo force sense generation apparatus", or only a part of the "system supporting the system that vibrates with the contact portion" may be included in the "pseudo force sense generation apparatus".

The "base mechanism" may further include a "second base mechanism-side component", and the "contact mechanism" may further include a "second contact mechanism-side component" which performs "second asymmetric vibration" relative to the "second base mechanism-side component". The aforementioned "contact mechanism-side component" performs asymmetric vibration relative to the "base mechanism-side component" along a "first axis", and the "second contact mechanism-side component" performs "second asymmetric vibration" relative to the "second base mechanism-side component" along a "second axis". The "first axis" and the "second axis" may be parallel to each other or may not be parallel to each other. The "first axis" and the "second axis" may be on the same axis or they may not be on the same axis. The "contact portion" is given force which is based on at least one of the "asymmetric vibration" and the "second asymmetric vibration" (vibration is transmitted). The "contact portion" performs "asymmetric motion" based on at least one of the "asymmetric vibration" and the "second asymmetric vibration". The "contact portion" thereby gives force based on at least one of the "asymmetric vibration" and the "second asymmetric vibration" to skin or mucous membrane. This enables presentation of diverse force senses. While the definition of the "second asymmetric vibration" is the same as the definition of "asymmetric vibration", the direction of vibration and/or time-series waveform of the "second asymmetric vibration" may be the same as or different from the direction of vibration and/or time-series waveform of the "asymmetric vibration".

In the case of thus providing the "second contact mechanism-side component" in addition to the "contact mechanism-side component", it is desirable that both the "asymmetric vibration" and the "second asymmetric vibration" are efficiently conveyed to the "contact portion" and that vibration including the "asymmetric vibration" and the "second asymmetric vibration" as well as motion (for example, vibration) resulting from combination of the "asymmetric vibration" and the "second asymmetric vibration" are not hindered (not significantly hindered) by the "contact portion". As a way to achieve this, an "intervening component" and a "second intervening component" may be provided. The "intervening component" is positioned between the "contact portion" and the "body portion" that supports the "base mechanism-side component" and the "second base mechanism-side component". The "intervening component" gives force based on "asymmetric vibration" and having a directional component along the "first axis" to the "contact portion" (transfers vibration to the "contact portion"), and permits movement of the "contact portion" in a direction along an axis having a different orientation than the "first axis" (movement of the "contact portion" relative to the "body portion"). The "second intervening component" gives force based on the "second asymmetric vibration" and having a directional component along the "second axis" to the "contact portion" (transfers vibration to the "contact portion"), and permits movement of the "contact portion" in a direction along an axis having a different orientation than the "second axis" (movement of the "contact portion" relative to the "body portion"). Examples of "β along α" are: β running alongside α, β parallel to α, and β substantially parallel to α. Also, examples of an "axis having a different orientation than α axis" include an "axis orthogonal to α axis", an "axis substantially orthogonal to α axis", and an "axis that forms an angle greater than 0° and smaller than 180° with α axis". Also, examples of a "direction along an axis" include a "direction parallel to the axis", a "direction substantially parallel to the axis", a "direction on the axis", and a "direction that forms an angle within a predetermined range with the axis".

An "intervening component" and a "second intervening component" having these features can be embodied by utilizing the anisotropy of rigidity, for example. For example, a component with the rigidity in the direction along the "first axis" being higher than the rigidity in a direction along an axis having a different orientation than the "first axis" may be employed as the "intervening component", or a component with the rigidity in the direction along the "second axis" being higher than the rigidity in the direction along an axis with different orientation than the "second axis" may be employed as the "second intervening component".

There are many variations of positioning of the "intervening component" utilizing the anisotropy of rigidity.

Example 11-1

The "intervening component" may be positioned between the "base mechanism-side component" and the "body portion". For example, one side of the "intervening component" may be attached to the "base mechanism-side component" side and the other side of the "intervening component" may be attached to the "body portion" side. In this case, the "body portion" supports the "base mechanism-side component" via the "intervening component".

Example 11-2

The "intervening component" may be positioned between the "contact mechanism-side component" and the "contact portion". For example, one side of the "intervening component" may be attached to of the "contact mechanism-side component" side and the other side of the "intervening component" may be attached to of the "contact portion" side.

Likewise, there are many variations of positioning of the "second intervening component" utilizing the anisotropy of rigidity.

Example 12-1

The "second intervening component" may be positioned between the "second base mechanism-side component" and the "body portion". For example, one side of the "second intervening component" may be attached to the "second base mechanism-side component" side and the other side of the "second intervening component" may be attached to the "body portion" side. In this case, the "body portion" supports the "second base mechanism-side component" via the "second intervening component".

Example 12-2

The "second intervening component" may be positioned between the "second contact mechanism-side component" and the "contact portion". For example, one side of the "second intervening component" may be attached to the "second contact mechanism-side component" side and the other side of the "second intervening component" may be attached to the "contact portion" side.

The combination of examples 11-1 and 12-1 or the combination of 11-2 and 12-2 is desirable; however, they may be positioned in other combinations.

The "intervening component" and the "second intervening component" may also be hinges. For example, the "intervening component" may be a "hinge" including a "first attachment portion" and a "second attachment portion" capable of rotating relative to the "first attachment portion" about a hinge shaft. Such a configuration may be embodied by integrally forming or linking a "first attachment portion" and a "second attachment portion" that are made of flexible material, or the "first attachment portion" and the "second attachment portion" may be coupled with each other via a hinge. Note that the hinge shaft of the "hinge" is positioned in an orientation along the "first axis". The "second intervening component" may be a "second hinge" including a "third attachment portion" and a "fourth attachment portion" capable of rotating relative to the "third attachment portion" about a hinge shaft. Such a configuration may be embodied by integrally forming or linking a "third attachment portion" and a "fourth attachment portion" that are made of flexible material, or the "third attachment portion" and the "fourth attachment portion" may be coupled with each other by a hinge. Note that the hinge shaft of the "second hinge" is positioned in an orientation along the "second axis". Examples of "orientation along α axis" include "orientation parallel to α axis", "orientation substantially parallel to α axis", "orientation on α axis", and "orientation that forms an angle within a predetermined range with α axis".

There are also many variations of positioning of the "intervening component" being a "hinge".

Example 21-1

The "first attachment portion" may be attached to the "base mechanism-side component" side and the "second attachment portion" may be attached to the "body portion" side. In this case, the "body portion" supports the "base mechanism-side component" via the "intervening component".

Example 21-2

The "first attachment portion" may be attached to the "contact mechanism-side component" side and the "second attachment portion" may be attached to the "contact portion" side.

There are also many variations of positioning of the "second intervening component" being the "second hinge".

Example 22-1

The "third attachment portion" may be attached to the "second base mechanism-side component" side and the "fourth attachment portion" may be attached to the "body portion" side. In this case, the "body portion" supports the "second base mechanism-side component" via the "second intervening component".

Example 22-2

The "third attachment portion" may be attached to the "second contact mechanism-side component" side and the "fourth attachment portion" may be attached to the "contact portion" side.

The combination of examples 21-1 and 22-1 or the combination of 21-2 and 22-2 is desirable; however, they may be positioned in other combinations.

The "intervening component" and the "second intervening component" may also be sliding mechanisms. For example, the "intervening component" may be a "sliding mechanism" including a "rail portion" and a "sliding portion" slidably supported in the "rail portion", where the "rail portion" is positioned in an orientation along a "sliding axis" having a different orientation than the "first axis" and the "sliding portion" is slidable along the "sliding axis". The "second intervening component" may be a "second sliding mechanism" including a "second rail portion" and a "second sliding portion" slidably supported in the "second rail portion", where the "second rail portion" is positioned in an orientation along a "second sliding axis" having a different orientation than the "second axis" and the "second sliding portion" is slidable along the "second sliding axis".

There are also many variations of positioning of the "intervening component" being a "sliding mechanism".

Example 31-1

The "rail portion" may be attached to the "base mechanism-side component" side and the "sliding portion" may be attached to the "body portion" side. In this case, the "body portion" supports the "base mechanism-side component" via the "intervening component".

Example 31-2

The "rail portion" may be attached to the "contact mechanism-side component" side and the "sliding portion" may be attached to the "contact portion" side.

There are also many variations of positioning of the "second intervening component" being the "second sliding mechanism".

Example 32-1

The "second rail portion" may be attached to the "second base mechanism-side component" side and the "second sliding portion" may be attached to the "body portion" side. In this case, the "body portion" supports the "second base mechanism-side component" via the "second intervening component".

Example 32-2

The "second rail portion" may be attached to the "second contact mechanism-side component" side and the "second sliding portion" may be attached to the "contact portion" side.

The combination of examples 31-1 and 32-1 or the combination of 31-2 and 32-2 is desirable; however, they may be positioned in other combinations.

Instead of providing the "intervening component" or the "second intervening component", similar features may be embodied with a so-called X-Y table structure. In this case, the "body portion" may be attached to the "base mechanism-side component" or integral with the "base mechanism-side component", and the "contact mechanism-side component" is capable of vibrating relative to the "base mechanism-side component" along the "first axis"; and the "contact portion" may be attached to the "second contact mechanism-side component" or integral with the "second contact mechanism-side component" and capable of vibrating relative to the "second base mechanism-side component" along the "second axis". Here, the "first axis" and the "second axis" are in different orientations, and the relative position of the "second axis" to the "first axis" is fixed or limited. For example, the "contact mechanism-side component" may be attached to the "second base mechanism-side component" or the "contact mechanism-side component" may be integral with the "second base mechanism-side component". The "first axis" may be substantially orthogonal or orthogonal to the "second axis". The angle formed between the "first axis" and the "second axis" may be greater than 0° and smaller than 180°.

An "nth base mechanism-side component" and an "nth contact mechanism-side component" that performs "nth asymmetric vibration" relative to the "nth base mechanism-side component" may be further provided. Here, n is an integer greater than 2, and the "nth contact mechanism-side component" performs asymmetric vibration relative to the "nth base mechanism-side component" along an "nth axis". It is desirable that all of the forces (vibration) of the "asymmetric vibration", the "second asymmetric vibration", and the "nth asymmetric vibration" are efficiently conveyed to the "contact portion" and that none of the "asymmetric vibration", the "second asymmetric vibration", and the "nth asymmetric vibration" is hindered (significantly hindered) by the "contact portion". In order to achieve this, an "nth intervening component" similar to the "intervening component" and the "second intervening component" may be provided, or an X-Y table structure may be employed as mentioned above.

First Embodiment

In the following, embodiments will be described with reference to the drawings.

<Configuration>

As illustrated in FIGS. 1A to 1D, 2A, and 2B, a pseudo force sense generation apparatus 1 according to a first embodiment has a body portion 101, a vibrator 102-1 including a supporting portion 1026-1 and a movable portion 1025-1 that performs asymmetric vibration relative to the supporting portion 1026-1, a vibrator 102-2 including a supporting portion 1026-2 and a movable portion 1025-2 that performs asymmetric vibration relative to the supporting portion 1026-2, a contact portion 103, and intervening components 104-1, 104-2. In this embodiment, a supporting portion 1026-*i* (where i=1, 2) corresponds to the "base mechanism-side component" and a movable portion 1025-*i* (where i=1, 2) corresponds to the "contact mechanism-side component". The contact portion 103 is a component for supporting the weight of the pseudo force sense generation apparatus 1. The movable portion 1025-*i* (where i=1, 2) in this embodiment performs asymmetric vibration along D-i axis (the ith axis) while being supported by the supporting portion 1026-*i*, based on a driving control signal DCS from a driving control device 100. Such asymmetric vibration is vibration for causing perception of pseudo force sense. Details of such asymmetric vibration are disclosed in Non-patent Literature 1, Reference Literature 1 (Japanese Registered Patent No. 4551448), and Reference Literature 2 (Japanese Patent Application Laid Open No. 2015-223563), for instance. Vibration based on each asymmetric vibration is transmitted to the contact portion 103. This causes the contact portion 103 to make periodical asymmetric motion, giving force based on the asymmetric motion to the skin or mucous membrane with which the contact portion 103 is in direct or indirect contact. Here, a mass $m_1$ of the system that vibrates with the contact portion 103 is smaller than a mass $m_2$ of the system supporting the system that vibrates with the contact portion 103. In such a configuration, the mass $m_1$ of the system that vibrates with the contact portion 103 is small even when the mass $m_1+m_2$ of the entire system is large, so force of a sufficient magnitude is transferred from the contact portion 103 to the skin or mucous membrane. As a result, larger deformation than with the conventional scheme can be given to the skin or mucous membrane via a vibrator 102-*i* having the same stroke and output as a conventional one. In addition, the relative displacement between the movable portion 1025-*i* and the supporting portion 1026-*i* can be made small, so a vibrator 102-*i* with smaller stroke may be used. Asymmetric vibration of the vibrator 102-*i* using such a mechanism enables pseudo force sense, such as sensation of being pulled, to be efficiently perceived.

<Body Portion 101>

As illustrated in FIGS. 1A to 1D, the body portion 101 in this embodiment is a plate-like component having a recess 101*d-i*, in which the vibrator 102-*i* and the intervening component 104-*i* are positioned, on the side of a bottom surface 101*b*. The body portion 101 may be any kind of object as mentioned above; for example, a part including a mobile terminal device such as smartphone terminal device may be the body portion 101.

<Intervening Component 104-*i*>

On a bottom surface 101*ba-i* of the recess 101*d-i*, one side of the intervening component 104-*i* is attached. The intervening component 104-*i* is a component for efficiently conveying the asymmetric vibration of each movable portion 1025-*i* along D-i axis (the ith axis) to the contact portion 103 and for preventing the asymmetric vibration of each movable portion 1025-*i* and vibration composed of combination of the asymmetric vibrations of the movable portions 1025-1, 1025-2 from being significantly hindered by the contact portion 103. In other words, the intervening component 104-*i* is a component that transfers vibration based on the asymmetric vibration of the movable portion 1025-*i* having a directional component along D-i axis to the contact portion 103 and that permits movement of the contact portion 103 along E-i axis having a different orientation than D-i axis (movement of the contact portion 103 relative to the body portion 101, that is, "relief"). This embodiment assumes that D-i axis and E-i axis are coplanar and D-i axis and E-i axis are orthogonal to each other. For example, when the vibrator 102-1 and the vibrator 102-2 are driven so as to present pseudo force sense in opposite directions to each other (for example, driven in opposite phases), the contact portion 103 performs rotary motion relative to the body portion 101. The intervening component 104-*i* enables "relief" in the direction along E-i axis, thereby relieving distortion and enabling the rotary motion. Details of the intervening component 104-*i* will be discussed later.

<Vibrator 102-*i*>

On the other side of the intervening component 104-*i*, a supporting portion 1026-*i* of the vibrator 102-*i* is attached. The vibrator 102-*i* is thereby supported by the body portion 101 via the intervening component 104-*i* (that is, the supporting portion 1026-*i* is configured so that it can be supported by the body portion 101), and a part of the vibrator 102-*i* is positioned inside the recess 101*d-i*. The movable portion 1025-*i* of the vibrator 102-*i* is capable of making asymmetric vibration relative to the supporting portion 1026-*i* along D-i axis while being supported by the supporting portion 1026-*i*. Specific configurations of the vibrator 102-*i* are shown below as examples.

Figure 2A:
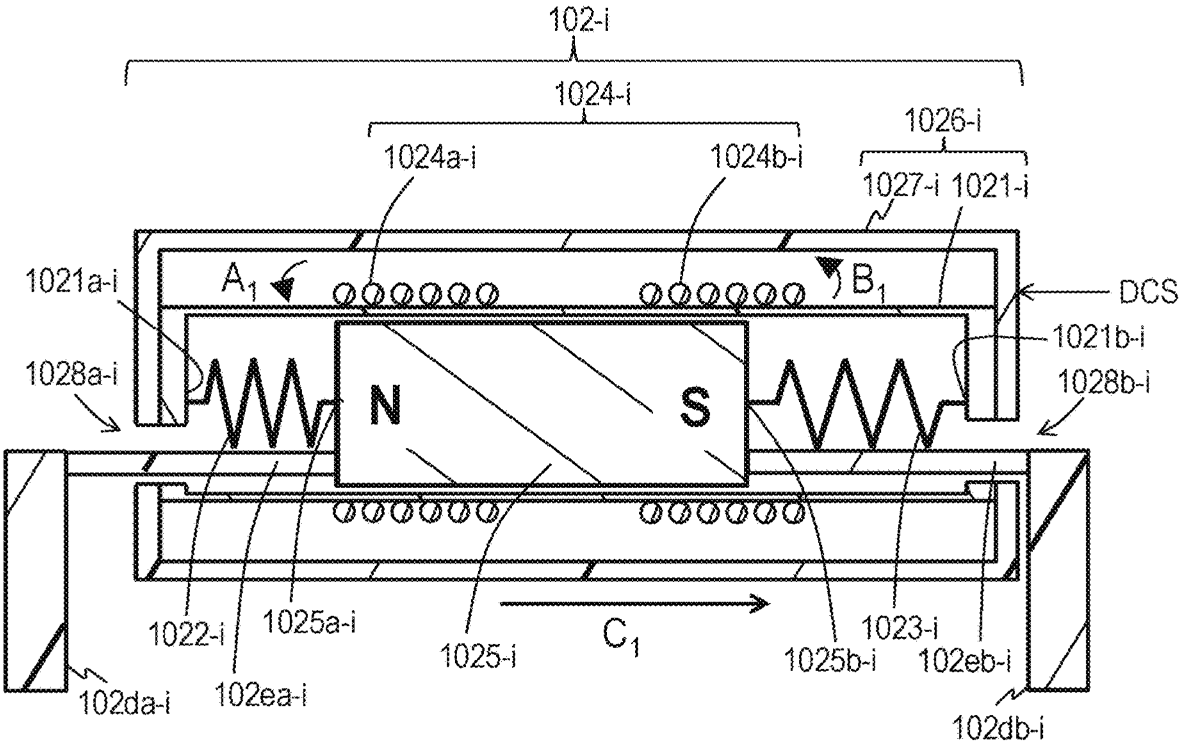
FIGS. 2A and 2B are conceptual diagrams illustrating a configuration of a vibrator according to the embodiment, showing a schematic cross section of the vibrator according to the embodiment at 1A-1A.
Figure 2B:
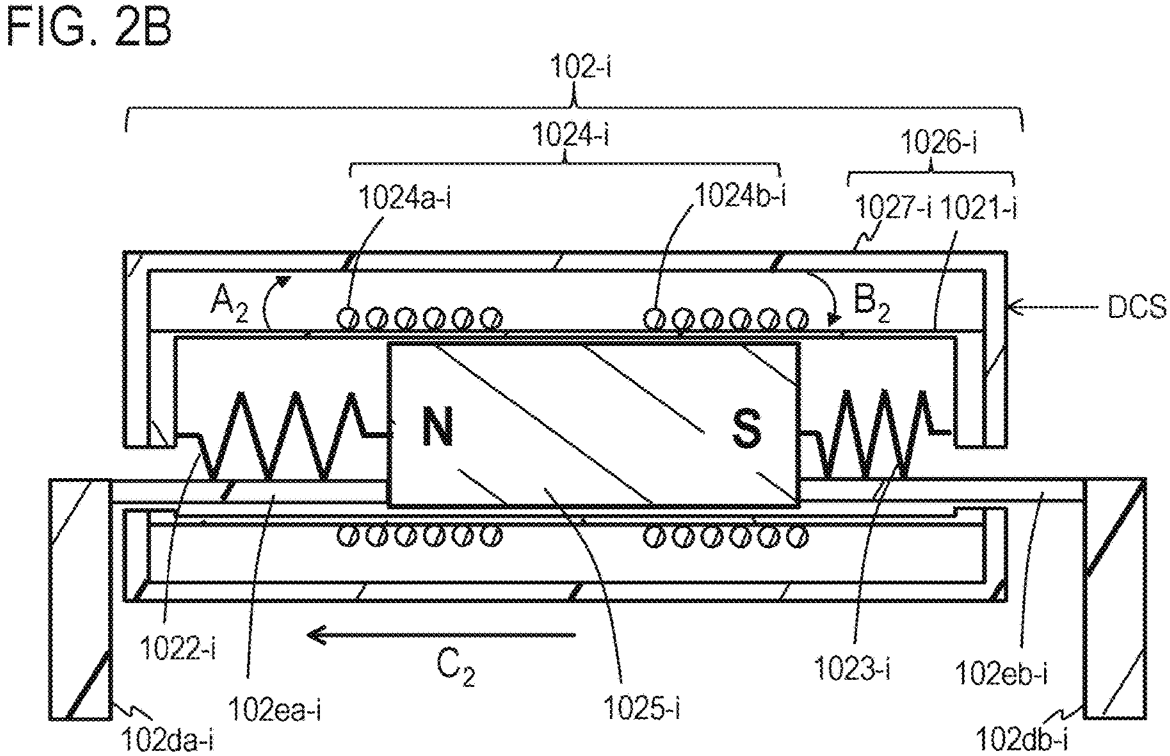

As illustrated in FIGS. 2A and 2B, the vibrator 102-*i* is a linear actuator having the supporting portion 1026-*i* including a case 1027-*i* and a guide 1021-*i*, springs 1022-*i*, 1023-*i* (elastic bodies), a coil 1024-*i*, a movable portion 1025-*i* formed from a permanent magnet, and linking portions 102*da*-*i*, 102*db*-*i*, 102*ea*-*i*, 102*eb*-*i*, for example. Both the case 1027-*i* and the guide 1021-*i* in this embodiment are hollow components with a part of the opposite open ends of a tube (for example, a cylinder or a polyhedral cylinder) being closed. Here, the guide 1021-*i* is smaller than the case 1027-*i* and is sized so that it can be accommodated inside the case 1027-*i*. The case 1027-*i*, the guide 1021-*i*, and the linking portions 102*da*-*i*, 102*db*-*i*, 102*ea*-*i*, 102*eb*-*i* are made of synthetic resin, such as ABS resin, for example. The springs 1022-*i*, 1023-*i* are helical or leaf springs made of metal, for example. While the moduli of elasticity (spring constants) of the springs 1022-*i*, 1023-*i* are desirably the same, they may be different from each other. The movable portion 1025-*i* is a column-shaped permanent magnet, for example, the side of one end 1025*a*-*i* in the longitudinal direction being the N-pole and the side of another end 1025*b*-*i* being the S-pole. The coil 1024-*i* is a string of enameled wire, for example, having a first wound portion 1024*a*-*i* and a second wound portion 1024*b*-*i*.

The movable portion 1025-*i* is accommodated inside the guide 1021-*i* and supported therein so as to be slidable in the longitudinal direction. Although details of such a supporting mechanism are not shown in the drawings, a straight rail along the longitudinal direction is provided on an inner wall surface of the guide 1021-*i*, and a rail supporting portion that slidably supports the rail is provided on a side surface of the movable portion 1025-*i*, for example. On an inner wall surface 1021*a*-*i* of the guide 1021-*i* on one longitudinal side thereof, one end of the spring 1022-*i* is fixed (that is, an end of the spring 1022-*i* being supported by the guide 1021-*i*), while the other end of the spring 1022-*i* is fixed to an end 1025*a*-*i* of the movable portion 1025-*i* (that is, the end 1025*a*-*i* of the movable portion 1025-*i* being supported at the other end of the spring 1022-*i*). On an inner wall surface 1021*b*-*i* of the guide 1021-*i* on the other longitudinal side thereof, one end of the spring 1023-*i* is fixed (that is, an end of the spring 1023-*i* being supported by the guide 1021-*i*), while the other end of the spring 1023-*i* is fixed to an end 1025*b*-*i* of the movable portion 1025-*i* (that is, the end 1025*b*-*i* of the movable portion 1025-*i* being supported at the other end of the spring 1023-*i*).

On the peripheral side of the guide 1021-*i*, the coil 1024-*i* is wound. Here, the first wound portion 1024*a*-*i* is wound in $A_1$ direction (the direction from the farther side to the closer side) on the side of the end 1025*a*-*i* (the N-pole side) of the movable portion 1025-*i*, whereas the second wound portion 1024*b*-*i* is wound in $B_1$ direction opposite to $A_1$ direction (the direction from the closer side to the farther side) on the side of the end 1025*b*-*i* (the S-pole side). That is, when viewed from the side of the end 1025*a*-*i* of the movable portion 1025-*i* (the N-pole side), the first wound portion 1024*a*-*i* is wound clockwise and the second wound portion 1024*b*-*i* is wound counterclockwise. It is also desirable that when the movable portion 1025-*i* is at rest and elastic forces from the springs 1022-*i*, 1023-*i* are balanced, the end 1025*a*-*i* side (the N-pole side) of the movable portion 1025-*i* is positioned in the area of the first wound portion 1024*a*-*i* and the end 1025*b*-*i* side (the S-pole side) is positioned in the area of the second wound portion 1024*b*-*i*.

The guide 1021-*i*, the springs 1022-*i*, 1023-*i*, the coil 1024-*i*, and the movable portion 1025-*i* thus arranged are accommodated in the case 1027-*i*, and the guide 1021-*i* is fixed inside the case 1027-*i*. That is, the relative position of the case 1027-*i* to the guide 1021-*i* is fixed. Here, the longitudinal direction of the case 1027-*i* coincides with the longitudinal direction of the guide 1021-*i* and the longitudinal direction of the movable portion 1025-*i*.

A through hole 1028*a*-*i* is provided in the case 1027-*i* and on the inner wall surface 1021*a*-*i* side of the guide 1021-*i*, and a through hole 1028*b*-*i* is provided on the inner wall surface 1021*b*-*i* side. A rod-like linking portion 102*ea*-*i* is inserted in the through hole 1028*a*-*i*, and a rod-like linking portion 102*eb*-*i* is inserted in the through hole 1028*b*-*i*. One end side of the linking portion 102*ea*-*i* is in contact with the end 1025*a*-*i* side of the movable portion 1025-*i*, while the other end side of the linking portion 102*ea*-*i* is supported at one end side of the linking portion 102*da*-*i*, positioned outside the case 1027-*i*, so as to be rotatable (rotatable about the axis of the linking portion 102*ea*-*i*). One end side of the linking portion 102*eb*-*i* is in contact with the end 1025*b*-*i* side of the movable portion 1025-*i*, while the other end side of the linking portion 102*eb*-*i* is supported at one end side of the linking portion 102*db*-*i*, positioned outside the case 1027-*i*, so as to be rotatable (rotatable about the axis of the linking portion 102*eb*-*i*). The one end side of the linking portion 102*ea*-*i* may or may not be connected with the end 1025*a*-*i* side of the movable portion 1025-*i*. The one end side of the linking portion 102*eb*-*i* may or may not be connected with the end 1025*b*-*i* side of the movable portion 1025-*i*. For example, the ends 1025*a*-*i*, 1025*b*-*i* of the movable portion 1025-*i* may be held between one end side of the linking portion 102*ea*-*i* and one end side of the linking portion 102*db*-*i*. However, the linking portions 102*da*-*i*, 102*db*-*i*, 102*ea*-*i*, 102*eb*-*i* need to move along with the motion of the movable portion 1025-*i*. That is, the linking portions 102*da*-*i*, 102*db*-*i*, 102*ea*-*i*, 102*eb*-*i* have to move with the movable portion 1025-*i*. As other alternatives, the one end side of the linking portion 102*ea*-*i* may be integral with the end 1025*a*-*i* side of the movable portion 1025-*i*, or the one end side of the linking portion 102*eb*-*i* may be integral with the end 1025*b*-*i* side of the movable portion 1025-*i*.

The coil 1024-*i* gives force corresponding to a current fed to it to the movable portion 1025-*i*, which causes the movable portion 1025-*i* to make periodical asymmetric vibration relative to the guide 1021-*i* (periodical translational reciprocating motion with asymmetry in the axis direction referenced to the guide 1021-*i*). More specifically, when a current is fed to the coil 1024-*i* in $A_1$ direction ($B_1$ direction), force in $C_1$ direction (the direction from the N-pole to the S-pole of the movable portion 1025-*i*; rightward) is applied to the movable portion 1025-*i* (FIG. 2A) due to the reaction of Lorentz force explained by the Fleming's left-hand rule. Conversely, when a current is fed to the coil 1024-*i* in $A_2$ direction ($B_2$ direction), force in $C_2$ direction (the direction from the S-pole to the N-pole of the movable portion 1025-*i*; leftward) is applied to the movable portion 1025-*i* (FIG. 2B). Here, $A_2$ direction is the opposite direction of $A_1$ direction. These actions give motion energy to the system composed of the movable portion 1025-*i* and the springs 1022-*i*, 1023-*i*. This can change the position and acceleration of the movable portion 1025-*i* with respect to the case 1027-*i* (the position and acceleration in the axis direction referenced to the guide 1021-*i*), and accordingly change the positions and accelerations of the linking portions 102*da*-*i*, 102*db*-*i*, 102*ea*-*i*, 102*eb*-*i* as well. That is, the movable portion 1025-*i* performs asymmetric vibration relative to the supporting portion 1026-*i* along D-i axis based on the driving control signal DCS supplied while being supported by the supporting portion 1026-*i*, along with which the linking portions 102*da-i*, 102*db-i*, 102*ea-i*, 102*eb-i* also make asymmetric vibration along D-i axis.

Note that the configuration of the vibrator 102-*i* is not limited to the one shown in FIGS. 2A and 2B. For example, it may be configured such that the first wound portion 1024*a-i* of the coil 1024-*i* is wound on the end 1025*a-i* side of the movable portion 1025-*i* in $A_1$ direction and the coil 1024-*i* is not wound on the end 1025*b-i* side. Conversely, it may be configured such that the second wound portion 1024*b-i* of the coil 1024-*i* is wound on the end 1025*b-i* side in $B_1$ direction and the coil 1024-*i* is not wound on the end 1025*a-i* side of the movable portion 1025-*i*. Alternatively, the first wound portion 1024*a-i* and the second wound portion 1024*b-i* may be separate coils from each other. That is, the first wound portion 1024*a-i* and the second wound portion 1024*b-i* may be configured such that they are not be electrically interconnected and that they are supplied with different electric signals than each other.

<Contact Portion 103>

The contact portion 103 is attached to the movable portion 1025-*i* of each vibrator 102-*i*, and thereby the contact portion 103 is supported by each vibrator 102-*i*. That is, the contact portion 103 is attached to the movable portion 1025-*i* while being capable of vibrating relative to the supporting portion 1026-*i*. As illustrated in FIGS. 1A to 1D, the contact portion 103 in this embodiment is a box-shaped component that can accommodate the body portion 101 supporting the vibrator 102-*i* thereon via the intervening component 104-*i* as mentioned above. That is, the contact portion 103 is configured in a shape that covers at least part of the external area of the body portion 101 supporting the supporting portion 1026-*i* thereon. For example, the contact portion 103 is a case that covers at least part of the external area (for example, some faces) of the body portion 101, being a mobile terminal device, supporting the supporting portion 1026-*i* thereon. It is desirable that the contact portion 103 is made of a material having hardness capable of transmitting vibration based on the asymmetric vibration of the movable portion 1025-*i*, has strength enough for acting as a grip portion, and is as lightweight as possible. Such a material may be a synthetic resin such as ABS resin, for example.

The inner bottom surface 103*b* of the contact portion 103 has a recess 103*ba-i* for attaching the movable portion 1025-*i* of the vibrator 102-*i*. The body portion 101 supporting the vibrator 102-*i* thereon is accommodated within the contact portion 103 as mentioned above, and the movable portion 1025-*i* of the vibrator 102-*i* is attached to the bottom surface side of the recess 103*ba-i* via the linking portions 102*da-i*, 102*db-i*, 102*ea-i*, 102*eb-i* described above. That is, the other end side of the linking portions 102*da-i*, 102*db-i* (the other end side of the portions supporting the linking portions 102*ea-i*, 102*eb-i*) is attached to the bottom surface side of the recess 103*ba-i*, thereby attaching the movable portion 1025-*i* to the contact portion 103. The bottom surface 101*b* of the body portion 101 is positioned opposite the inner bottom surface 103*b* of the contact portion 103, and the side surface 101*a* of the body portion 101 is positioned opposite the inner wall surface 103*a* of the contact portion 103. Note that there is a gap between the bottom surface 101*b* and the inner bottom surface 103*b*; they are not in contact with each other. Likewise, there is a gap between the side surface 101*a* and the inner wall surface 103*a*; they are not fixed to each other either. Thus, the contact portion 103 is capable of vibrating relative to the body portion 101, the intervening component 104-*i*, and the supporting portion 1026-*i*. Moreover, in combination with the features of the intervening component 104-*i* described above, the contact portion 103 is also capable of vibration along D-i axis and rotary vibration along a plane on which D-1 axis and D-2 axis exist.

<Mass of System>

The average amplitude of vibration of the "contact mechanism" as the system that vibrates with the contact portion 103 in this embodiment is greater than the average amplitude of vibration of the "base mechanism" as the system supporting the system that vibrates with the contact portion 103. Note that the "system that vibrates with the contact portion 103" and the "system supporting the system that vibrates with the contact portion 103" are systems included in the pseudo force sense generation apparatus 1. In the case of the above-described configuration, the "contact mechanism" as the system that vibrates with the contact portion 103 includes the contact portion 103 and the movable portion 1025-*i*. The "contact mechanism" may further include the linking portions 102*da-i*, 102*db-i*, 102*ea-i*, 102*eb-i*. The "base mechanism" as the system supporting the system that vibrates with the contact portion 103 includes the supporting portion 1026-*i*. The "base mechanism" may further include at least some of the body portion 101, the intervening component 104-*i*, the springs 1022-*i*, 1023-*i*, and the coil 1024-*i*.

The mass $m_1$ of the "contact mechanism" as the system that vibrates with the contact portion 103 is smaller than the mass $m_2$ of the "base mechanism" as the system supporting the system that vibrates with the contact portion 103. This can present pseudo force sense efficiently (clearly and/or with vibrator 102-*i* having smaller stroke). Preferably, the mass $m_1$ of the "contact mechanism" is greater than zero and not more than one third of the mass $m_2$ of the "base mechanism". In other words, $0<m_1/m_2\leq 1/3$ holds. This is because it enables more efficient presentation of pseudo force sense (the associated experimental data will be discussed later).

<Driving Control Device 100>

The driving control device 100 is, for example, a device configured through execution of a predetermined program by a general-purpose or dedicated computer including a processor (hardware processor) such as a CPU (central processing unit), and memories such as RAM (random-access memory) and ROM (read-only memory), among others. The computer may have a single processor and memory or may have more than one processor and memory. The program may be installed in the computer or be recorded in ROM or the like in advance. Some or all of the processing modules may be configured using an electronic circuit (circuitry) that implements processing functions without using a program, instead of an electronic circuit that implements functionality by reading of a program, such as a CPU. In addition, electronic circuit constituting a single device may include multiple CPUs.

<Operation>

Figure 1D:
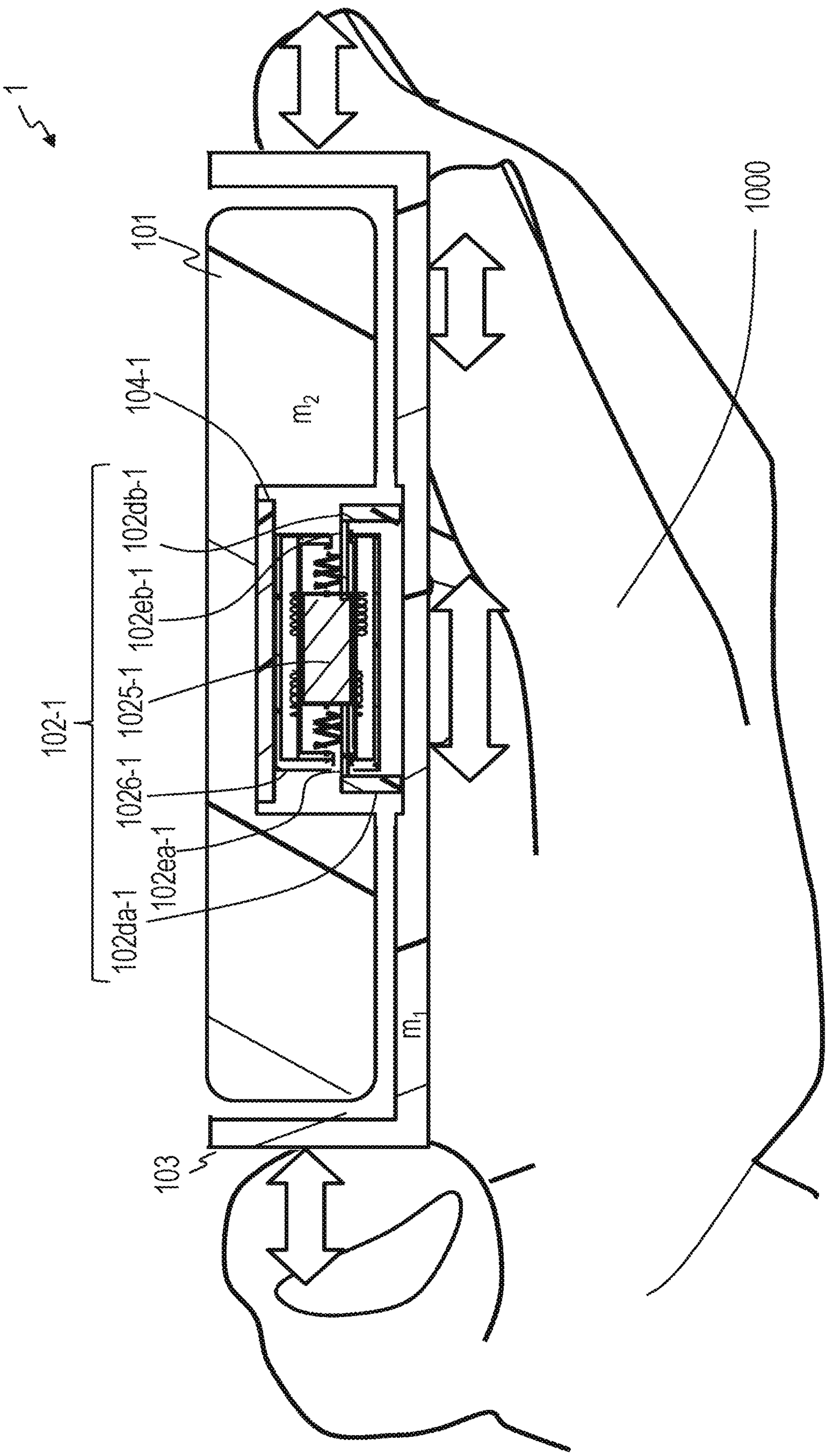
FIG. 1D is a conceptual diagram for describing how the pseudo force sense generation apparatus according to the embodiment is used.

During use of the pseudo force sense generation apparatus 1, only the exterior of the contact portion 103 of the pseudo force sense generation apparatus 1 is gripped in a palm 1000 (FIG. 1D). The other parts, such as the body portion 101, are not gripped. This makes only the contact portion 103 function as the part that makes direct contact with skin. Instead of being directly gripped in the palm 1000, the contact portion 103 may also be gripped via an object, such as a glove. That is, the contact portion 103 may be indirectly gripped in the palm 1000. Alternatively, the contact portion 103 may be brought into contact with skin or mucous membrane of a human body other than a hand. Also in this case, however, the other parts, such as the body portion 101, do not make contact with the human body. That is, only the contact portion 103 is allowed to function as the part that makes direct or indirect contact with the skin or mucous membrane. In other words, the weight of the pseudo force sense generation apparatus 1 during use is supported by the contact portion 103.

The driving control device 100 supplies the vibrator 102-*i* with the driving control signal DCS for driving the vibrator 102-*i*. The driving control signal DCS may be a voltage-controlled signal or a current-controlled signal. Through the driving control signal DCS, a period T1 in which the coil 1024-*i* is fed with a current in a direction that gives the movable portion 1025-*i* acceleration in a desired direction ($C_1$ direction or $C_2$ direction in FIGS. 2A and 2B), and other period T2 are periodically repeated. In doing so, the ratio between the period (time) during which a current is fed in the predetermined direction and the other period (time) (the inversion ratio) is biased to either one of the two periods. In other words, the coil 1024-*i* is fed with a periodical current in which the proportion of the period T1 within one cycle is different from the proportion of the period T2 in that cycle. This causes at least some movable portion(s) 1025-*i* to asymmetrically vibrate relative to the supporting portion 1026-*i* along D-i axis. The asymmetric vibration of the movable portion 1025-*i* is transmitted to the contact portion 103 via the linking portions 102*da*-*i*, 102*db*-*i*, 102*ea*-*i*, 102*eb*-*i*. In other words, force based on the asymmetric vibration of the movable portion 1025-*i* is given to the contact portion 103 via the linking portions 102*da*-*i*, 102*db*-*i*, 102*ea*-*i*, 102*eb*-*i*. This causes the contact portion 103 to make periodical asymmetric motion relative to the body portion 103 and the supporting portion 1026-*i*, giving force based on the asymmetric motion to the skin with which the contact portion 103 is in direct or indirect contact. This can present pseudo force sense in a desired translational direction or rotational direction. For example, when the movable portion 1025-1 and the movable portion 1025-2 present pseudo force sense in the same direction (the same direction along D-1 axis and D-2 axis) with asymmetric vibration of the same phase, the user perceives translational force sense. For example, when the movable portion 1025-1 and the movable portion 1025-2 present pseudo force sense in opposite directions to each other (opposite directions to each other along D-1 axis and D-2 axis) with asymmetric vibration of reverse phases, the user perceives pseudo force sense in a rotational direction.

Desirably, a waveform pattern (time-series waveform pattern) of the force that is given by the contact portion 103 to skin or mucous membrane represents force that is in a predetermined direction DIR1 and has an absolute value equal to or greater than threshold TH1 (a first threshold) in time segment $\tau 1$ (a first time segment), and represents force that is in direction DIR2 opposite to the predetermined direction and has an absolute value within threshold TH2 (TH2<TH1) in time segment $\tau 2$ (a second time segment different from the first time segment). Here, $\tau 1<\tau 2$ holds, and time segment $\tau 1$ and time segment $\tau 2$ are periodically repeated. Such a waveform pattern will be called "optimized waveform pattern". This enables pseudo force sense to be perceived more clearly. It is more desirable that the waveform pattern of the force is a rectangular pattern or a pattern close to a rectangular pattern.

<Specific Examples of Intervening Component 104-*i*>

When the movable portion 1025-1 and the movable portion 1025-2 make asymmetric vibration of the reverse phases, the contact portion 103 rotates (turns) relative to the body portion 101. Such a movement is effected by the action of the intervening component 104-*i* described above. Exemplary configurations of the intervening component 104-*i* are described below.

<<Example of Intervening Component 104-*i* Utilizing the Anisotropy of Rigidity>>

The intervening component 104-*i* may be a component with the rigidity in the direction along D-i axis (the ith axis) being higher than the rigidity in the direction along E-i axis (an axis having a different orientation than D-i axis). In this embodiment, every intervening component 104-*i* is positioned between the supporting portion 1026-*i* and the body portion 101.

Example 1-1

Figure 3A:
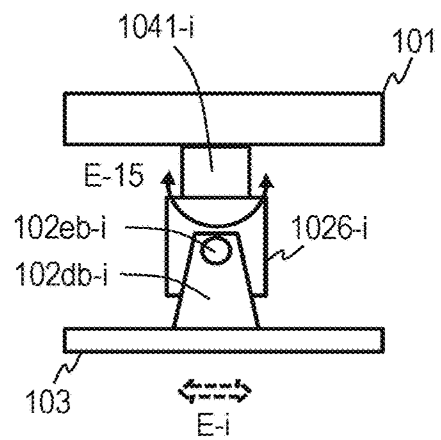
FIGS. 3A to 3D are conceptual diagrams illustrating a configuration of an intervening component according to the embodiment.
Figure 3B:
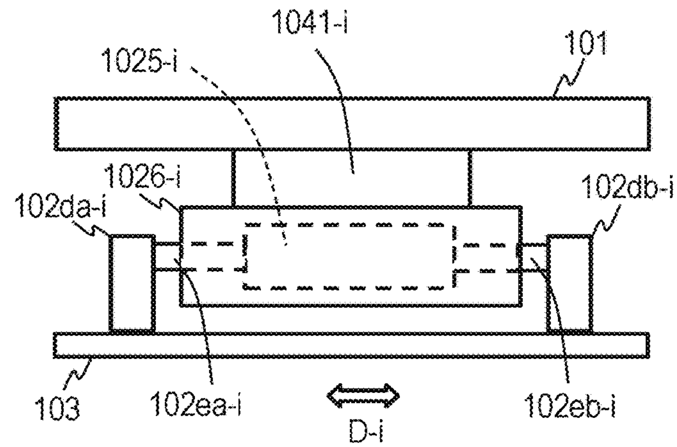

FIGS. 3A and 3B show an intervening component 1041-*i* as an example 1-1 of the intervening component 104-*i* utilizing the anisotropy of rigidity. FIG. 3A is a right side view of the intervening component 1041-*i*, and FIG. 3B is a front view of the intervening component 1041-*i*. The intervening component 1041-*i* is a rectangular-parallelepiped flexible component (for example, an elastic body such as synthetic resin and rubber). For example, the intervening component 1041-*i* may be a piece of sponge-lined, double-sided adhesive tape. The movable portion 1025-*i* of the vibrator 102-*i* is attached to the contact portion 103 via the linking portions 102*da*-*i*, 102*db*-*i*, 102*ea*-*i*, 102*eb*-*i*, and the supporting portion 1026-*i* of the vibrator 102-*i* is attached to one side surface of the intervening component 1041-*i*. The surface opposite to that one side surface of the intervening component 1041-*i* is attached to the body portion 101. The rigidity of the intervening component 1041-*i* in the longitudinal direction (the direction along D-i axis) is higher than the rigidity in the short direction (the direction along E-i axis). This allows vibration of the movable portion 1025-*i* in the direction along D-i axis to be efficiently transmitted to the contact portion 103. In addition, since the vibrator 102-*i* rotates in E-15 direction, movement of the contact portion 103 relative to the body portion 101 in the direction along E-i axis is not significantly hindered (the contact portion 103 can make minute vibration relative to the body portion 101 in the direction along E-i axis).

Example 1-2

Figure 3C:
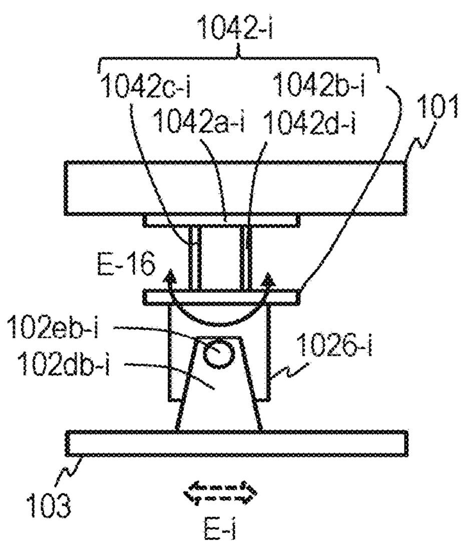
Figure 3D:
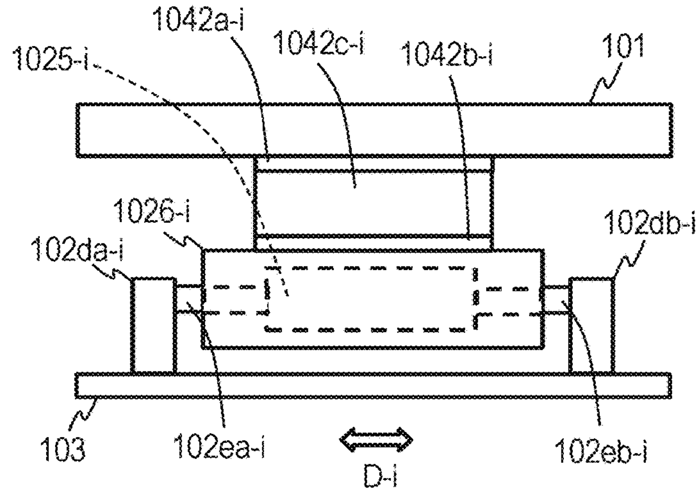

FIGS. 3C and 3D show an intervening component 1042-*i* as an example 1-2 of the intervening component 104-*i* utilizing the anisotropy of rigidity. FIG. 3C is a right side view of the intervening component 1042-*i*, and FIG. 3D is a front view of the intervening component 1042-*i*. The intervening component 1042-*i* is composed of two rectangular plate-like portions 1042*a*-*i*, 1042*b*-*i* positioned substantially parallel (for example, parallel) to each other, and two rectangular plate-like portions 1042*c*-*i*, 1042*d*-*i* connecting between the plate-like portions 1042*a*-*i*, 1042*b*-*i* and positioned substantially parallel (for example, parallel) to each other. The plate-like portions 1042*a*-*i*, 1042*b*-*i* are substantially orthogonal (for example, orthogonal) to the plate-like portions 1042*c*-*i*, 1042*d*-*i*. The intervening component 1042-*i* is made of a flexible component and integrally formed, for example. The movable portion 1025-*i* of the vibrator 102-*i* is attached to the contact portion 103 via the linking portions 102*da*-*i*, 102*db*-*i*, 102*ea*-*i*, 102*eb*-*i*, and the supporting portion 1026-*i* of the vibrator 102-*i* is attached to the plate-like portion 1042*b*-*i* of the intervening component 1042-*i*. The plate-like portion 1042*a*-*i* of the intervening component 1042-*i* is attached to the body portion 101. The rigidity of the intervening component 1042-*i* in the longitudinal direction (the direction along D-i axis) is higher than the rigidity in the short direction (the direction along E-i axis). This allows vibration of the movable portion 1025-*i* in the direction along D-i axis to be efficiently transmitted to the contact portion 103. In addition, since the vibrator 102-*i* rotates in E-16 direction, movement of the contact portion 103 relative to the body portion 101 in the direction along E-i axis is not significantly hindered.

Example 1-3

Figure 4A:
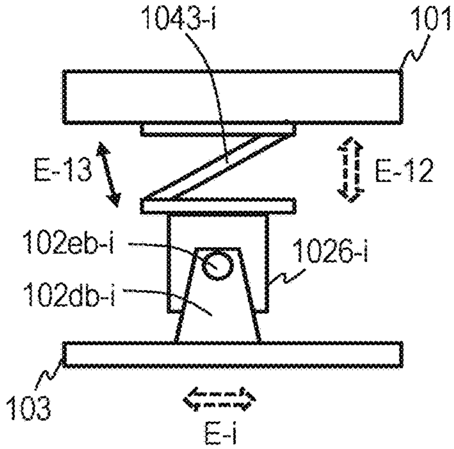
FIGS. 4A to 4F are conceptual diagrams illustrating a configuration of an intervening component according to the embodiment.
Figure 4B:
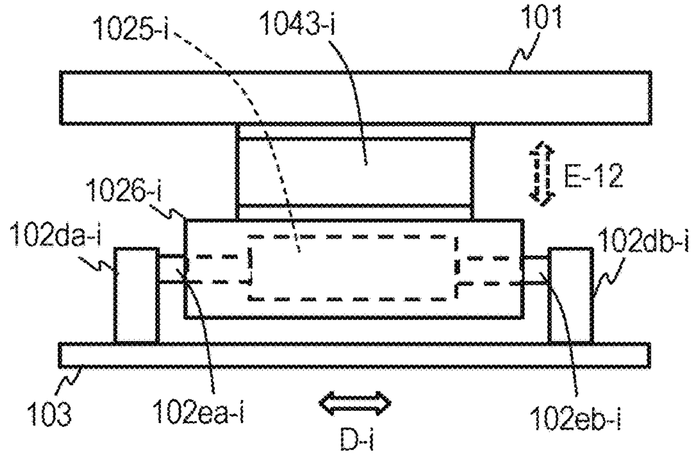

FIGS. 4A and 4B show an intervening component 1043-*i* as an example 1-3 of the intervening component 104-*i* utilizing the anisotropy of rigidity. FIG. 4A is a right side view of the intervening component 1043-*i*, and FIG. 4B is a front view of the intervening component 1043-*i*. The intervening component 1043-*i* is a component having a Z-shaped right side surface, composed of two rectangular plate-like portions positioned substantially parallel to each other and a rectangular plate-like portion connecting them obliquely. The intervening component 1043-*i* is made of a flexible component and integrally formed, for example. The movable portion 1025-*i* of the vibrator 102-*i* is attached to the contact portion 103 via the linking portions 102*da*-*i*, 102*db*-*i*, 102*ea*-*i*, 102*eb*-*i*, the supporting portion 1026-*i* of the vibrator 102-*i* is attached to one end of the intervening component 1043-*i*, and the other end of intervening component 1043-*i* is attached to the body portion 101. The rigidity of the intervening component 1043-*i* in the longitudinal direction (the direction along D-i axis) is higher than the rigidity in the short direction (the direction along E-i axis). This allows vibration of the movable portion 1025-*i* in the direction along D-i axis to be efficiently transmitted to the contact portion 103. In addition, since the vibrator 102-*i* moves in E-13 direction, movement of the contact portion 103 relative to the body portion 101 in the direction along E-i axis is not significantly hindered. Further, the vibrator 102-*i* can also move in E-12 direction; movement of the contact portion 103 relative to the body portion 101 in E-12 direction is not significantly hindered either.

Example 1-4

Figure 4C:
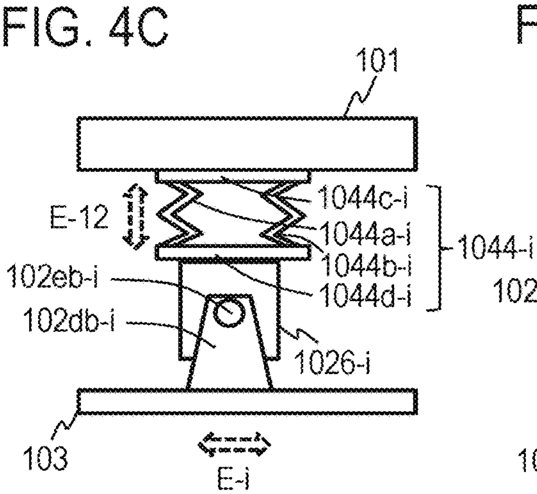
Figure 4D:
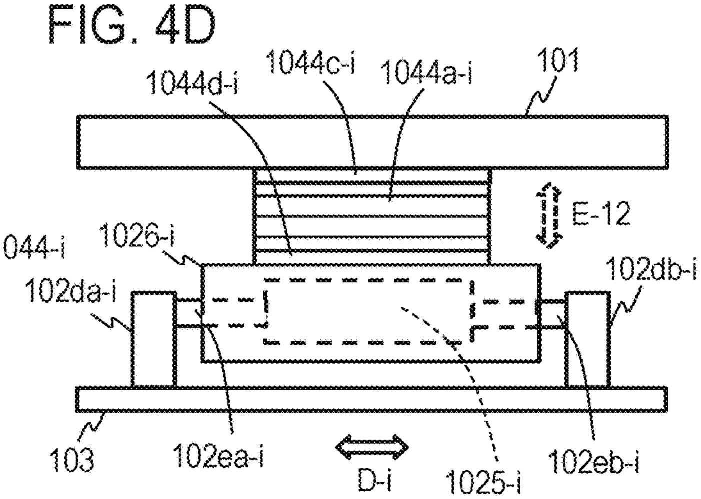

FIGS. 4C and 4D show an intervening component 1044-*i* as an example 1-4 of the intervening component 104-*i* utilizing the anisotropy of rigidity. FIG. 4C is a right side view of the intervening component 1044-*i*, and FIG. 4D is a front view of the intervening component 1044-*i*. The intervening component 1044-*i* is composed of two rectangular plate-like portions 1044*c*-*i*, 1044*d*-*i* positioned substantially parallel to each other, and two accordion-shaped portions 1044*a*-*i*, 1044*b*-*i* connecting between the plate-like portions 1044*c*-*i*, 1044*d*-*i*. The intervening component 1044-*i* is made of a flexible component and integrally formed, for example. The movable portion 1025-*i* of the vibrator 102-*i* is attached to the contact portion 103 via the linking portions 102*da*-*i*, 102*db*-*i*, 102*ea*-*i*, 102*eb*-*i*, and the supporting portion 1026-*i* of the vibrator 102-*i* is attached to the plate-like portion 1044*d*-*i* of the intervening component 1044-*i*. The plate-like portion 1044*c*-*i* of the intervening component 1044-*i* is attached to the body portion 101. The rigidity of the intervening component 1044-*i* in the longitudinal direction (the direction along D-i axis) is higher than the rigidity in the short direction (the direction along E-i axis). This allows vibration of the movable portion 1025-*i* in the direction along D-i axis to be efficiently transmitted to the contact portion 103. In addition, movement of the contact portion 103 relative to the body portion 101 in the direction along E-i axis is not significantly hindered. Further, the vibrator 102-*i* can also move in E-12 direction; movement of the contact portion 103 relative to the body portion 101 in E-12 direction is not significantly hindered either.

Example 1-5

Figure 4E:
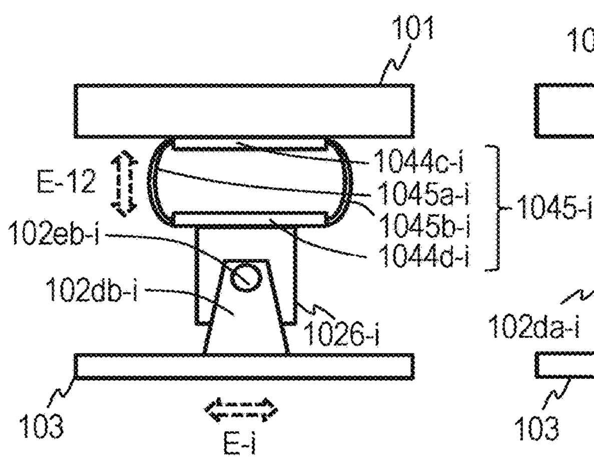
Figure 4F:
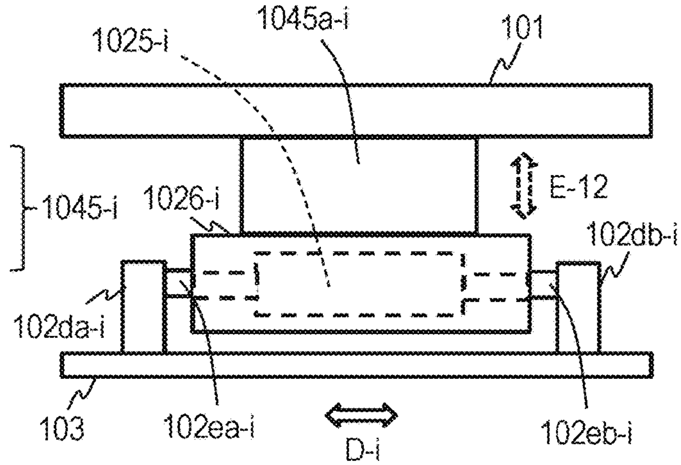

FIGS. 4E and 4F show an intervening component 1045-*i* as an example 1-5 of the intervening component 104-*i* utilizing the anisotropy of rigidity. FIG. 4C is a right side view of the intervening component 1045-*i*, and FIG. 4D is a front view of the intervening component 1045-*i*. The intervening component 1045-*i* is similar to the intervening component 1044-*i* described above but with the two accordion-shaped portions 1044*a*-*i*, 1044*b*-*i* replaced with curved portions 1045*a*-*i*, 1045*b*-*i*. The intervening component 1045-*i* is made of a flexible component and integrally formed, for example. This configuration also can achieve similar features to example 1-4.

Example 1-6

Figure 6A:
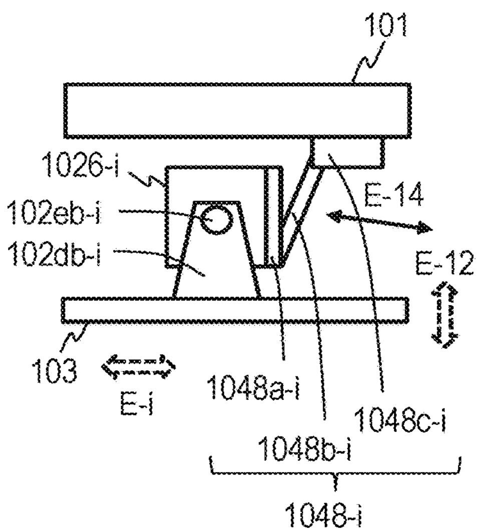
FIGS. 6A to 6D are conceptual diagrams illustrating a configuration of an intervening component according to the embodiment.
Figure 6B:
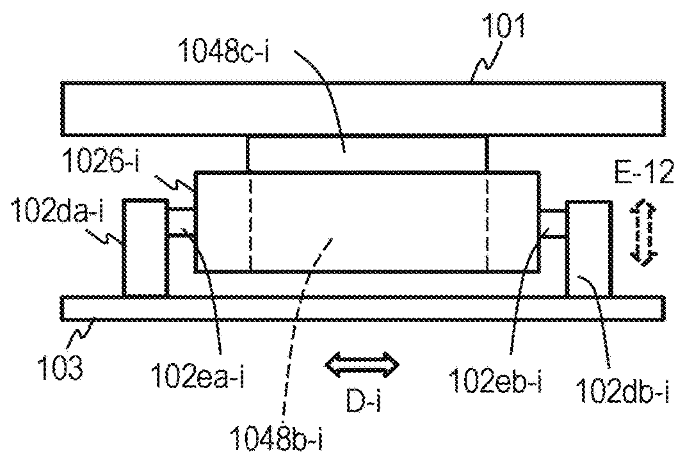

FIGS. 6A and 6B show an intervening component 1048-*i* as an example 1-6 of the intervening component 104-*i* utilizing the anisotropy of rigidity. FIG. 6A is a right side view of the intervening component 1048-*i*, and FIG. 6B is a front view of the intervening component 1048-*i*. The intervening component 1048-*i* is a component composed of two rectangular plate-like portions 1048*a*-*i*, 1048*c*-*i* substantially orthogonal to each other, and a rectangular plate-like portion 1048*b*-*i* connecting between them. The plate-like portion 1048*b*-*i* may connect the plate-like portions 1048*a*-*i*, 1048*c*-*i* at any position. The intervening component 1048-*i* is made of a flexible component and integrally formed, for example. The movable portion 1025-*i* of the vibrator 102-*i* is attached to the contact portion 103 via the linking portions 102*da*-*i*, 102*db*-*i*, 102*ea*-*i*, 102*eb*-*i*, and a side surface of the supporting portion 1026-*i* of the vibrator 102-*i* is attached to the plate-like portion 1048*a*-*i* of the intervening component 1048-*i*. The plate-like portion 1048*c*-*i*, located at the other end of the intervening component 1048-*i*, is attached to the body portion 101. The rigidity of the intervening component 1048-*i* in the longitudinal direction (the direction along D-i axis) is higher than the rigidity in the short direction (the direction along E-i axis). This allows vibration of the movable portion 1025-*i* in the direction along D-i axis to be efficiently transmitted to the contact portion 103. In addition, since the vibrator 102-*i* moves in E-14 direction, movement of the contact portion 103 relative to the body portion 101 in the direction along E-i axis is not significantly hindered. Further, the vibrator 102-*i* can also move in E-12 direction; movement of the contact portion 103 relative to the body portion 101 in E-12 direction is not significantly hindered either.

Examples of Intervening Component 104-*i* Using Hinge

The intervening component 104-*i* may also be a hinge mechanism.

Example 2-1

Figure 5A:
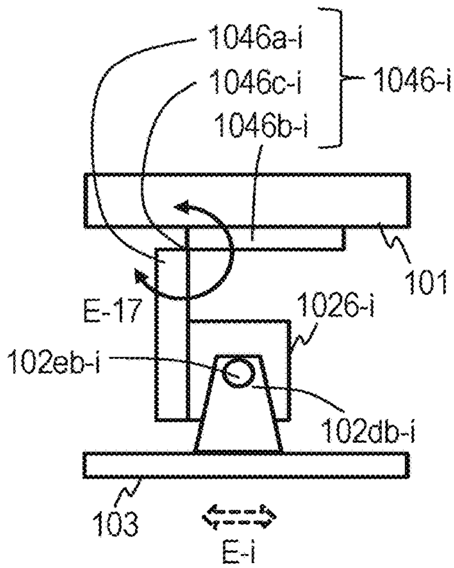
FIGS. 5A to 5D are conceptual diagrams illustrating a configuration of an intervening component according to the embodiment.
Figure 5B:
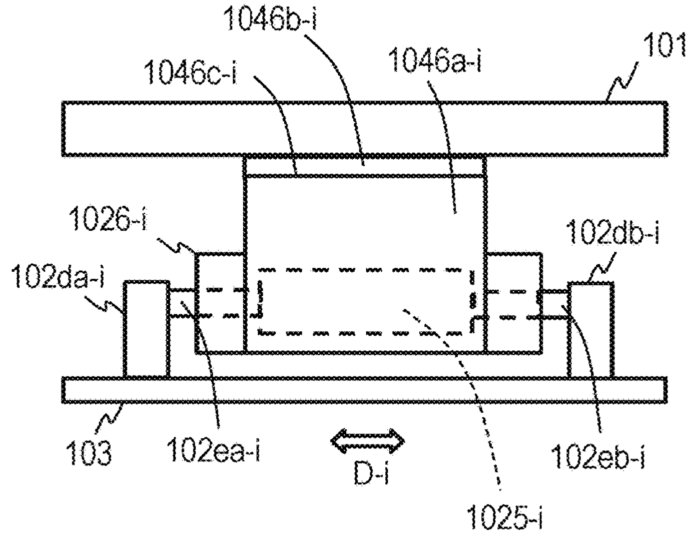

FIGS. 5A and 5B show an intervening component 1046-*i* as an example 2-1 of an intervening component 104-*i* using a hinge mechanism. FIG. 5A is a right side view of the intervening component 1046-*i*, and FIG. 5B is a front view of the intervening component 1046-*i*. The intervening component 1046-*i* is a hinge including an attachment portion 1046*a*-*i* and an attachment portion 1046*b*-*i* which is capable of rotating relative to the attachment portion 1046*a*-*i* about a hinge shaft 1046*c*-*i*. The intervening component 1046-*i* may be integrally formed from a flexible component made of polypropylene and the like, or separate attachment portions 1046*a*-1046*b*-*i* composed of flexible components may be connected together. Note that the hinge shaft 1046*c*-*i* has to be positioned in an orientation along D-i axis (the ith axis). The attachment portion 1046*a*-*i* is attached to the supporting portion 1026-*i* side, while the attachment portion 1046*b*-*i* is attached to the body portion 101 side. This allows vibration of the movable portion 1025-*i* in the direction along D-i axis to be efficiently transmitted to the contact portion 103. In addition, thanks to the rotation of the vibrator 102-*i* in E-17 direction and rotation about the axis along the linking portion 102*eb*-*i*, movement of the contact portion 103 relative to the body portion 101 in the direction along E-i axis is not significantly hindered.

Example 2-2

Figure 5C:
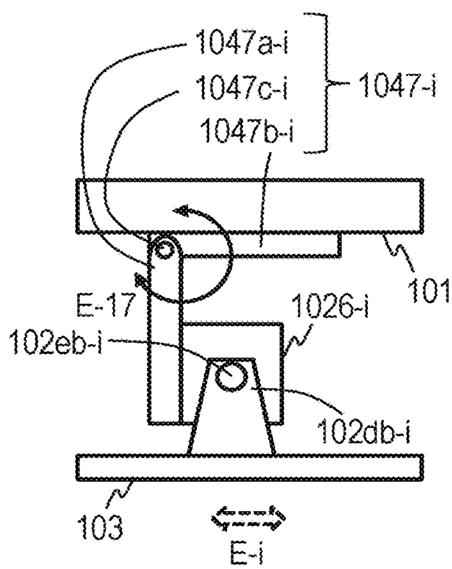
Figure 5D:
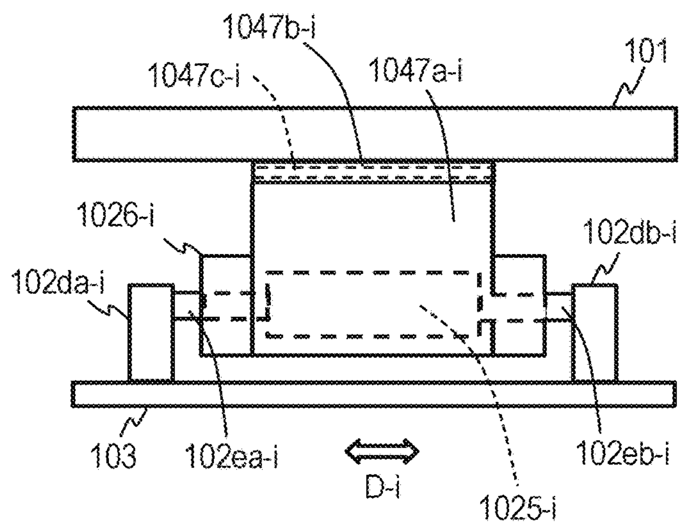

FIGS. 5C and 5D show an intervening component 1047-*i* as an example 2-2 of the intervening component 104-*i* using a hinge mechanism. FIG. 5C is a right side view of intervening component 1047-*i*, and FIG. 5D is a front view of the intervening component 1047-*i*. The intervening component 1047-*i* is a hinge including an attachment portion 1047*a*-*i* and an attachment portion 1047*b*-*i* which is capable of rotating relative to the attachment portion 1047*a*-*i* about a hinge shaft 1047*c*-*i*. The difference from example 2-1 is that the attachment portions 1047*a*-*i*, 1047*b*-*i* are mechanically coupled by the hinge shaft 1047*c*-*i*. The intervening component 1047-*i* is made of synthetic resin, for example. The hinge shaft 1047*c*-*i* has to be positioned in the orientation along D-i axis (the ith axis). The attachment portion 1047*a*-*i* is attached to the supporting portion 1026-*i* side, while the attachment portion 1047*b*-*i* is attached to the body portion 101 side. This configuration also can achieve similar features to example 2-1.

Examples of Intervening Component 104-*i* Using Sliding Mechanism

The intervening component 104-*i* may also be composed of a sliding mechanism.

Figure 6C:
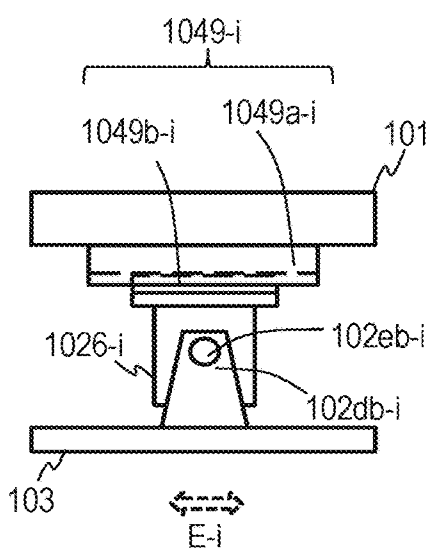
Figure 6D:
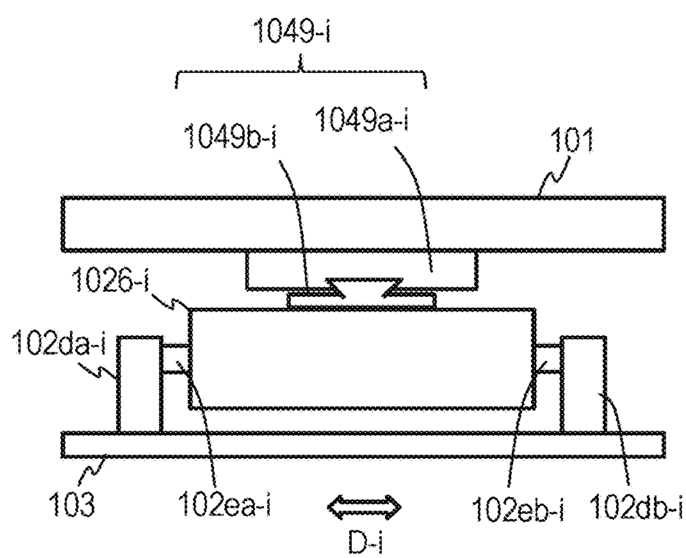

FIGS. 6C and 6D show an intervening component 1049-*i* as an example of an intervening component 104-*i* using a sliding mechanism. FIG. 6C is a right side view of the intervening component 1048-*i*, and FIG. 6D is a front view of the intervening component 1048-*i*. The intervening component 1048-*i* is a sliding mechanism including a rail portion 1049*b*-*i* and a sliding portion 1049*a*-*i* slidably supported in the rail portion 1049*b*-*i*. The rail portion 1049*b*-*i* is positioned in an orientation along E-i axis (a sliding axis having a different orientation than the ith axis). The sliding portion 1049*a*-*i* can slide along E-i axis (the sliding axis) while being supported in the rail portion 1049*b*-*i*. The rail portion 1049*b*-*i* is attached to the supporting portion 1026-*i* side, and the sliding portion 1049*a*-*i* is attached to the body portion 101 side. This allows vibration of the movable portion 1025-*i* in the direction along D-i axis to be efficiently transmitted to the contact portion 103. In addition, since the sliding portion 1049*a*-*i* can slide along E-i axis, movement of the contact portion 103 relative to the body portion 101 in the direction along E-i axis is not significantly hindered.

Modification 1 of the First Embodiment

The intervening component 104-*i* may be not be included in the pseudo force sense generation apparatus 1 of the first embodiment such that the supporting portion 1026-*i* is directly attached to the bottom surface 101*ba*-*i* of the recess 101*d*-*i* in the body portion 101. Although pseudo force sense in a rotational direction cannot be presented in that case, translational force sense can be presented by causing the movable portion 1025-1 and the movable portion 1025-2 to make asymmetric vibration of the same phase.

Modification 2 of the First Embodiment

In the first embodiment, the contact portion 103 is attached to the movable portion 1025-*i* via the linking portions 102*da*-*i*, 102*db*-*i*, 102*ea*-*i*, 102*eb*-*i* as described above. However, the contact portion 103 may instead be integral with the movable portion 1025-*i*.

Second Embodiment

While in the first embodiment only the bottom surface 101*b* and the side surface 101*a* of the body portion 101 are covered by the contact portion 103, the exterior of the body portion 101 may be entirely covered by the contact portion. The following description will focus on differences from the matters so far described, and matters already described are denoted with the same reference characters and are not described in detail again.

Figure 7A:
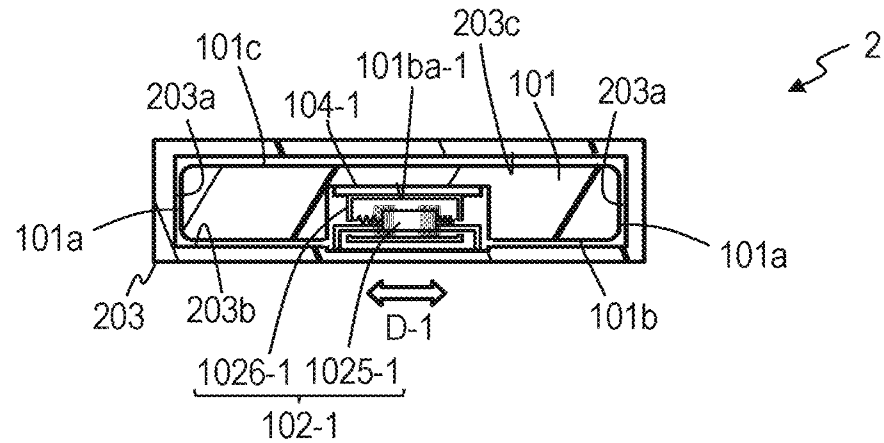
FIGS. 7A and 7B are conceptual diagrams illustrating a configuration of a pseudo force sense generation apparatus according to an embodiment.
Figure 7B:
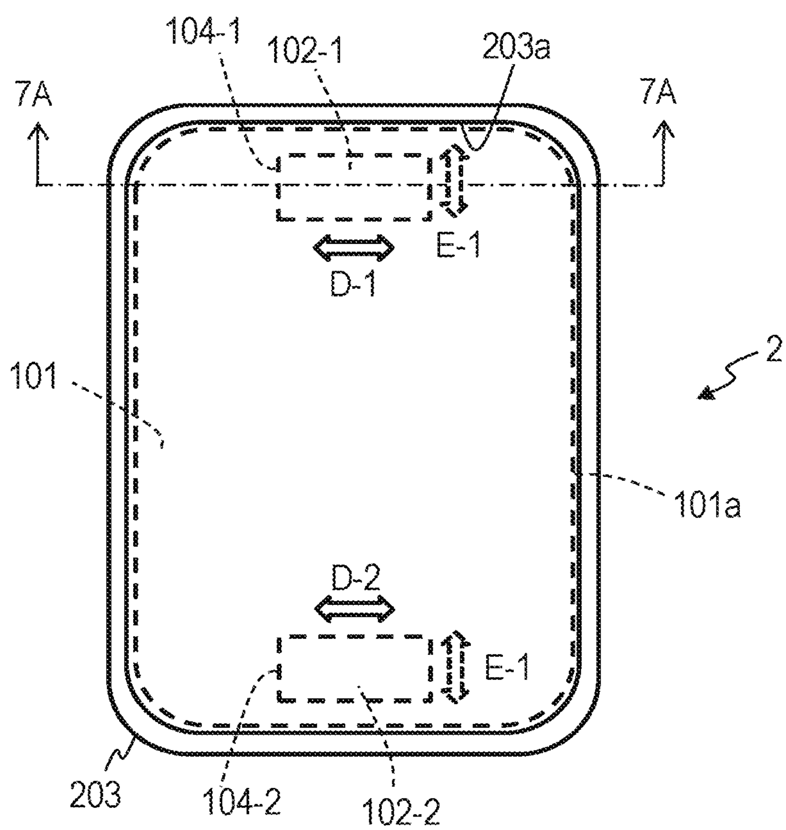
Figure 7C:
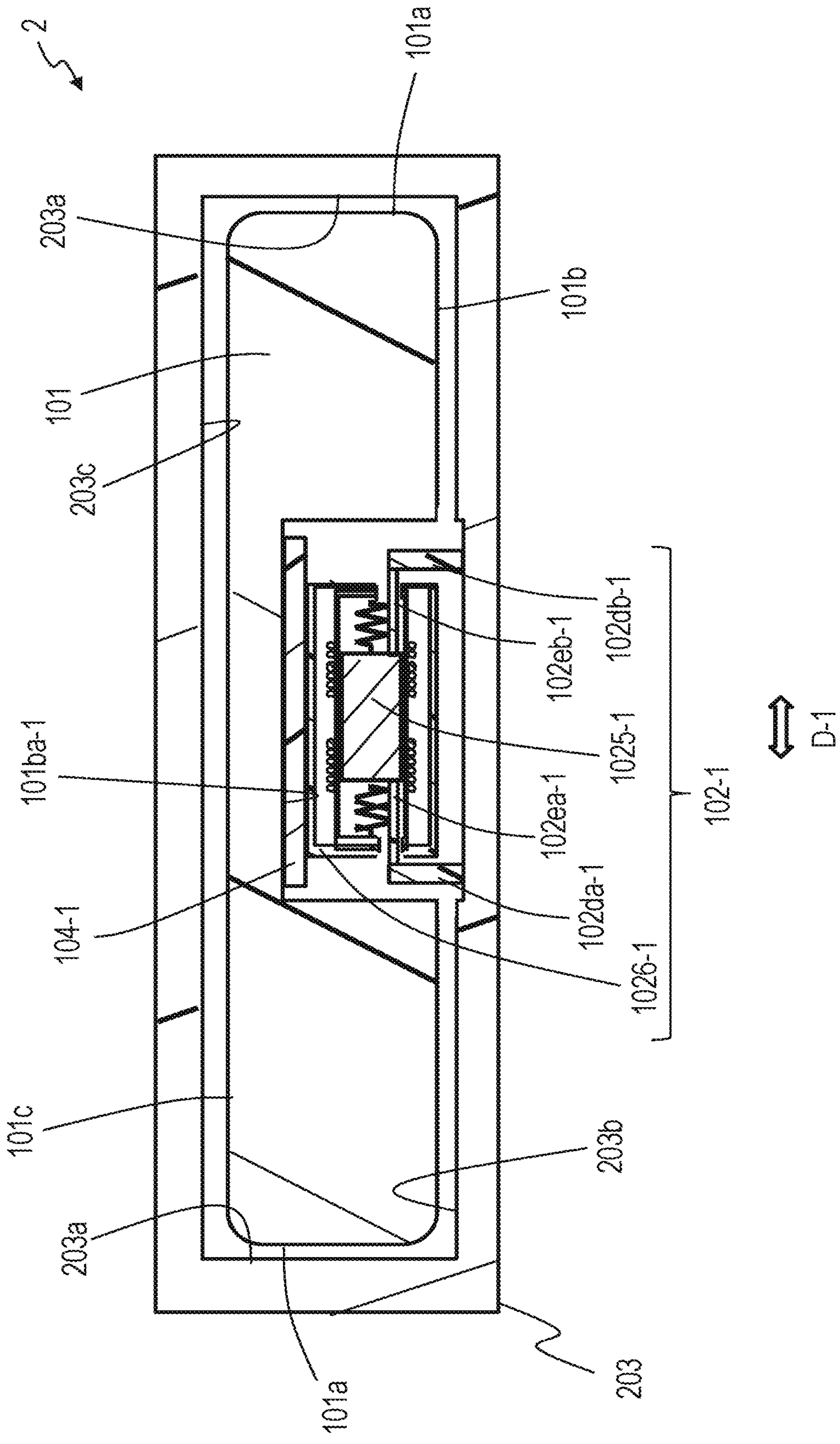
FIG. 7C is an enlarged cross-sectional view at 7A-7A in FIG. 7B.
Figure 8A:
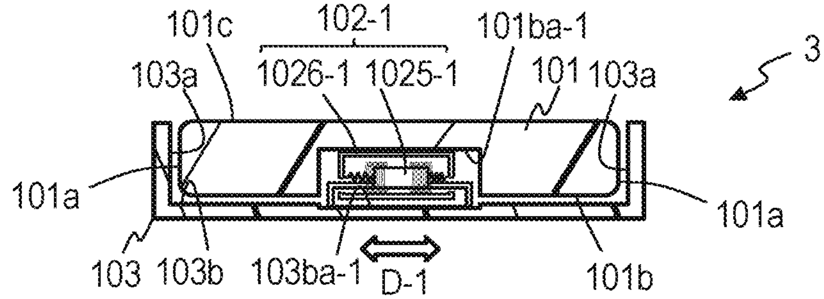
FIGS. 8A to 8C are conceptual diagrams illustrating a configuration of a pseudo force sense generation apparatus according to an embodiment.
Figure 8B:
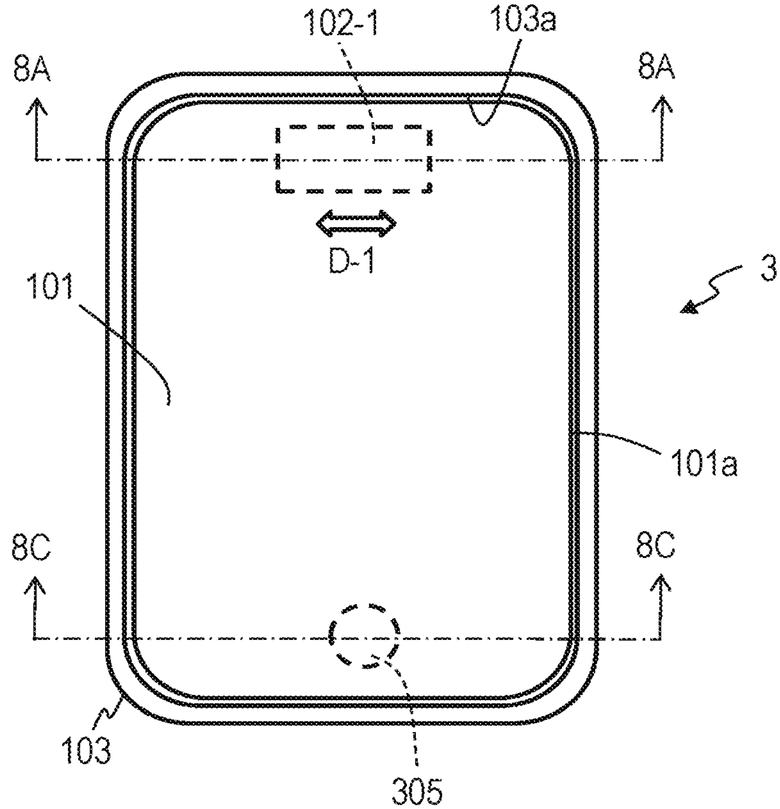
Figure 8C:
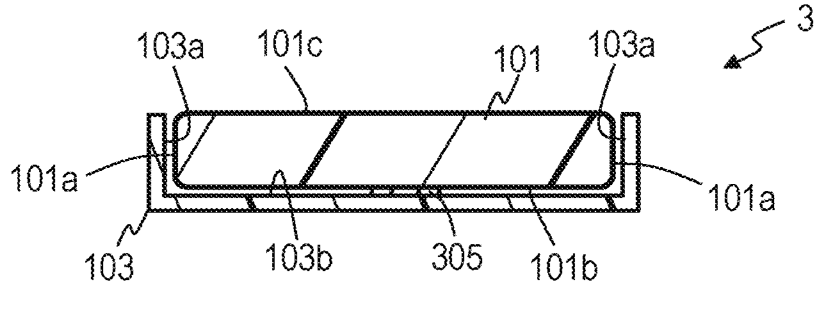
Figure 8D:
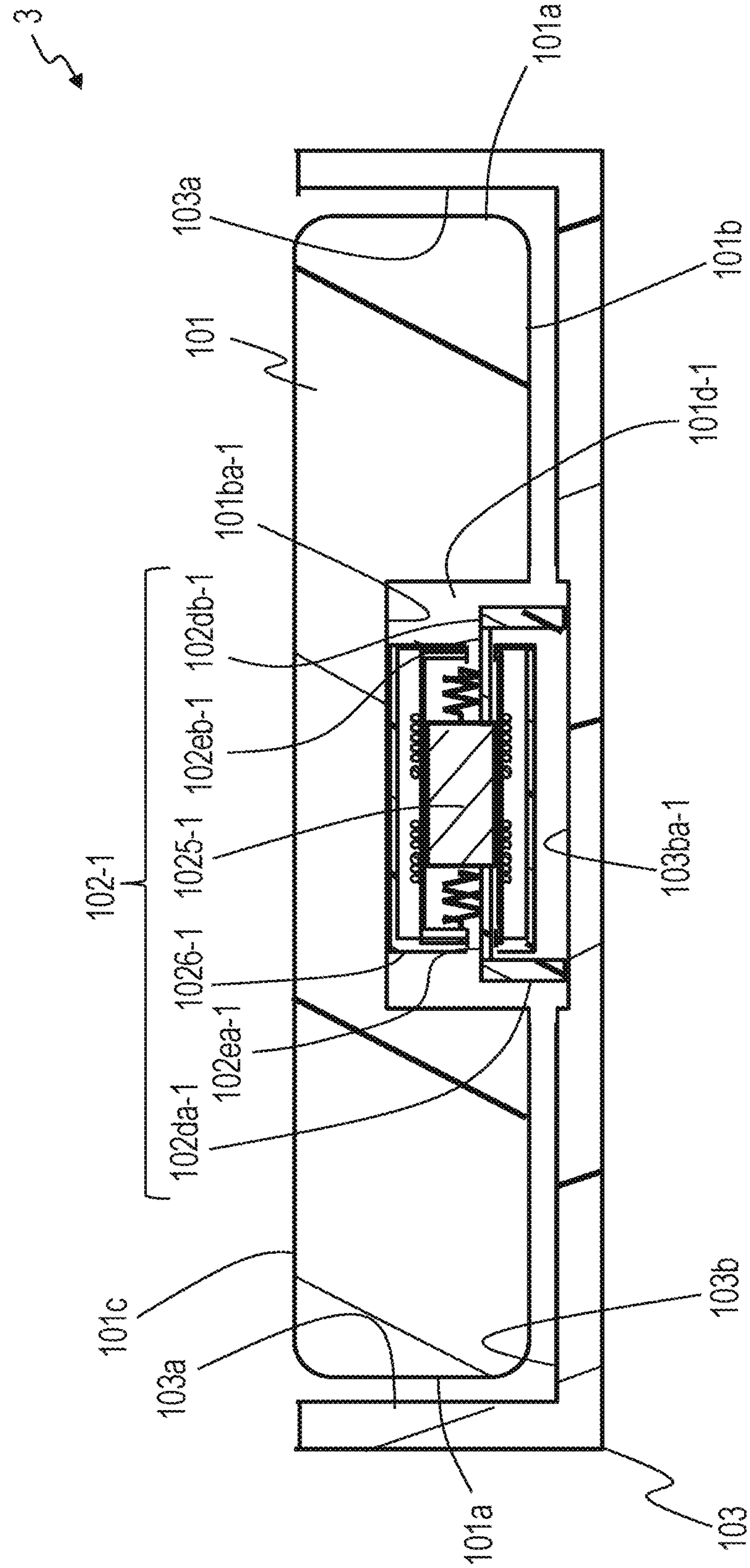
FIG. 8D is an enlarged cross-sectional view at 8A-8A in FIG. 8B.
Figure 9A:
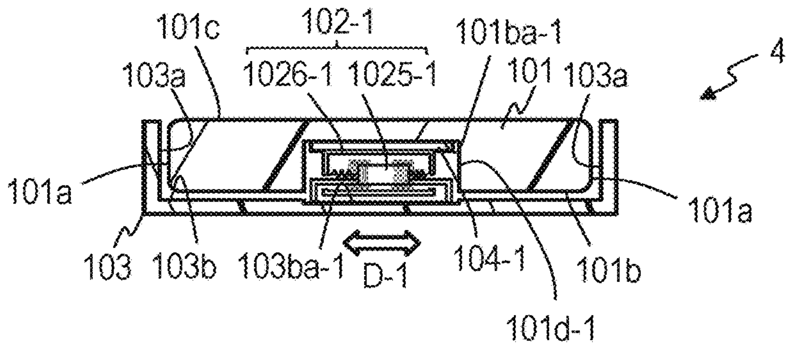
FIGS. 9A to 9C are conceptual diagrams illustrating a configuration of a pseudo force sense generation apparatus according to an embodiment.
Figure 9B:
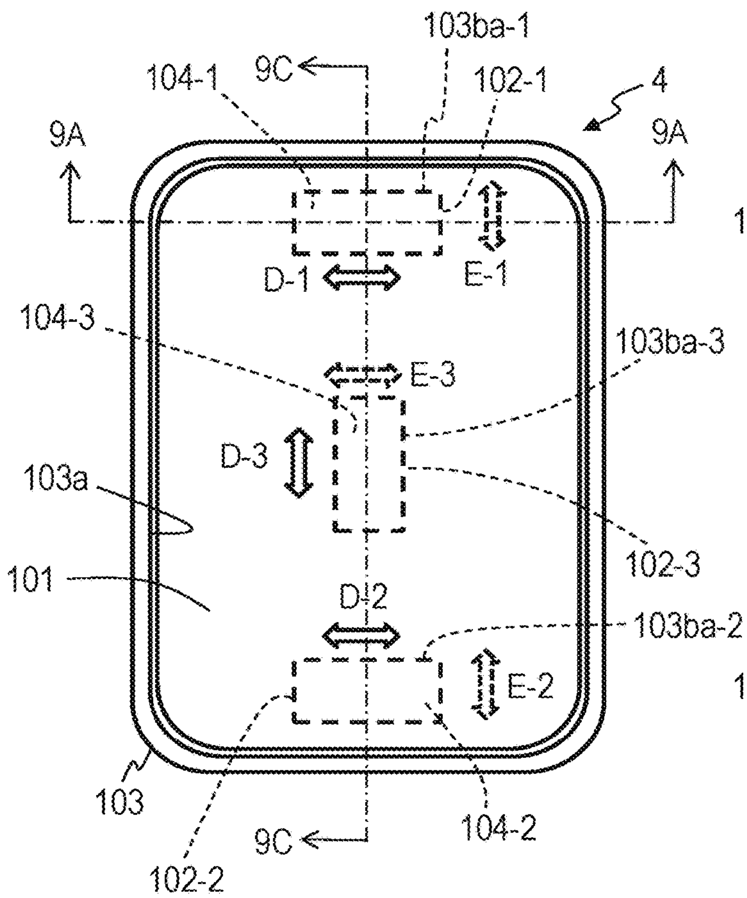
Figure 9C:
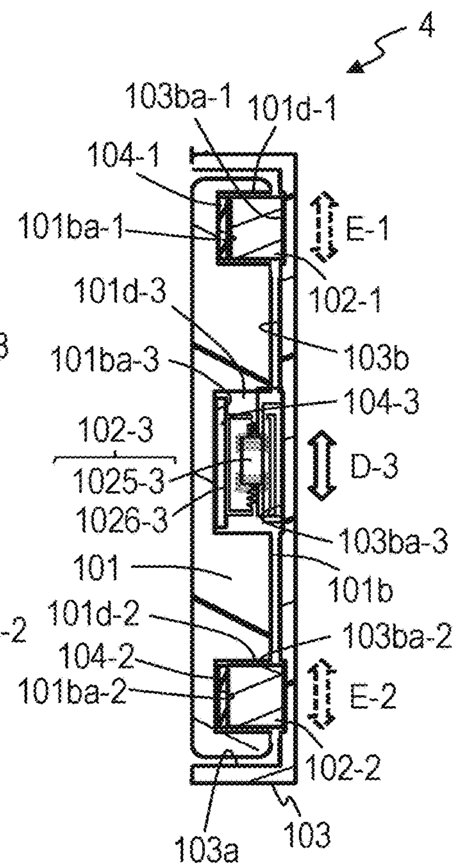
Figure 9D:
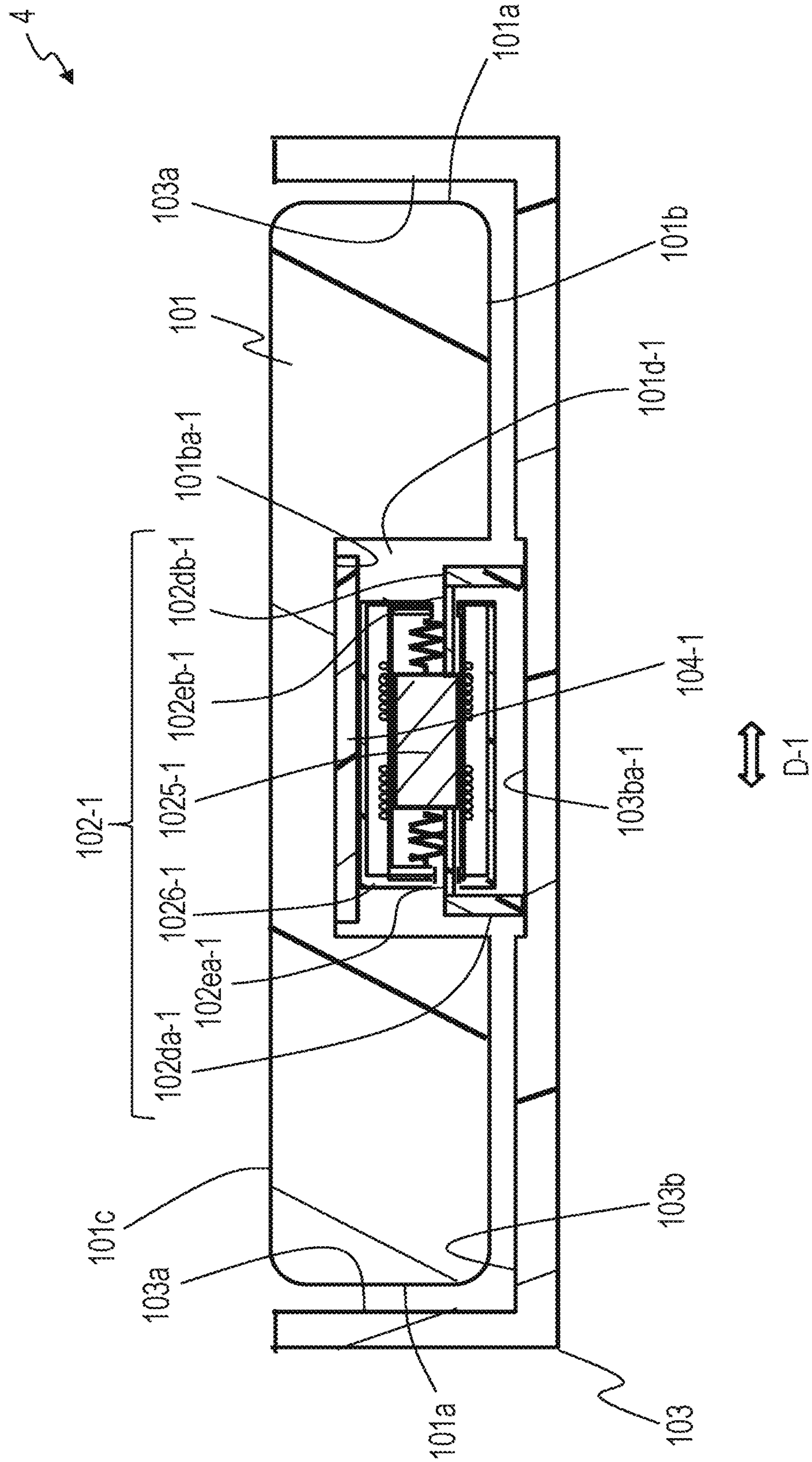
FIG. 9D is an enlarged cross-sectional view at 9A-9A in FIG. 9B.
Figure 9E:
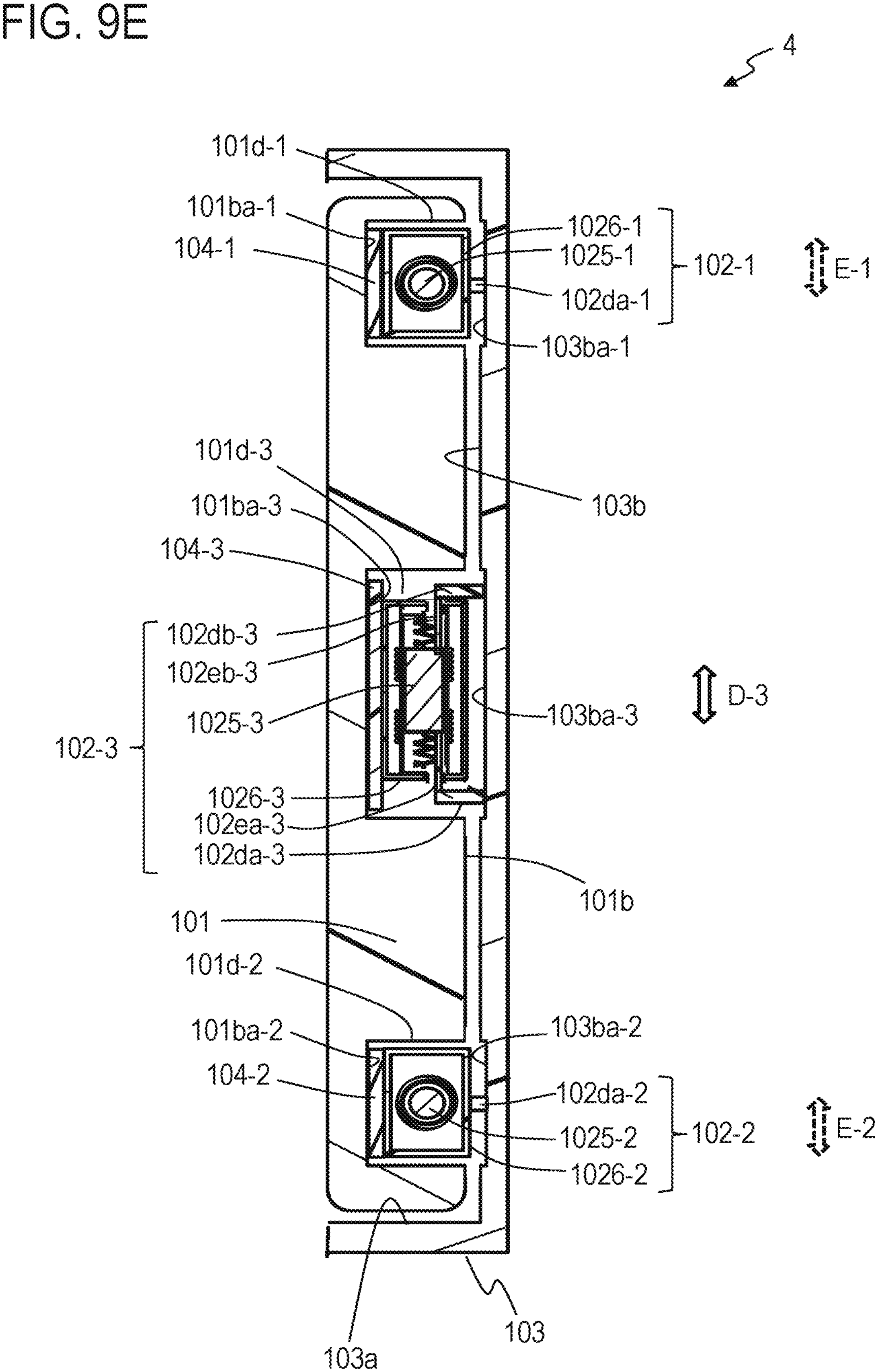
FIG. 9E is an enlarged cross-sectional view at 9C-9C in FIG. 9B.

As illustrated in FIGS. 7A to 7C, a pseudo force sense generation apparatus 2 in a second embodiment has a body portion 101, vibrators 102-1, 102-2, a contact portion 203, and intervening components 104-1, 104-2. Again, the supporting portion 1026-*i* of the vibrator 102-*i* (where i=1, 2) corresponds to the "base mechanism-side component" and the movable portion 1025-*i* corresponds to the "contact mechanism-side component". The contact portion 203 is a component for supporting the weight of the pseudo force sense generation apparatus 2. The differences from the first embodiment are that the contact portion 203 is a box-shaped component that entirely covers the exterior of the body portion 101, the bottom surface 101*b* of the body portion 101 accommodated in the contact portion 203 is positioned opposite an inner bottom surface 203*b* of the contact portion 203, the side surface 101*a* of the body portion 101 is positioned opposite an inner wall surface 203*a* of the contact portion 203, and the upper surface 101*c* of the body portion 101 is positioned opposite an inner upper surface 203*c* of the contact portion 203. There are gaps between the bottom surface 101*b* and the inner bottom surface 203*b*, between the side surface 101*a* and the inner wall surface 203*a*, and between the upper surface 101*c* and the inner upper surface 203*c*; and the body portion 101 and the contact portion 203 are not in contact with each other. Otherwise, this embodiment may be same as the first embodiment or modifications thereof except the replacement of the contact portion 103 with the contact portion 203.

Third Embodiment

In the first and second embodiments, the pseudo force sense generation apparatus 1, 2 has two vibrators 102-1, 102-2, which are attached to the body portion 101 via the intervening components 104-1, 104-2 as described above. However, the pseudo force sense generation apparatus may have only one vibrator 102-1. In this case, the intervening component 104-1 is unnecessary.

As illustrated in FIGS. 8A to 8D, a pseudo force sense generation apparatus 3 in a third embodiment has a body portion 101, a vibrator 102-1, a contact portion 103, and a supporting component 305 made of flexible material. In this embodiment, the supporting portion 1026-1 of the vibrator 102-1 corresponds to the "base mechanism-side component" and the movable portion 1025-1 corresponds to the "contact mechanism-side component". The difference from the first embodiment is that the supporting portion 1026-1 of the vibrator 102-1 is directly attached to the bottom surface 101*ba*-1 of the recess 101*d*-1 of the body portion 101 and the supporting component 305 is attached in place of the vibrator 102-2. One end of the supporting component 305 is attached to the bottom surface 101*b* side of the body portion 101, and the other end of the supporting component 305 is attached to the inner bottom surface 103*b* side of the contact portion 103. Otherwise, this embodiment may be same as the first embodiment or modifications thereof. The presence of the supporting component 305 between the body portion 101 and the contact portion 103 creates a gap between the body portion 101 and the contact portion 103, and the contact portion 103 made of a flexible component prevents the vibration of the contact portion 103 in D-1 axis direction from being significantly hindered. In place of the flexible supporting component 305, a mechanism that does not significantly hinder vibration in D-1 axis direction (for example, a rail mechanism or a hinge) may be provided. Alternatively, the supporting component 305 may be composed of a component with low flexibility and the contact portion 103 may be composed of a material with high flexibility. In this case, with the flexibility (distortional deformation) of the contact portion 103, the vibration of the contact portion 103 in D-1 axis direction is also prevented from being significantly hindered. As another alternative, in the configuration of the second embodiment, the supporting portion 1026-1 of the vibrator 102-1 may be directly attached to the bottom surface 101*ba-i* of the recess 101*d-i* of the body portion 101, and the supporting component 305 may be attached in place of the vibrator 102-2. Alternatively, the supporting portion 1026-*i* may be attached to the body portion 101 via the intervening component 104-1 without eliminating the intervening component 104-1.

Fourth Embodiment

Figure 10A:
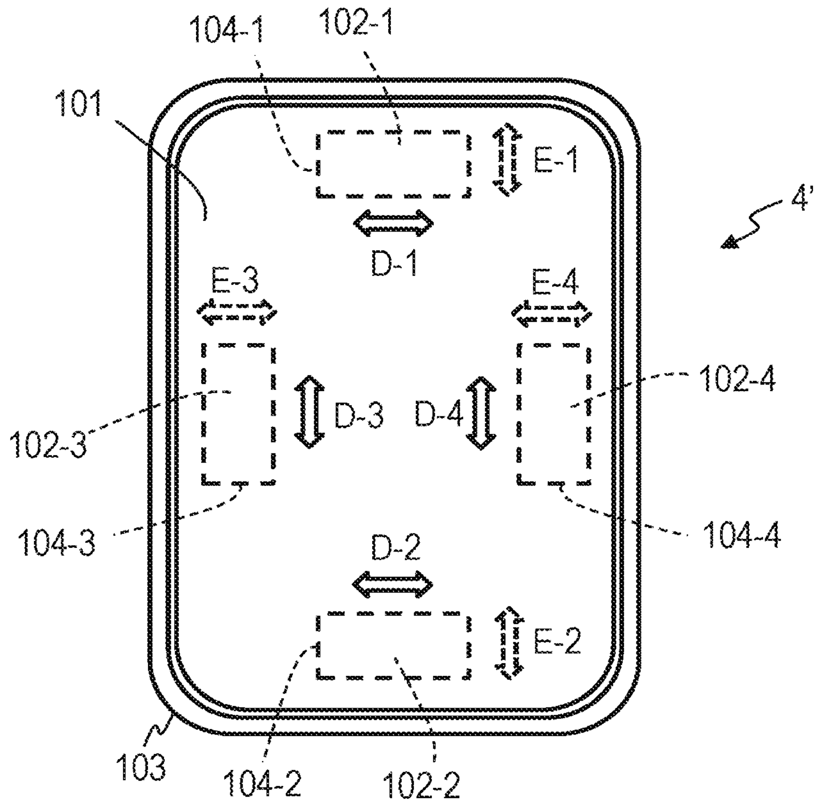
FIGS. 10A and 10B are conceptual plan views illustrating the configurations of pseudo force sense generation apparatuses according to the embodiment.
Figure 10B:
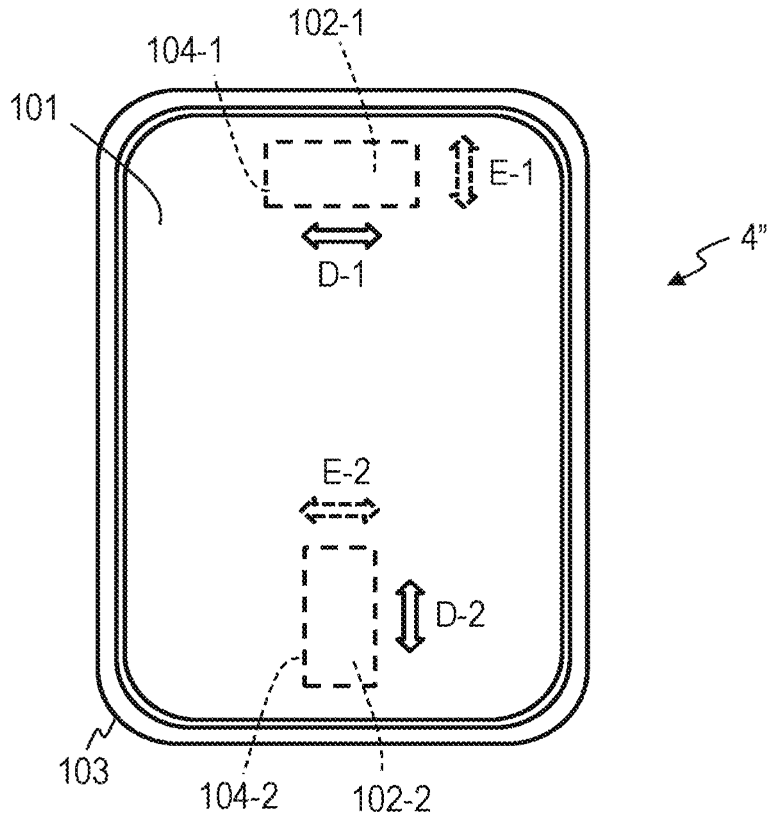

The positioning and/or number of vibrators 102-*i* included in the pseudo force sense generation apparatus are not limited to those of the first to third embodiments. For example, as illustrated in FIGS. 9A to 9E, a pseudo force sense generation apparatus 4 may have a body portion 101, a vibrator 102-*i* including a supporting portion 1026-*i* (where i=1, 2, 3) and a movable portion 1025-*i* that performs asymmetric vibration relative to the supporting portion 1026-*i*, a contact portion 103, and an intervening component 104-*i*. In a fourth embodiment, the supporting portion 1026-*i* of the vibrator 102-*i* (where i=1, 2, 3) corresponds to the "base mechanism-side component", and the movable portion 1025-*i* corresponds to the "contact mechanism-side component". The differences from the first embodiment are that i=1, 2, 3 with the pseudo force sense generation apparatus 4 as opposed to i=1, 2 in the first embodiment, D-3 axis is substantially orthogonal to D-1, 2 axes, E-3 axis is substantially orthogonal to E-1, 2 axes, and a vibrator 102-3 is positioned in the area between the vibrator 102-1 and the vibrator 102-2. Alternatively, like a pseudo force sense generation apparatus 4' of FIG. 10A, i may be i=1, 2, 3, 4, and D-3, 4 axes may be substantially orthogonal to D-1, 2 axes, E-3, 4 axes may be substantially orthogonal to E-1, 2 axes, and the vibrators 102-3, 4 may be positioned on a side edge of the body portion 101 where the vibrator 102-1 or the vibrator 102-2 is not positioned. Alternatively, i may be i=1, 2, D-1 axis may be substantially orthogonal to D-2 axis, and E-1 axis may be substantially orthogonal to E-2 axis, like a pseudo force sense generation apparatus 4" of FIG. 10B. Otherwise, this embodiment may be same as the first embodiment or modifications thereof.

Fifth Embodiment

In the first to fourth embodiments, the supporting portion 1026-*i* of the vibrator 102-*i* is attached to the body portion 101 via the intervening component 104-*i*, and the movable portion 1025-*i* of the vibrator 102-*i* is attached to the contact portion 103 via the linking portions 102*da-i*, 102*db-i*, 102*ea-i*, 102*eb-i* as described above. However, the positions of the body portion 101 and the contact portion 103 may be reversed. That is, like a pseudo force sense generation apparatus 5 illustrated in FIGS. 11A to 11C, 2A, and 2B, the supporting portion 1026-*i* may be attached to the contact portion 103 via the intervening component 104-*i*, and the movable portion 1025-*i* may be attached to the bottom surface 101*ba-i* of the recess 101*d-i* of the body portion 101 via the linking portions 102*da-i*, 102*db-i*, 102*ea-i*, 102*eb-i*. That is, the intervening component 104-*i* may be positioned between the supporting portion 1026-*i* and the contact portion 103, and the contact portion 103 may be attached to the supporting portion 1026-*i* via the intervening component 104-*i* and be capable of vibrating relative to the movable portion 1025-*i*. In a fifth embodiment, the movable portion 1025-*i* of the vibrator 102-*i* (where i=1, 2) corresponds to the "base mechanism-side component" and the supporting portion 1026-*i* corresponds to the "contact mechanism-side component".

In this configuration, the "contact mechanism" as the system that vibrates with the contact portion 103 includes the contact portion 103 and the supporting portion 1026-*i*. This "contact mechanism" may further include at least some of the intervening component 104-*i*, the springs 1022-*i*, 1023-*i*, and the coil 1024-*i*. The "base mechanism" as the system supporting the system that vibrates with the contact portion 103 includes the body portion 101. The system supporting the "base mechanism" may further include at least some of the linking portions 102*da-i*, 102*db-i*, 102*ea-i*, 102*eb-i*, and the movable portion 1025-*i*. Again, it is assumed that the average amplitude of vibration of the "contact mechanism" is greater than the average amplitude of vibration of the "base mechanism". The mass $m_1$ of the "contact mechanism" is smaller than the mass $m_2$ of the "base mechanism". Preferably, the mass $m_1$ of the "contact mechanism" is not more than one third of the mass $m_2$ of the "base mechanism".

Figure 15A:
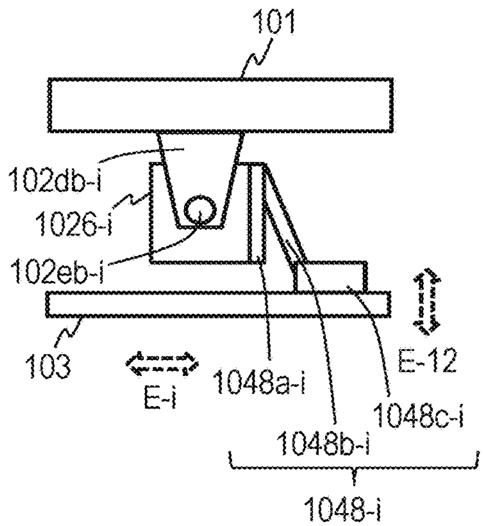
FIGS. 15A to 15D are conceptual diagrams illustrating a configuration of an intervening component according to the embodiment.
Figure 15B:
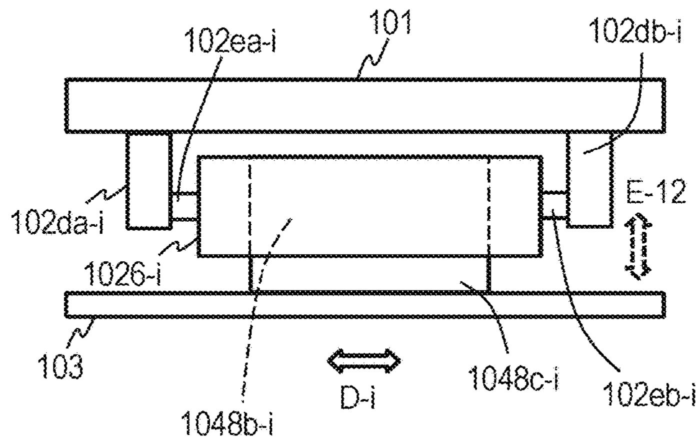
Figure 15C:
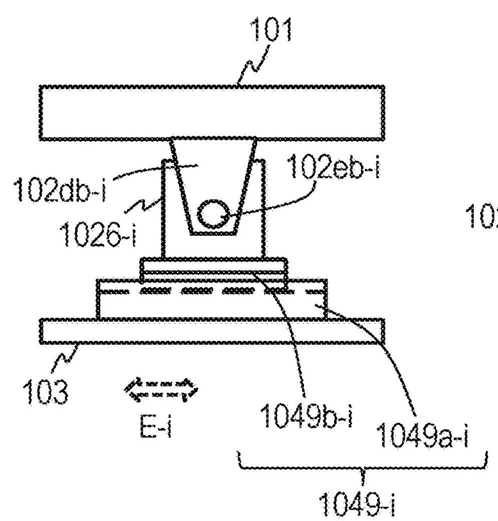
Figure 15D:
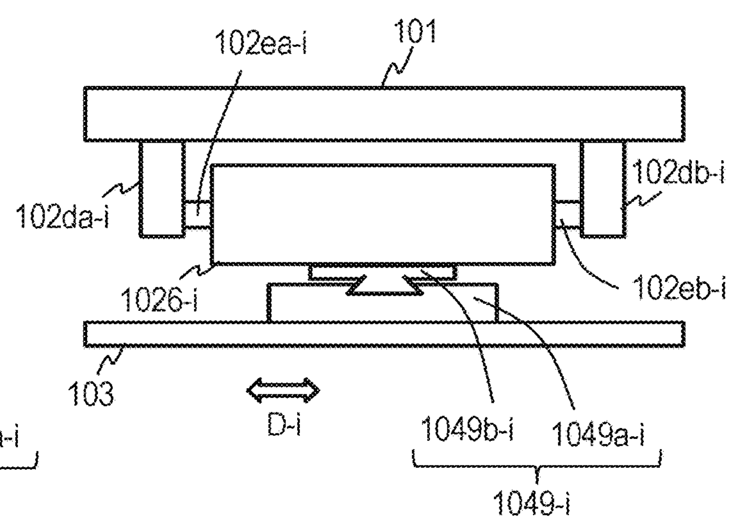

Specific examples of the intervening component 104-*i* may be same as the first embodiment. However, the intervening component 104-*i* is positioned between the supporting portion 1026-*i* and the contact portion 103. That is, as illustrated in FIGS. 12 to 15, the body portion 101 and the contact portion 103 in FIGS. 3 to 6 of the first embodiment may be arranged such that they are interchanged with each other. For example, in the case of <<Example of intervening component 104-*i* utilizing the anisotropy of rigidity>>, the supporting portion 1026-*i* of the vibrator 102-*i* may be attached to the contact portion 103 side via the intervening components 1041-*i*, 1242-*i*, 1048-*i*, and the movable portion 1025-*i* of the vibrator 102-*i* may be attached to the body portion 101 via the linking portions 102*da-i*, 102*db-i*, 102*ea-i*, 102*eb-i* (FIGS. 12, 13, 15A, and 15B). For example, in the case of <<Examples of intervening component 104-*i* using hinge>>, the attachment portions 1046*a-i*, 1047*a-i* may be attached to the supporting portion 1026-*i* side, the attachment portions 1046*b-i*, 1047*b-i* may be attached to the contact portion 103 side, and the movable portion 1025-*i* of the vibrator 102-*i* may be attached to the body portion 101 via the linking portions 102*da-i*, 102*db-i*, 102*ea-i*, 102*eb-i* (FIG. 14). In the case of <<Examples of intervening component 104-*i* using sliding mechanism>>, the rail portion 1049*b-i* may be attached to the supporting portion 1026-*i* side, the sliding portion 1049*a-i* may be attached to the contact portion 103 side, and the movable portion 1025-*i* of the vibrator 102-*i* may be attached to the body portion 101 via the linking portions 102*da-i*, 102*db-i*, 102*ea-i*, 102*eb-i* (FIGS. 15C and 15D).

Modification 1 of the Fifth Embodiment

Figure 11A:
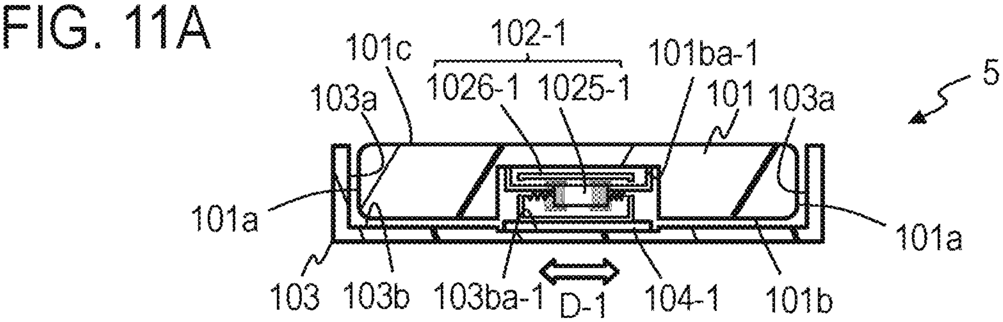
FIGS. 11A and 11B are conceptual diagrams illustrating a configuration of a pseudo force sense generation apparatus according to an embodiment.
Figure 11B:
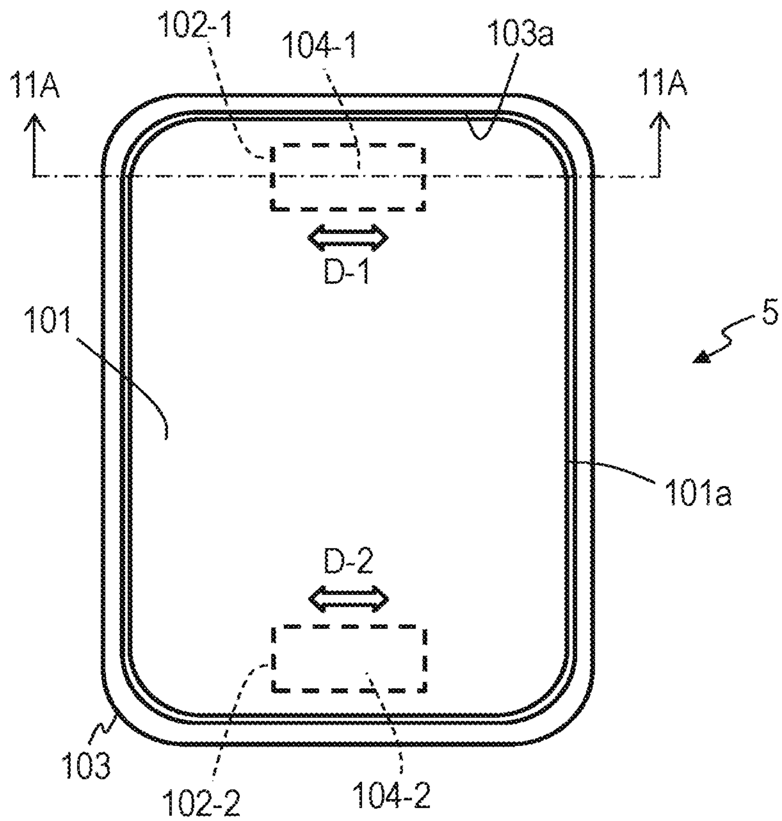
Figure 11C:
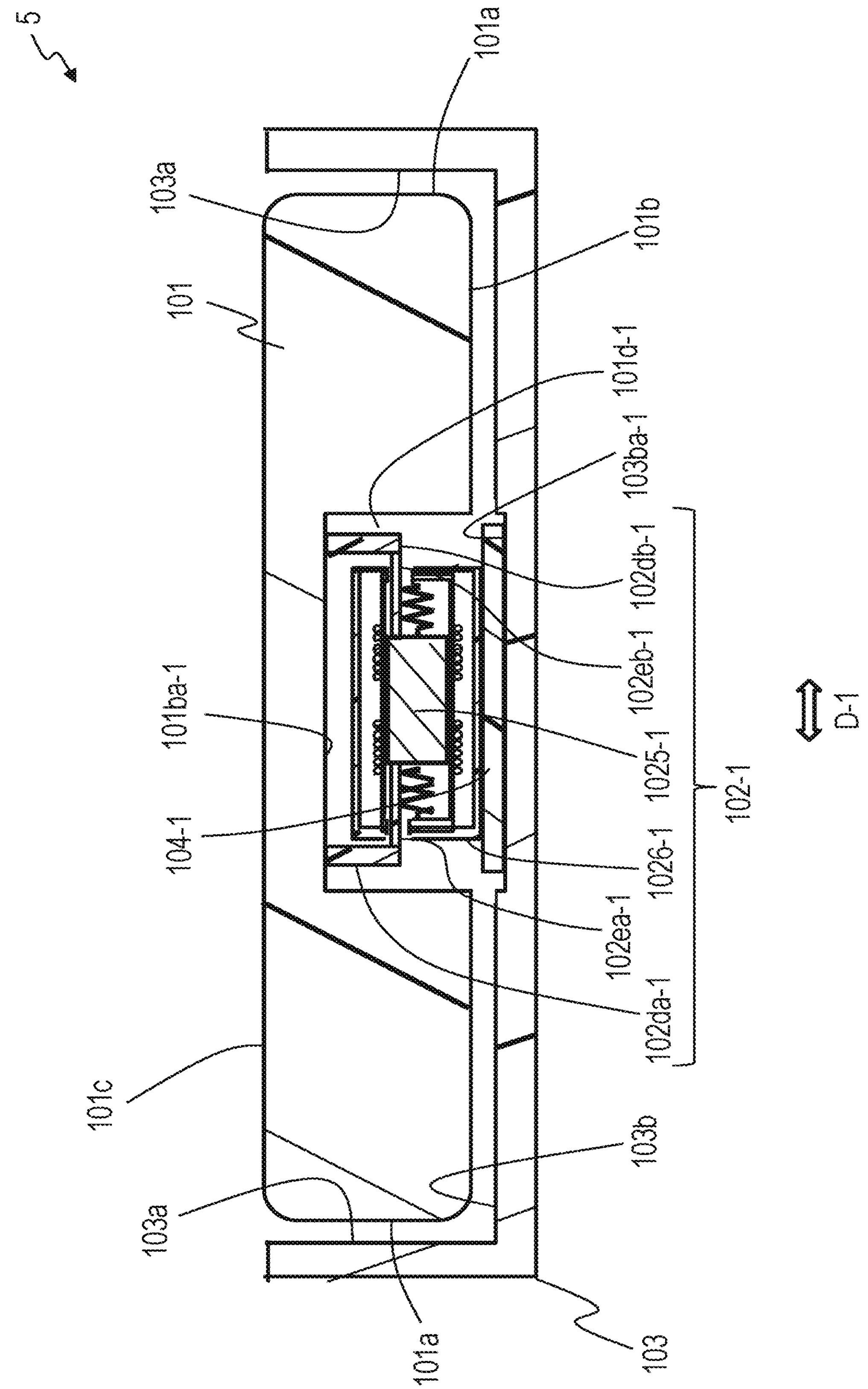
FIG. 11C is an enlarged cross-sectional view at 11A-11A in FIG. 11B.
Figure 11D:
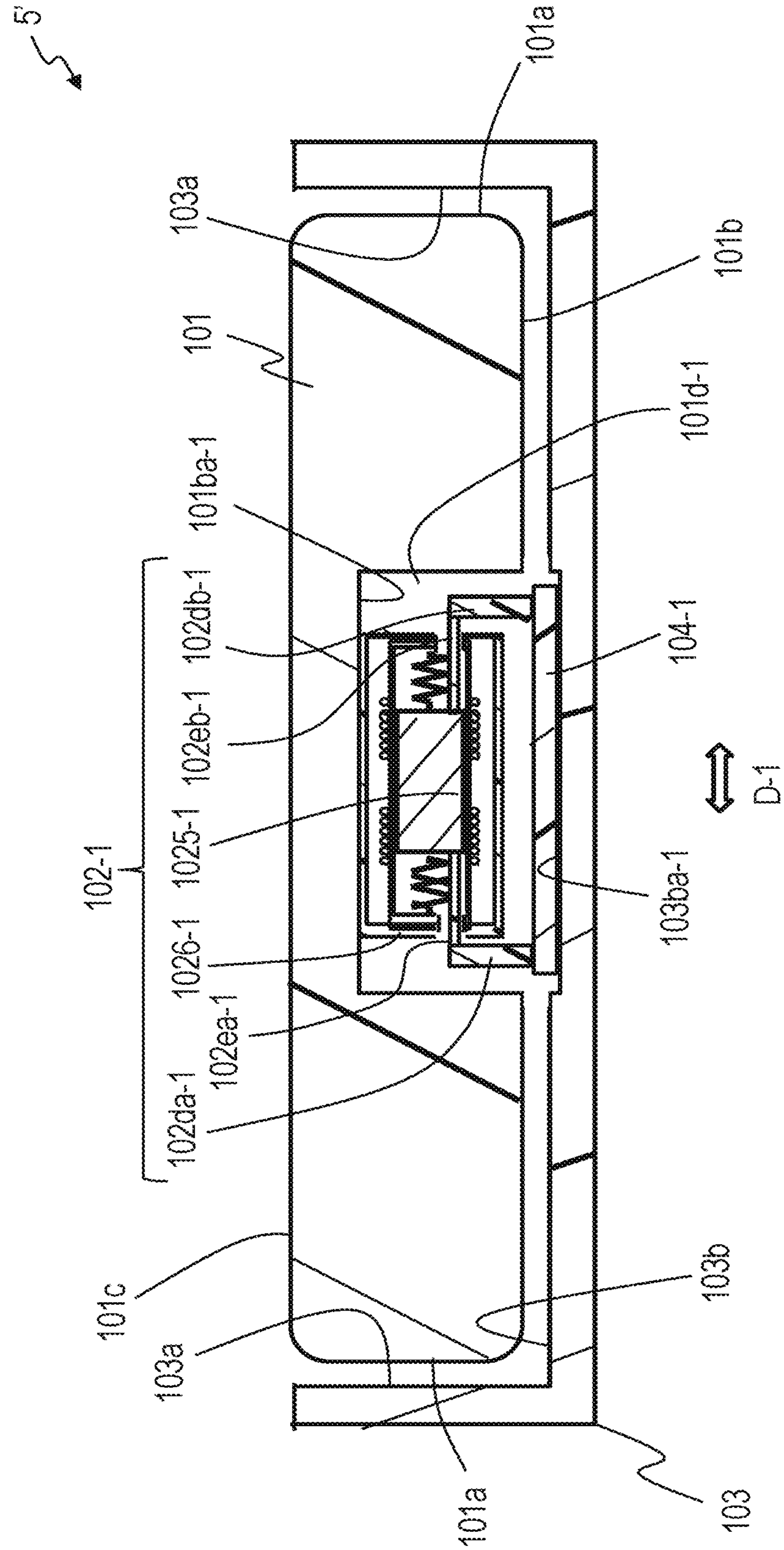
FIG. 11D is a schematic cross-sectional view showing a modification, which replaces the enlarged cross-sectional view at 11A-11A of FIG. 11C.
Figure 12A:
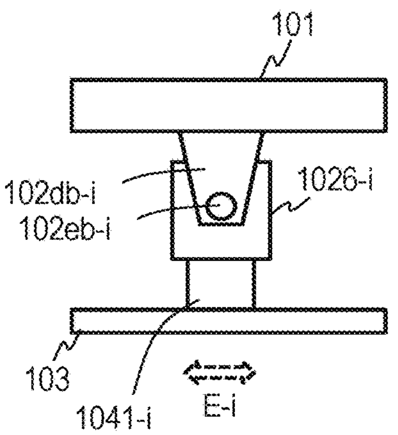
FIGS. 12A to 12D are conceptual diagrams illustrating a configuration of an intervening component according to the embodiment.
Figure 12B:
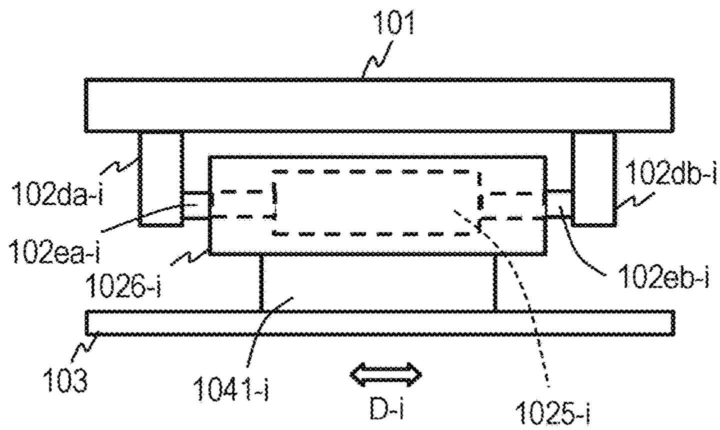
Figure 12C:
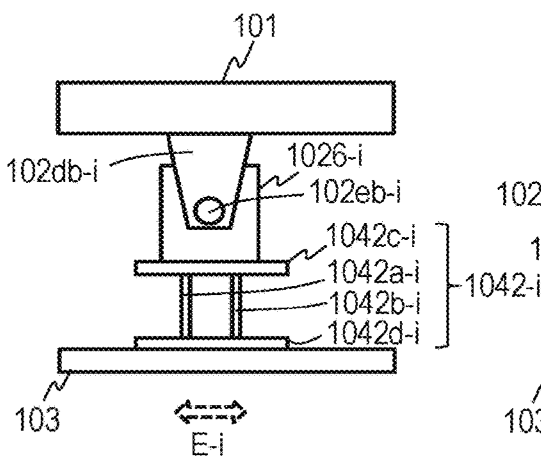
Figure 12D:
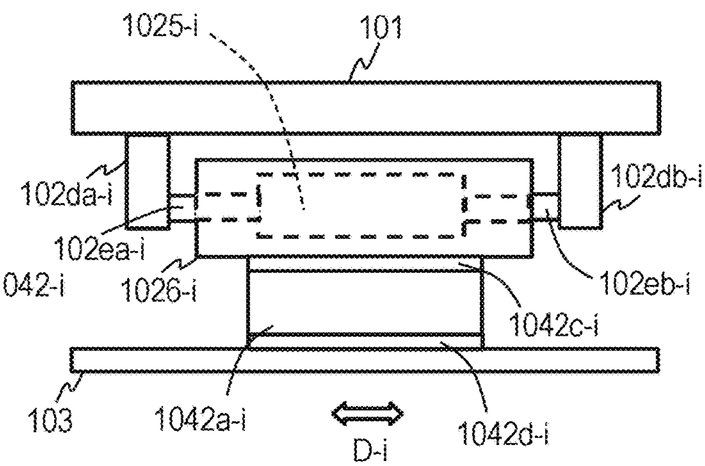
Figure 13A:
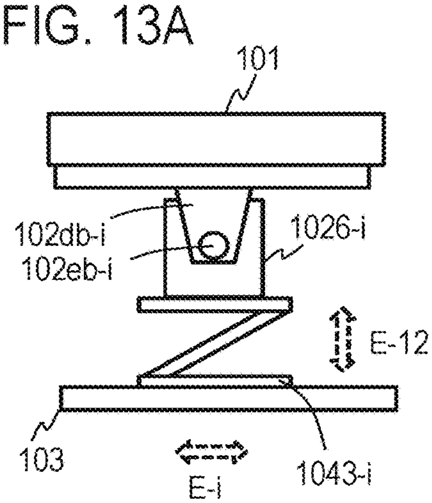
FIGS. 13A to 13F are conceptual diagrams illustrating a configuration of an intervening component according to the embodiment.
Figure 13B:
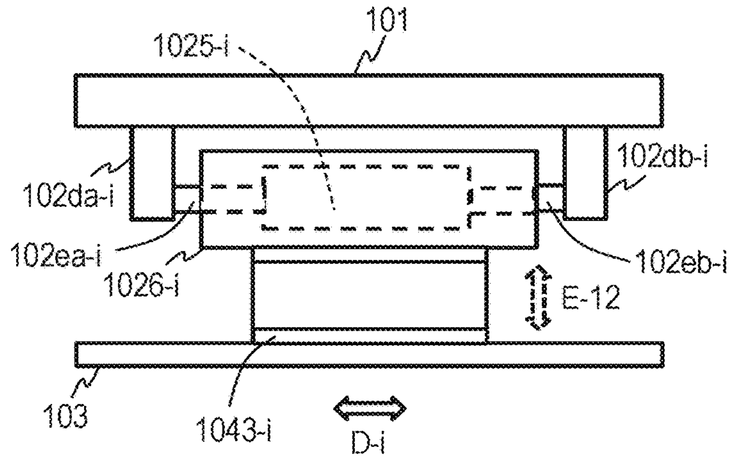
Figure 13C:
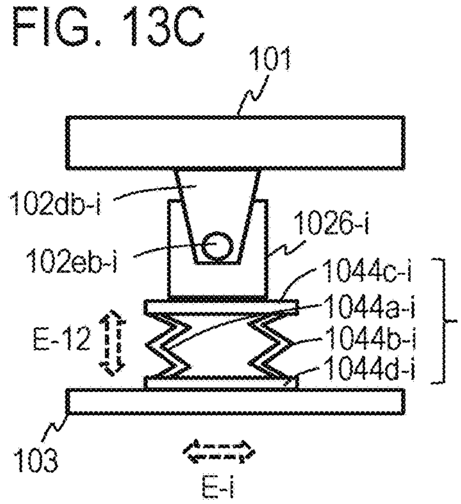
Figure 13D:
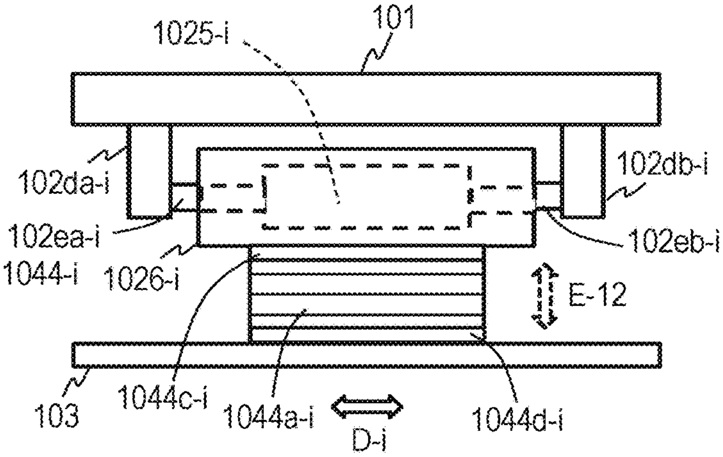
Figure 13E:
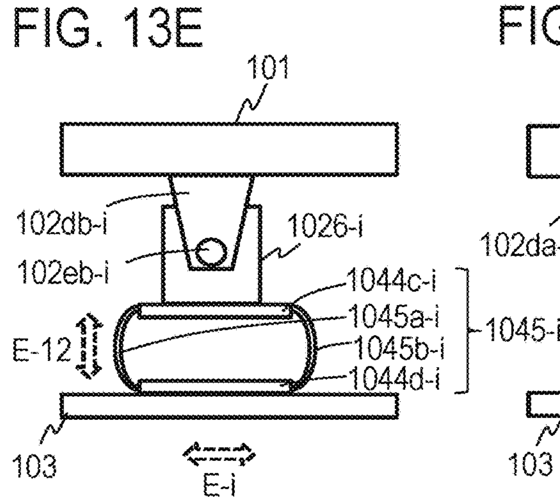
Figure 13F:
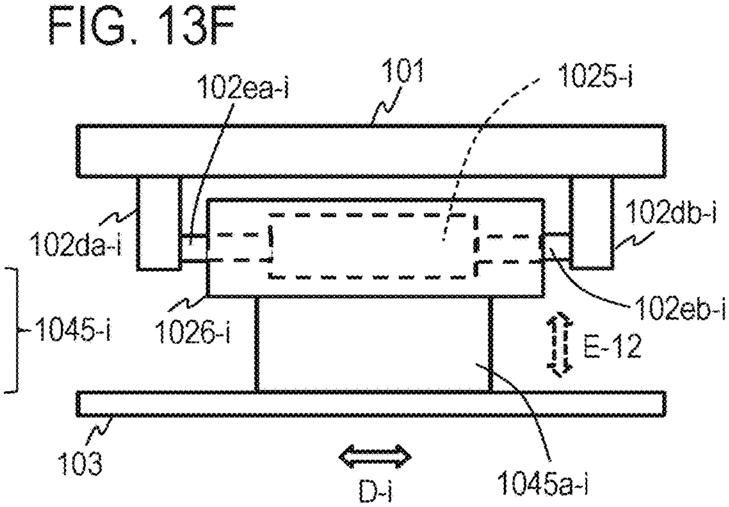
Figure 14A:
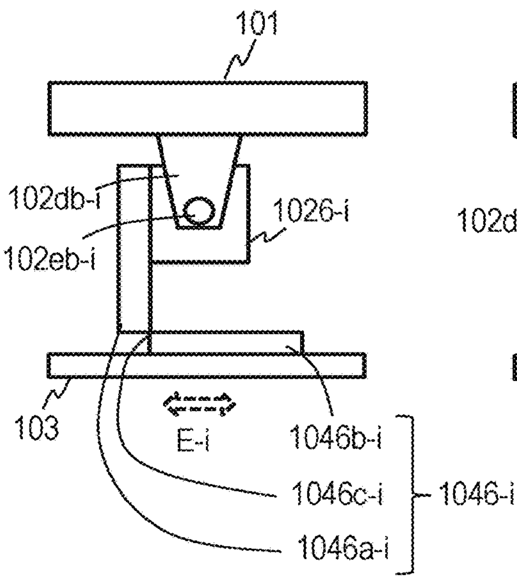
FIGS. 14A to 14D are conceptual diagrams illustrating a configuration of an intervening component according to the embodiment.
Figure 14B:
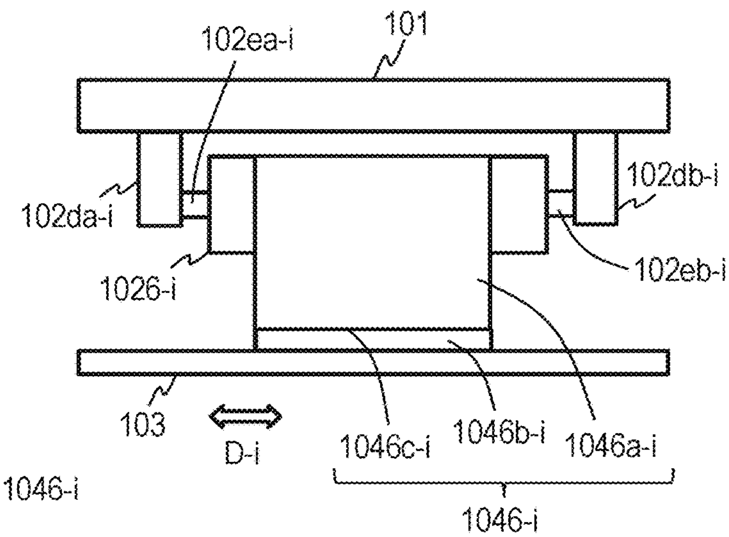
Figure 14C:
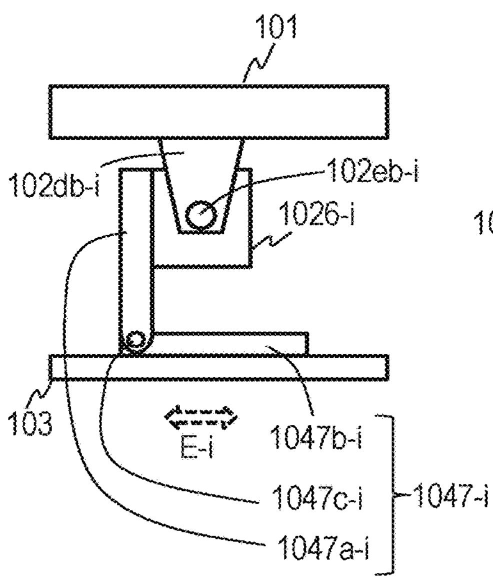
Figure 14D:
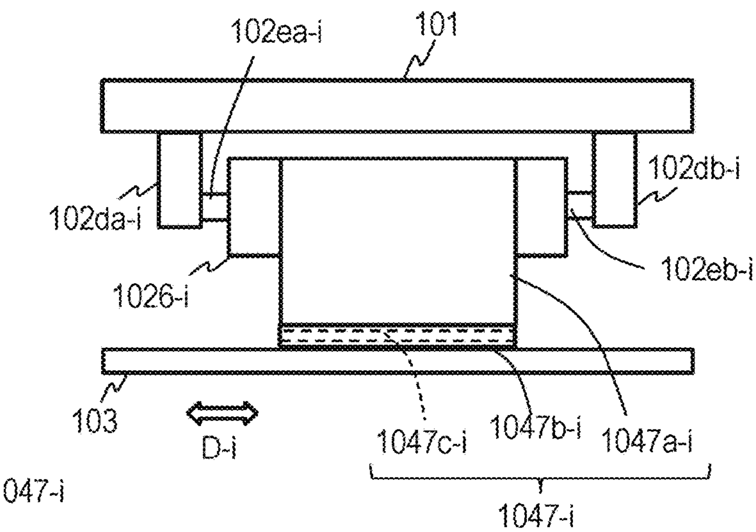

Like the pseudo force sense generation apparatus 5' illustrated in FIG. 11D, the supporting portion 1026-*i* of the vibrator 102-*i* may be directly attached to the bottom surface 101*ba-i* of the recess 101*d-i* of the body portion 101, and the movable portion 1025-*i* of the vibrator 102-*i* may be attached to the contact portion 103 via the linking portions 102*da-i*, 102*db-i*, 102*ea-i*, 102*eb-i* and the intervening component 104-*i*. That is, the intervening component 104-*i* may be positioned between the movable portion 1025-*i* and the contact portion 103. In this case, the supporting portion 1026-*i* of the vibrator 102-*i* corresponds to the "base mechanism-side component", and the movable portion 1025-*i* corresponds to the "contact mechanism-side component". In the case of this configuration, the "contact mechanism" as the system that vibrates with the contact portion 103 includes the contact portion 103 and the movable portion 1025-*i*. This "contact mechanism" may further include at least some of the intervening component 104-*i*, and the linking portions 102*da-i*, 102*db-i*, 102*ea-i*, 102*eb-i*. The "base mechanism" as the system supporting the system that vibrates with the contact portion 103 includes the supporting portion 1026-*i*. This "base mechanism" may further include at least some of the body portion 101, the springs 1022-*i*, 1023-*i*, and the coil 1024-*i*. Again, it is assumed that the average amplitude of vibration of the "contact mechanism" is greater than the average amplitude of vibration of the "base mechanism". Also, the mass $m_1$ of the "contact mechanism" is smaller than the mass $m_2$ of the "base mechanism". Preferably, the mass $m_1$ of the "contact mechanism" is not more than one third of the mass $m_2$ of the "base mechanism".

Modification 2 of the Fifth Embodiment

In the fifth embodiment, the contact portion 103 is attached to the supporting portion 1026-*i* via the intervening component 104-*i* as described above. However, the contact portion 103 may be integral with the supporting portion 1026-*i* without via the intervening component 104-*i*. Alternatively, the contact portion 103, the intervening component 104-*i*, and the supporting portion 1026-*i* may be integral.

Modification 3 of the Fifth Embodiment

Figure 16A:
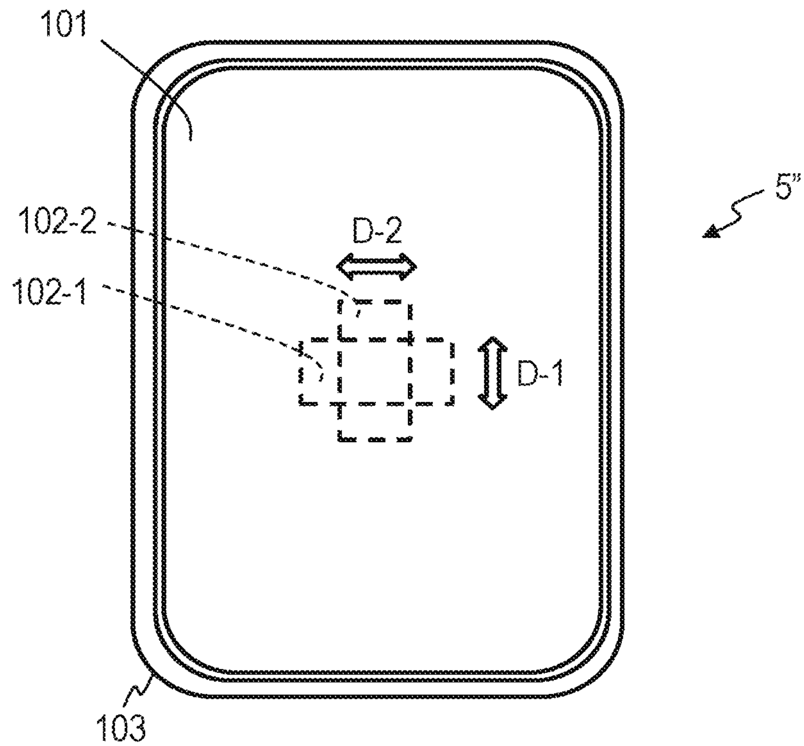
FIGS. 16A and 16B are schematic plan views of pseudo force sense generation apparatuses according to the embodiment.
Figure 17A:
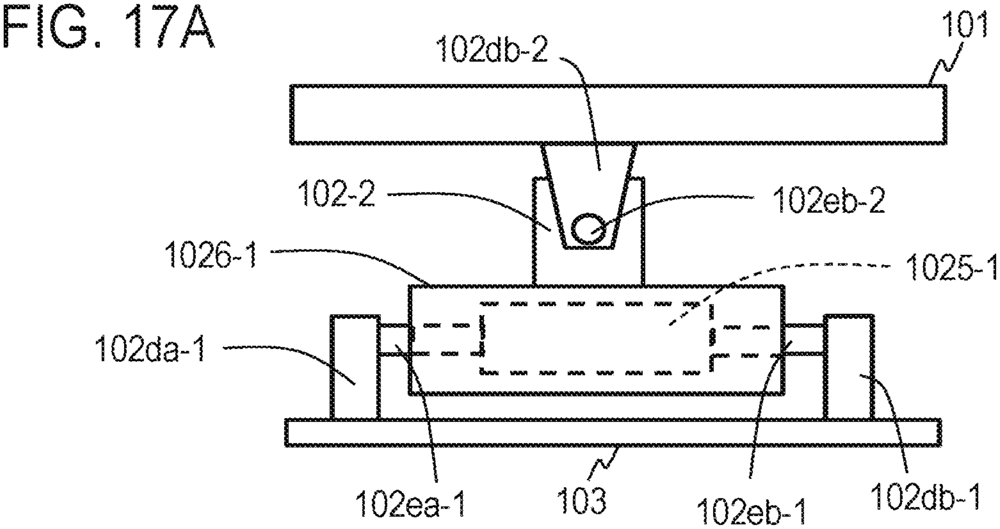
FIGS. 17A to 17C are conceptual diagrams illustrating the configurations according to the embodiment.
Figure 17B:
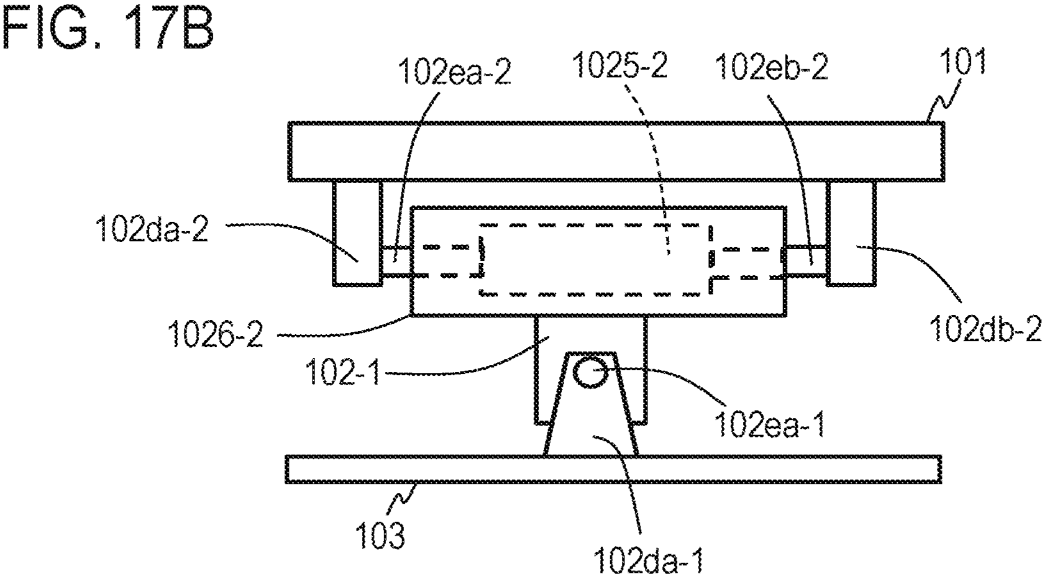

The supporting portions of multiple vibrators that vibrate in different directions may be attached or fixed to each other without using the intervening component 104-*i* such that the contact portion 103 is configured to be capable of vibrating in a certain two-dimensional direction relative to the body portion 101. In the pseudo force sense generation apparatus 5" illustrated in FIGS. 16A, 17A, and 17B, the body portion 101 is attached to the movable portion 1025-2 of the vibrator 102-2 via the linking portions 102*da*-2, 102*db*-2, 102*ea*-2, 102*eb*-2 or integral with the movable portion 1025-2. The contact portion 103 is attached to the movable portion 1025-1 of the vibrator 102-1 via the linking portions 102*da*-1, 102*db*-1, 102*ea*-1, 102*eb*-1 or integral with the movable portion 1025-1. The vibrator 102-*i* is capable of vibrating relative to the supporting portion 1026-*i* along D-i axis (the ith axis). Here, D-1 axis and D-2 axis are in different orientations, and the relative position of D-2 axis to D-1 axis is fixed or limited. In the example of FIGS. 16A, 17A, and 17B, D-1 axis and D-2 axis are substantially orthogonal, and the outer surface of the supporting portion 1026-1 is attached to the outer surface of the supporting portion 1026-2, or the supporting portions 1026-1, 1026-2 are integral. With this configuration, vibration based on at least one of the asymmetric vibration of the movable portion 1025-1 and the asymmetric vibration of the movable portion 1025-2 is transmitted to the contact portion 103, and the contact portion 103 in turn gives force based on at least one of the asymmetric vibrations to skin or mucous membrane.

Figure 16B:
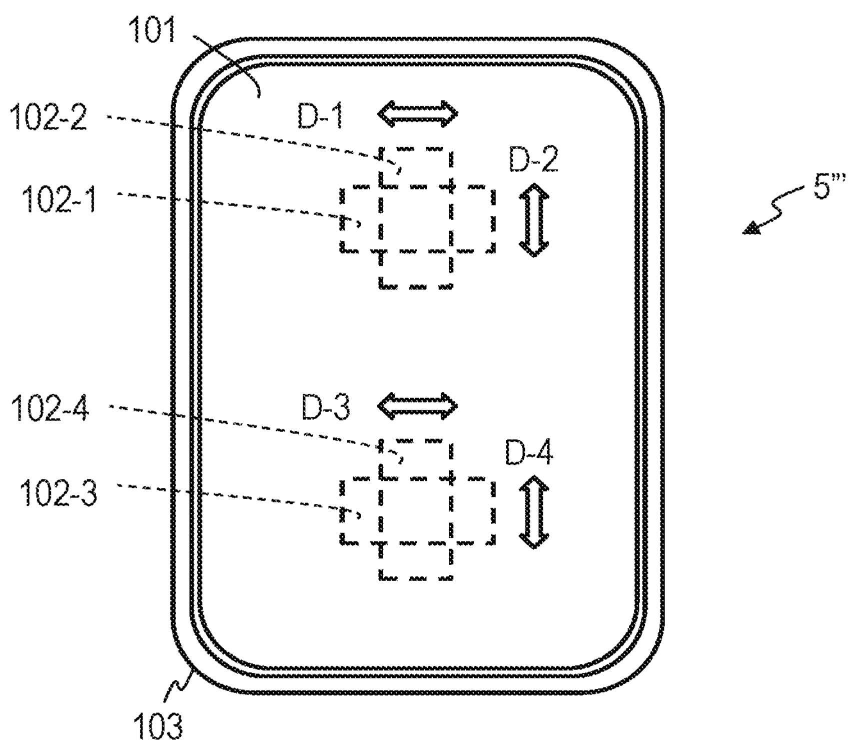

As mentioned above, there may be multiple sets of vibrators with their supporting portions being attached or fixed to each other. For example, like the pseudo force sense generation apparatus 5''' illustrated in FIG. 16B, the body portion 101 is attached to the movable portion 1025-$i_2$ of the vibrator 102-$i_2$ via the linking portions 102*da*-$i_2$, 102*db*-$i_2$, 102*ea*-$i_2$, 102*eb*-$i_2$ or integral with the movable portion 1025-$i_2$. The contact portion 103 is attached to the movable portion 1025-1 of the vibrator 102-$i_1$ via the linking portions 102*da*-$i_1$, 102*db*-$i_1$, 102*ea*-$i_1$, 102*eb*-$i_1$ or integral with the movable portion 1025-$i_1$. Here, $i_r$ is an odd number and $i_2$ is an even number, $i_2=i_1+1$. While $(i_1, i_2)=(1, 2), (3, 4)$ in the example of FIG. 16B, more sets of vibrators may be provided. The vibrator 102-*i* is capable of vibrating relative to the supporting portion 1026-*i* along D-i axis. Here, D-$i_1$ and D-$i_2$ axis are in different orientations, and the relative position of D-$i_2$ axis to D-$i_1$ axis is fixed or limited. In the example of FIG. 16B, D-1 axis and D-2 axis are substantially orthogonal, D-3 axis and D-4 axis are substantially orthogonal, and D-1 axis and D-3 axis are substantially parallel. This is not, however, intended to limit the present invention; D-$i_1$ axis and D-$(i_1+1)$ axis have only to be different from each other.

Figure 17C:
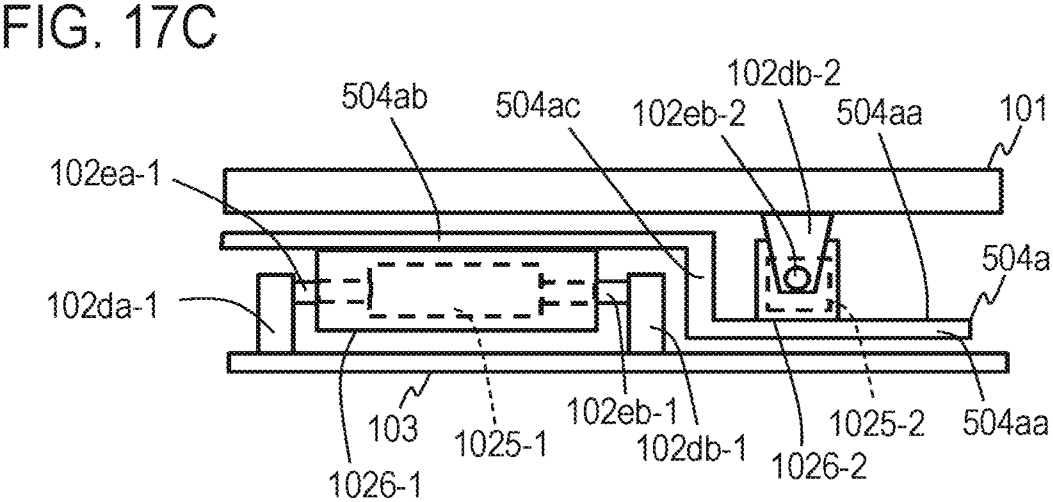

As an alternative, the supporting portion of multiple vibrators that vibrate in different directions may be connected with each other via some component rather than being directly connected with each other. For example, as illustrated in FIG. 17C, the supporting portion 1026-1 of the vibrator 102-1 may be connected with the supporting portion 1026-2 of the vibrator 102-2 via plate-like portions 504*aa*, 504*ab* substantially parallel to each other and via a stepped component 504*a* composed of a plate-like portion 504*ac* which connects between the plate-like portions 504*aa*, 504*ab* and are substantially orthogonal to them. In this example, the body portion 101 is attached to the movable portion 1025-2 of the vibrator 102-2 via the linking portions 102*da*-2, 102*db*-2, 102*ea*-2, 102*eb*-2 or is integral with the movable portion 1025-2. The contact portion 103 is attached to the movable portion 1025-1 of the vibrator 102-1 via the linking portions 102*da*-1, 102*db*-1, 102*ea*-1, 102*eb*-1 or is integral with the movable portion 1025-1. The supporting portion 1026-1 is connected with the plate-like portion 504*ab* of the stepped component 504*a*, and the supporting portion 1026-2 is connected with the plate-like portion 504*aa*. The contact surface between the supporting portion 1026-1 and the plate-like portion 504*ab* is not coplanar with the contact surface between the supporting portion 1026-2 and the plate-like portion 504*aa*. A plane including the contact surface between the supporting portion 1026-2 and the plate-like portion 504*aa* is positioned between the contact portion 103 and a plane including the contact surface between the supporting portion 1026-1 and the plate-like portion 504*ab*. A plane including the contact surface between the supporting portion 1026-1 and the plate-like portion 504*ab* is positioned between the body portion 101 and a plane including the contact surface between the supporting portion 1026-2 and the plate-like portion 504*aa*. This can reduce the thickness compared to a configuration that requires the interval between the body portion 101 and the contact portion 103 to be larger than the total thickness of the supporting portions 1026-1, 1026-2 (for example, FIGS. 17A and 17B).

Sixth Embodiment

Figure 18A:
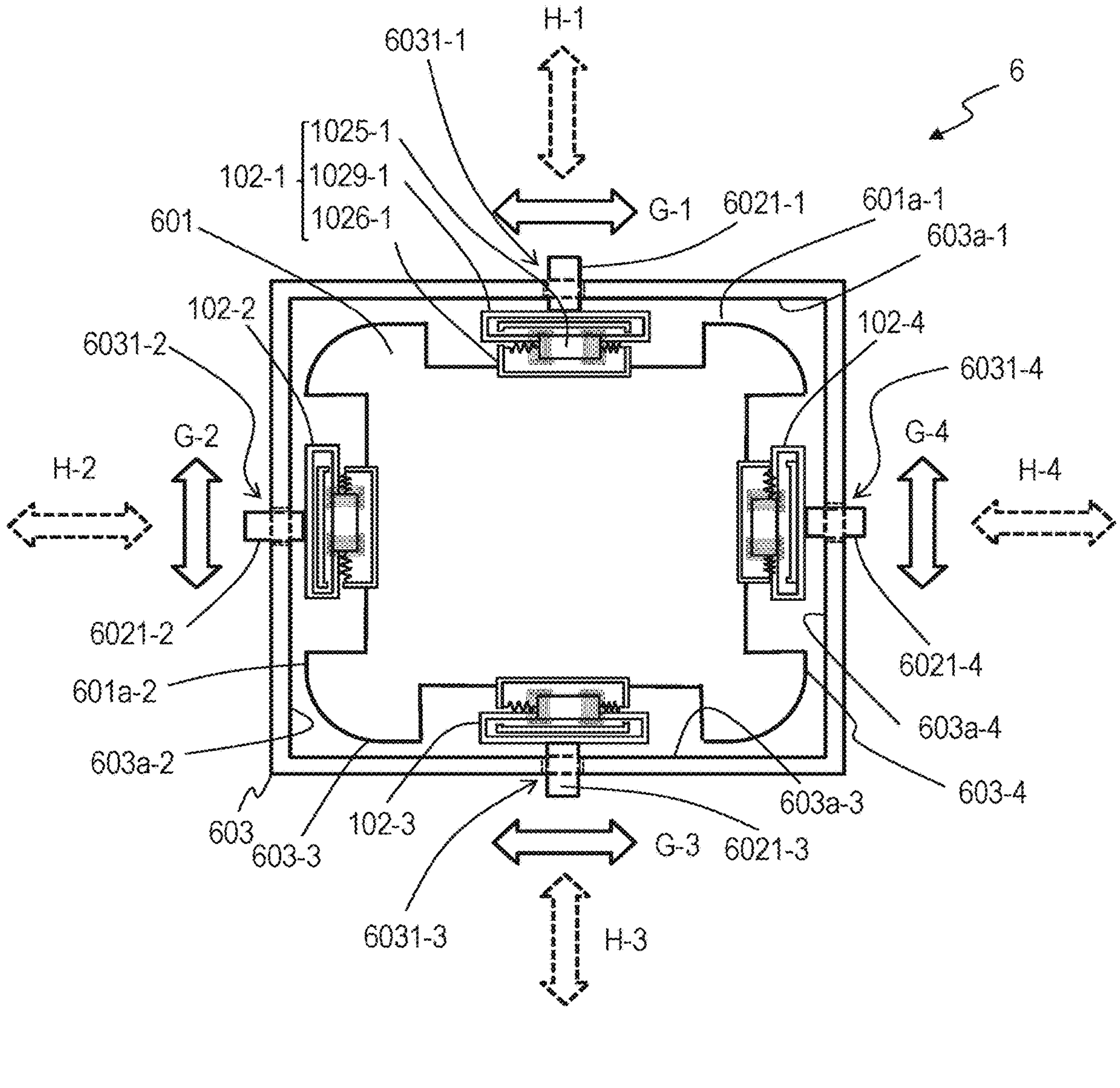
FIG. 18A is a conceptual plan view illustrating a configuration according to an embodiment.

There are many variations of arrangement of the contact portion, the body portion, the supporting portion, and the movable portion. For example, like a pseudo force sense generation apparatus 6 illustrated in FIG. 18A, the side surface of a plate-like body portion 601 having a substantially quadrangular planer shape may be externally surrounded by a frame-shaped contact portion 603, and a vibrator 102-*i* may be positioned between each of the four side surfaces 601*a*-*i* (where i=1, 2, 3, 4) of the body portion 601 and each of the four inner wall surfaces 603*a*-*i* of the contact portion 603. In this example, the supporting portion 1026-*i* of the vibrator 102-*i* is attached to the side surface 601*a*-*i* of the body portion 601, and the movable portion 1025-*i* of the vibrator 102-*i* is attached to the one end side of a rod-like supporting portion 6021-*i* via linking portion 1029-*i* (linking portions 102*da*-*i*, 102*db*-*i*, 102*ea*-*i*, 102*eb*-*i*). A through hole 6031-*i* is provided in each of the four inner wall surfaces 603*a*-*i* of the contact portion 603, and the other end side of the rod-like supporting portion 6021-*i* is inserted in the through hole 6031-*i*. The inner diameter of the through hole 6031-*i* is slightly larger than the outer diameter of the rod-like supporting portion 6021-*i* so that the rod-like supporting portion 6021-*i* can move along H-i axis coaxial with the through hole 6031-*i* (the axis along the direction in which the inner wall surface 603*a*-*i* is penetrated). The rod-like supporting portion 6021-*i* may be configured to be freely movable along the through hole 6031-*i* by means of a mechanism such as a ball bearing. The movable portion 1025-*i* of the vibrator 102-*i* performs asymmetric vibration relative to the supporting portion 1026-*i* in the direction along G-i axis. There is an interstice between the side surface 601*a*-*i* and the inner wall surface 603*a*-*i*, and asymmetric vibration in the direction along G-i axis is transmitted to the contact portion 603 via the linking portion 1029-*i* and the rod-like supporting portion 6021-*i*. Meanwhile, the contact portion 603 is freely movable relative to the rod-like supporting portion 6021-*i* in the direction along H-i axis. Thus, vibration of the contact portion 603 in the direction along H-i axis is not significantly limited by the rod-like supporting portion 6021-*i* or the vibrator 102-*i* attached to it. In a sixth embodiment, the supporting portion 1026-*i* of the vibrator 102-*i* (where i=1, 2, 3, 4) corresponds to the "base mechanism-side component" and the movable portion 1025-*i* corresponds to the "contact mechanism-side component". The contact portion 603 is a component for supporting the weight of the pseudo force sense generation apparatus 6. Vibration based on the asymmetric vibration of at least some movable portion 1025-*i* is transmitted to the contact portion 603, and the contact portion 603 in turn gives force based on at least one of such asymmetric vibrations to the skin or mucous membrane with which the contact portion 603 is in direct or indirect contact. This can also present pseudo force sense.

Seventh Embodiment

Figure 18B:
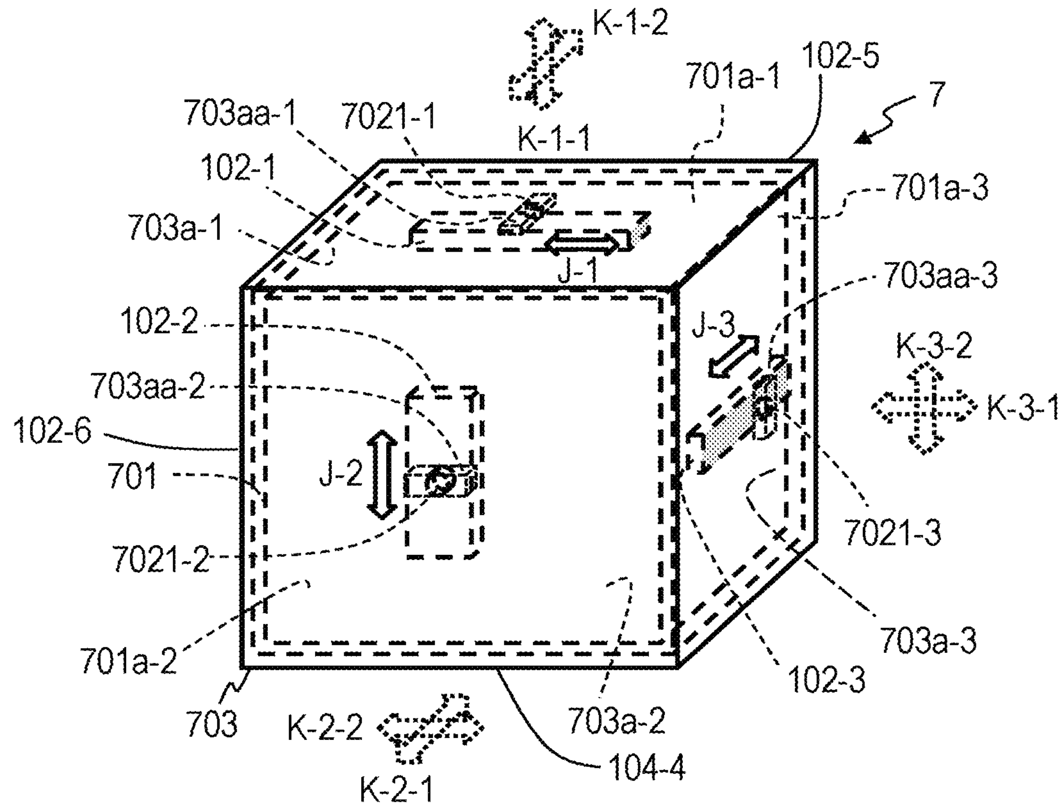
FIG. 18B is a conceptual diagram illustrating a configuration according to an embodiment.
Figure 19A:
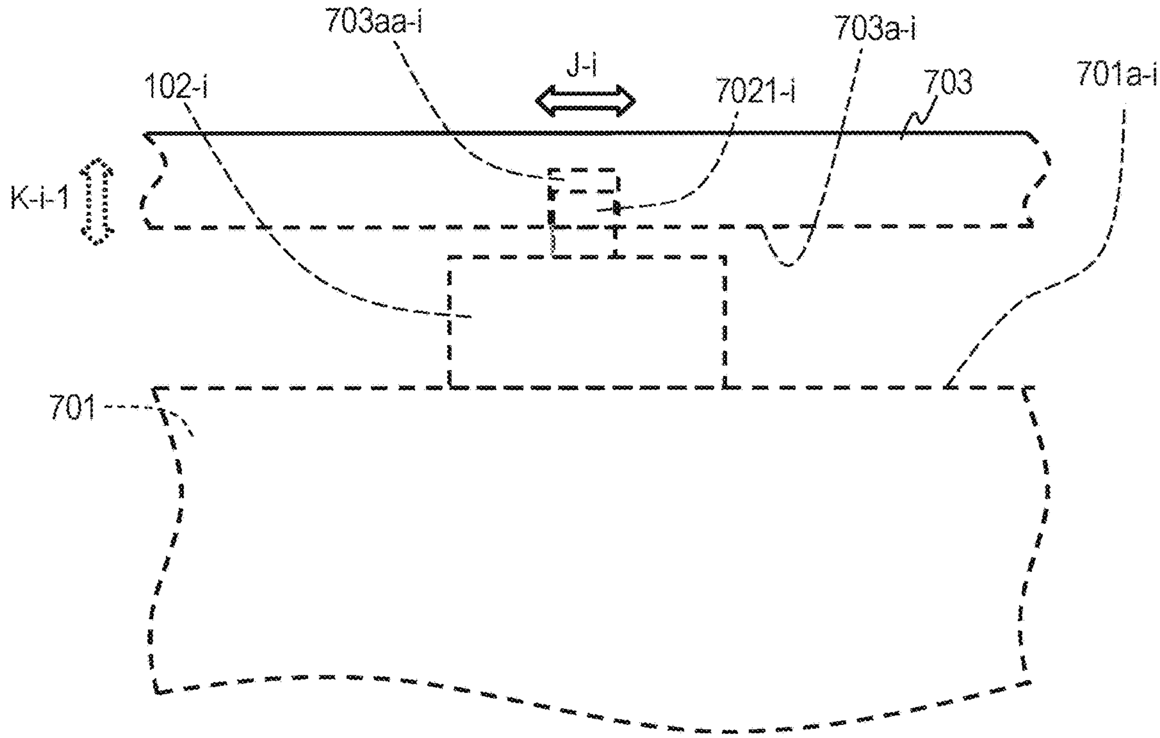
FIGS. 19A and 19B are partial enlarged views illustrating the configuration according to the embodiment.
Figure 19B:
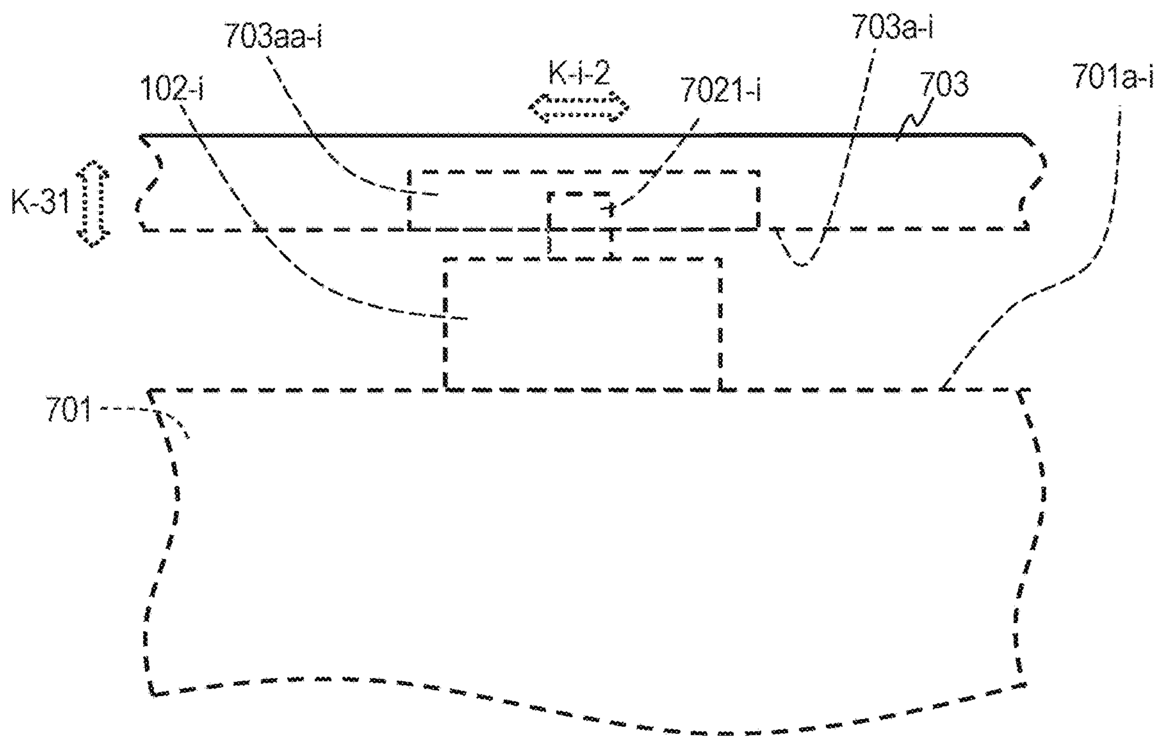

A vibrator may be positioned along each of three-dimensional axes. For example, like a pseudo force sense generation apparatus 7 illustrated in FIG. 18B, a substantially hexahedral (for example, substantially cubic) body portion 701 may be accommodated inside a box-shaped contact portion 703, and the vibrator 102-*i* may be positioned between each face 701*a*-*i* (where i=1, 2, 3, 4, 5, 6) of the body portion 701 and each of the six inner wall surfaces 703*a*-*i* of the contact portion 703. Here, the faces 701*a*-1, 701*a*-2, 701*a*-3 are substantially orthogonal to each other, and the faces 701*a*-4, 701*a*-5, 701*a*-6 (not shown) are substantially orthogonal to each other. The face 701*a*-1 and the face 701*a*-4 are substantially parallel, the face 701*a*-2 and the face 701*a*-5 are substantially parallel, and the face 701*a*-3 and the face 701*a*-6 are substantially parallel. The contact portion 703 is a component for supporting the weight of the pseudo force sense generation apparatus 7. In this example, the supporting portion 1026-*i* of the vibrator 102-*i* is attached to the face 701*a*-*i* of the body portion 701, and the movable portion 1025-*i* of the vibrator 102-*i* is attached to one end side of the rod-like supporting portion 7021-*i* via the linking portion 1029-*i*. The movable portion 1025-*i* of each vibrator 102-*i* performs asymmetric vibration relative to the supporting portion 1026-*i* in the direction along J-i axis. J-1 axis, J-2 axis, and J-3 axis are substantially orthogonal to each other. J-4 axis, J-5 axis, and J-6 axis (not shown) are substantially orthogonal to each other. J-1 axis and J-4 axis are substantially parallel, J-2 axis and J-5 axis are substantially parallel, and J-3 axis and J-6 axis are substantially parallel. The six inner wall surfaces 703*a*-*i* of the contact portion 703 each have a groove 703*aa*-*i* therein which slidably holds the other end side of the rod-like supporting portion 7021-*i* on K-i-2 axis (an axis substantially orthogonal to J-i axis). As illustrated in FIG. 19A, there is an interstice (play) between the bottom surface of the groove 703*aa*-*i* and a tip of the rod-like supporting portion 7021-*i* such that the contact portion 703 can move relative to the body portion 701 in K-i-1 axis direction (a direction substantially orthogonal to the face 701*a*-*i*). There is an interstice between the face 701*a*-*i* and the inner wall surface 703*a*-*i*, and asymmetric vibration in the direction along J-i axis is transmitted to the contact portion 703 via the rod-like supporting portion 7021-*i*. As illustrated in FIG. 19B, a right side view of FIG. 19A, the contact portion 703 can also move relative to the rod-like supporting portion 7021-*i* in the direction along K-i-2 axis (an axis substantially orthogonal to J-i axis). Thus, vibration of the contact portion 703 in the directions along K-i-1 axis and K-i-2 axis is not significantly limited by the rod-like supporting portion 7021-*i* or the vibrator 102-*i* attached to it. Vibration based on the asymmetric vibration of at least some vibrator 102-*i* is transmitted to the contact portion 703, and the contact portion 703 in turn gives force based on at least one of such asymmetric vibrations to the skin or mucous membrane with which the contact portion 703 is in direct or indirect contact. This can present pseudo force sense of six degrees of freedom (see an eighth embodiment).

Eighth Embodiment

Figure 20A:
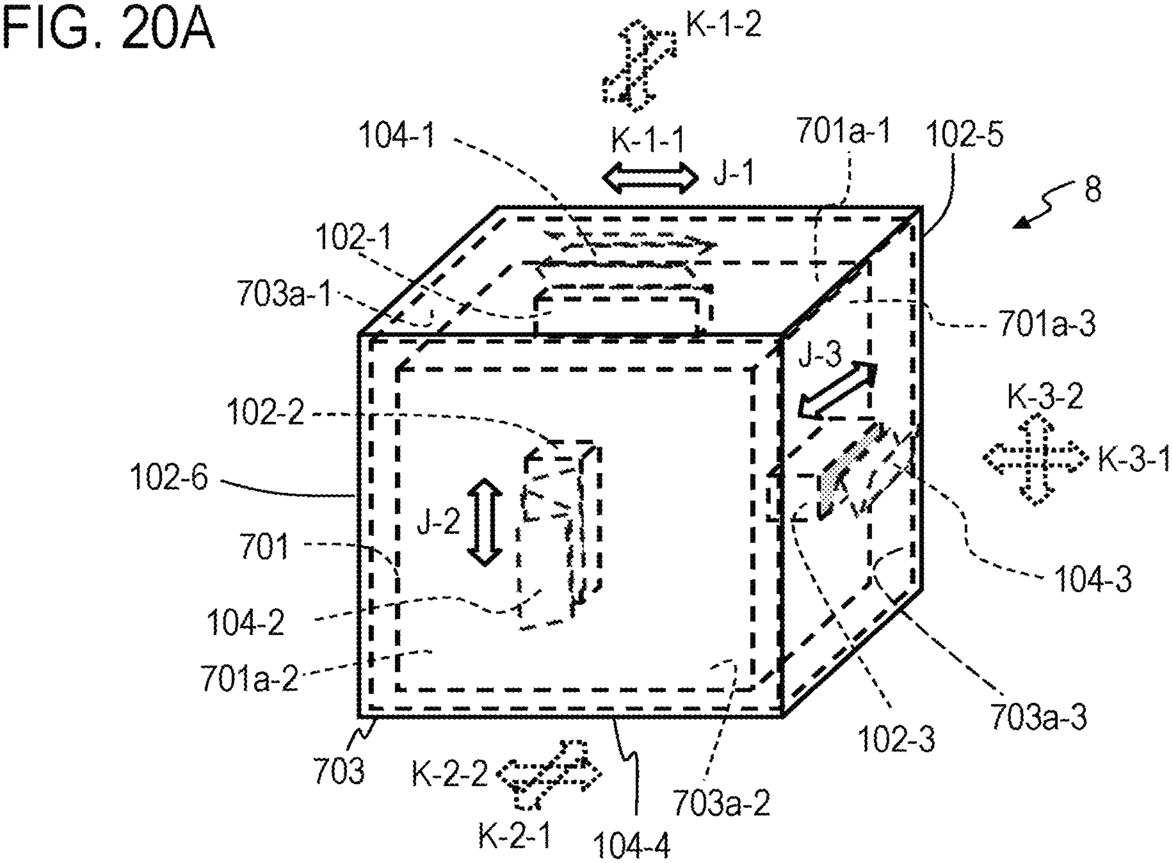
FIGS. 20A and 20B are conceptual diagrams illustrating a configuration according to an embodiment.
Figure 20B:
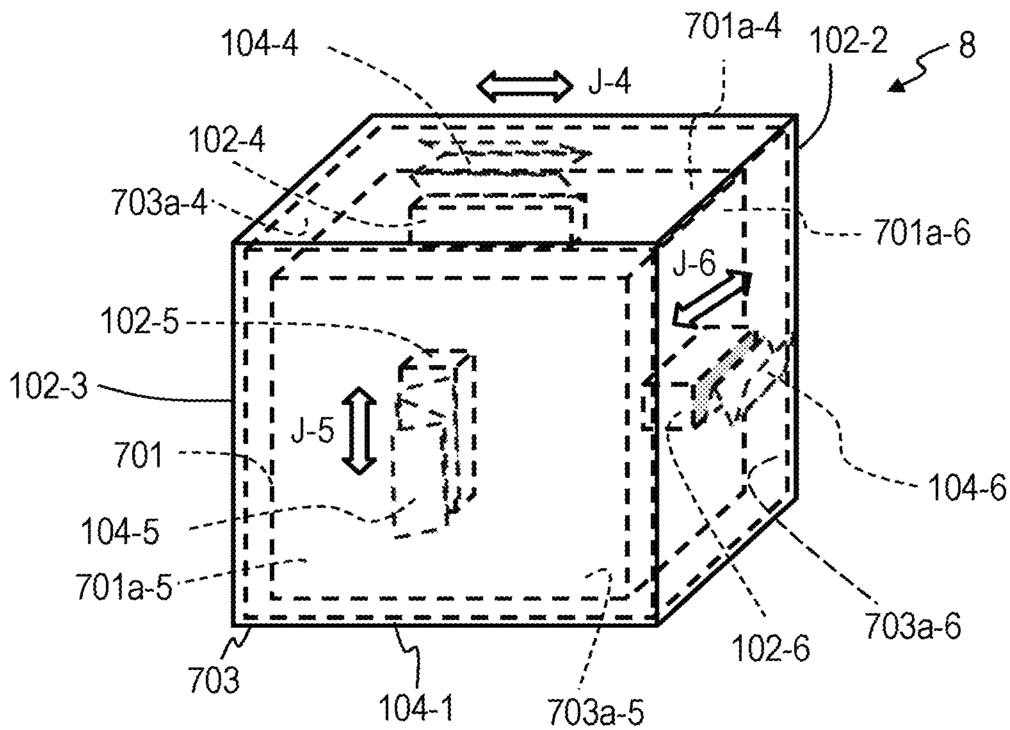

As a modification of the seventh embodiment, the intervening component 104-*i* described in the first embodiment may be used in place of the rod-like supporting portion 7021-*i* and the groove 703*aa*-*i*. For example, like a pseudo force sense generation apparatus 8 illustrated in FIGS. 20A and 20B, a substantially hexahedral (for example, substantially cubic) body portion 701 is accommodated inside a box-shaped contact portion 703, and the vibrator 102-*i* and the intervening component 104-*i* may be positioned between each face 701*a*-*i* (where i=1, 2, 3, 4, 5, 6) of the body portion 701 and each of the six inner wall surfaces 703*a*-*i* of the contact portion 703. The contact portion 703 in an eighth embodiment is a component for supporting the weight of the pseudo force sense generation apparatus 8. In this example, the supporting portion 1026-*i* of the vibrator 102-*i* is attached to the face 701*a*-*i* of the body portion 701, and the movable portion 1025-*i* of the vibrator 102-*i* is attached to the one side of the intervening component 104-*i* via the linking portion 1029-*i*. The other side of the intervening component 104-*i* is attached to the inner wall surface 703*a*-*i* of the contact portion 703. The intervening component 104-*i* is preferably the intervening component 1044-*i* or the intervening component 1045-*i*, for example. The movable portion 1025-*i* of each vibrator 102-*i* performs asymmetric vibration relative to the supporting portion 1026-*i* (see FIGS. 2A and 2B, for instance) in the direction along J-i axis. Vibration based on this asymmetric vibration is efficiently transmitted to the contact portion 703 via the intervening component 104-*i*. Meanwhile, thanks to the action of the intervening component 104-*i*, vibration of the contact portion 703 in the directions along K-i-1 axis and K-i-2 axis is not significantly limited by the rod-like supporting portion 7021-*i* or the vibrator 102-*i* attached to it. Vibration based on the asymmetric vibration of at least some vibrator 102-*i* is transmitted to the contact portion 703, and the contact portion 703 in turn gives force based on at least one of such asymmetric vibrations to the skin or mucous membrane with which the contact portion 703 is in direct or indirect contact. This can also present pseudo force sense of six degrees of freedom as described below.

Figure 21A:
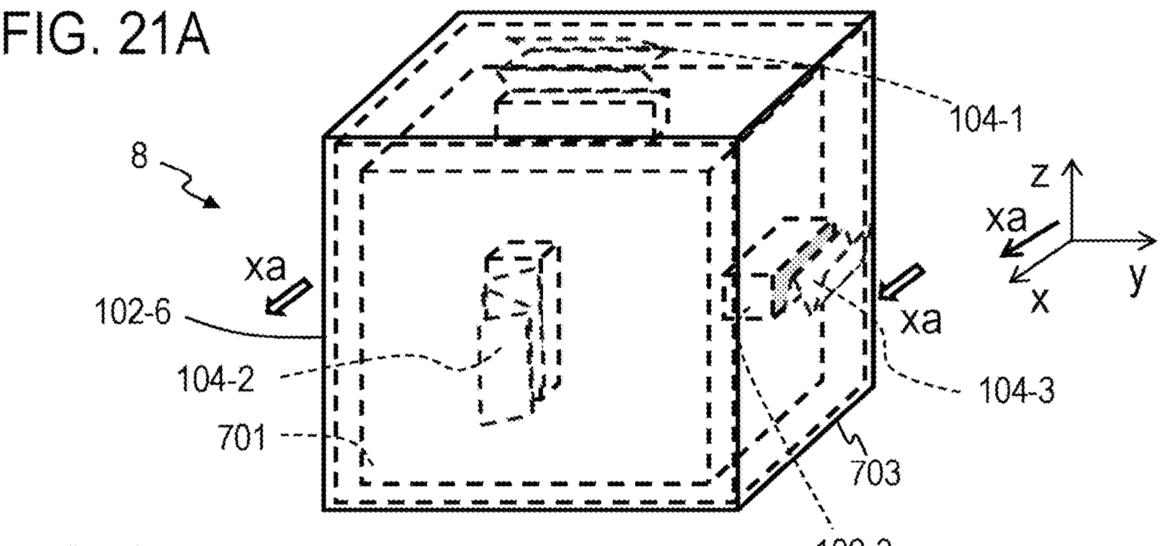
FIGS. 21A to 21C are conceptual diagrams for illustrating the operation of the embodiment.
Figure 21B:
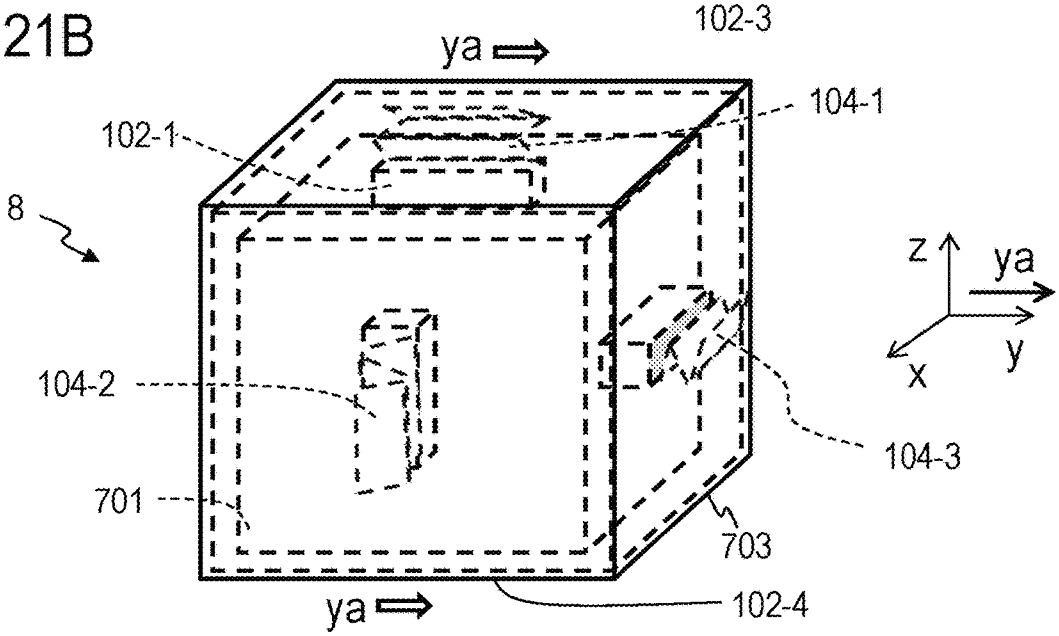
Figure 21C:
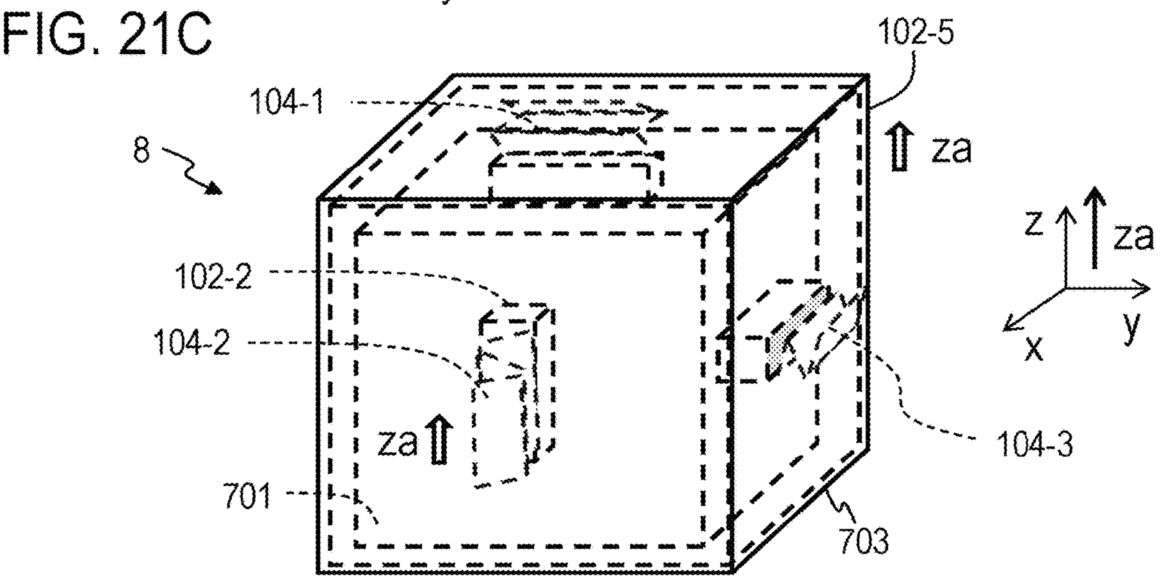

As illustrated in FIG. 21A, when the vibrator 102-3 and the vibrator 102-6 asymmetrically vibrate so as to present pseudo force sense in the same xa direction, a user contacting the contact portion 703 perceives translational force sense in the xa direction. As illustrated in FIG. 21B, when the vibrator 102-1 and the vibrator 102-4 asymmetrically vibrate so as to present pseudo force sense in the same ya direction, a user contacting the contact portion 703 perceives translational force sense in the ya direction. As illustrated in FIG. 21C, when the vibrator 102-2 and the vibrator 102-5 asymmetrically vibrate so as to present pseudo force sense in the same za direction, a user contacting the contact portion 703 perceives translational force sense in the za direction.

Figure 22A:
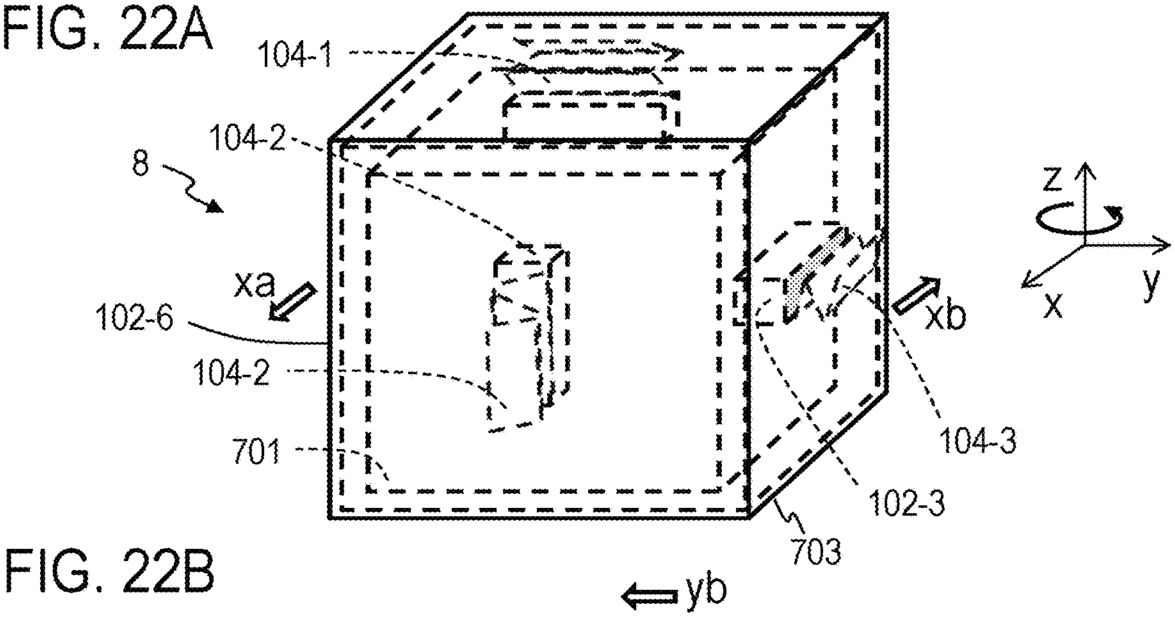
FIGS. 22A to 22C are conceptual diagrams for illustrating the operation of the embodiment.
Figure 22B:
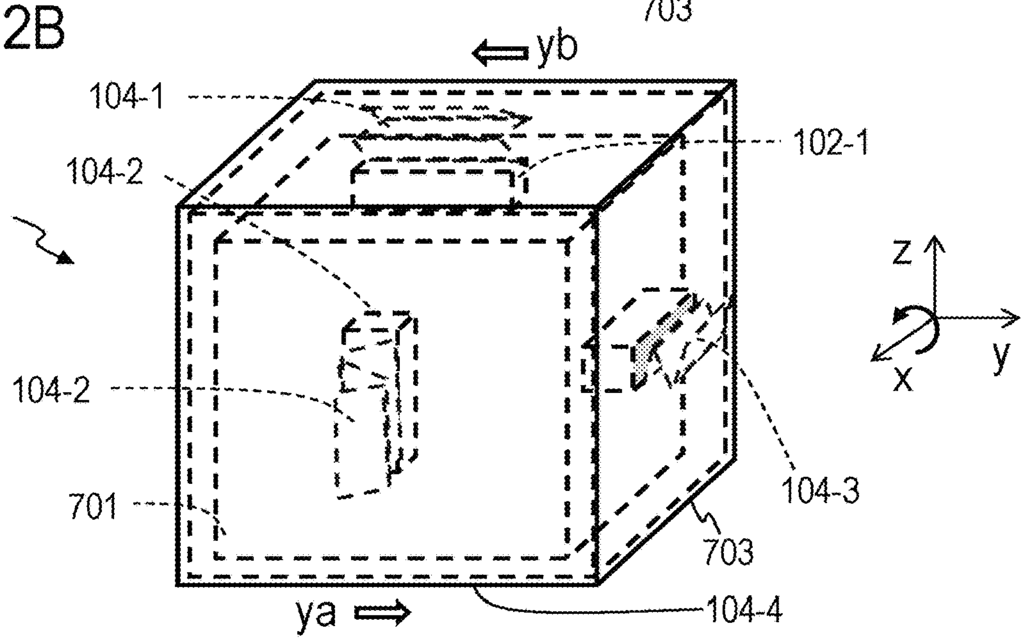
Figure 22C:
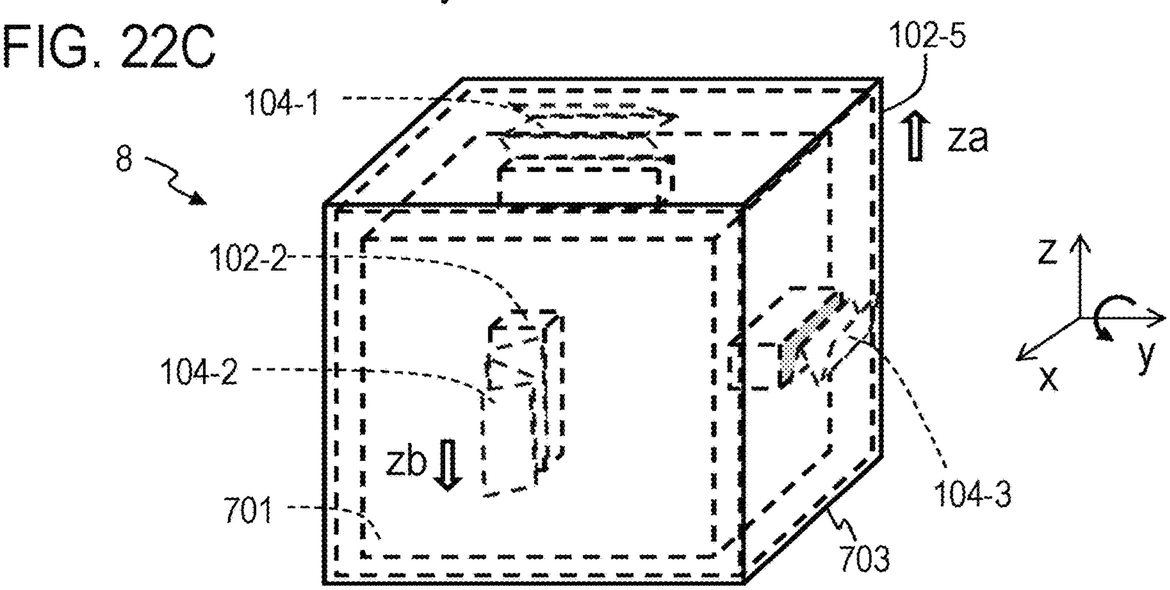

As illustrated in FIG. 22A, when the vibrator 102-3 and the vibrator 102-6 asymmetrically vibrate so as to present pseudo force sense in xb direction and xa direction which are opposite to each other, respectively, a user contacting the contact portion 703 perceives pseudo rotary force sense about the z-axis. As illustrated in FIG. 22B, when the vibrator 102-1 and the vibrator 102-5 asymmetrically vibrate so as to present pseudo force sense in yb direction and ya direction which are opposite to each other, respectively, a user contacting the contact portion 703 perceives pseudo rotary force sense about the x-axis. As illustrated in FIG. 22C, when the vibrator 102-2 and the vibrator 102-4 asymmetrically vibrate so as to present pseudo force sense in zb direction and za direction which are opposite to each other, respectively, a user contacting the contact portion 703 perceives pseudo rotary force sense about the y-axis.

Ninth Embodiment

Figure 23A:
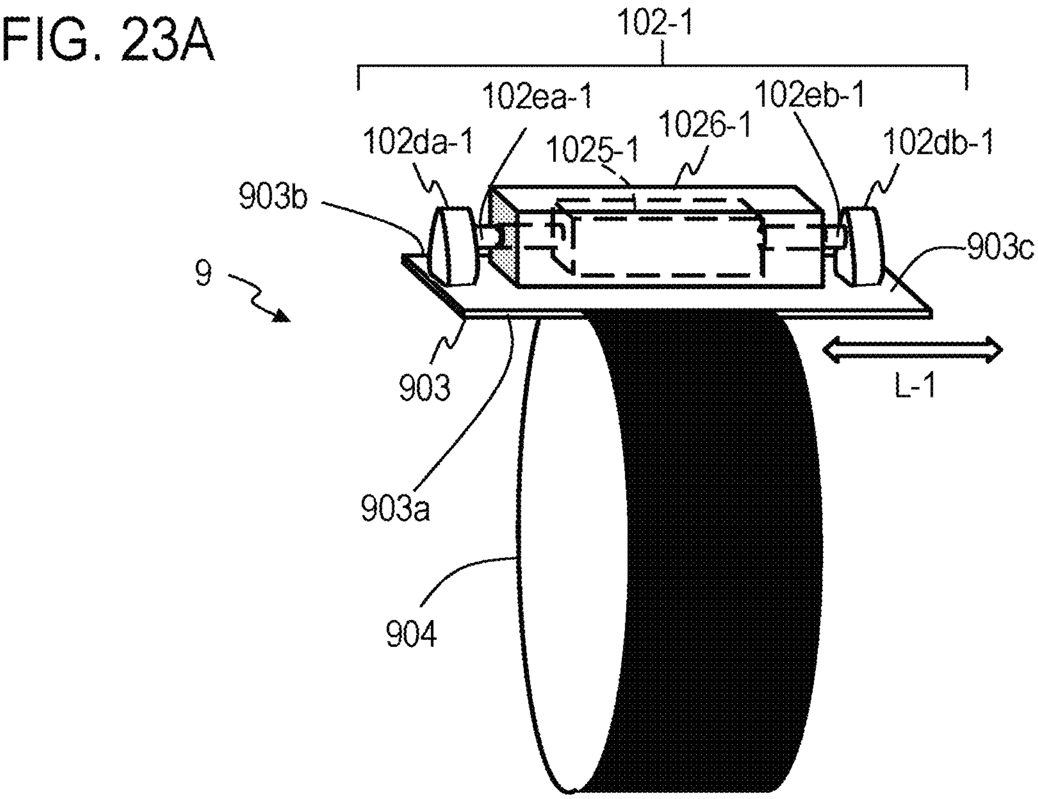
FIGS. 23A and 23B are conceptual diagrams illustrating a configuration according to an embodiment.
Figure 23B:
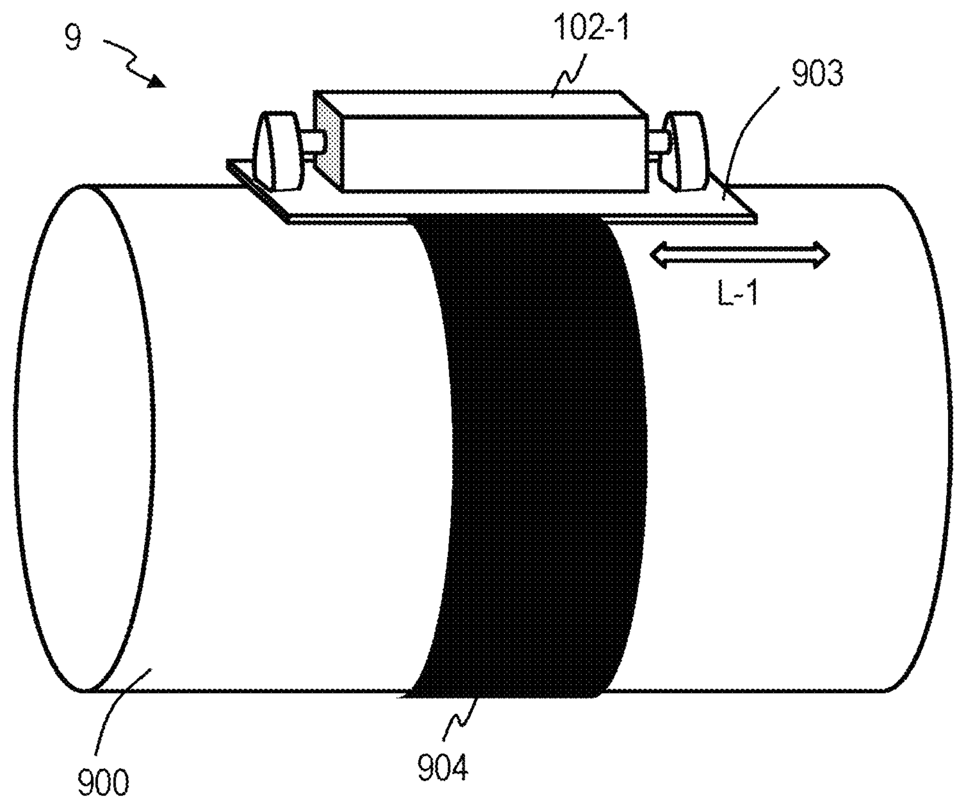

The supporting portions of the vibrators may not be supported by the body portion. For example, a pseudo force sense generation apparatus 9 illustrated in FIGS. 23A and 23B has the vibrator 102-1, a plate-like contact portion 903, and a band-like contact portion 904. The contact portion 903 is made of synthetic resin and the like, and the contact portion 904 is made of synthetic resin, leather, or the like. The movable portion 1025-1 of the vibrator 102-1 is attached to a plate face 903*c* of the contact portion 903 via the linking portions 102*da*-1, 102*db*-1, 102*ea*-1, 102*eb*-1. Further, the opposite ends of the contact portion 904 are attached to the edge portions 903*a*, 903*b* of the contact portion 903. The movable portion 1025-1 of the vibrator 102-1 performs asymmetric vibration along L-1 axis, where the edge portions 903*a*, 903*b* are edge portions lying along the L-1 axis (substantially parallel to the L-1 axis). As illustrated in FIG. 23B, the pseudo force sense generation apparatus 9 is worn so that the contact portions 903, 904 make contact with the skin of an arm 900 of the user, for example. In a ninth embodiment, the supporting portion 1026-1 of the vibrator 102-1 corresponds to the "base mechanism-side component" and the movable portion 1025-1 corresponds to the "contact mechanism-side component".

In the case of this configuration, the "contact mechanism" as the system that vibrates with the contact portions 903, 904 includes the contact portions 903, 904 and the movable portion 1025-1. This "contact mechanism" may further include the linking portions 102*da*-1, 102*db*-1, 102*ea*-1, 102*eb*-1. The "base mechanism" as the system supporting the system that vibrates with the contact portions 903, 904 includes the supporting portion 1026-*i*. This "base mechanism" may further include at least some of the springs 1022-*i*, 1023-*i*, and the coil 1024-*i*. The mass $m_1$ of the "contact mechanism" is smaller than the mass $m_2$ of the "base mechanism". This can efficiently present pseudo force sense. Preferably, the mass $m_1$ of the "contact mechanism" as the system that vibrates with the contact portions 903, 904 is not more than one third of the mass $m_2$ of the "base mechanism" as the system supporting the system that vibrates with the contact portions 903, 904. This is because it enables more efficient presentation of pseudo force sense.

Figure 24A:
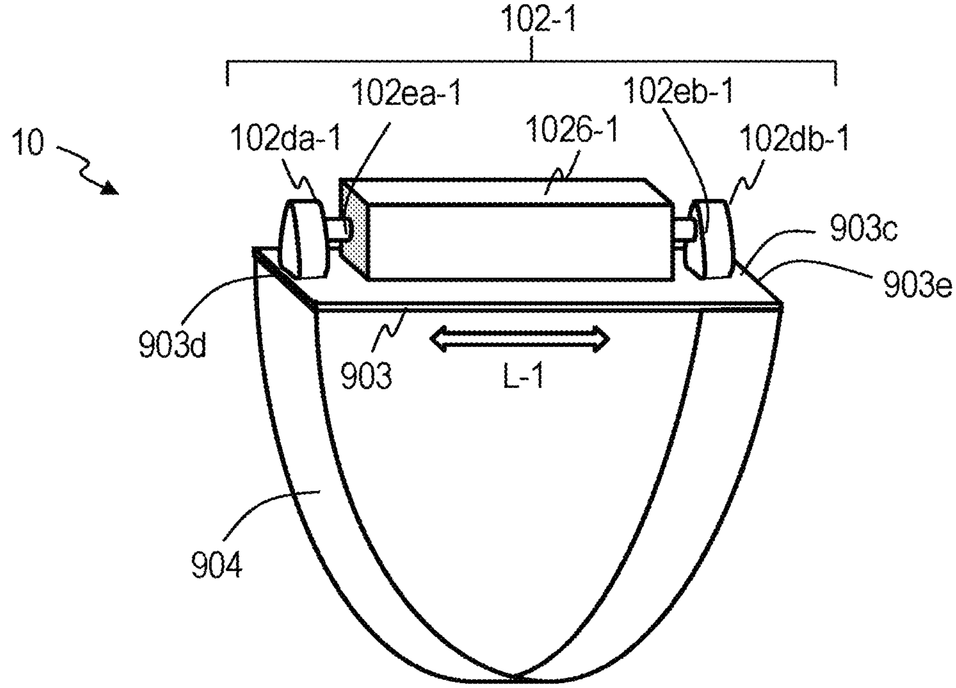
FIGS. 24A and 24B are conceptual diagrams illustrating configurations according to the embodiment.

Like a pseudo force sense generation apparatus 10 illustrated in FIG. 24A, the opposite ends of the contact portion 904 may be attached to the edge portions 903*d*, 903*e* substantially orthogonal to L-1 axis.

Figure 24B:
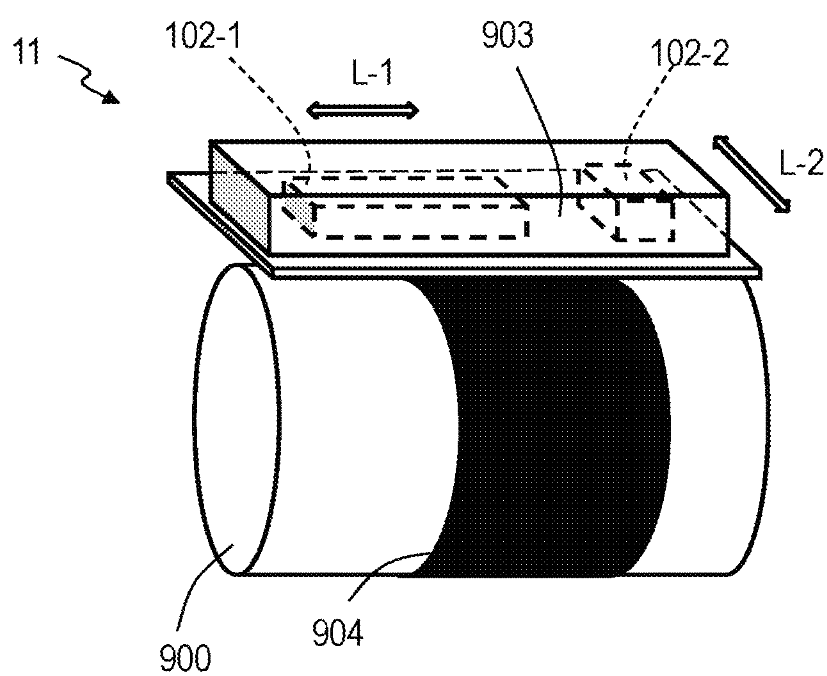

Also, like a pseudo force sense generation apparatus 11 illustrated in FIG. 24B, multiple vibrators including movable portions to make asymmetric vibration along L-i axis may be attached to the contact portion 903. L-1 axis and L-2 axis in FIG. 24B are substantially orthogonal.

Figure 25A:
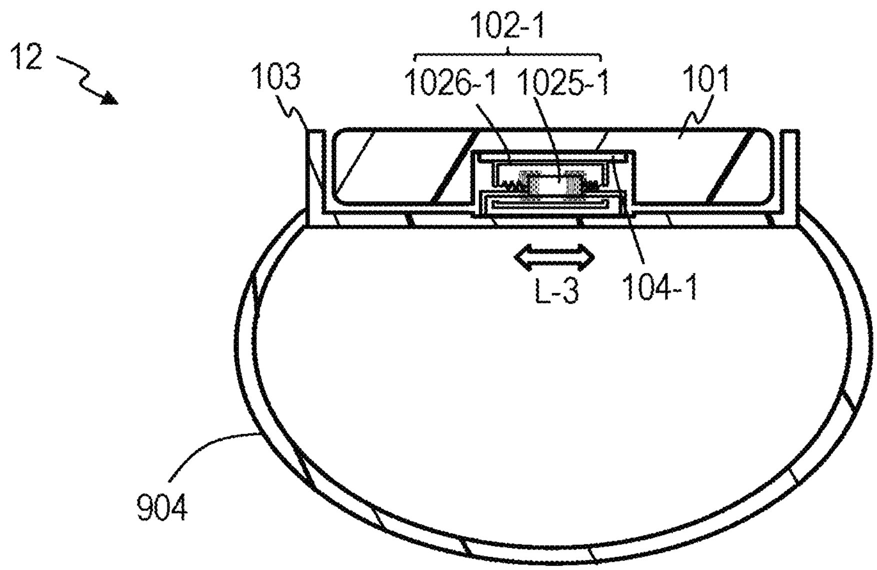
FIGS. 25A and 25B are conceptual diagrams illustrating the configuration according to the embodiment.
Figure 25B:
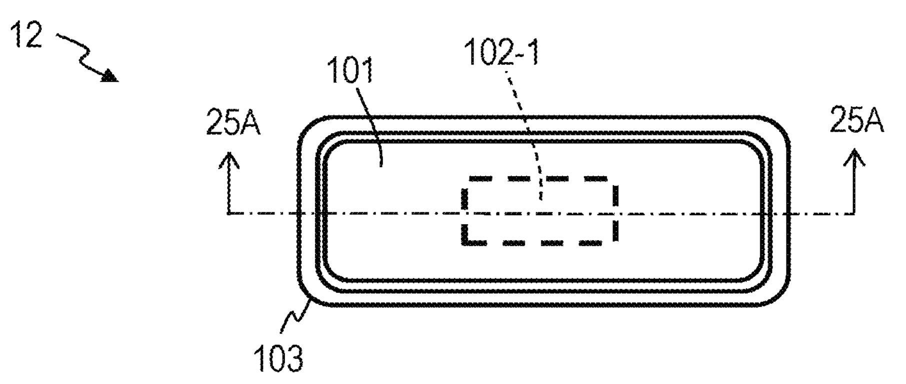

A pseudo force sense generation apparatus for attachment on an arm or the like with a band-like contact portion may include the body portion. For example, like a pseudo force sense generation apparatus 12 illustrated in FIGS. 25A and 25B, a pseudo force sense generation apparatus having the body portion 101, the vibrator 102-1 including the movable portion 1025-1 and the supporting portion 1026-1, and the contact portion 103 as illustrated in the first embodiment may have a band-like contact portion 904 attached thereto. FIG. 25A is a schematic cross-sectional view at 25A-25A in FIG. 25B. In this example, the supporting portion 1026-1 of the vibrator 102-1 corresponds to the "base mechanism-side component" and the movable portion 1025-1 corresponds to the "contact mechanism-side component".

[Setting of Driving Control Signal DCS by Way of Dynamics Analysis of Vibration System]

The way of setting the driving control signal DCS for giving force of a desired waveform pattern to the user's skin will be illustrated. Herein, the driving control signal DCS is set by way of dynamics analysis of a vibration system. As illustrated in FIG. 1D, imagine a state in which the exterior of the contact portion 103 of the pseudo force sense generation apparatus 1 is gripped in the user's palm 1000. This state is represented with a mechanical characteristic model Md for the pseudo force sense generation apparatus 1 and a mechanical characteristic model Ms for the skin of the palm 1000 to make contact with the contact portion 103. The mechanical characteristic model Md for the pseudo force sense generation apparatus 1 in this example represents the characteristics of a mechanical system composed of point masses $M_1$, $M_2$ with masses $m_1$, $m_2$, respectively, a spring with a modulus of elasticity of $k_2$ connecting between them, a damper with a coefficient of viscosity (attenuation coefficient) of $b_2$, and periodical Lorentz force f that acts on the point masses $M_1$, $M_2$ in accordance with driving voltage Vout. In the case of the configuration illustrated in FIGS. 2A and 2B, Lorentz force f can be denoted as $f=\iota_2 BL$. Here, $\iota_2$ [A] is a current fed through the coil 1024-*i*, B is a magnetic flux density generated by the coil 1024-*i*, and L [m] is the length of the coil 1024-*i* perpendicular to the magnetic flux direction passing through the supporting portion 1026-*i* in the longitudinal direction. The position of point mass $M_1$ relative to reference origin $O_1$ is represented as $x_1$, and the position of point mass $M_2$ relative to reference origin $O_2$ is represented as $x_2$. Note that the reference origins $O_1$, $O_2$ are points whose relative positions to the center of gravity of the palm 1000 are fixed. Also, for both $x_1$ and $x_2$, the right side to the center of gravity of the palm 1000 in FIG. 1D is positive and the left side to the center of gravity of the palm 1000 in FIG. 1D is negative. In this example, it is assumed that the center of gravity of the palm 1000 is not moving relative to the outside world. Time differential values of $x_1$ and $x_2$, namely velocity, are denoted as:

$\dot{x}_1, \dot{x}_2$

Figure 26:
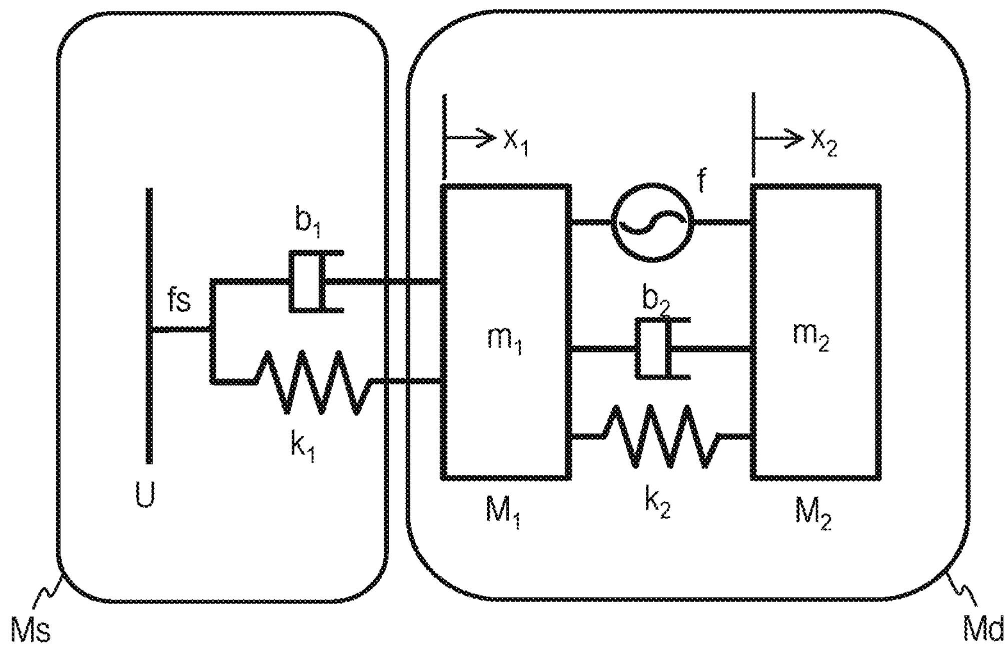
FIG. 26 is a conceptual diagram for describing a mechanical characteristic model for a pseudo force sense generation apparatus and a mechanical characteristic model for skin.

Here, due to notational limitation, they may be sometimes denoted as $x^{\bullet}_1$ and $x^{\bullet}_2$ herein. The mechanical characteristic model Ms for skin illustrated in FIG. 26 represents the characteristics of a mechanical system composed of a spring with a modulus of elasticity of $k_1$ present between the point mass $M_1$ and the center of gravity of the palm 1000, and a damper with a coefficient of viscosity of $b_1$. Here, force that is given to the skin of the palm 1000 in contact with the grip portion 126 (stress generated on the skin in response to the force) is represented as fs.

Formula representations of the mechanical characteristic model Md for the pseudo force sense generation apparatus 1 and the mechanical characteristic model Ms for skin may as shown below, for example.

<<Example of Mechanical Characteristic Model Md>>

$$\frac{d}{dt}\begin{bmatrix} x_1 \\ \dot{x}_1 \\ x_2 \\ \dot{x}_2 \end{bmatrix} = \begin{bmatrix} 0 & 1 & 0 & 0 \\ -(k_1+k_2)/m_1 & -(b_1+b_2)/m_1 & k_2/m_1 & b_2/m_1 \\ 0 & 0 & 0 & 1 \\ k_2/m_2 & b_2/m_2 & -k_2/m_2 & -b_2/m_2 \end{bmatrix}\begin{bmatrix} x_1 \\ \dot{x}_1 \\ x_2 \\ \dot{x}_2 \end{bmatrix} + \begin{bmatrix} 0 \\ -f/m_1 \\ 0 \\ f/m_2 \end{bmatrix} \quad (1)$$

The mechanical system parameters $m_1$, $m_2$, $k_2$, $b_2$ of the mechanical characteristic model Md may be derived from design values or measured values of the pseudo force sense generation apparatus 1, or may be derived by an approach such as system identification.

<<Example of Mechanical Characteristic Model Ms>>

$$fs=k_1 \cdot x_1 + b_1 \cdot x^{\bullet}_1 \quad (2)$$

The mechanical system parameters $k_1$, $b_1$ of the mechanical characteristic model Ms may be derived by an approach such as system identification or may be typical values.

<<Example of Inverse Dynamics Model Mc for Controlled Target>>

While unknown time-series parameters in the above-described formulas (1) and (2) are f, $x_1$, $x^{\bullet}_1$, $x_2$, $x^{\bullet}_2$, and fs, a relational formula between f and fs, fs=F(f), can be derived by eliminating $x_1$, $x^{\bullet}_1$, $x_2$, $x^{\bullet}_2$ using the above-described formulas (1) and (2). In the example of FIGS. 2A and 2B, f can be denoted as $f=\iota_2 BL$. B and L can be derived from design values of the pseudo force sense generation apparatus 1 or by an approach such as system identification. From $fs=F(\iota_2 BL)=F_2(\iota_2)$, a relational expression can be derived:

$$fs=F_2(\iota_2) \quad (3A).$$

The inverse function or an approximate inverse function of this relational expression (3A):

$$\iota_2=\mathrm{Inv}(fs) \quad (3B)$$

may be employed as an inverse dynamics model Mc for the controlled target.

When R represents the resistance of the coil 1024-*i* and Vout represents the voltage given to the coil 1024-*i*, if back electromotive force generated by relative movement of the magnet and the coil is sufficiently small, $\iota_2$=Vout/R holds, and then fs=$F_2$(Vout/R)=$F_R$(Vout) holds. It is also possible to employ the inverse function or an approximate inverse function:

$$Vout=\mathrm{Inv}_R(fs) \quad (4B),$$

of this relational expression:

$$fs=F_R(Vout) \quad (4A),$$

as an inverse dynamics model Mc for the controlled target.

By applying the waveform pattern of the force to be given to the skin of the palm 1000 to such an inverse dynamics model Mc, the driving control signal DCS for producing the waveform pattern of that force can be obtained. For example, the driving control signal DCS may be of a time-series waveform pattern of $\iota_2$ that is determined by substituting the waveform pattern (time-series waveform pattern) of the force fs to be given to the skin of the palm 1000 into formula (3B). Alternatively, the driving control signal DCS may be of a time-series waveform pattern of Vout that is determined by substituting the waveform pattern of the force fs to be given to the skin of the palm 1000 into formula (4B). An example of the waveform pattern of the force fs to be given to the skin of the palm 1000 is an "optimized waveform pattern" or a "rectangular waveform pattern for obtaining an optimized waveform pattern" as described above. A driving control signal DCS corresponding to the "optimized waveform pattern" will be called "non-linearly optimized driving control signal DCS".

[Comparative Simulation Results]

Next, comparative simulation results of comparison between a conventional pseudo force sense generation apparatus (containing a vibrator in the main body) and the pseudo force sense generation apparatus 5 in the fifth embodiment (FIGS. 11A and 11C) will be shown.

<Comparison for Driving Control Signal DCS with Sinusoidal Wave>

Figure 27A:
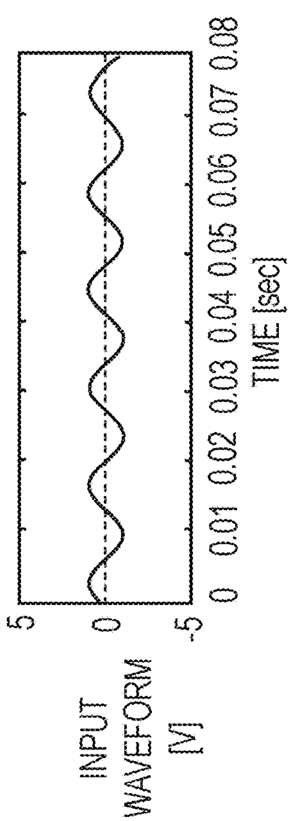
FIGS. 27A to 27C are data illustrating the characteristics of a conventional pseudo force sense generation apparatus.
Figure 27B:
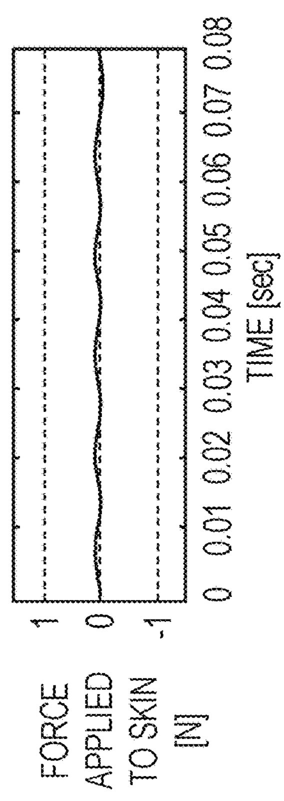
Figure 27C:
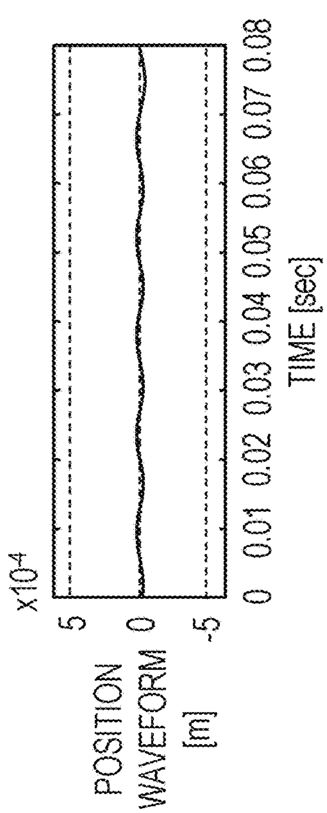
Figure 27D:
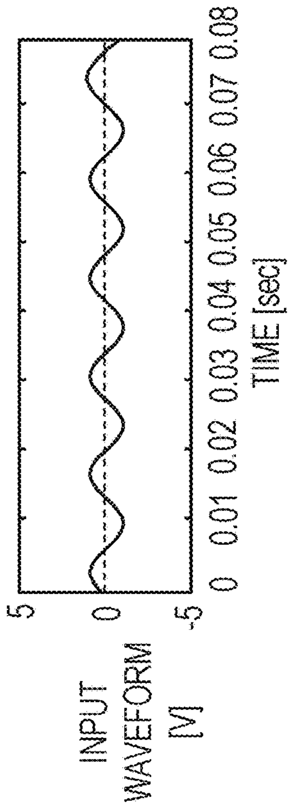
FIGS. 27D to 27F are data illustrating the characteristics of the pseudo force sense generation apparatus according to an embodiment.
Figure 27E:
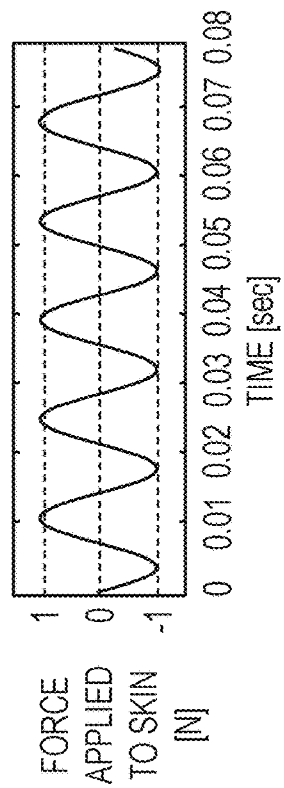
Figure 27F:
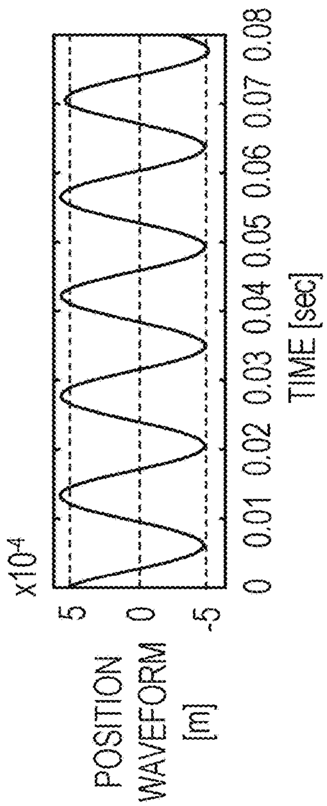

Using FIGS. 27A to 27F, comparative simulation results for a case of inputting a sinusoidal wave as the driving control signal DCS are shown. FIGS. 27A to 27C show simulation results with the conventional pseudo force sense generation apparatus, and FIGS. 27D to 27F show simulation results with the pseudo force sense generation apparatus 5. FIGS. 27A and 27D represent the input waveforms of the driving control signal DCS input to the conventional apparatus and the pseudo force sense generation apparatus 5. The vertical axis represents the voltage value [V] of the input waveform and the horizontal axis represents time [sec]. FIGS. 27B and 27E represent the force that is given from the contact portion to the skin when a driving control signal DCS of the input waveforms in FIGS. 27A and 27D is given to the conventional apparatus and the pseudo force sense generation apparatus 5. The vertical axis represents the force given to the skin [N] and the horizontal axis represents time [sec]. FIGS. 27C and 27F represent the vibration waveforms (position waveforms) of the contact portion when a driving control signal DCS of the input waveforms in FIGS. 27A and 27D is given to the conventional apparatus and the pseudo force sense generation apparatus 5. The vertical axis represents the position of the contact portion [in] and the horizontal axis represents time [sec]. Here, in FIGS. 27A to 27C, for the conventional pseudo force sense generation apparatus, the system composed of a body portion (for example, a smartphone terminal device) with a mass of 135 g, a contact portion (for example, smartphone case) with a mass of 10 g, and a supporting portion (for example, an actuator case) with a mass of 10 g had a mass of $m_1$=155 g, and the system composed of a movable portion (for example, an actuator mover) with a mass of 5 g had a mass of $m_2$=5 g. Meanwhile, in FIGS. 27D to 27F, the system composed of a contact portion 103 (for example, smartphone case) with a mass of 10 g and a supporting portion 1026-*i* (for example, actuator case) with a mass of 10 g had a mass of $m_1$=20 g, and the system composed of a movable portion 1025-*i* (for example, actuator mover) with a mass of 5 g and a body portion 101 (for example, smartphone terminal device) with a mass of 135 g had a mass of $m_2$=140 g. As can be seen from FIGS. 27A to 27F, this embodiment can make mass $m_2$ large relative to mass $m_1$ compared to the conventional apparatus, which results in larger vibration of the contact portion as well as stronger force given to the skin.

<Comparison 1 for Driving Control Signal DCS with Temporally Asymmetric Rectangular Wave>

Figure 28A:
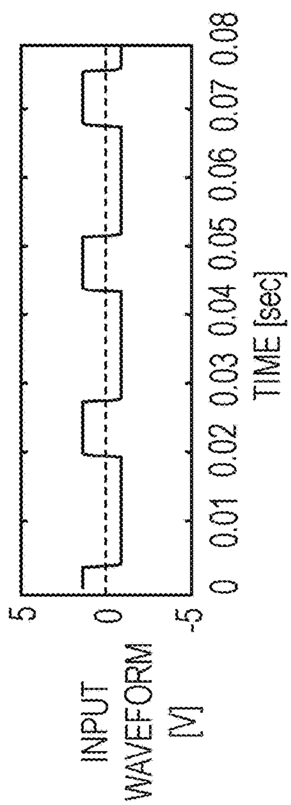
FIGS. 28A to 28C are data illustrating the characteristics of a conventional pseudo force sense generation apparatus.
Figure 28B:
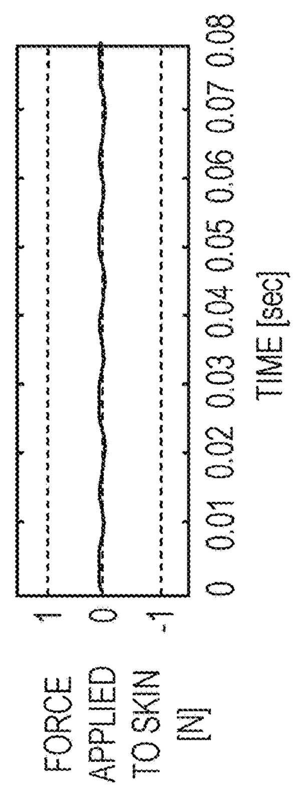
Figure 28C:
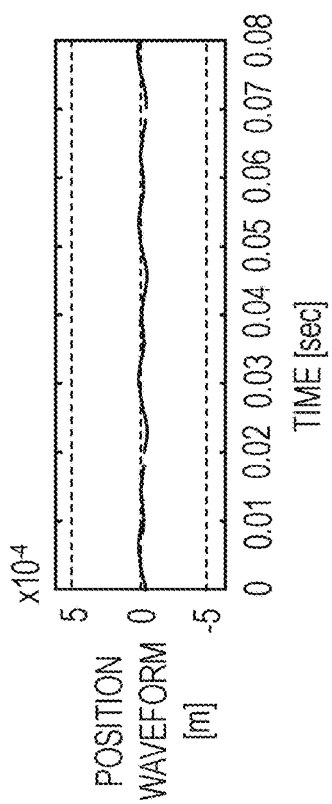
Figure 28D:
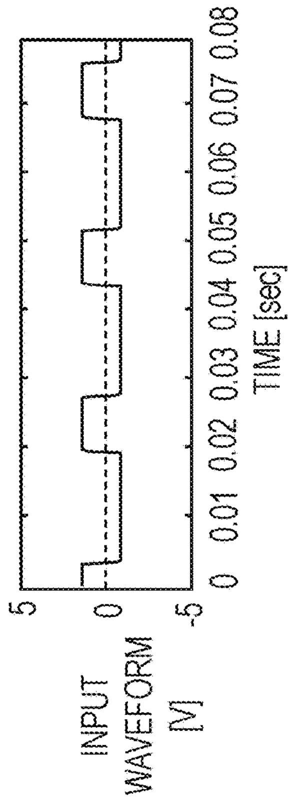
FIGS. 28D to 28F are data illustrating the characteristics of the pseudo force sense generation apparatus according to the embodiment.
Figure 28E:
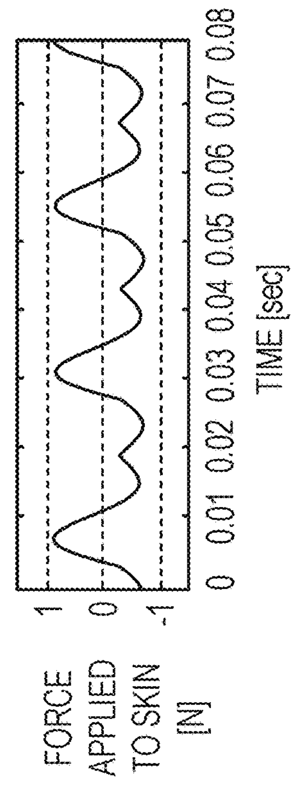
Figure 28F:
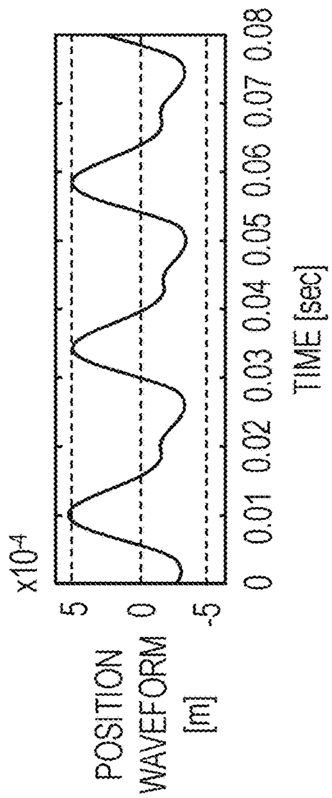
Figure 29A:
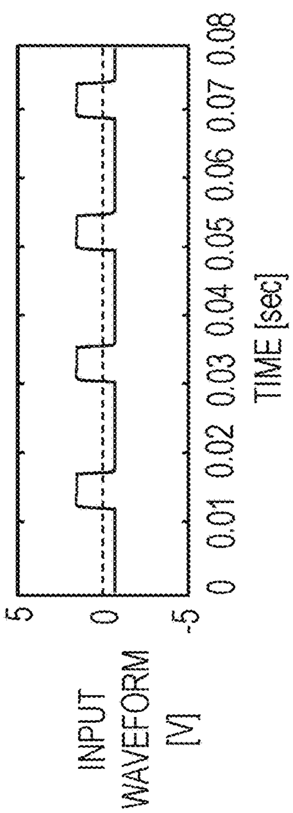
FIGS. 29A to 29C are data illustrating the characteristics of a conventional pseudo force sense generation apparatus.
Figure 29B:
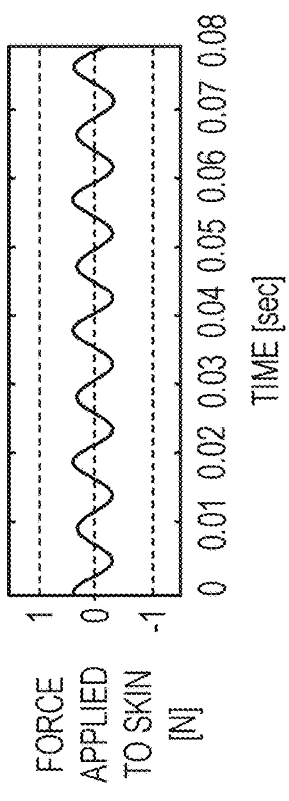
Figure 29C:
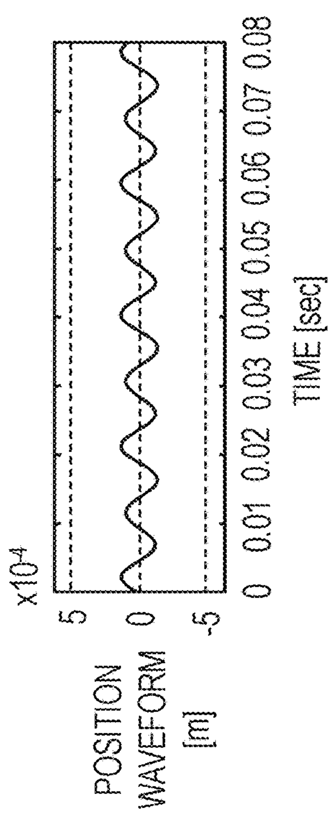
Figure 29D:
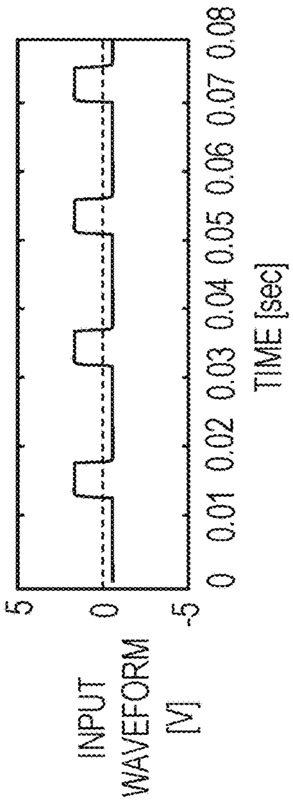
FIGS. 29D to 29F are data illustrating the characteristics of the pseudo force sense generation apparatus according to the embodiment.
Figure 29E:
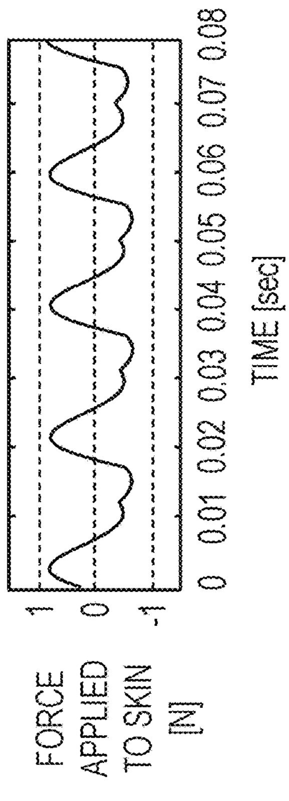
Figure 29F:
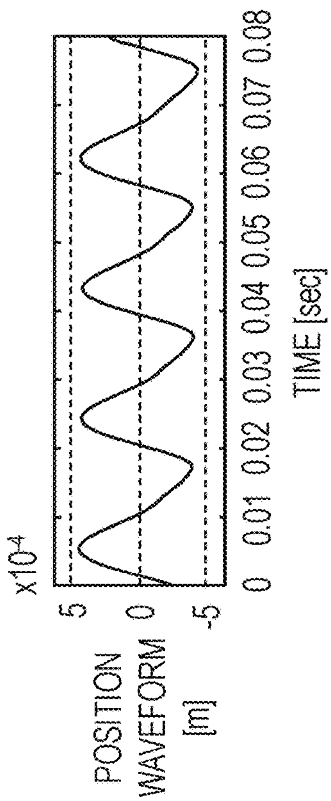

Using FIGS. 28A to 28F, comparative simulation results for the case of inputting a temporally asymmetric rectangular wave as the driving control signal DCS are shown. Here, in this temporally asymmetric rectangular wave, the period T1 in which the input waveform of driving control signal DCS is positive and the period T2 in which the input waveform is negative is: [T1, T2]=[8, 16] [ins]. FIGS. 28A to 28C show simulation results with the conventional pseudo force sense generation apparatus, and FIGS. 28D to 28F show simulation results with the pseudo force sense generation apparatus 5. FIGS. 28A and 28D represent the input waveforms of the driving control signal DCS input to the conventional apparatus and the pseudo force sense generation apparatus 5. The vertical axis represents the voltage value [V] of the input waveform and the horizontal axis represents time [sec]. FIGS. 28B and 28E represent the force that is given from the contact portion to the skin when a driving control signal DCS of the input waveforms in FIGS. 28A and 28D is given to the conventional apparatus and the pseudo force sense generation apparatus 5. The vertical axis represents the force given to the skin [N] and the horizontal axis represents time [sec]. FIGS. 28C and 28F represent the vibration waveforms (position waveforms) of the contact portion when a driving control signal DCS of the input waveforms in FIGS. 28A and 28D is given to the conventional apparatus and the pseudo force sense generation apparatus 5. The vertical axis represents the position of the contact portion [in] and the horizontal axis represents time [sec]. Here, in FIGS. 28A to 28C, for the conventional pseudo force sense generation apparatus, the system composed of a body portion (for example, a smartphone terminal device) with a mass of 135 g, a contact portion (for example, a smartphone case) with a mass of 10 g, and a supporting portion (for example, an actuator case) with a mass of 10 g had a mass of $m_1$=155 g, and the system composed of a movable portion (for example, an actuator mover) with a mass of 5 g had a mass of $m_2$=5 g. Meanwhile, in FIGS. 28D to 28F, the system composed of a contact portion 103 (for example, a smartphone case) with a mass of 10 g and a supporting portion 1026-*i* (for example, an actuator case) with a mass of 10 g had a mass of $m_1$=20 g, and the system composed of a movable portion 1025-*i* (for example, an actuator mover) with a mass of 5 g and a body portion 101 (for example, a smartphone terminal device) with a mass of 135 g had a mass of $m_2$=140 g. As can be seen from FIGS. 28A to 28F, this embodiment can make mass $m_2$ large relative to mass $m_1$ compared to the conventional apparatus, allowing increase both in asymmetry of the vibration of the contact portion and the asymmetry of the force given to the skin. As a result, with the configuration of this embodiment, pseudo force sense can be presented more clearly than conventionally done.

<Comparison 2 for Driving Control Signal DCS with Temporally Asymmetric Rectangular Wave>

FIG. 29A to 29F show comparative simulation results for the case of inputting a temporally asymmetric rectangular wave with [T1, T2]=[5, 14] [ms] as the driving control signal DCS. In this case, this embodiment can also make mass $m_2$ large relative to mass $m_1$ compared to the conventional apparatus, allowing increase in the asymmetry of the force given from the contact portion to the skin. As a result, with the configuration of this embodiment, pseudo force sense can be presented more clearly than conventionally done.

<Comparison 3 for Driving Control Signal DCS with Temporally Asymmetric Rectangular Wave>

Figure 30A:
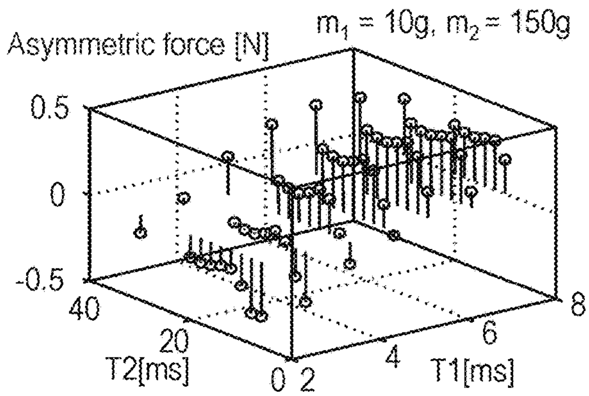
FIGS. 30A to 30F are stem plotting diagrams of an example of the relationship between a period T1 during which the input waveform of the driving control signal for the pseudo force sense generation apparatus is positive, a period T2 during which it is negative, and the asymmetry of force applied from the pseudo force sense generation apparatus to skin, per set of masses $m_1$, $m_2$.
Figure 30B:
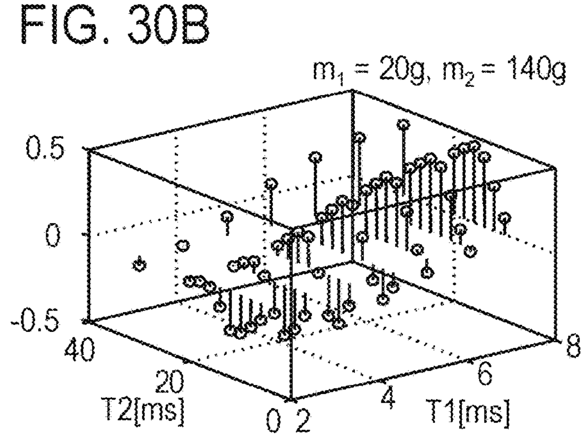
Figure 30C:
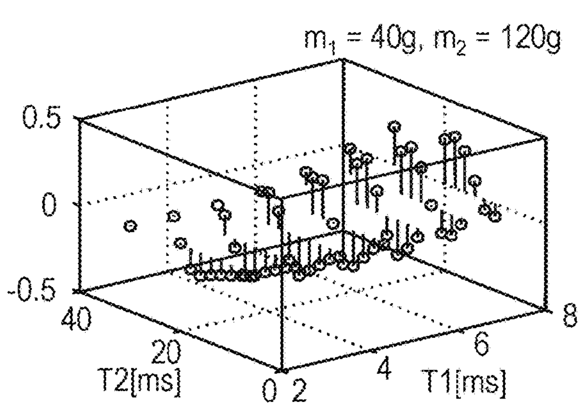
Figure 30D:
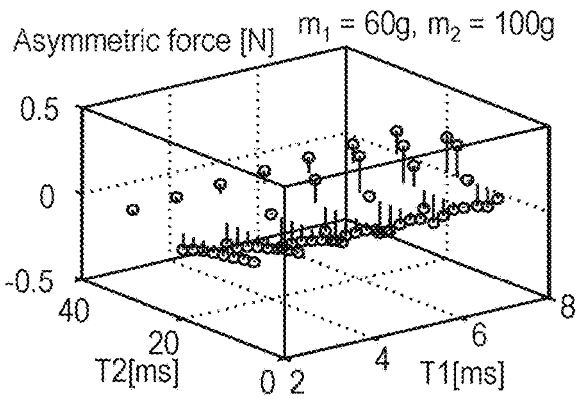
Figure 30E:
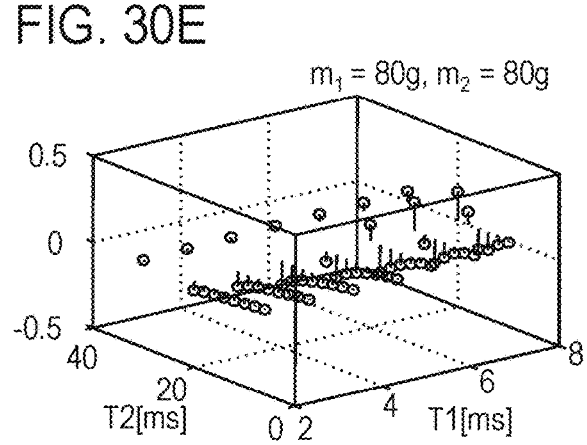
Figure 30F:
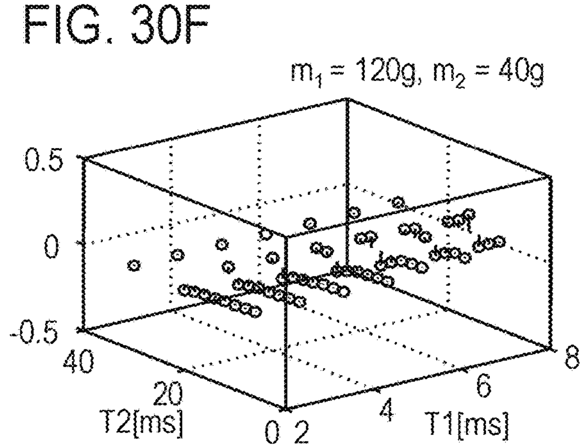
Figure 31A:
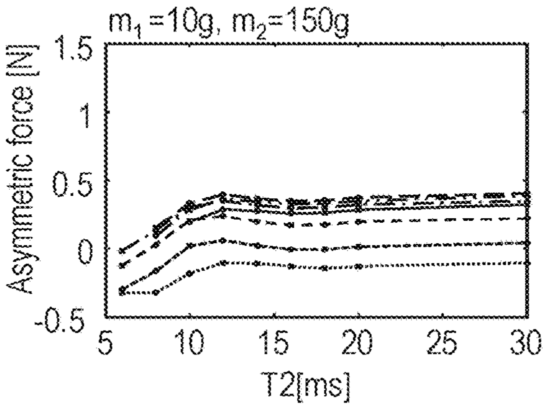
FIGS. 31A to 31F are line chart diagrams showing an example of the relationship between the period T1 during which the input waveform of the driving control signal for the pseudo force sense generation apparatus is positive, the period T2 during which it is negative, and the asymmetry of force applied from the pseudo force sense generation apparatus to skin, per set of masses $m_1$, $m_2$.
Figure 31D:
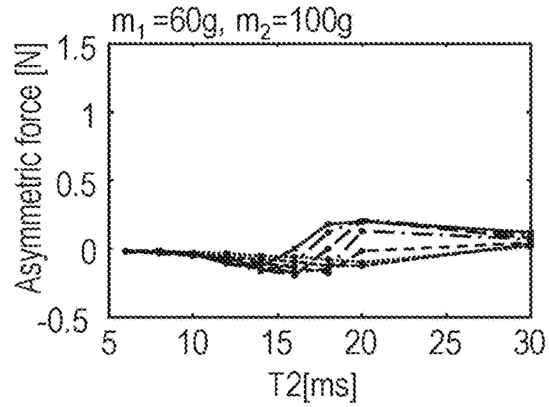
Figure 31B:
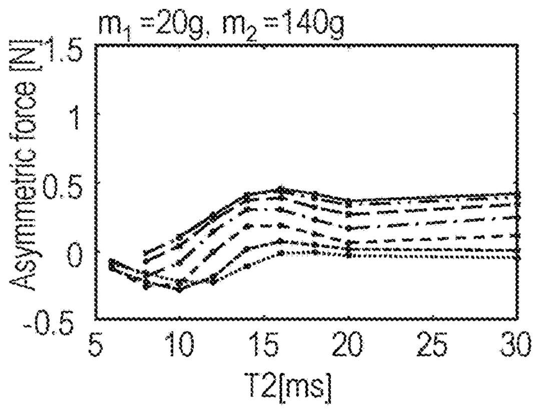
Figure 31E:
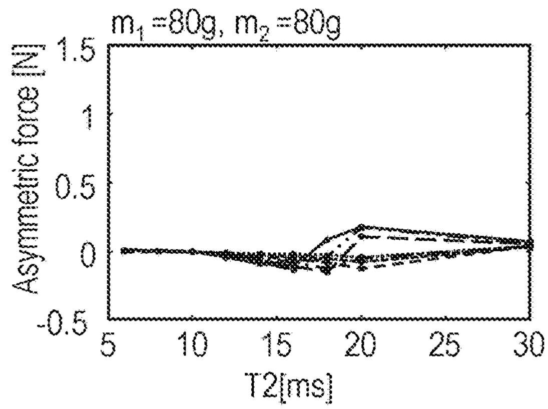
Figure 31C:
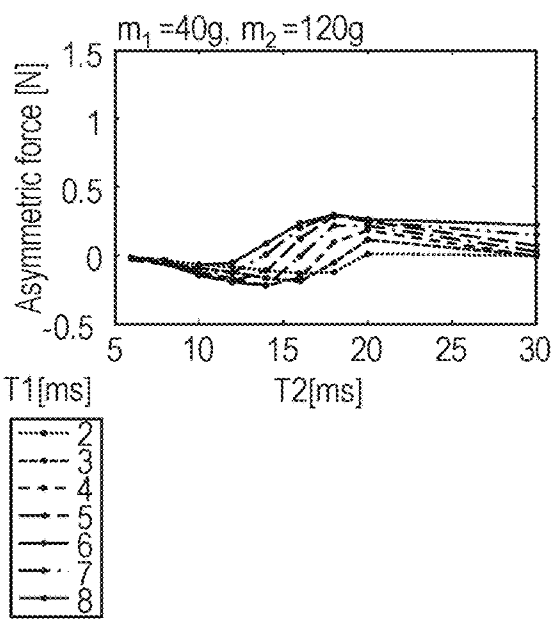
Figure 31F:
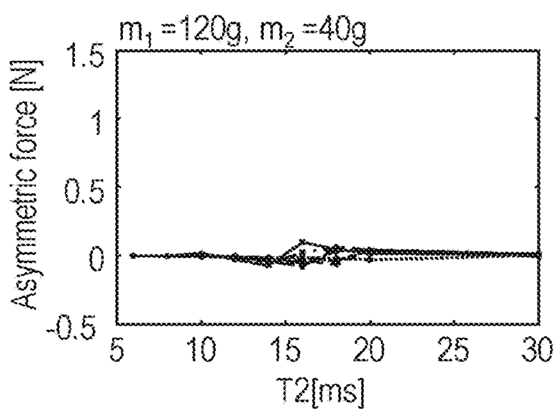

FIGS. 30A to 30F are stein plotting diagrams of an example of the asymmetry of the force given from the contact portion 103 to the skin when a driving control signal DCS of a temporally asymmetric rectangular wave with [T1, T2] [ms] is input to the pseudo force sense generation apparatus 5 (FIGS. 11A and 11C), per [$m_1$, $m_2$] [g]. The two axes on the bottom surface in each diagram represent the periods T1 and T2, respectively, and the vertical axis represents the asymmetry of the force given to the skin. The difference between the maximum absolute value of force in a first direction (the positive direction) given to the skin and the maximum absolute value of force in the opposite direction to the first direction (the negative direction) is defined as the value of "force asymmetry". FIGS. 31A to 31F are diagrams representing the same data as FIGS. 30A to 30F with line charts. The respective diagrams correspond to the following [$m_1$, $m_2$]:

FIGS. 30A and 31A: [$m_1$, $m_2$]=[10, 150] [g]
FIGS. 30B and 31B: [$m_1$, $m_2$]=[20, 140] [g]
FIGS. 30C and 31C: [$m_1$, $m_2$]=[40, 120] [g]
FIGS. 30D and 31D: [$m_1$, $m_2$]=[60, 100] [g]
FIGS. 30E and 31E: [$m_1$, $m_2$]=[80, 80] [g]
FIGS. 30F and 31F: [$m_1$, $m_2$]=[120, 40] [g]

From these diagrams, it can be seen that the smaller mass $m_1$ is relative to mass $m_2$, the asymmetry of the force given from the contact portion 103 to the skin increases, allowing the skin to perceive clear force sense. In FIGS. 30A to 30C in particular, the asymmetry of the force given from the contact portion 103 to the skin is large and allows the skin to perceive clearer force sense, which is considered advantageous. That is, it is understood that the relationship of $0<m_1/m_2\leq 1/3$ is preferably satisfied, which enables clearer presentation of pseudo force sense.

<Example of Optimized Waveform Pattern of Force>

Figure 32A:
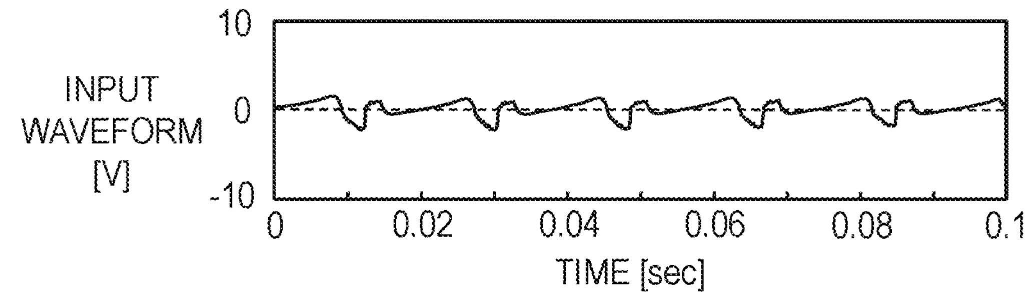
FIG. 32A is a diagram illustrating time-series data for the input waveform of a non-linearly optimized driving control signal.
Figure 32B:
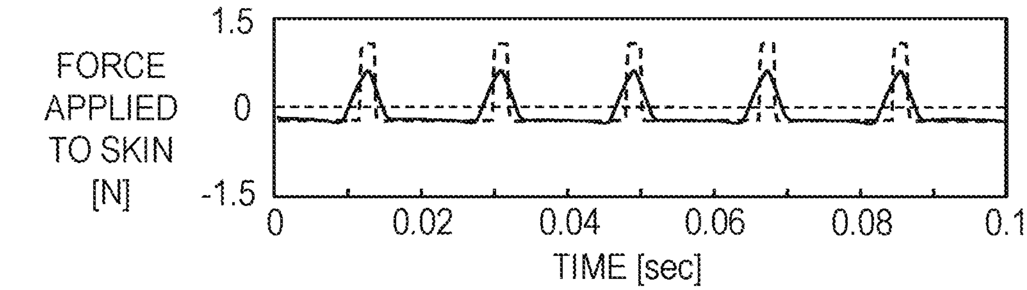
FIG. 32B is a diagram illustrating time-series data (optimized waveform pattern) for the force applied from a pseudo force sense generation apparatus controlled by the non-linearly optimized driving control signal to skin.
Figure 32C:
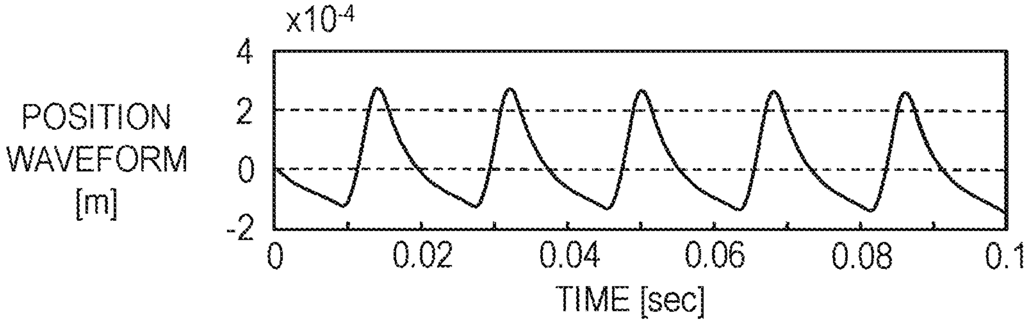
FIG. 32C is a diagram illustrating time-series data for the position waveform of the pseudo force sense generation apparatus controlled by the non-linearly optimized driving control signal.
Figure 33A:
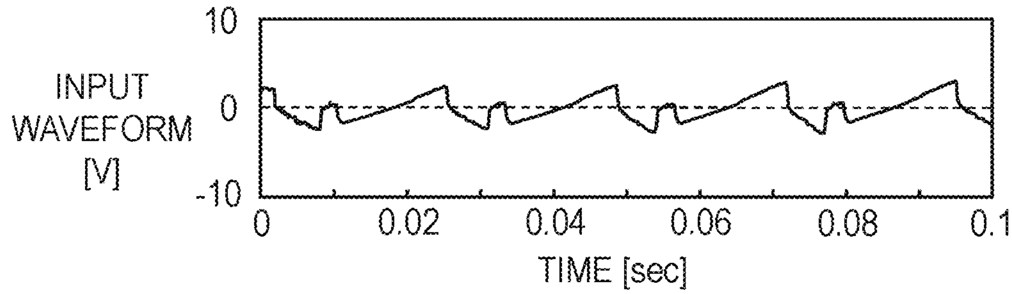
FIG. 33A is a diagram illustrating time-series data for the input waveform of a non-linearly optimized driving control signal.
Figure 33B:
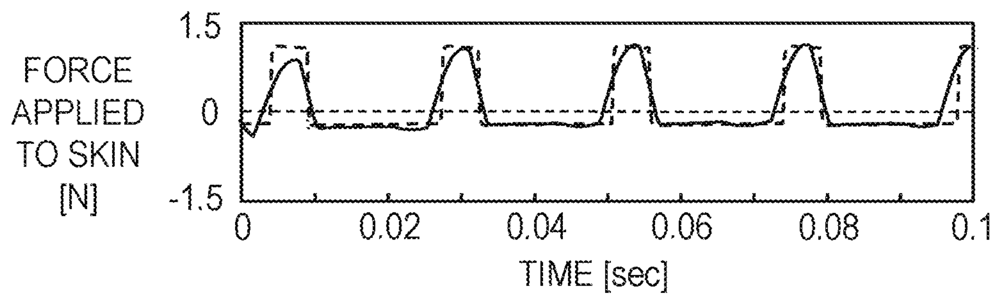
FIG. 33B is a diagram illustrating time-series data (optimized waveform pattern) for the force applied from a pseudo force sense generation apparatus controlled by the non-linearly optimized driving control signal to skin.
Figure 33C:
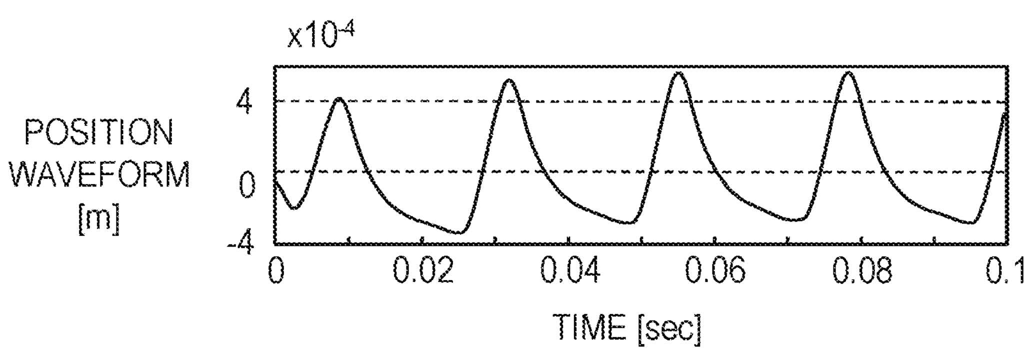
FIG. 33C is a diagram illustrating time-series data for the position waveform of the pseudo force sense generation apparatus controlled by the non-linearly optimized driving control signal.
Figure 34A:
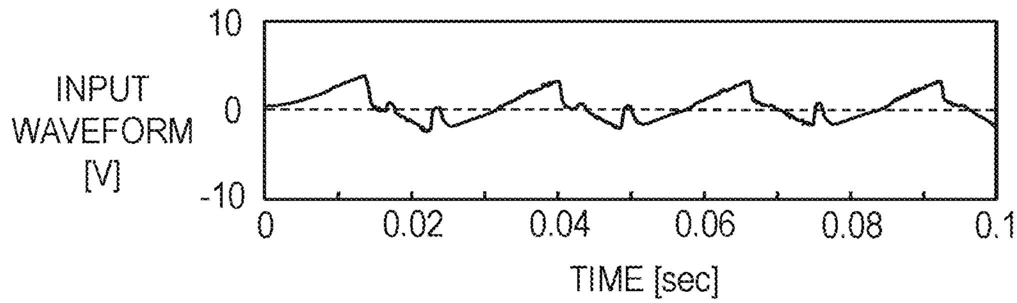
FIG. 34A is a diagram illustrating time-series data for the input waveform of a non-linearly optimized driving control signal.
Figure 34B:
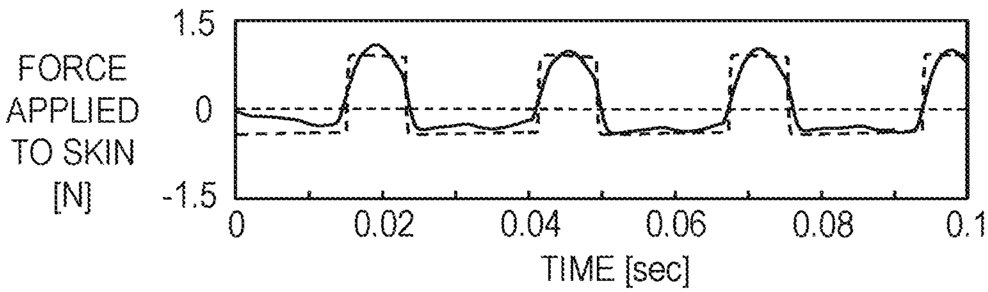
FIG. 34B is a diagram illustrating time-series data (optimized waveform pattern) for the force applied from a pseudo force sense generation apparatus controlled by the non-linearly optimized driving control signal to skin.
Figure 34C:
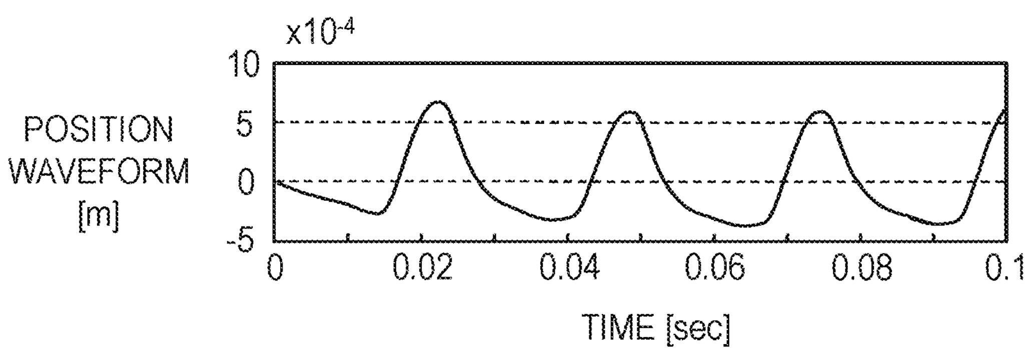
FIG. 34C is a diagram illustrating time-series data for the position waveform of the pseudo force sense generation apparatus controlled by the non-linearly optimized driving control signal.
Figure 35A:
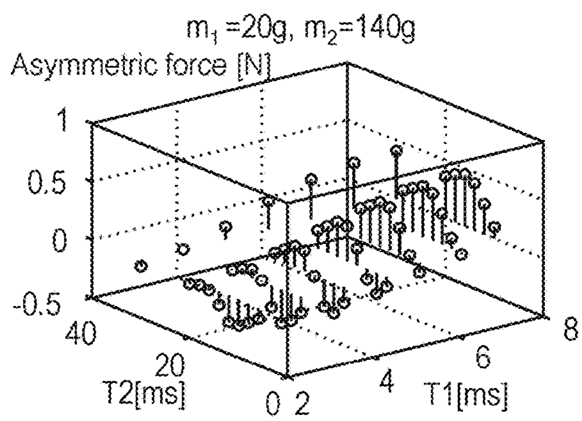
FIGS. 35A to 35D are stem plotting diagrams of an example of the relationship between the period T1 during which the input waveform of the driving control signal is positive, the period T2 during which it is negative, and the asymmetry of force applied from the pseudo force sense generation apparatus to skin, per set of masses $m_1$, $m_2$, where a driving control signal with a temporally asymmetric rectangular wave is used in FIGS. 35A and 35C, whereas a non-linearly optimized driving control signal is used in FIGS. 35B and 35D.
Figure 35B:
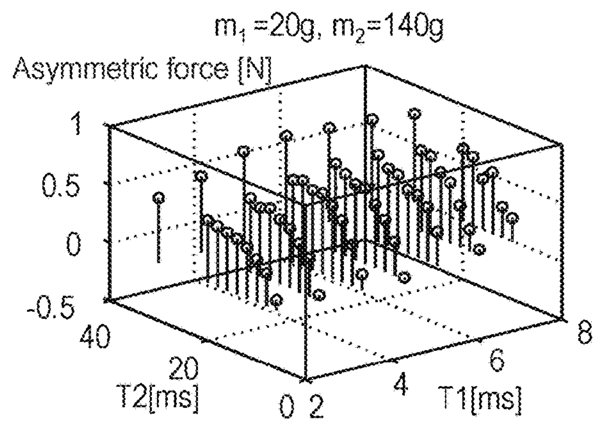
Figure 35C:
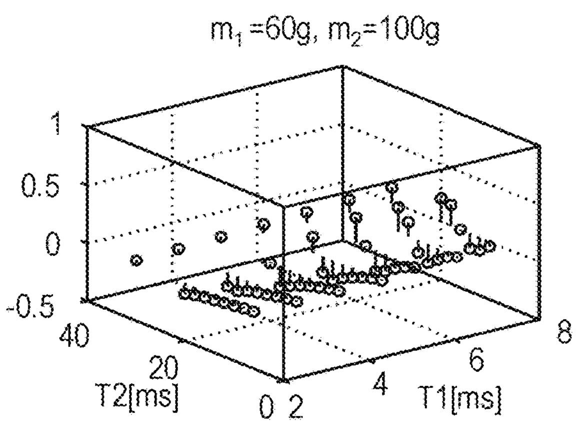
Figure 35D:
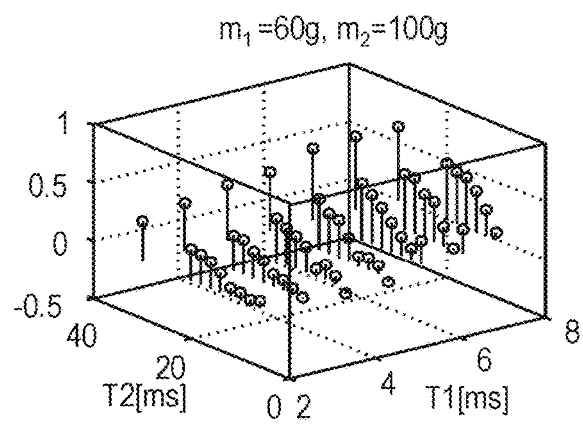
Figure 36A:
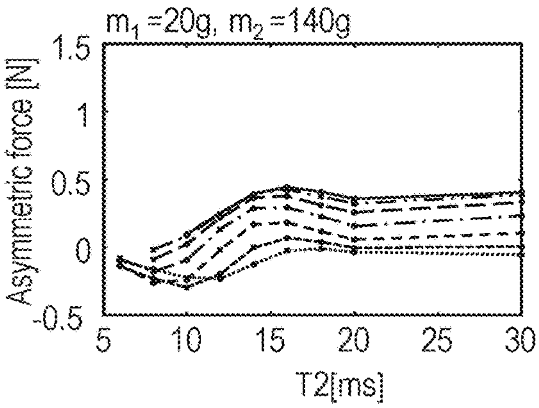
FIGS. 36A to 36D are line chart diagrams showing an example of the relationship between the period T1 during which the input waveform of the driving control signal is positive, the period T2 during which it is negative, and the asymmetry of force applied from the pseudo force sense generation apparatus to skin, per set of masses $m_1$, $m_2$, where a driving control signal with a temporally asymmetric rectangular wave is used in FIGS. 36A and 36C, whereas a non-linearly optimized driving control signal is used in FIGS. 36B and 36D.
Figure 36B:
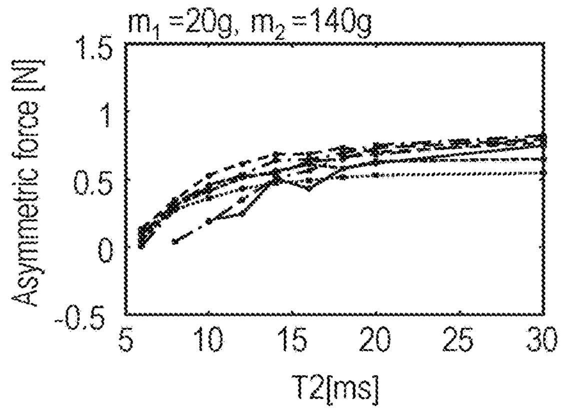
Figure 36C:
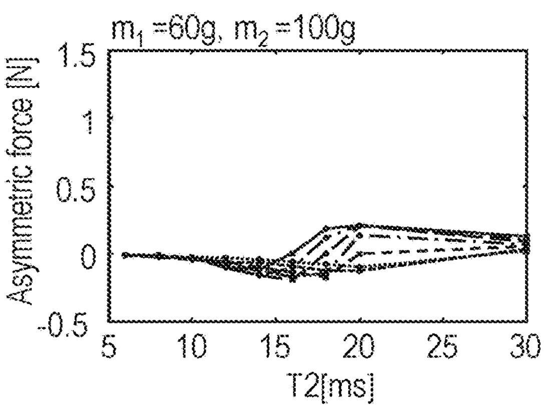
Figure 36D:
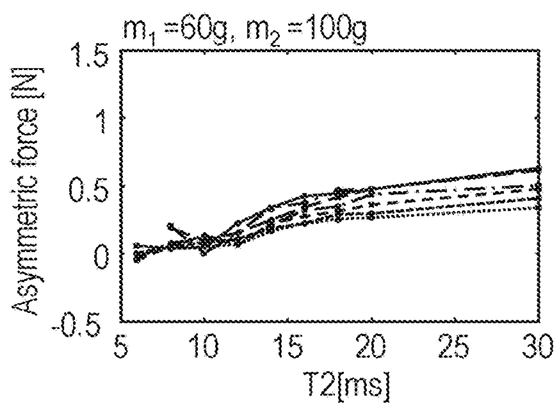
Figure 36D:
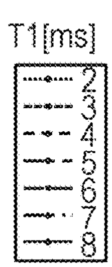

FIGS. 32A, 33A, and 34A are diagrams illustrating time-series data for the input waveform of a non-linearly optimized driving control signal DCS; FIGS. 32B, 33B, and 34B are diagrams illustrating time-series data (optimized waveform pattern) for the force applied to the skin from the contact portion 103 of the pseudo force sense generation apparatus 5 when controlled via such a driving control signal DCS; and FIGS. 32C, 33C, and 34C are diagrams illustrating time-series data for the position waveform of the contact portion 103 in this case, where [$m_1$, $m_2$]=[20, 140] [g]. The driving control signal DCS was calculated by applying the rectangular waveform pattern indicated by the broken line in FIG. 32B (a rectangular waveform pattern for obtaining the optimized waveform pattern) to the inverse dynamics model Mc described above. [T1, T2] in the diagrams are:

FIGS. 32A to 32C: [T1, T2]=[2, 16] [ms]
FIGS. 33A to 33C: [T1, T2]=[5, 18] [ins]
FIGS. 34A to 34C: [T1, T2]=[8, 18] [ms]

As can be seen from these diagrams, with the optimized waveform pattern, the asymmetry of the force given from the contact portion 103 to the skin is large and further the asymmetry of the position waveform of the contact portion 103 is also large, allowing the skin to perceive clearer force sense.

<Comparison Between Driving Control Signal DCS with Temporally Asymmetric Rectangular Wave and Non-Linearly Optimized Driving Control Signal DCS>

FIGS. 35A to 35D are stem plotting diagrams of an example of the asymmetry of the force given from the contact portion 103 to the skin when a driving control signal DCS with [T1, T2] [ms] is input to the pseudo force sense generation apparatus 5 (FIGS. 11A and 11C), per [$m_1$, $m_2$] [g]. Note that in FIGS. 35A and 35C, a driving control signal DCS of a temporally asymmetric rectangular wave is used, whereas in FIGS. 35B and 35D, a non-linearly optimized driving control signal DCS is used. The two axes on the bottom surface in each diagram represent the periods T1 and T2, respectively, and the vertical axis represents the asymmetry of the force given to the skin. The difference between the maximum absolute value of force in a first direction (the positive direction) given to the skin and the maximum absolute value of force in the opposite direction to the first direction (the negative direction) is defined as the value of "force asymmetry". FIGS. 36A to 36D are diagrams representing the same data as FIGS. 35A to 35D with line charts. The respective diagrams correspond to the following [$m_1$, $m_2$]:

FIGS. 35A, 35B, 36A, and 36B: [$m_1$, $m_2$]=[20, 140] [g]
FIGS. 35C, 35D, 36C, and 36D: [$m_1$, $m_2$]=[60, 100] [g]

From these diagrams, it can be seen that use of a non-linearly optimized driving control signal DCS increases the asymmetry of the force given from the contact portion 103 to the skin, compared to when a driving control signal DCS of a temporally asymmetric rectangular wave is used. It is further seen that use of the non-linearly optimized driving control signal DCS gives robust trend against change in [T1, T2]. That is, as can been seen from FIGS. 35C, 35D, 36C, and 36D, a certain level of force asymmetry can be achieved by use of the non-linearly optimized driving control signal DCS even when the mass difference between $m_1$ and $m_2$ is small.

Overview of Tenth to Fifteenth Embodiments

The pseudo force sense generation apparatuses according to the tenth to fifteenth embodiments have a "base mechanism" and multiple "contact mechanisms" which make periodical "asymmetric motion" relative to the "base mechanism" and give force based on the "asymmetric motion" to the skin or mucous membrane with which they are in direct or indirect contact. In other words, these pseudo force sense generation apparatuses have at least a "base mechanism", one "contact mechanism" that performs periodical "asymmetric motion" relative to the "base mechanism" and gives force based on the "asymmetric motion" to the skin or mucous membrane with which the contact mechanism is in direct or indirect contact, and another "contact mechanism (a third contact mechanism)" that performs periodical "asymmetric motion (a third asymmetric motion)" relative to the "base mechanism" and gives force based on the "asymmetric motion (the third asymmetric motion)" to the skin or mucous membrane with which the contact mechanism is in direct or indirect contact. Here, the mass of each "contact mechanism" is smaller than the mass of the "base mechanism", or the mass of each "contact mechanism" is smaller than the sum of the mass of the "base mechanism" and the mass of a "mechanism that is attached to the base mechanism". Also with this configuration, since each one of the multiple "contact mechanisms" as a system that vibrates in direct or indirect contact with skin or mucous membrane has a small mass even when the mass of the entire system is large, force of a sufficient magnitude is transferred from the multiple "contact mechanisms" to the skin or mucous membrane. This enables clearer presentation of force sense even with an actuator having the same stroke and output as the conventional scheme. Alternatively, even with an actuator having smaller stroke and output than the conventional scheme, force sense of a similar level to the conventional scheme can be presented. That is, these embodiments can present force sense more efficiently than conventionally done.

Moreover, since multiple "contact mechanisms" are present and they each give force based on "asymmetric motion" to the skin or mucous membrane, pseudo force sense can be presented from each one of these "contact mechanisms". By combining pseudo force senses presented by the multiple "contact mechanisms", it is also possible to present force sense in a rotational direction or force sense in a desired direction. Preferably, each one of the multiple "contact mechanisms" performs periodical "asymmetric motion" independently from each other relative to the "base mechanism". In other words, the "asymmetric motion" of a certain "contact mechanism" and the "asymmetric motion (the third asymmetric motion)" of another "contact mechanism (the third contact mechanism)" are independent from each other relative to the "base mechanism", for example. That is, the "asymmetric motion" of each one of the "contact mechanisms" does not interfere with each other and gives force based on the "asymmetric motion" to the skin or mucous membrane independently. For example, the multiple "contact mechanisms" are separate from each other and do not limit each other's vibration. The multiple "contact mechanisms" may not be in contact with each other or may be linked via a sliding mechanism or a soft object (an elastic body) so that they do not limit each other's vibration. Such a configuration can suppress mutual weakening of the force which is based on the "asymmetric motion" of each one of the "contact mechanisms", allowing efficient presentation of force sense. In a case "asymmetric motions" of the multiple "contact mechanisms" respectively present pseudo force sense in different directions from each other, it is also possible to present force sense in a rotational direction or force sense in a desired direction by combination of those force senses.

The periodical "asymmetric motion" is such periodic motion that causes pseudo force sense to be perceived with force given from the "contact mechanism" to skin or mucous membrane based on that motion, and is periodic motion in which a time-series waveform of motion in a "predetermined direction" is asymmetric with the time-series waveform of motion in the opposite direction to the "predetermined direction". The "asymmetric motion" may be periodical translational motion for presenting pseudo force sense in a translational direction, or periodical rotary motion for presenting pseudo force sense in a rotational direction. An example of periodical "asymmetric motion" is "asymmetric vibration" (periodical asymmetric vibration) relative to the "base mechanism-side component". Preferably, the "asymmetric motion" is such that a "waveform pattern" of force given by the "contact mechanism" to skin or mucous membrane based on the "asymmetric motion" represents force that is in the predetermined direction and has an absolute value equal to or higher than a "first threshold" in a "first time segment", and represents force that is in the opposite direction to the "predetermined direction" and has an absolute value within a "second threshold" smaller than the "first threshold" in a "second time segment" different from the "first time segment", where the "first time segment" is shorter than the "second time segment". In other words, it is desirably such an "asymmetric motion" that makes the "waveform pattern" a rectangular pattern or a pattern close to a rectangular pattern because this enables clearer presentation of pseudo force sense. When the "periodical asymmetric motion" is "asymmetric vibration" relative to the "base mechanism-side component", the "asymmetric vibrations" of the multiple "contact mechanisms" may be vibrations along axes that are parallel or substantially parallel to each other, or vibrations along axes that are not parallel to each other, that is, axes with different orientations than each other (for example, axes orthogonal to each other or axes substantially orthogonal to each other). While the "asymmetric vibrations" of the multiple "contact mechanisms" may be vibrations along the same axis (vibrations in a direction along the same axis), it is desirable that they are asymmetric vibrations along axes different from each other (asymmetric vibrations in directions along different axes). This is because force sense in a rotational direction or force sense in a desired direction can be presented as mentioned above when the "asymmetric vibrations" of the multiple "contact mechanisms" are vibrations along axes different from each other. Examples of "$\beta$ along $\alpha$" are: $\beta$ running alongside $\alpha$, $\beta$ parallel to $\alpha$, $\beta$ substantially parallel to $\alpha$, and $\beta$ on $\alpha$. Examples of a "direction along an axis" include a "direction parallel to the axis", a "direction substantially parallel to the axis", a "direction on the axis", and a "direction that forms an angle within a predetermined range with the axis".

(1) The "base mechanism" includes the "base mechanism-side component", and (2) each of the "contact mechanisms" includes a "contact mechanism-side component" which performs "asymmetric vibration" relative to the "base mechanism-side component" and a "contact portion" which is given force based on the "asymmetric vibration" and gives force based on the "asymmetric vibration" to the skin or mucous membrane with which the contact portion is in direct or indirect contact. The relative position of the "contact portion" to the "contact mechanism-side component" may be fixed or may not be fixed. For more efficient presentation of force sense, it is desirable that the relative position of the "contact portion" to the "contact mechanism-side component" is fixed; for example, the "contact portion" is fixed to the "contact mechanism-side component" or the "contact portion" and the "contact mechanism-side component" are integral. The mass of each "contact mechanism" as the system that vibrates with the "contact portion" is smaller than the mass of the system supporting the system that vibrates with the "contact portion" (the mass of the "base mechanism" or the sum of the mass of the "base mechanism" and the mass of the "mechanism that is attached to the base mechanism"). The "asymmetric vibration" is vibration for causing perception of pseudo force sense with force given from each "contact mechanism" to skin or mucous membrane, meaning vibration in which the time-series waveform of vibration in a "predetermined direction" is asymmetric with the time-series waveform of vibration in the opposite direction to the "predetermined direction". The "asymmetric vibration" is, for example, vibration of the "contact mechanism-side component" in which the time-series waveform of a "physical quantity" of the "contact mechanism-side component" in the "predetermined direction" is asymmetric with the time-series waveform of the "physical quantity" of the "contact mechanism-side component" in the opposite direction to the "predetermined direction". Examples of the "physical quantity" include force given to the "base mechanism-side component" supporting the "contact mechanism-side component", the acceleration, velocity, or position of the "base mechanism-side component", force given by the "contact mechanism-side component" to the "base mechanism-side component", the acceleration, velocity, or position of the "contact mechanism-side component", force given to skin or mucous membrane from the "contact mechanism-side component", or the acceleration, velocity, or position of the "contact mechanism-side component".

The “base mechanism” may be configured in a shape that can be attached to a “body portion” which is a separate object (a shape to be supported), or may not be configured in a shape that can be attached to a separate object (a shape to be supported). With the attachment of the former “base mechanism” to the “body portion”, the “base mechanism” is supported by the “body portion”. That “α is supported by β” means that α is supported by β directly or indirectly. In other words, “α is supported by β” means part or all of the motion of α is limited by β; for example, the degree of freedom of the motion of a is partially or entirely limited by β. Not only in a case where α is fixed to β but even in a case where α is able to move or rotate relative to β, “α is supported by β” is applicable if some movement of α is limited by β. That “α is being supported by β” and “have α supported by β” mean a state in which “α is supported by β”.

The “skin or mucous membrane with which the “contact mechanism” is in direct or indirect contact” means either skin or mucous membrane that is in contact with the “contact mechanism” with no intervening object therebetween, or skin or mucous membrane that is in contact with the “contact mechanism” via an intervening object. That “α makes contact with γ via β” means entering a state in which force can be given to γ from α via β. That “α makes contact with γ via β” means, for example, entering a state in which α is in direct contact with β, β is in direct contact with γ, and force can be given to γ from α via β. The intervening object may be a rigid body, an elastic body, a plastic body, fluid, or any object having at least some of their characteristics in combination; however, it has to be able to transfer force from the “contact mechanism” to the skin or mucous membrane.

The “contact mechanism” is a mechanism for supporting the weight of the “pseudo force sense generation apparatus” (force associated with gravity, that is, weight). In other words, the reaction force of the weight of the “pseudo force sense generation apparatus” as gripped by or attached to the user is only given to the “contact mechanism”. That is, the “contact mechanism” can be said to be a mechanism for supporting the reaction force of the weight of the “pseudo force sense generation apparatus”. The “pseudo force sense generation apparatus” is gripped by or attached to the user directly or indirectly via the “contact mechanism”. It is desirable that only the “contact mechanism” (for example, only the “contact portion”) functions as the part that makes direct or indirect contact with skin or mucous membrane. That is, it is desirable that the pseudo force sense generation apparatus according to the embodiments makes direct or indirect contact with the user’s skin or mucous membrane through parts of the “contact mechanism”, but parts other than the “contact mechanism”, such as the “base mechanism” or a mechanism that is attached to the “base mechanism”, do not make direct or indirect contact with the user’s skin or mucous membrane. In other words, it is desirable that no external force such as reaction force is given to parts other than the “contact mechanism”, because this allows force for causing perception of pseudo force sense to be efficiently transmitted to the user’s skin or mucous membrane. For example, it is desirable that the “contact portion” is configured in a shape to be positioned outside the “body portion” supporting the “base mechanism-side component” thereon. For example, it is desirable that the “contact portion” is configured in a shape that covers at least part of an external area of the “body portion” supporting the “base mechanism-side component” thereon. For example, the “contact portion” may be configured in a shape that covers not less than 50% of the external area of the “body portion”, or the “contact portion” may be configured in a shape that covers all of the external area of the “body portion”. The “contact portion” may be a “grip portion” of the pseudo force sense generation apparatus or an “attachment portion” for attachment to the user. The “body portion” may be a mechanism (a separate object) that is attached to the “base mechanism” as mentioned above, or a mechanism included in the “base mechanism”. An example of the “body portion” is a mobile terminal device, such as a smartphone terminal device, tablet terminal device, electronic book reader device, mobile phone terminal device, notebook personal computer, and portable game console. A keyboard, a mouse, a controller, or other electronic unit may be the “body portion” or a component other than an electronic unit may be the “body portion”. The “body portion” may also include a mobile terminal device such as a mobile phone terminal device and other components. The pseudo force sense generation apparatus may be incorporated as a part of the “body portion” in advance. The “body portion” may include a “mobile terminal device”, and the “contact portion” may be a case that covers at least part of an external area of the “mobile terminal device” (for example, an area including at least one of the outer surfaces).

As mentioned above, a clear force sense can be presented when the mass of the “contact mechanism” as the system that vibrates with the “contact portion” is smaller than the mass of the system supporting the system that vibrates with the “contact portion” (the mass of the “base mechanism”, or the sum of the mass of the base mechanism” and the mass of a “mechanism that is attached to the base mechanism”). However, it is more preferable that the mass of the system that vibrates with the “contact portion” is greater than zero and not more than one third of the mass of the system supporting the system that vibrates with the “contact portion”. In other words, the ratio of the mass of the “system that vibrates with the contact portion” to the mass of the “system supporting the system that vibrates with the contact portion” is greater than zero and not more than one third. That is, it is desirable that the mass of each “contact mechanism” is greater than zero and not more than one third of the mass of the “base mechanism”, or that the mass of each “contact mechanism” is greater than zero and not more than one third of the sum of the mass of the “base mechanism” and the mass of the mechanism that is attached to the “base mechanism”. This enables pseudo force sense to be perceived more efficiently.

The “contact portion” is attached to the “contact mechanism-side component” or integral with the “contact mechanism-side component”, and is capable of vibrating relative to the “base mechanism-side component”, for example. For example, the “contact mechanism-side component” performs “asymmetric vibration” while being supported by the “base mechanism-side component”, which in turn causes the “contact portion” connected or integral with the “contact mechanism-side component” to also vibrate relative to the “base mechanism-side component”. Note that “α being attached to β” means one of: α being fixed to β, α being connected with β, α being removably held on β, and α being held on β with some “play (clearance)” or “backlash”. Also, “α being attached to β” is a concept that encompasses not only α being directly attached to β but α being indirectly attached to β via an intervening object.

As mentioned above, the mass of each “contact mechanism” (the mass of the system that vibrates with the “contact portion”) is smaller than the mass of the “base mechanism” or the sum of the mass of the “base mechanism” and the mass of the mechanism that is attached to the “base mechanism" (the mass of the system supporting the system that vibrates with the "contact portion"). In this case, an average amplitude of vibration of each "contact mechanism" is greater than the average amplitude of vibration of the "base mechanism" or the average amplitude of vibration of the "base mechanism" and the mechanism that is attached to the "base mechanism". The "average amplitude of vibration of each contact mechanism" means a time average (absolute value) of the average amplitudes (absolute values) of the components constituting that "contact mechanism". Likewise, the "average amplitude of vibration of the base mechanism or the average amplitude of vibration of the base mechanism and the mechanism that is attached to the base mechanism" means a time average (absolute value) of the average amplitudes (absolute values) of the components constituting the "base mechanism", or the "base mechanism" and the "mechanism that is attached to the base mechanism". In other words, the magnitude of vibration of "each contact mechanism" is larger than the magnitude of vibration of "the base mechanism, or the base mechanism and the mechanism that is attached to the base mechanism". For example, "the base mechanism, or the base mechanism and the mechanism that is attached to the base mechanism" does not vibrate with "each contact mechanism" or vibrates with an average amplitude smaller than that of "each contact mechanism".

The "mechanism that is attached to the base mechanism" may be entirely included in the "pseudo force sense generation apparatus", or only a part of the "mechanism that is attached to the base mechanism" may be included in the "pseudo force sense generation apparatus", or the "mechanism that is attached to the base mechanism" may not be included in the "pseudo force sense generation apparatus".

Tenth Embodiment

In the following, embodiments will be described with reference to the drawings.

<Configuration>

As illustrated in FIGS. 37A to 41B, a pseudo force sense generation apparatus 2001 according to a tenth embodiment has a body portion 20101, a vibrator 20102-1 including a supporting portion 201026-1 and a movable portion 201025-1 that performs asymmetric vibration relative to the supporting portion 201026-1, a vibrator 20102-2 including a supporting portion 201026-2 and a movable portion 201025-2 that performs asymmetric vibration relative to the supporting portion 201026-2, and contact portions 20103-1, 2. In this embodiment, a supporting portion **201026-*i* (where i=1, 2) corresponds to the "base mechanism-side component" and a movable portion 201025-*i* (where i=1, 2) corresponds to the "contact mechanism-side component". A contact portion 20103-*i* (where i=1, 2) is a component for supporting the weight of the pseudo force sense generation apparatus 2001. The movable portion 201025-*i* (where i=1, 2) in this embodiment performs asymmetric vibration along D20-i axis (the ith axis) while being supported by the supporting portion 201026-*i*, based on a driving control signal DCS from a driving control device 20100. These asymmetric vibrations are vibrations for causing perception of pseudo force sense in a desired direction. Details of such asymmetric vibration are disclosed in Non-patent Literature 1, Reference Literature 1, and Reference Literature 2, for instance. The asymmetric vibration of each movable portion 201025-*i* also causes each contact portion 20103-*i* to asymmetrically vibrate. That is, the asymmetric vibration of the movable portion 201025-1 causes the contact portion 20103-1 to asymmetrically vibrate, and the asymmetric vibration of the movable portion 201025-2 causes the contact portion 20103-2 to asymmetrically vibrate. Each contact portion 20103-*i* thereby gives force based on the asymmetric motion to the skin or mucous membrane with which the contact portion 20103-*i* is in direct or indirect contact. That is, the contact portion 20103-1 gives force based on the asymmetric vibration of the movable portion 201025-1 to the skin or mucous membrane, and the contact portion 20103-2 gives force based on the asymmetric vibration of the movable portion 201025-2 to the skin or mucous membrane. The contact portions 20103-1, 2 are not in contact with each other and their motions are independent from each other, for example. Here, the mass $m_1$-i of the system that vibrates with each contact portion 20103-*i* is smaller than the mass $m_2$ of the system supporting the system that vibrates with that contact portion 20103-*i* (the mass of each contact mechanism is smaller than the mass $m_2$ of the base mechanism). With such a configuration, even when the mass of the entire system, $(m_1\text{-}1)+(m_1\text{-}2)+m_2$, is large, force of a sufficient magnitude is transferred from the contact portion 20103-*i* to the skin or mucous membrane if the mass of the system that vibrates with the contact portion 20103-*i* is sufficiently small. As a result, larger deformation than with the conventional scheme can be given to the skin or mucous membrane via a vibrator 20102-*i* having the same stroke and output as a conventional one. In addition, the relative displacement between the movable portion 201025-*i* and the supporting portion 201026-*i* can be made small, so a vibrator 20102-*i* with smaller stroke may be used. Asymmetric vibration of the vibrator 20102-*i* using such a mechanism enables pseudo force sense, such as sensation of being pulled, to be efficiently perceived. In addition, since the contact portions 20103-1, 2 can be vibrated independently from each other, the contact portions 20103-1, 2 do not hinder each other's vibration. Furthermore, by vibrating the contact portions 20103-1, 2** independently from each other, varieties of force sense can be presented.

<Body Portion 20101>

As illustrated in FIGS. 37A to 40, the body portion 20101 in this embodiment is a plate-like component having a recess **20101*d-i*, in which the vibrator 20102-*i* is positioned, on the side of a bottom surface 20101*b*. The body portion 20101 may be any kind of object as mentioned above; for example, a part including a mobile terminal device such as smartphone terminal device may be the body portion 20101**.

<Vibrator **20102-*i***>

On a bottom surface **20101*ba-i* of the recess 20101*d-i*, the supporting portion 201026-*i* of the vibrator 20102-*i* is attached. The vibrator 20102-*i* is thereby supported by the body portion 20101, and a part of the vibrator 20102-*i* is positioned inside the recess 20101*d-i*. The movable portion 201025-*i* of the vibrator 20102-*i* can make asymmetric vibration relative to the supporting portion 201026-*i* along D20-i axis while being supported by the supporting portion 201026-*i*. D20-1 axis and D20-2 axis in this embodiment are axes different from each other and parallel to or substantially parallel to each other. Specific configurations of the vibrator 20102-*i*** are shown below as examples.

Figure 41A:
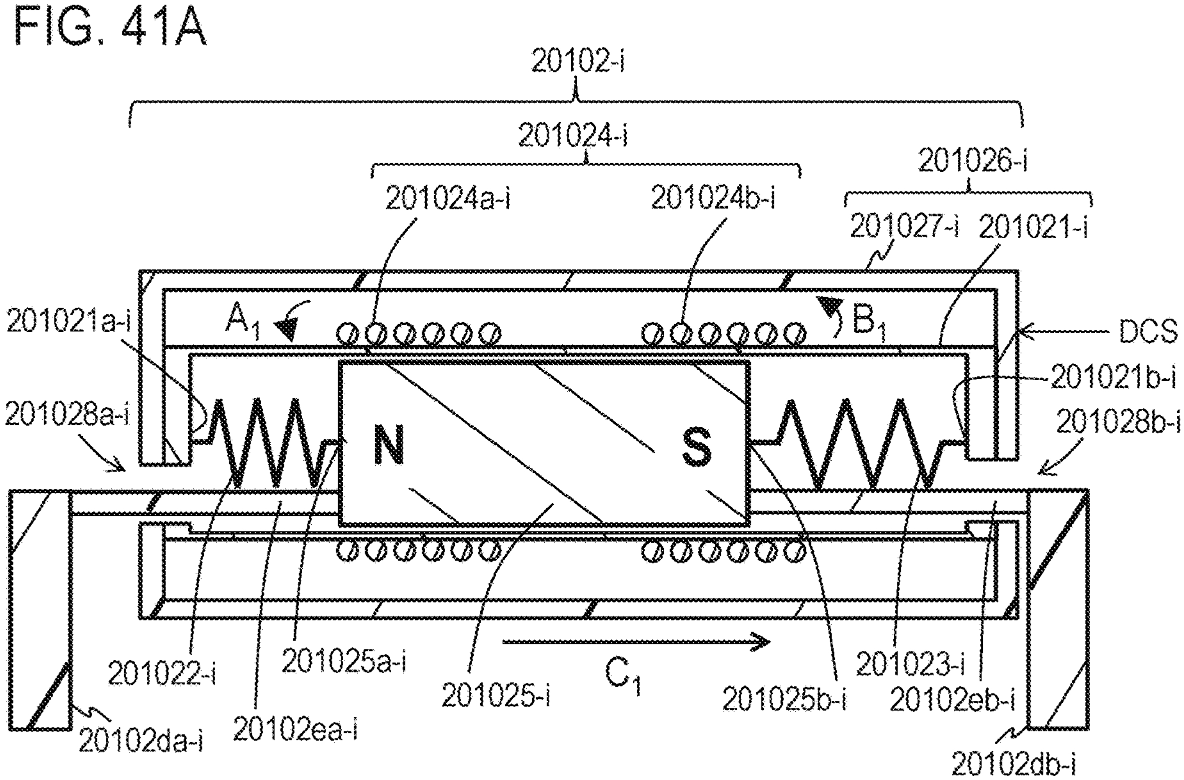
FIGS. 41A and 41B are conceptual diagrams illustrating a configuration of a vibrator according to the embodiment, showing a schematic cross section of the vibrator according to the embodiment at 38A-38A.
Figure 41B:
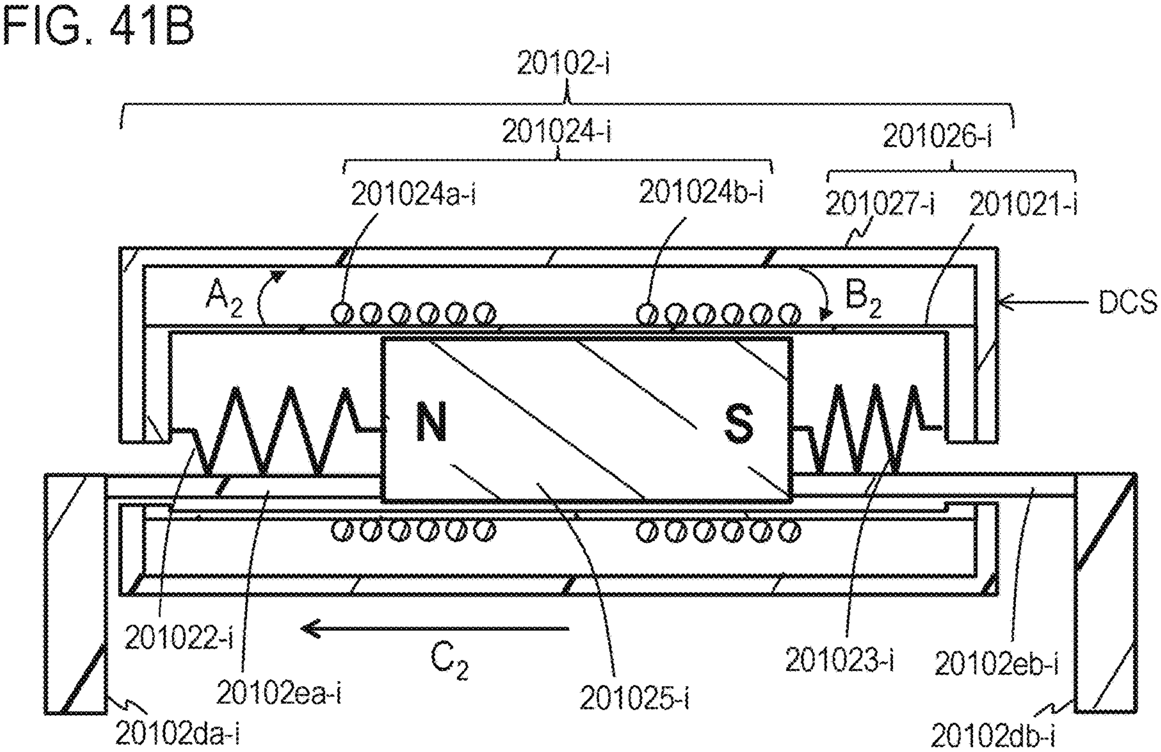

As illustrated in FIGS. 41A and 41B, the vibrator **20102-*i* is a linear actuator having the supporting portion 201026-*i* including a case 201027-*i* and a guide 201021-*i*, springs 201022-*i*, 201023-*i* (elastic bodies), a coil 201024-*i*, a movable portion 201025-*i* formed from a permanent magnet, and linking portions 20102*da-i*, 20102*db-i*, 20102*ea-i*, 20102*eb-i*, for example. Both the case 201027-*i* and the guide 201021-*i* in this embodiment are hollow components with a part of the opposite open ends of a tube (for example, a cylinder or a polyhedral cylinder) being closed. Here, the guide 201021**-*i* is smaller than the case 201027-*i* and is sized so that it can be accommodated inside the case 201027-*i*. The case 201027-*i*, the guide 201021-*i*, and the linking portions 20102*da*-*i*, 20102*db*-*i*, 20102*ea*-*i*, 20102*eb*-*i* are made of synthetic resin, such as ABS resin, for example. The springs 201022-*i*, 201023-*i* are helical or leaf springs made of metal, for example. While the moduli of elasticity (spring constants) of the springs 201022-*i*, 201023-*i* are desirably the same, they may be different from each other. The movable portion 201025-*i* is a column-shaped permanent magnet, for example, the side of one end 201025*a*-*i* in the longitudinal direction being the N-pole and the side of another end 201025*b*-*i* being the S-pole. The coil 201024-*i* is a string of enameled wire, for example, having a first wound portion 201024*a*-*i* and a second wound portion 201024*b*-*i*.

The movable portion 201025-*i* is accommodated inside the guide 201021-*i* and supported therein so as to be slidable in the longitudinal direction. Although details of such a supporting mechanism are not shown in the drawings, a straight rail along the longitudinal direction is provided on an inner wall surface of the guide 201021-*i*, and a rail supporting portion that slidably supports the rail is provided on a side surface of the movable portion 201025-*i*, for example. On an inner wall surface 201021*a*-*i* of the guide 201021-*i* on one longitudinal side thereof, one end of the spring 201022-*i* is fixed (that is, an end of the spring 201022-*i* being supported by the guide 201021-*i*), while the other end of the spring 201022-*i* is fixed to an end 201025*a*-*i* of the movable portion 201025-*i* (that is, the end 201025*a*-*i* of the movable portion 201025-*i* being supported at the other end of the spring 201022-*i*). On an inner wall surface 201021*b*-*i* of the guide 201021-*i* on the other longitudinal side thereof, one end of the spring 201023-*i* is fixed (that is, an end of the spring 201023-*i* being supported by the guide 201021-*i*), while the other end of the spring 201023-*i* is fixed to an end 201025*b*-*i* of the movable portion 201025-*i* (that is, the end 201025*b*-*i* of the movable portion 201025-*i* being supported at the other end of the spring 201023-*i*).

On the peripheral side of the guide 201021-*i*, the coil 201024-*i* is wound. Here, the first wound portion 201024*a*-*i* is wound in $A_1$ direction (the direction from the farther side to the closer side) on the side of the end 201025*a*-*i* (the N-pole side) of the movable portion 201025-*i*, whereas the second wound portion 201024*b*-*i* is wound in $B_1$ direction opposite to $A_1$ direction (the direction from the closer side to the farther side) on the side of the end 201025*b*-*i* (the S-pole side). That is, when viewed from the side of the end 201025*a*-*i* of the movable portion 201025-*i* (the N-pole side), the first wound portion 201024*a*-*i* is wound clockwise and the second wound portion 201024*b*-*i* is wound counterclockwise. It is also desirable that when the movable portion 201025-*i* is at rest and elastic forces from the springs 201022-*i*, 201023-*i* are balanced, the end 201025*a*-*i* side (the N-pole side) of the movable portion 201025-*i* is positioned in the area of the first wound portion 201024*a*-*i* and the end 201025*b*-*i* side (the S-pole side) is positioned in the area of the second wound portion 201024*b*-*i*.

The guide 201021-*i*, the springs 201022-*i*, 201023-*i*, the coil 201024-*i*, and the movable portion 201025-*i* thus arranged are accommodated in the case 201027-*i*, and the guide 201021-*i* is fixed inside the case 201027-*i*. That is, the relative position of the case 201027-*i* to the guide 201021-*i* is fixed. Here, the longitudinal direction of the case 201027-*i* coincides with the longitudinal direction of the guide 201021-*i* and the longitudinal direction of the movable portion 201025-*i*.

A through hole 201028*a*-*i* is provided in the case 201027-*i* and on the inner wall surface 201021*a*-*i* side of the guide 201021-*i*, and a through hole 201028*b*-*i* is provided on the inner wall surface 201021*b*-*i* side. A rod-like linking portion 20102*ea*-*i* is inserted in the through hole 201028*a*-*i*, and a rod-like linking portion 20102*eb*-*i* is inserted in the through hole 201028*b*-*i*. One end side of the linking portion 20102*ea*-*i* is in contact with the end 201025*a*-*i* side of the movable portion 201025-*i*, while the other end side of the linking portion 20102*ea*-*i* is supported at one end side of the linking portion 20102*da*-*i*, positioned outside the case 201027-*i*, so as to be rotatable (rotatable about the axis of the linking portion 20102*ea*-*i*). One end side of the linking portion 20102*eb*-*i* is in contact with the end 201025*b*-*i* side of the movable portion 201025-*i*, while the other end side of the linking portion 20102*eb*-*i* is supported at one end side of the linking portion 20102*db*-*i*, positioned outside the case 201027-*i*, so as to be rotatable (rotatable about the axis of the linking portion 20102*eb*-*i*). The one end side of the linking portion 20102*ea*-*i* may or may not be connected with the end 201025*a*-*i* side of the movable portion 201025-*i*. The one end side of the linking portion 20102*eb*-*i* may or may not be connected with the end 201025*b*-*i* side of the movable portion 201025-*i*. For example, the ends 201025*a*-*i*, 201025*b*-*i* of the movable portion 201025-*i* may be held between one end side of the linking portion 20102*ea*-*i* and one end side of the linking portion 20102*db*-*i*. However, the linking portions 20102*da*-*i*, 20102*db*-*i*, 20102*ea*-*i*, 20102*eb*-*i* need to move along with the motion of the movable portion 201025-*i*. That is, the linking portions 20102*da*-*i*, 20102*db*-*i*, 20102*ea*-*i*, 20102*eb*-*i* have to move with the movable portion 201025-*i*. As other alternatives, the one end side of the linking portion 20102*ea*-*i* may be integral with the end 201025*a*-*i* side of the movable portion 201025-*i*, or the one end side of the linking portion 20102*eb*-*i* may be integral with the end 201025*b*-*i* side of the movable portion 201025-*i*.

The coil 201024-*i* gives force corresponding to a current fed to it to the movable portion 201025-*i*, which causes the movable portion 201025-*i* to make periodical asymmetric vibration relative to the guide 201021-*i* (periodical translational reciprocating motion with asymmetry in the axis direction referenced to the guide 201021-*i*). More specifically, when a current is fed to the coil 201024-*i* in $A_1$ direction ($B_1$ direction), force in $C_1$ direction (the direction from the N-pole to the S-pole of the movable portion 201025-*i*; rightward) is applied to the movable portion 201025-*i* (FIG. 41A) due to the reaction of Lorentz force explained by the Fleming's left-hand rule. Conversely, when a current is fed to the coil 201024-*i* in $A_2$ direction ($B_2$ direction), force in $C_2$ direction (the direction from the S-pole to the N-pole of the movable portion 201025-*i*; leftward) is applied to the movable portion 201025-*i* (FIG. 41B). Here, $A_2$ direction is the opposite direction of $A_1$ direction. These actions give motion energy to the system composed of the movable portion 201025-*i* and the springs 201022-*i*, 201023-*i*. This can change the position and acceleration of the movable portion 201025-*i* with respect to the case 201027-*i* (the position and acceleration in the axis direction referenced to the guide 201021-*i*), and accordingly change the positions and accelerations of the linking portions 20102*da*-*i*, 20102*db*-*i*, 20102*ea*-*i*, 20102*eb*-*i* as well. That is, the movable portion 201025-*i* performs asymmetric vibration relative to the supporting portion 201026-*i* along D20-i axis based on the driving control signal DCS supplied while being supported by the supporting portion 201026-*i*, along with which the linking portions 20102*da*-*i*, 20102*db*-*i*, 20102*ea*-*i*, 20102*eb*-*i* also make asymmetric vibration along D20-i axis.

Note that the configuration of the vibrator 20102-*i* is not limited to the one shown in FIGS. 41A and 41B. For example, it may be configured such that the first wound portion 201024*a*-*i* of the coil 201024-*i* is wound on the end 201025*a*-*i* side of the movable portion 201025-*i* in $A_1$ direction and the coil 201024-*i* is not wound on the end 201025*b*-*i* side. Conversely, it may be configured such that the second wound portion 201024*b*-*i* of the coil 201024-*i* is wound on the end 201025*b*-*i* side in $B_1$ direction and the coil 201024-*i* is not wound on the end 201025*a*-*i* side of the movable portion 201025-*i*. Alternatively, the first wound portion 201024*a*-*i* and the second wound portion 201024*b*-*i* may be separate coils from each other. That is, the first wound portion 201024*a*-*i* and the second wound portion 201024*b*-*i* may be configured such that they are not be electrically interconnected and that they are supplied with different electric signals than each other.

<Contact Portion 20103-*i*>

Figure 37A:
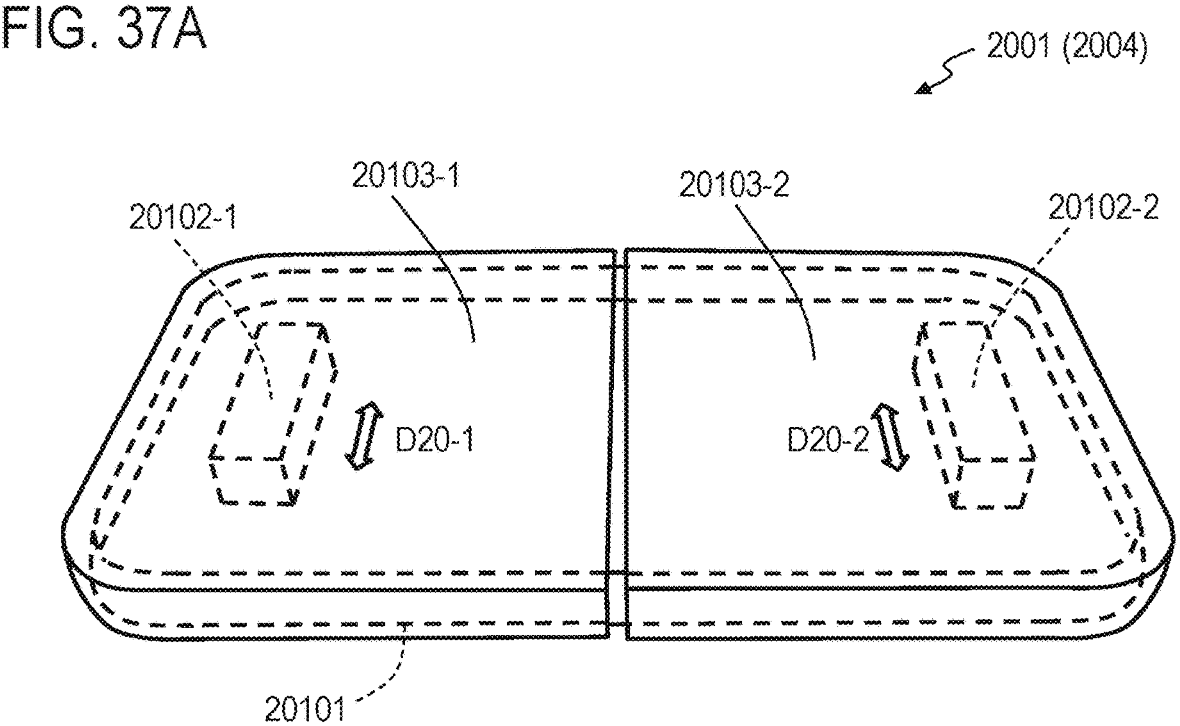
FIG. 37A is a perspective view of a pseudo force sense generation apparatus according to an embodiment.
Figure 37B:
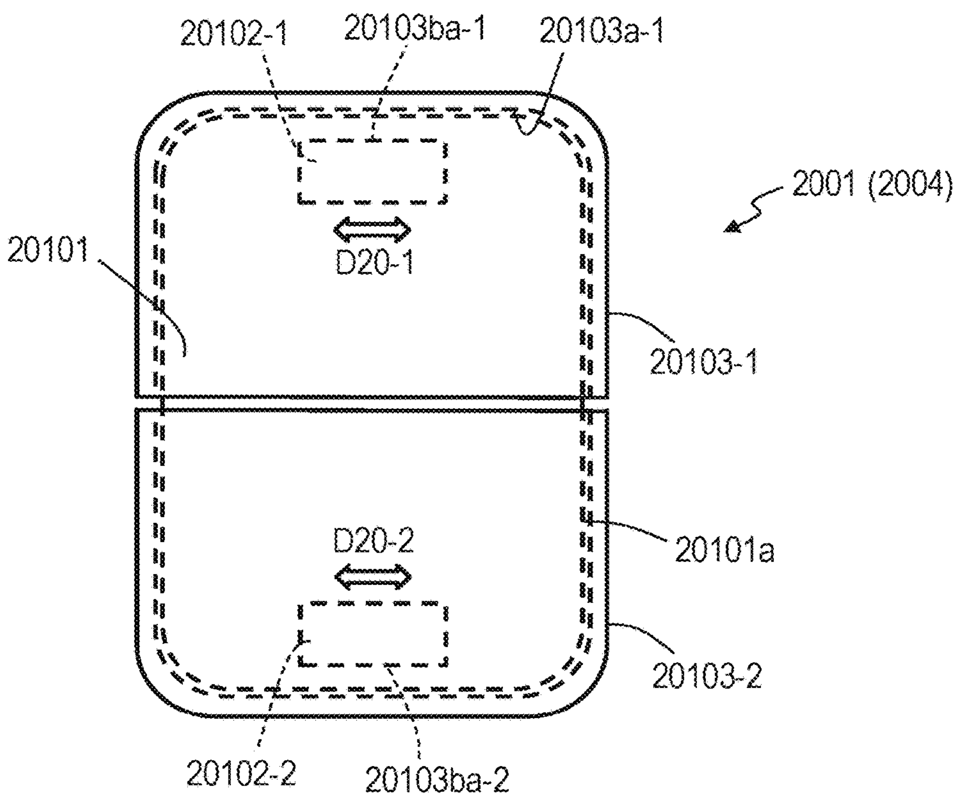
FIG. 37B is a bottom view of the pseudo force sense generation apparatus according to the embodiment.

Each contact portion 20103-*i* is attached to the movable portion 201025-*i* of each vibrator 20102-*i* so that the contact portion 20103-*i* is supported by the vibrator 20102-*i*. That is, each contact portion 20103-*i* is attached to each movable portion 201025-*i* and is also capable of vibrating relative to each supporting portion 201026-*i*. The contact portion 20103-1 and contact portion 20103-2 are separate from each other and not in contact with each other. As illustrated in FIGS. 37A, 37B, and 38B, the contact portion 20103-*i* in this embodiment is a case-shaped component that covers the body portion 20101 supporting the vibrator 20102-*i* thereon as mentioned above. The contact portion 20103-1 is configured in a shape that covers a part of the external area of the body portion 20101 supporting the supporting portion 201026-1 thereon, and the contact portion 20103-2 is configured in a shape that covers another part of the external area of the body portion 20101 supporting the supporting portion 201026-2 thereon. For example, the contact portions 20103-1, 2 are cases that cover at least part of the external area (for example, some faces) of the body portion 20101, being a mobile terminal device, supporting the supporting portions 201026-1, 2 thereon. It is desirable that the contact portion 20103-*i* is made of a material having hardness capable of transmitting vibration based on the asymmetric vibration of the movable portion 201025-*i*, has strength enough for acting as a grip portion, and is as lightweight as possible. Such a material may be a synthetic resin such as ABS resin, for example.

Figure 38A:
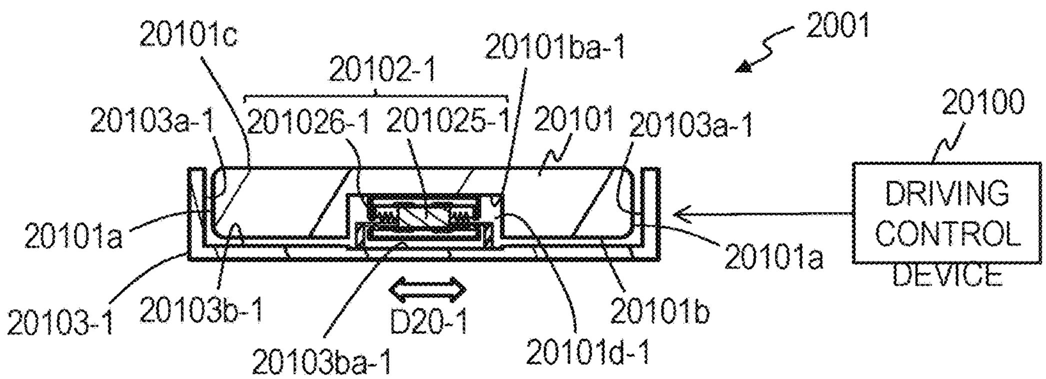
FIG. 38A is a cross-sectional view at 38A-38A in FIG. 38B.
Figure 38B:
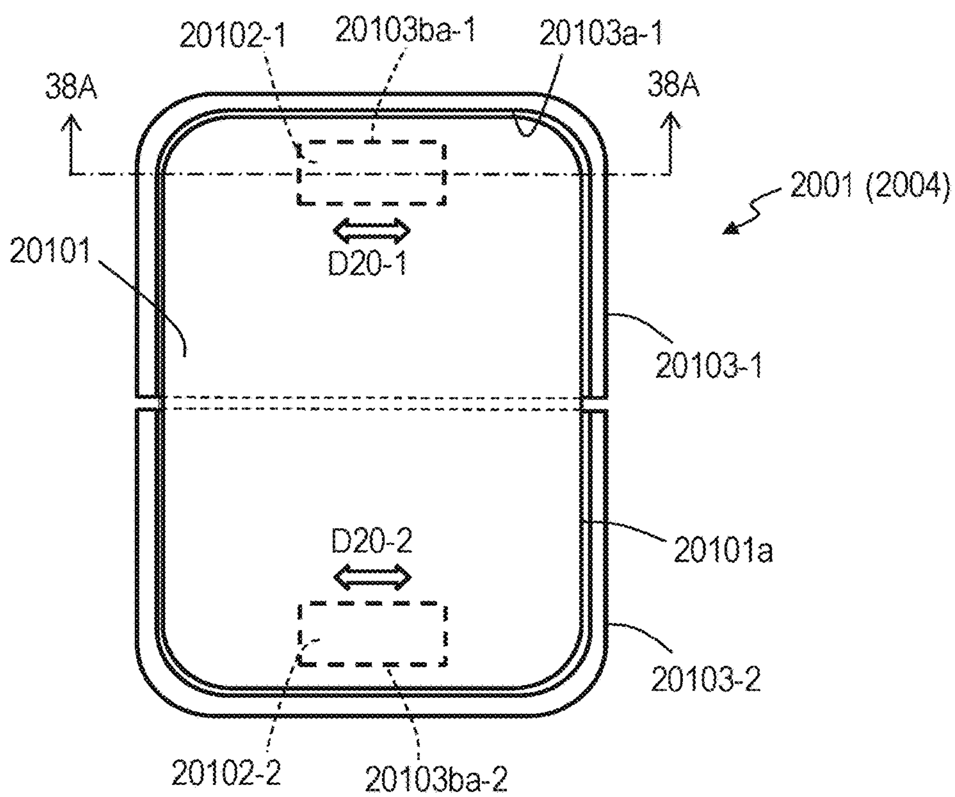
FIG. 38B is a plan view of the pseudo force sense generation apparatus according to the embodiment.
Figure 39:
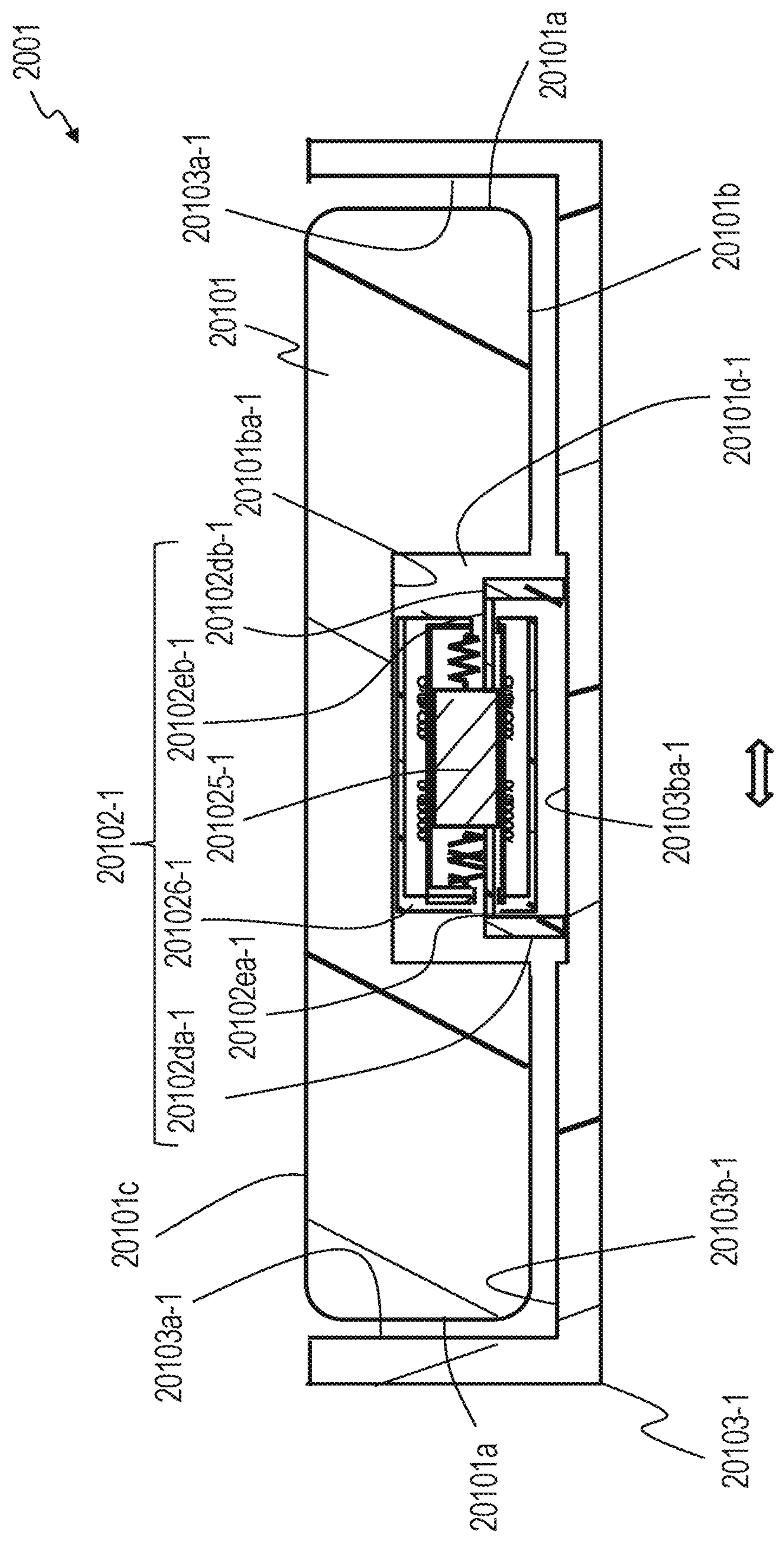
FIG. 39 is an enlarged view of FIG. 38A.

The inner bottom surface 20103*b*-*i* of the contact portion 20103-*i* has a recess 20103*ba*-*i* for attaching the movable portion 201025-*i* of the vibrator 20102-*i* (FIGS. 38A and 39). The body portion 20101 supporting the vibrator 20102-*i* thereon is accommodated within the contact portion 20103-*i*, and the movable portion 201025-*i* of the vibrator 20102-*i* is attached to the bottom surface side of the recess 20103*ba*-*i* via the linking portions 20102*da*-*i*, 20102*db*-*i*, 20102*ea*-*i*, 20102*eb*-*i* described above. That is, the other end side of the linking portions 20102*da*-*i*, 20102*db*-*i* (the other end side of the portions supporting the linking portions 20102*ea*-*i*, 20102*eb*-*i*) is attached to the bottom surface side of the recess 20103*ba*-*i*, thereby attaching the movable portion 201025-*i* to the contact portion 20103-*i*. The bottom surface 20101*b* of the body portion 20101 is positioned opposite the inner bottom surface 20103*b*-*i* of the contact portion 20103-*i*, and the side surface 20101*a* of the body portion 20101 is positioned opposite the inner wall surface 20103*a*-*i* of the contact portion 20103-*i*. Note that there is a gap between the bottom surface 20101*b* and the inner bottom surface 20103*b*-*i*; they are not in contact with each other. Likewise, there is a gap between the side surface 20101*a* and the inner wall surface 20103*a*-*i*; they are not fixed to each other either. Thus, the contact portion 20103-*i* is capable of vibrating relative to the body portion 20101 and the supporting portion 201026-*i* (asymmetric vibration along D20-i axis). Since the contact portions 20103-1, 2 are not in contact with each other as mentioned above, the vibrations of the contact portions 20103-1, 2 do not hinder each other. Also, the contact portions 20103-1, 2 make asymmetric vibration along D20-1, 2 axes, respectively.

<Mass of System>

The average amplitude of vibration of each "contact mechanism" as a system that vibrates with the contact portion 20103-*i* in this embodiment is greater than the average amplitude of vibration of the "base mechanism" as the system supporting the system that vibrates with the contact portion 20103-*i*. Note that the "system that vibrates with the contact portion 20103-*i*" and the "system supporting the system that vibrates with the contact portion 20103-*i*" are systems included in the pseudo force sense generation apparatus 2001. In the case of the above-described configuration, each "contact mechanism" as the system that vibrates with the contact portion 20103-*i* includes the contact portion 20103-*i* and the movable portion 201025-*i*. Each "contact mechanism" may further include the linking portions 20102*da*-*i*, 20102*db*-*i*, 20102*ea*-*i*, 20102*eb*-*i*. The "base mechanism" as the system supporting the system that vibrates with the contact portion 20103-*i* includes the supporting portion 201026-*i*. The "base mechanism" may further include at least some of the body portion 20101, the springs 201022-*i*, 201023-*i*, and the coil 201024-*i*.

The mass $m_1$-i of the "contact mechanism" as the system that vibrates with the contact portion 20103-*i* is smaller than the mass $m_2$ of the "base mechanism" as the system supporting the system that vibrates with the contact portion 20103-*i*. This can present pseudo force sense efficiently (clearly and/or with vibrator 20102-*i* having smaller stroke). Preferably, the mass $m_1$-i of the "contact mechanism" is greater than zero and not more than one third of the mass $m_2$ of the "base mechanism". In other words, $0<(m_1\text{-i})/m_2\leq 1/3$ holds. This is because it enables more efficient presentation of pseudo force sense.

<Driving Control Device 20100>

The driving control device 20100 is, for example, a device configured through execution of a predetermined program by a general-purpose or dedicated computer including a processor (hardware processor) such as a CPU (central processing unit), and memories such as RAM (random-access memory) and ROM (read-only memory), among others. The computer may have a single processor and memory or may have more than one processor and memory. The program may be installed in the computer or be recorded in ROM or the like in advance. Some or all of the processing modules may be configured using an electronic circuit (circuitry) that implements processing functions without using a program, instead of an electronic circuit that implements functionality by reading of a program, such as a CPU. In addition, electronic circuit constituting a single device may include multiple CPUs.

<Operation>

Figure 40:
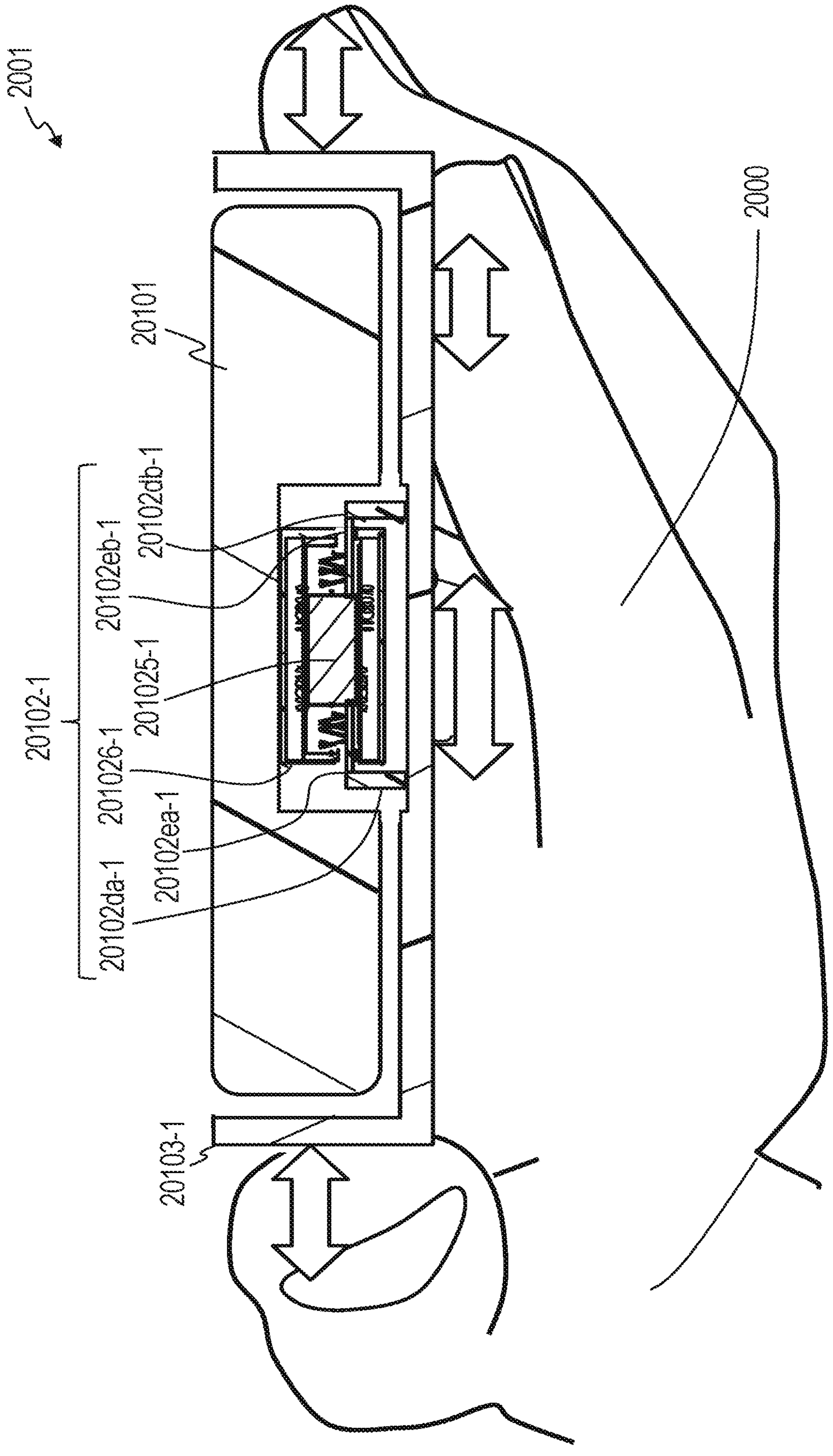
FIG. 40 is a conceptual diagram for describing how the pseudo force sense generation apparatus is used.

During use of the pseudo force sense generation apparatus 2001, only the exterior of the contact portion 20103-*i* of the pseudo force sense generation apparatus 2001 is gripped in a palm 2000 (FIG. 40). The other parts, such as the body portion 20101, are not gripped. This makes only the contact portion 20103-*i* function as the part that makes direct contact with skin. Instead of being directly gripped in the palm 2000, the contact portion 20103-*i* may also be gripped via an object, such as a glove. That is, the contact portion 20103-*i* may be indirectly gripped in the palm 2000. Alternatively, the contact portion 20103-*i* may be brought into contact with skin or mucous membrane of a human body other than a hand. Also in this case, however, the other parts, such as the body portion 20101, do not make contact with the human body. That is, only the contact portion 20103-*i* is allowed to function as the part that makes direct or indirect contact with the skin or mucous membrane. In other words, the weight of the pseudo force sense generation apparatus 2001 during use is supported by the contact portion 20103-*i*.

Figure 42A:
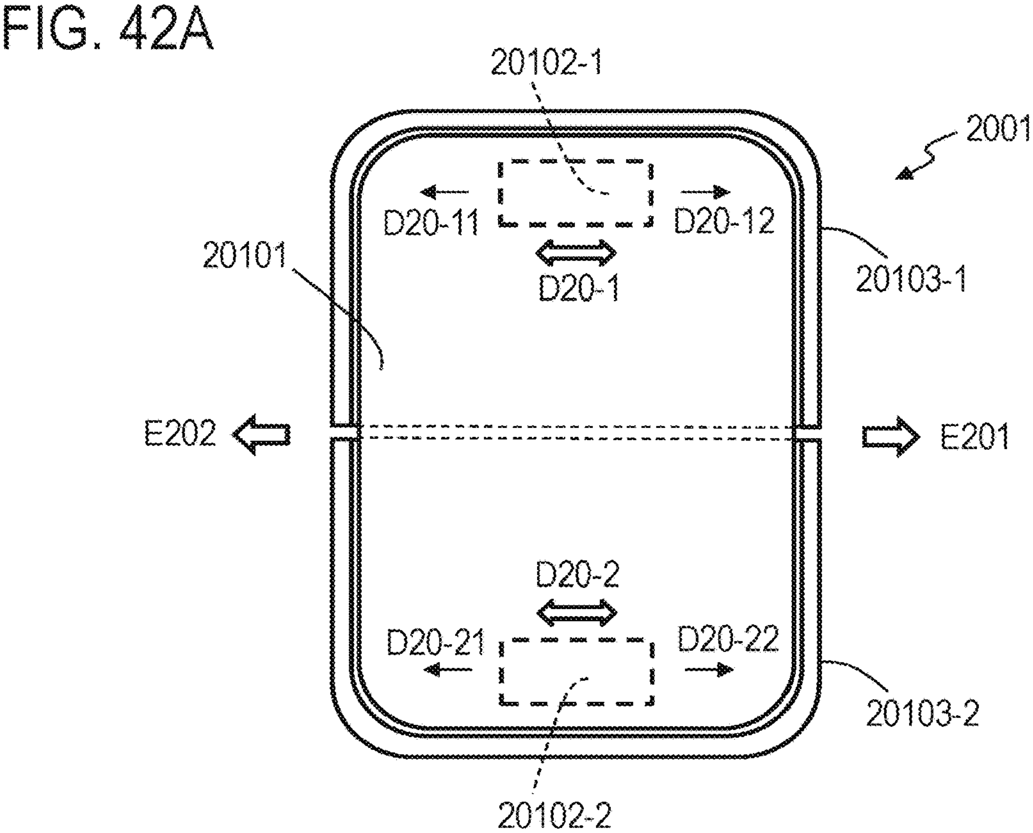
FIGS. 42A and 42B are diagrams for describing the operation of the pseudo force sense generation apparatus according to the embodiment.
Figure 42B:
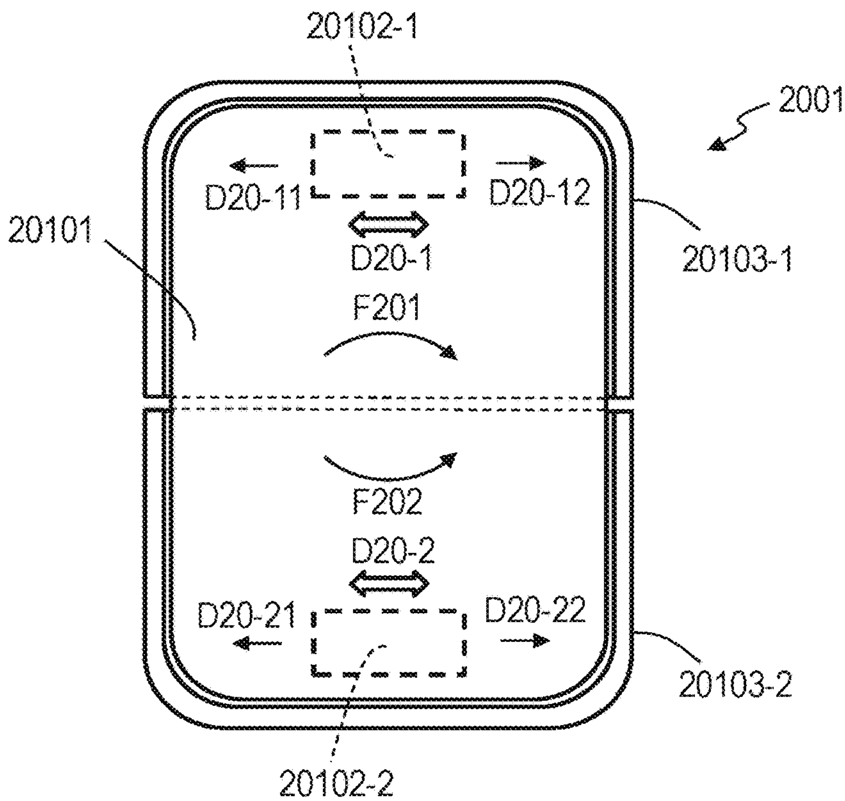

The driving control device 20100 supplies the vibrator 20102-*i* with the driving control signal DCS for driving the vibrator 20102-*i*. The driving control signal DCS may be a voltage-controlled signal or a current-controlled signal. Through the driving control signal DCS, a period T1 in which the coil 201024-*i* is fed with a current in a direction that gives the movable portion 201025-*i* acceleration in a desired direction ($C_1$ direction or $C_2$ direction in FIGS. 41A and 41B), and other period T2 are periodically repeated. In doing so, the ratio between the period (time) during which a current is fed in the predetermined direction and the other period (time) (the inversion ratio) is biased to either one of the two periods. In other words, the coil 201024-*i* is fed with a periodical current in which the proportion of the period T1 within one cycle is different from the proportion of the period T2 in that cycle. This causes at least some movable portion(s) 201025-*i* to asymmetrically vibrate relative to the supporting portion 201026-*i* along D20-i axis. The asymmetric vibration of the movable portion 201025-*i* is transmitted to the contact portion 20103-*i* via the linking portions 20102*da-i*, 20102*db-i*, 20102*ea-i*, 20102*eb-i*. In other words, force based on the asymmetric vibration of the movable portion 201025-*i* is given to the contact portion 20103-*i* via the linking portions 20102*da-i*, 20102*db-i*, 20102*ea-i*, 20102*eb-i*. This causes the contact portion 20103-*i* to make periodical asymmetric motion relative to the body portion 20101 and the supporting portion 201026-*i*, giving force based on the asymmetric motion to the skin with which the contact portion 20103-*i* is in direct or indirect contact. By either one or both of the contact portions 20103-1, 2 thus giving force based on the asymmetric motion to the skin, pseudo force sense in a desired translational direction or rotational direction can be presented. For example, when the contact portion 20103-1 and the contact portion 20103-2 present pseudo force sense in the same direction (the same direction along D20-1 axis and D20-2 axis) via asymmetric vibration of the same phase of the movable portion 201025-1 and the movable portion 201025-2, the user perceives translational force sense as a whole. That is, as illustrated in FIG. 42A, when both the contact portion 20103-1 and the contact portion 20103-2 present pseudo force sense in E201 direction, the user perceives translational force sense in E201 direction. Conversely, when both the contact portion 20103-1 and the contact portion 20103-2 present pseudo force sense in E202 direction, the user perceives translational force sense in E202 direction as a whole. In contrast, when the movable portion 201025-1 and the movable portion 201025-2 present pseudo force sense via asymmetric vibration of reverse phases in the opposite directions to each other (the opposite directions to each other along D20-1 axis and D20-2 axis), the user perceives pseudo force sense in a rotational direction (rotary force sense) as a whole. That is, as illustrated in FIG. 42B, when the contact portion 20103-1 presents pseudo force sense in D20-12 direction and the contact portion 20103-2 presents pseudo force sense in D20-21 direction, the user perceives rotary force sense in F201 direction as a whole. Conversely, when the contact portion 20103-1 presents pseudo force sense in D20-11 direction and the contact portion 20103-2 presents pseudo force sense in D20-22 direction, the user perceives rotary force sense in F202 direction as a whole.

Desirably, a waveform pattern (time-series waveform pattern) of the force that is given by the contact portion 20103-*i* to skin or mucous membrane represents force that is in a predetermined direction DIR1-*i* and has an absolute value equal to or greater than threshold TH1 (a first threshold) in time segment $\tau 1$ (a first time segment), and represents force that is in direction DIR2-*i* opposite to the predetermined direction and has an absolute value within threshold TH2 (TH2<TH1) in time segment $\tau 2$ (a second time segment different from the first time segment). Here, $\tau 1 < \tau 2$ holds, and time segment $\tau 1$ and time segment $\tau 2$ are periodically repeated. Such a waveform pattern will be called "optimized waveform pattern". This enables pseudo force sense to be perceived more clearly. It is more desirable that the waveform pattern of the force is a rectangular pattern or a pattern close to a rectangular pattern.

[Modification 1 of the Tenth Embodiment]

In the tenth embodiment, the contact portion 20103-*i* is attached to the movable portion 201025-*i* via the linking portions 20102*da-i*, 20102*db-i*, 20102*ea-i*, 20102*eb-i* as described above. However, the contact portion 20103-*i* may be integral with the movable portion 201025-*i*.

Eleventh Embodiment

In the tenth embodiment only the bottom surface 20101*b* and the side surface 20101*a* of the body portion 20101 are covered by the contact portion 20103-*i*; however, the upper surface of the body portion 20101 may also be covered by the contact portion in addition to the bottom surface and the side surface. The following description will focus on differences from the matters so far described, and matters already described are denoted with the same reference characters and are not described in detail again.

Figure 43A:
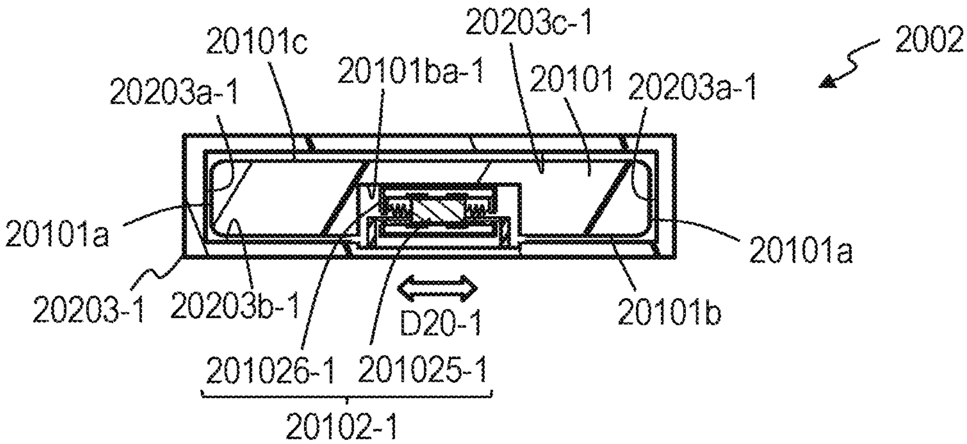
FIG. 43A is a cross-sectional view at 43A-43A in FIG. 43B.
Figure 43B:
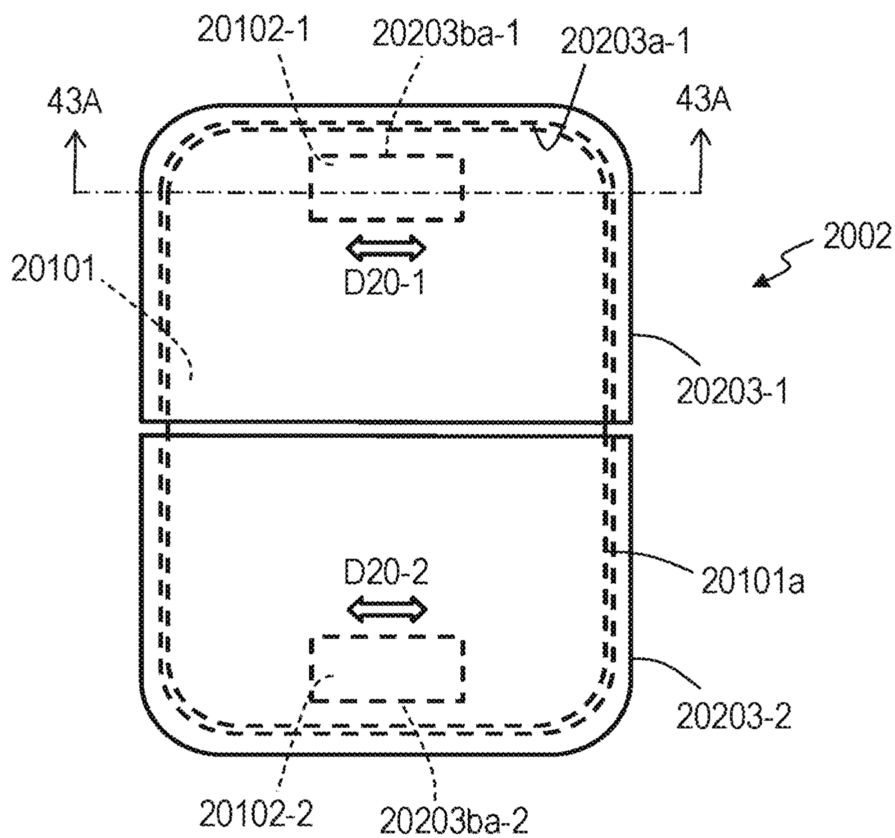
FIG. 43B is a plan view of a pseudo force sense generation apparatus according to an embodiment.
Figure 44A:
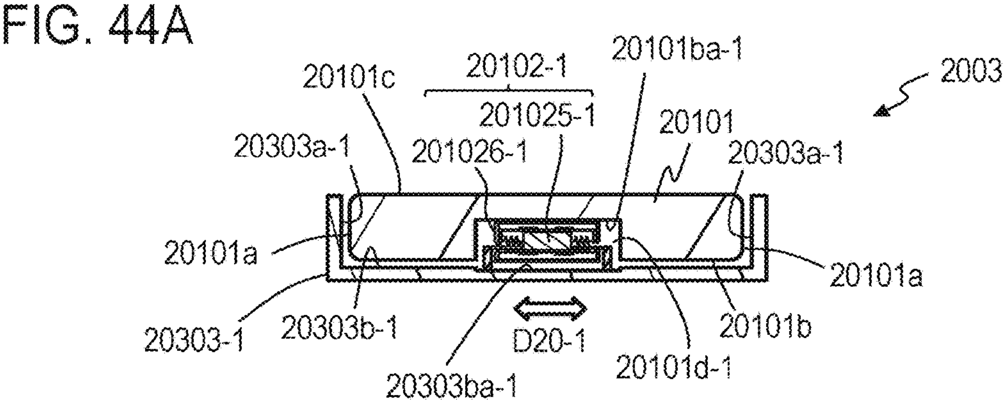
FIG. 44A is a cross-sectional view at 44A-44A in FIG. 44B.
Figure 44B:
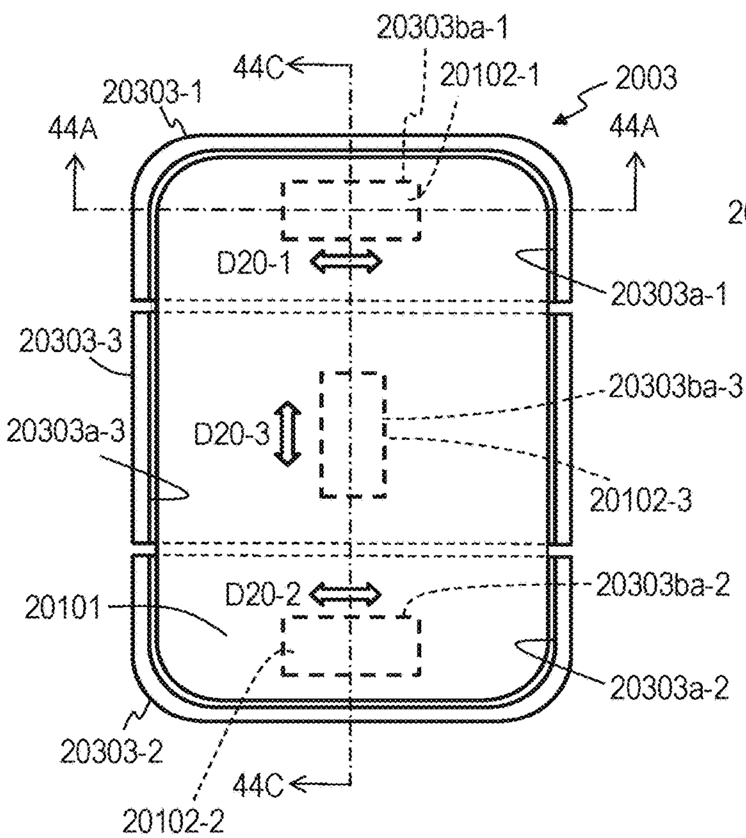
FIG. 44B is a plan view of a pseudo force sense generation apparatus according to an embodiment.
Figure 44C:
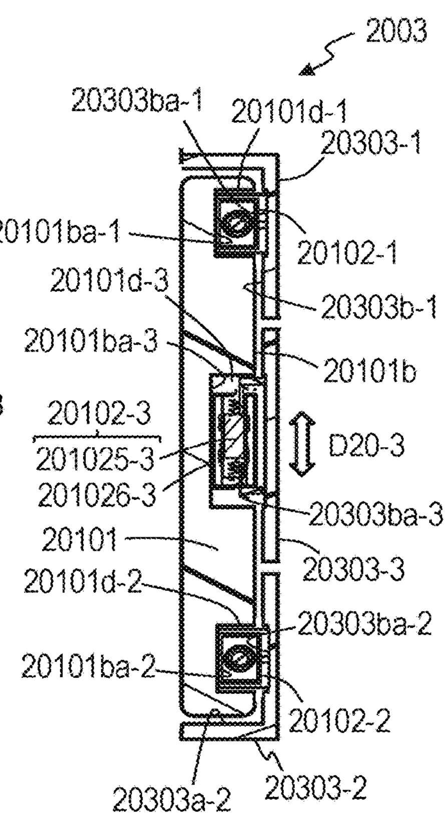
FIG. 44C is a cross-sectional view at 44C-44C in FIG. 44B.
Figure 45:
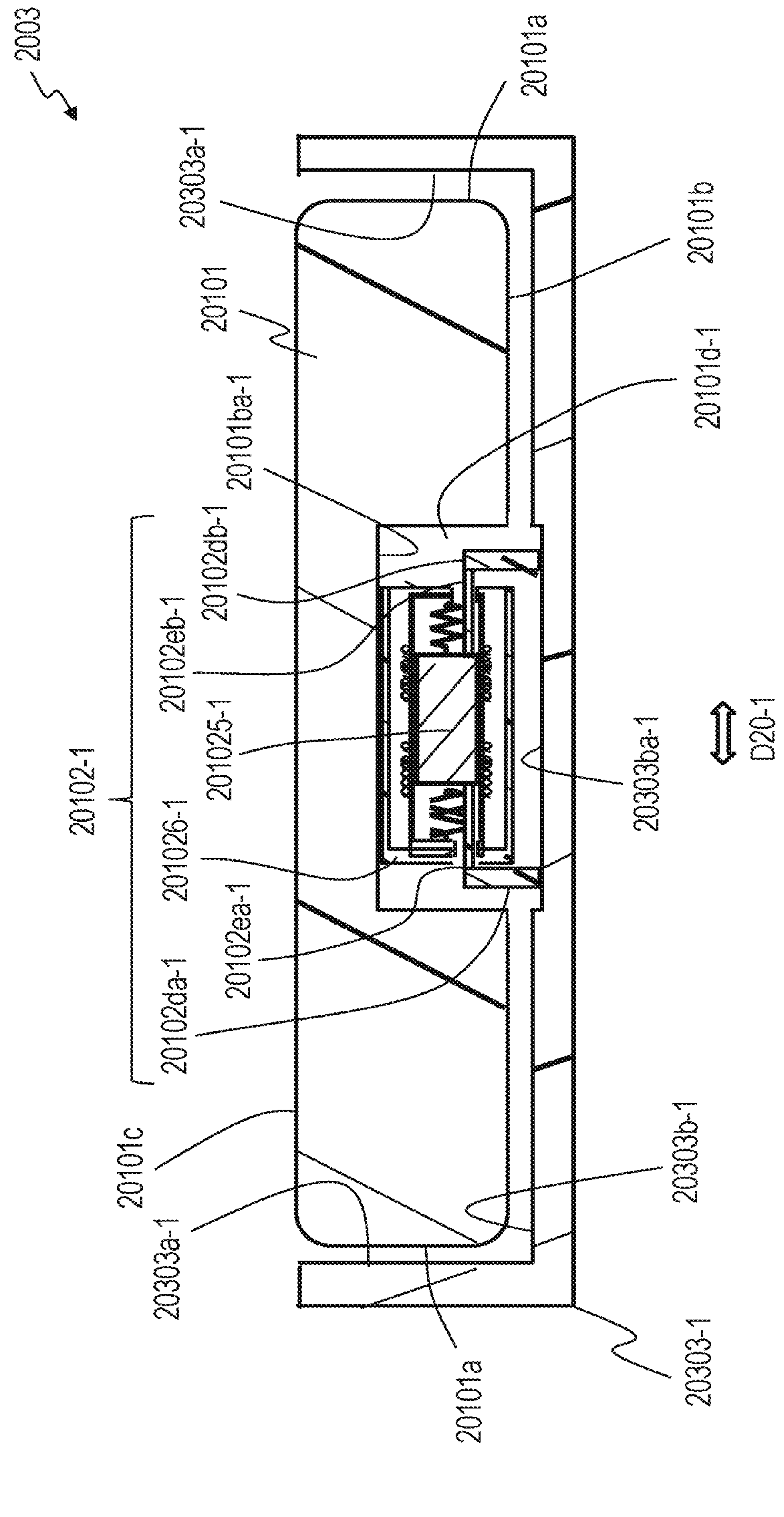
FIG. 45 is an enlarged view of FIG. 44A.
Figure 46:
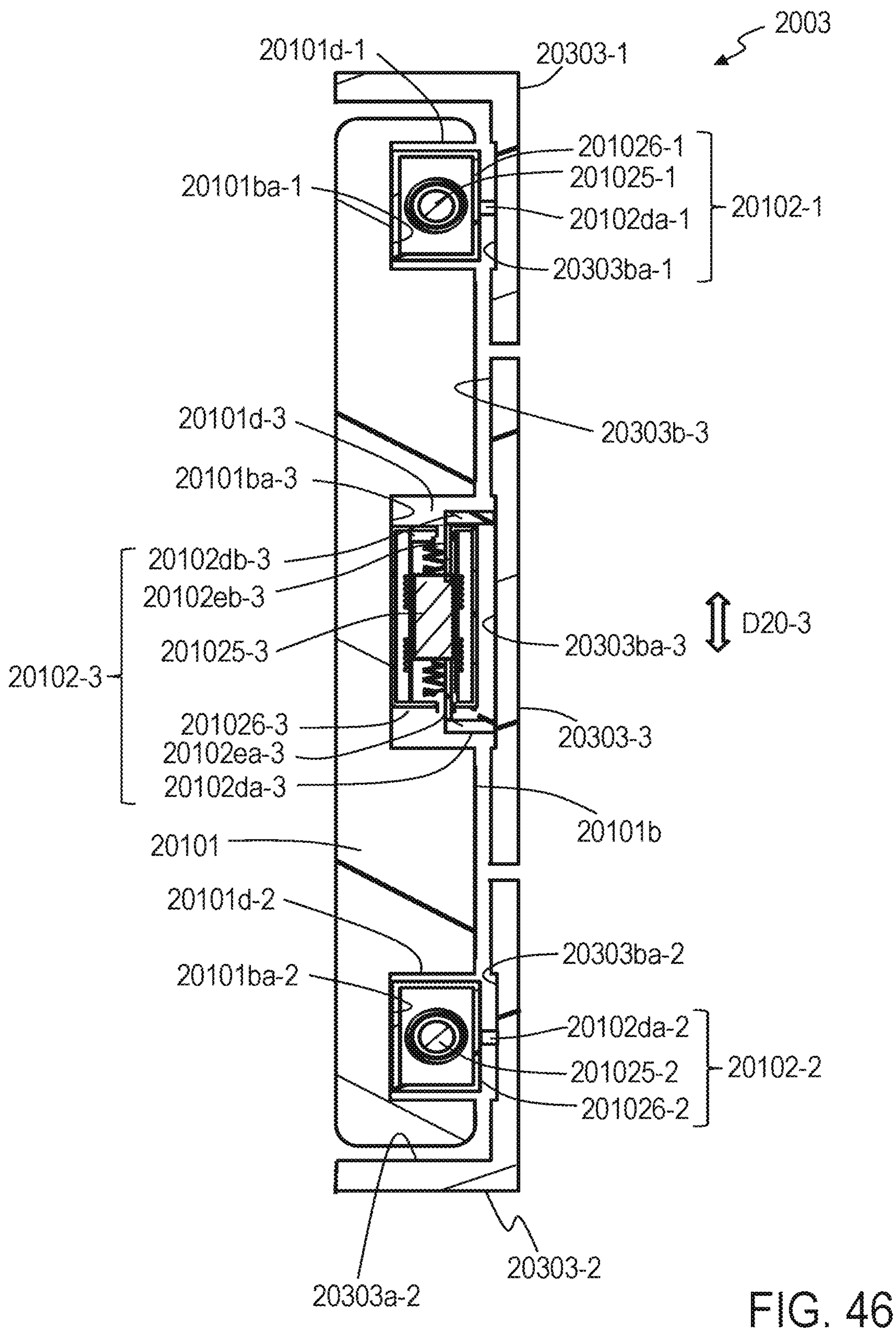
FIG. 46 is an enlarged view of FIG. 44C.

As illustrated in FIGS. 43A and 43B, a pseudo force sense generation apparatus 2002 in an eleventh embodiment has a body portion 20101, vibrators 20102-1, 20102-2, and contact portions 20203-1, 20203-2. Again, the supporting portion 201026-*i* of the vibrator 20102-*i* (where i=1, 2) corresponds to the "base mechanism-side component" and the movable portion 201025-*i* corresponds to the "contact mechanism-side component". The contact portion 20203-*i* is a component for supporting the weight of the pseudo force sense generation apparatus 2002. A difference from the tenth embodiment is that the contact portion 20203-*i* covers the outside of the body portion 20101. A bottom surface 20101*b* of the body portion 20101 accommodated in the contact portion 20203-*i* (where i=1, 2) is positioned opposite an inner bottom surface 20203*b-i* of the contact portion 20203-*i*, a side surface 20101*a* of the body portion 20101 is positioned opposite an inner wall surface 20203*a-i* of the contact portion 20203-*i*, and an upper surface 20101*c* of the body portion 20101 is positioned opposite an inner upper surface 20203*c-i* of the contact portion 20203-*i*. There are gaps between the bottom surface 20101*b* and the inner bottom surface 20203*b-i*, between the side surface 20101*a* and the inner wall surface 20203*a-i*, and between the upper surface 20101*c* and the inner upper surface 20203*c-i*, respectively; the body portion 20101 and the contact portion 20203-*i* are not in contact with each other. Also, the contact portions 20203-1, 2 are not in contact with each other and their motions are independent from each other. Otherwise, this embodiment may be same as the tenth embodiment or a modification thereof except the replacement of the contact portion 20103-*i* with the contact portion 20203-*i*.

Twelfth Embodiment

The positioning and/or number of vibrators 20102-*i* included in the pseudo force sense generation apparatus are not limited to those of the tenth and eleventh embodiments. As illustrated in FIGS. 44A to 46, a pseudo force sense generation apparatus 2003 in a twelfth embodiment has a body portion 20101, a vibrator 20102-*i* including a supporting portion 201026-*i* (where i=1, 2, 3) and a movable portion 201025-*i* which performs asymmetric vibration relative to the supporting portion 201026-*i*, and a contact portion 20303-*i*. In this embodiment, the supporting portion 201026-*i* of the vibrator 20102-*i* (where i=1, 2, 3) corresponds to the "base mechanism-side component" and the movable portion 201025-*i* corresponds to the "contact mechanism-side component". Differences from the tenth embodiment are that i=1, 2, 3 for the pseudo force sense generation apparatus 2004 as opposed to i=1, 2 in the tenth embodiment, D20-3 axis is substantially orthogonal to D20-1, 2 axes, a vibrator 20102-3 is positioned in the area between a vibrator 20102-1 and a vibrator 20102-2, and a contact portion 20303-3 is positioned between a contact portion 20303-1 and a contact portion 20303-2. On the inner bottom surface 20303*b-i* of the contact portion 20303-*i*, a recess 20303*ba-i* for attaching the movable portion 201025-*i* of the vibrator 20102-*i* is provided. The body portion 20101 supporting the vibrator 20102-*i* thereon is accommodated within the contact portion 20303-*i*, and the movable portion 201025-*i* of the vibrator 20102-*i* is attached to the bottom surface side of the recess 20303*ba-i* via the linking portions 20102*da-i*, 20102*db-i*, 20102*ea-i*, 20102*eb-i* described above. The bottom surface 20101*b* of the body portion 20101 is positioned opposite the inner bottom surface 20303*b-i* of the contact portion 20303-*i*, and the side surface 20101*a* of the body portion 20101 is positioned opposite the inner wall surface 20303*a-i* of the contact portion 20303-*i*. Note that there is a gap between the bottom surface 20101*b* and the inner bottom surface 20303*b-i*; they are not in contact with each other. Likewise, there is a gap between the side surface 20101*a* and the inner wall surface 20303*a-i*; they are not fixed to each other either. Thus, the contact portion 20303-*i* is capable of vibrating relative to the body portion 20101 and the supporting portion 201026-*i* (asymmetric vibration along D20-i axis). The contact portions 20303-1, 2, 3 are not in contact with each other and their motions are independent from each other. The asymmetric vibrations of the contact portions 20303-1, 2, 3 are made in a state in which they are not in contact with each other. The contact portion 20303-*i* (where i=1, 2, 3) performs periodical asymmetric motion relative to the body portion 20101 and the supporting portion 201026-*i*, and gives force based on the asymmetric motion to the skin with which the contact portion 20303-*i* is in direct or indirect contact. By some or all of the contact portions 20303-1, 2, 3 giving force based on the asymmetric motion to the skin, pseudo force sense in a desired translational direction or rotational direction can be presented. For example, when only the contact portion 20303-1 and the contact portion 20303-2 make asymmetric vibration of the same phase for presenting pseudo force sense in the same direction (the same direction along D20-1 axis and D20-2 axis), the user gripping the contact portion 20303-*i* perceives translational force sense. When only the contact portion 20303-1 and the contact portion 20303-2 make asymmetric vibration of the same phase for presenting pseudo force sense in the opposite directions (the opposite directions along D20-1 axis and D20-2 axis), the user gripping the contact portion 20303-*i* perceives rotary force sense. When the contact portions 20303-1, 3 make asymmetric vibration, or when the contact portions 20303-2, 3 make asymmetric vibration, or when the contact portions 20303-1, 2, 3 make asymmetric vibration, the user gripping the contact portion 20303-*i* perceives translational force sense and/or rotary force sense in a certain two-dimensional direction along D20-1 to D20-3 axis. Otherwise, this embodiment is same as the tenth embodiment or a modification thereof.

Figure 47A:
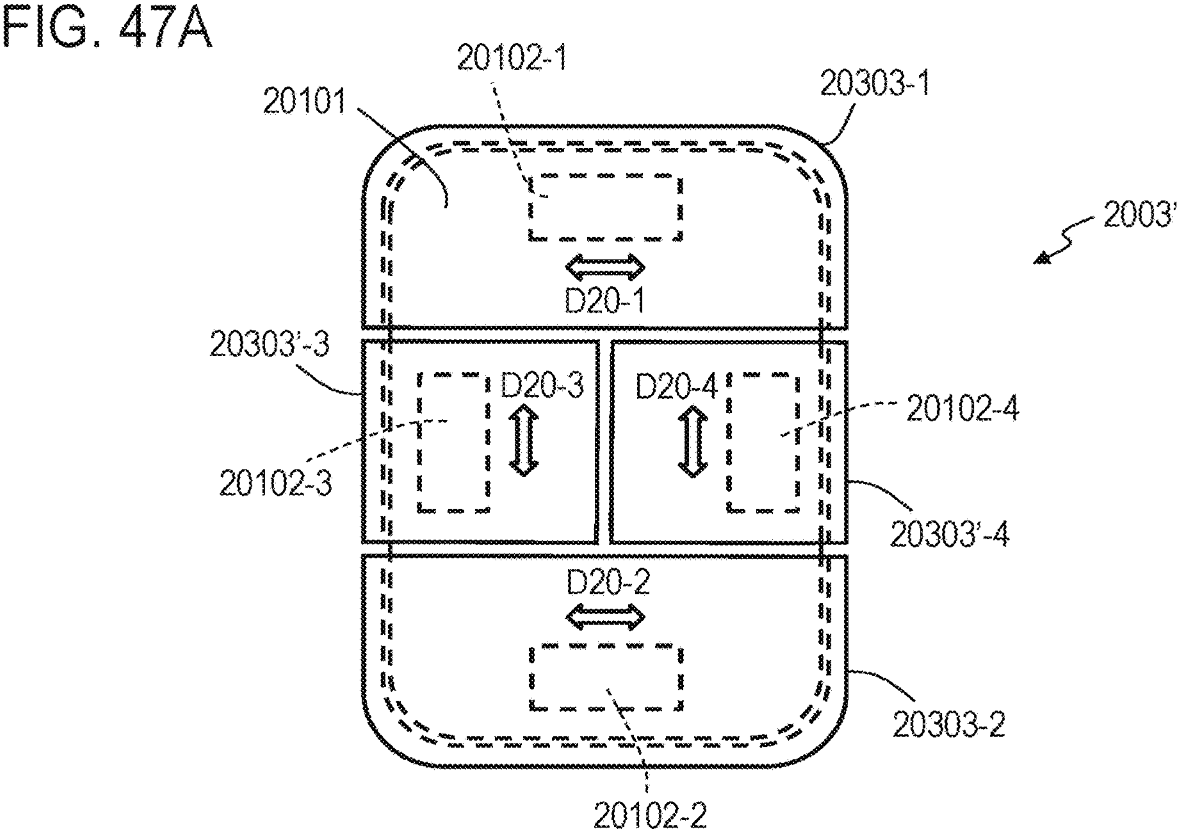
FIGS. 47A and 47B are bottom views of pseudo force sense generation apparatuses as modifications of the embodiment.
Figure 47B:
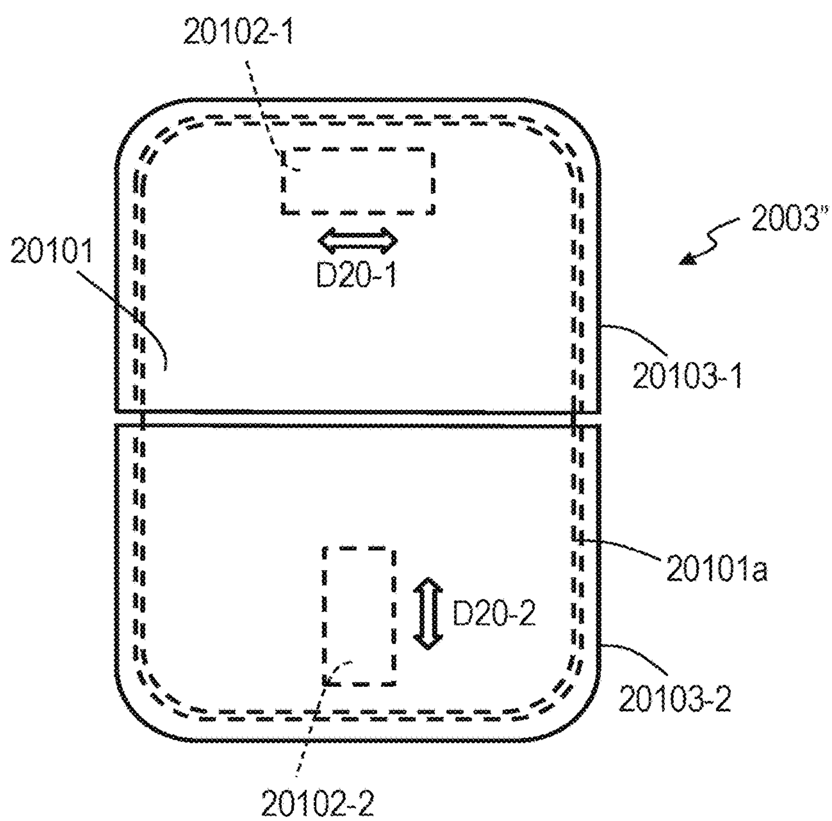
Figure 48:
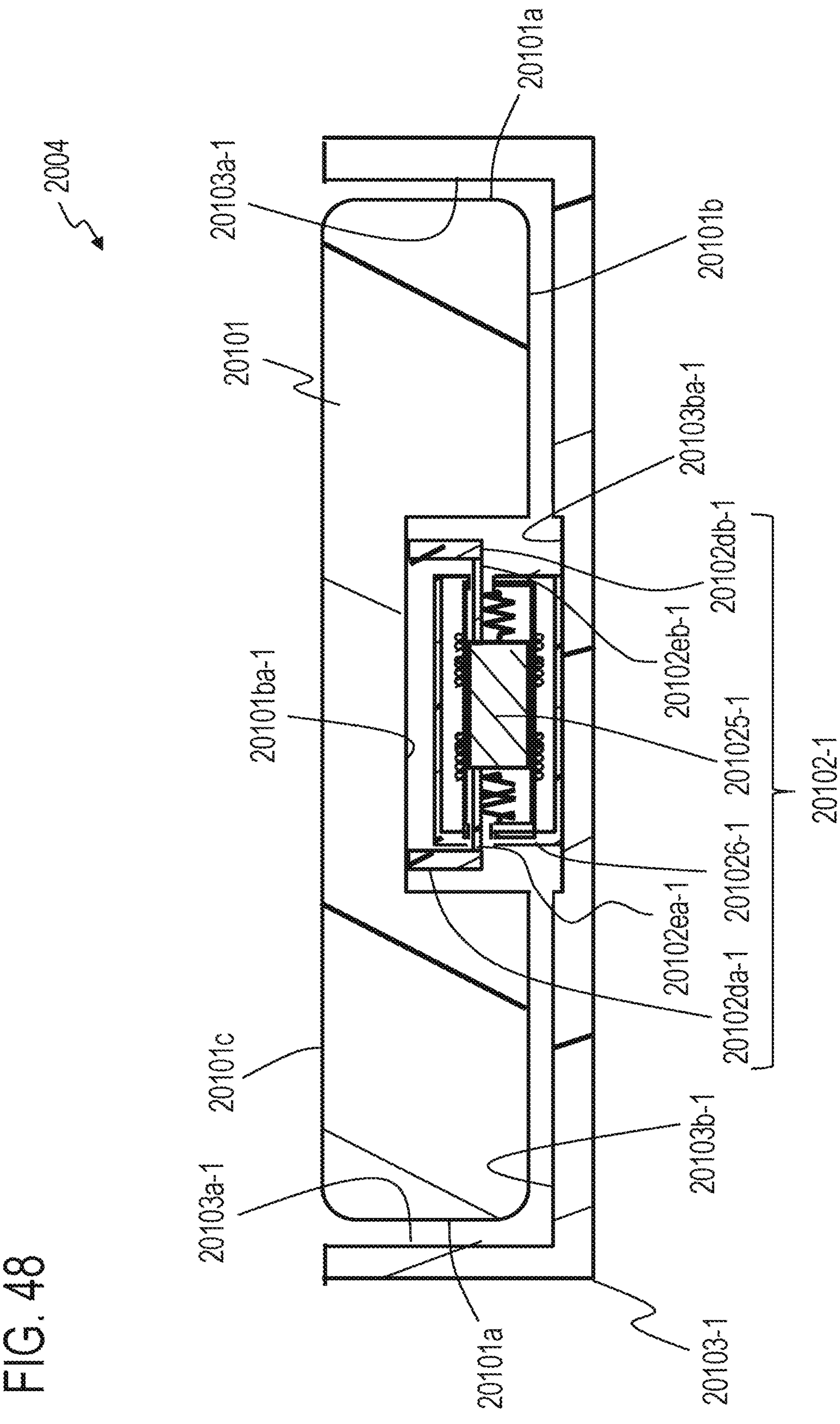
FIG. 48 is an enlarged cross-sectional view at 38A-38A in FIG. 38B showing a pseudo force sense generation apparatus according to an embodiment.

As another alternative, like a pseudo force sense generation apparatus 2003' in FIG. 47A, i may be i=1, 2, 3, 4, D20-3, 4 axes may be substantially orthogonal to D20-1, 2 axes respectively, vibrators 20102-3, 4 may be positioned on a side edge of the body portion 20101 where neither the vibrator 20102-1 nor the vibrator 20102-2 is positioned, and a contact portion 20303'-3 and a contact portion 20303'-4 may be positioned between the contact portion 20303-1 and the contact portion 20303-2. The contact portions 20303-1, 2 and 20303'-3, 4 are not in contact with each other and their motions are independent from each other. The asymmetric vibrations of the contact portions 20303-1, 2 and 20303'-3, 4 are made in a state in which they are not in contact with each other. Alternatively, like a pseudo force sense generation apparatus 2003" in FIG. 47B, i may be i=1, 2, and D20-1 axis may be substantially orthogonal to D20-2 axis. Even in such a case, the user gripping the contact portion 20303-*i* can be caused to perceive translational force sense and/or rotary force sense in a certain two-dimensional direction.

Thirteenth Embodiment

In the tenth to twelfth embodiments, the supporting portion 201026-*i* of the vibrator 20102-*i* is attached to the body portion 20101, and the movable portion 201025-*i* of the vibrator 20102-*i* is attached to the contact portion 20103-*i* via the linking portions 20102*da-i*, 20102*db-i*, 20102*ea-i*, 20102*eb-i* as described above. However, the positional relationship between the body portion 20101 and the contact portion 20103-*i* may be reversed. For example, like the pseudo force sense generation apparatus 2004 illustrated in FIGS. 37A, 37B, 38B, 48, 41A, and 41B, the supporting portion 201026-*i* may be attached to the contact portion 20103-*i*, and the movable portion 201025-*i* may be attached to the bottom surface 20101*ba-i* of the recess 20101*d-i* of the body portion 20101 via the linking portions 20102*da-i*, 20102*db-i*, 20102*ea-i*, 20102*eb-i*. That is, the contact portion 20103-*i* may be attached to the supporting portion 201026-*i* and be capable of vibrating relative to the movable portion 201025-*i*. In a thirteenth embodiment, the movable portion 201025-*i* of the vibrator 20102-*i* (where i=1, 2) corresponds to the "base mechanism-side component" and the supporting portion 201026-*i* corresponds to the "contact mechanism-side component".

In this configuration, the "contact mechanism" as the system that vibrates with the contact portion 20103-*i* includes the contact portion 20103-*i* and the supporting portion 201026-*i*. This "contact mechanism" may further include at least some of the springs 201022-*i*, 201023-*i*, and the coil 201024-*i*. The "base mechanism" as the system supporting the system that vibrates with the contact portion 20103-*i* includes the body portion 20101. The system supporting this "base mechanism" may further include at least some of the linking portions 20102*da*-*i*, 20102*db*-*i*, 20102*ea*-*i*, 20102*eb*-*i*, and the movable portion 201025-*i*. Again, it is assumed that the average amplitude of vibration of the "contact mechanism" is greater than the average amplitude of vibration of the "base mechanism". Also, the mass $m_1$-i of each "contact mechanism" is smaller than the mass $m_2$ of the "base mechanism". Preferably, the mass $m_1$-i of each "contact mechanism" is not more than one third of the mass $m_2$ of the "base mechanism".

Fourteenth Embodiment

Figure 49A:
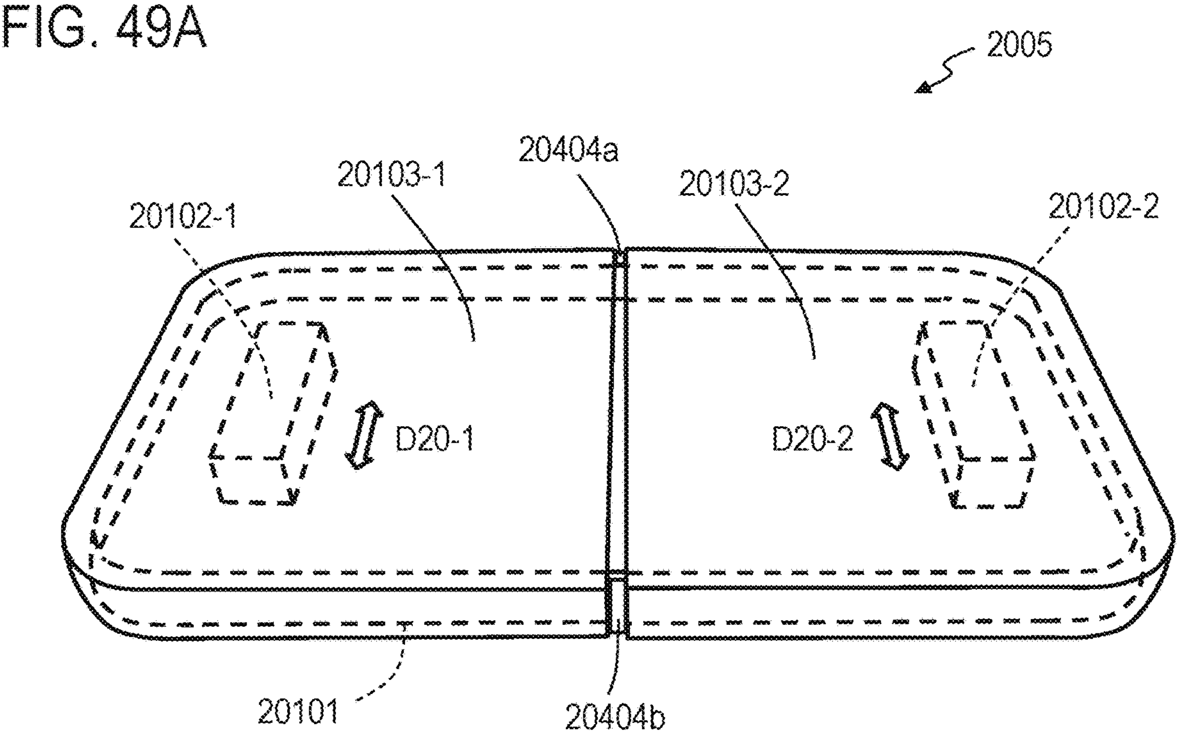
FIG. 49A is a perspective view of a pseudo force sense generation apparatus according to an embodiment.
Figure 49B:
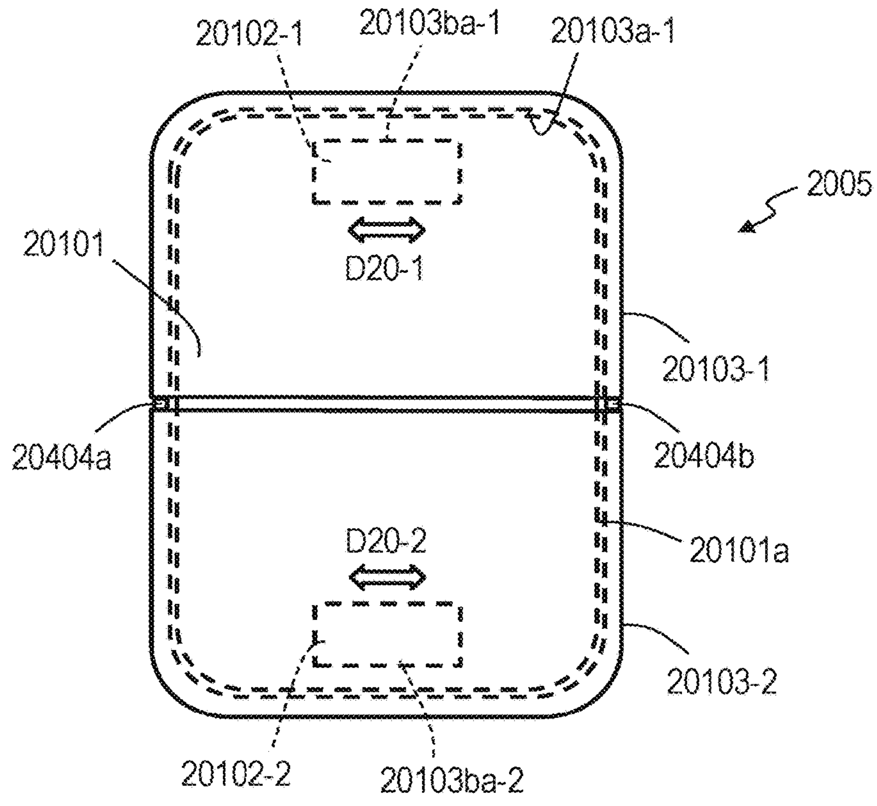
FIG. 49B is a plan view of the pseudo force sense generation apparatus according to the embodiment.

In the tenth to thirteenth embodiments or modifications thereof, the contact portions 20103-*i* may be linked via a sliding mechanism or a soft object so that they do not limit each other's vibration. For example, like a pseudo force sense generation apparatus 2005 illustrated in FIGS. 49A and 49B, the contact portion 20103-1 and the contact portion 20103-2 may be linked together via intervening portions 20404*a* and 20404*b*. The intervening portions 20404*a* and 20404*b* may be soft objects such as urethane, rubber, or springs, or material with low rigidity that allows the contact portions 20103-1, 2 to operate independently to some degree, or sliding mechanisms that allow the contact portion 20103-1 to slide in D20-1 direction relative to the contact portion 20103-2 and the contact portion 20103-2 to slide in D20-2 direction relative to the contact portion 20103-1.

Fifteenth Embodiment

Figure 50A:
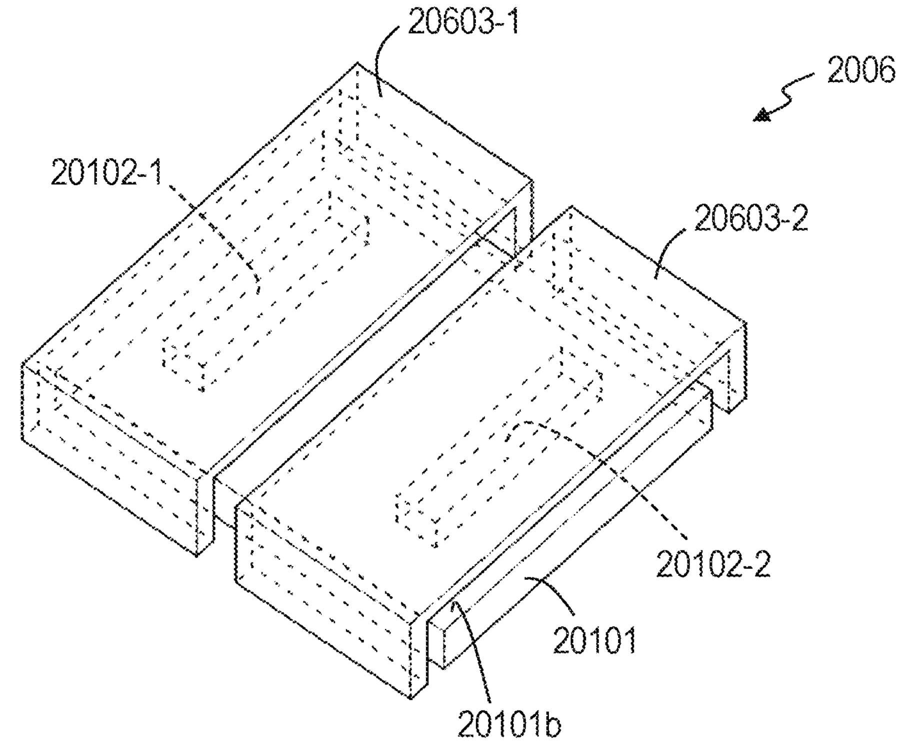
FIGS. 50A and 50B are perspective views of pseudo force sense generation apparatuses as modifications of an embodiment.
Figure 50B:
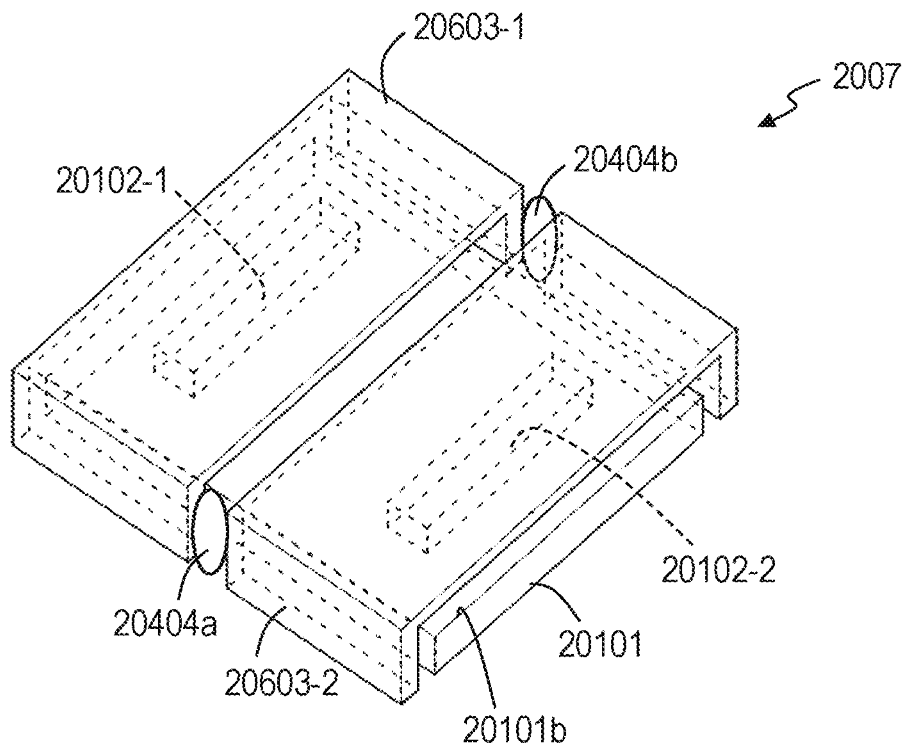
Figure 51:
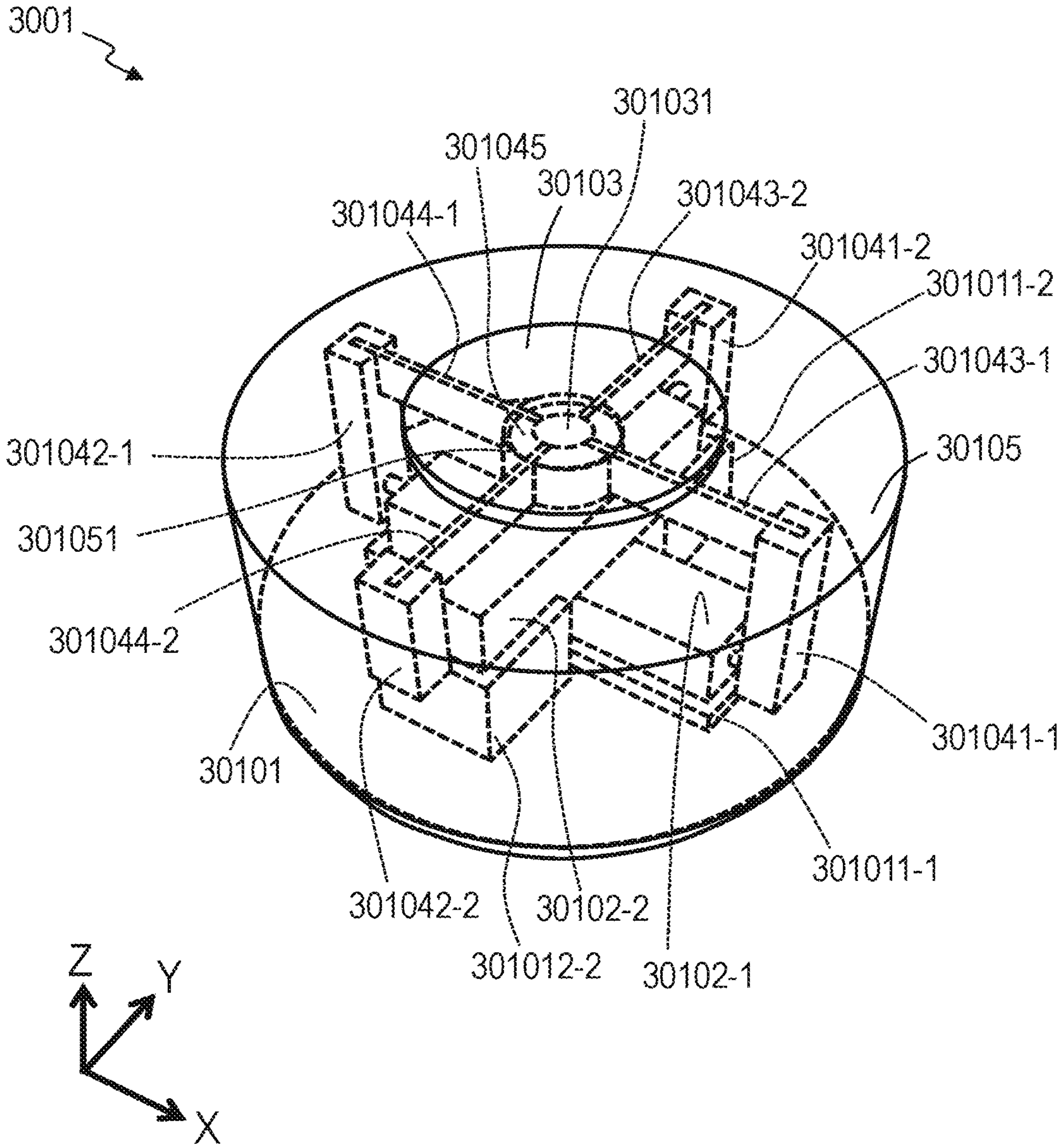
FIG. 51 is a transparent perspective view illustrating a configuration of a pseudo force sense generation apparatus according to an embodiment.
Figure 52:
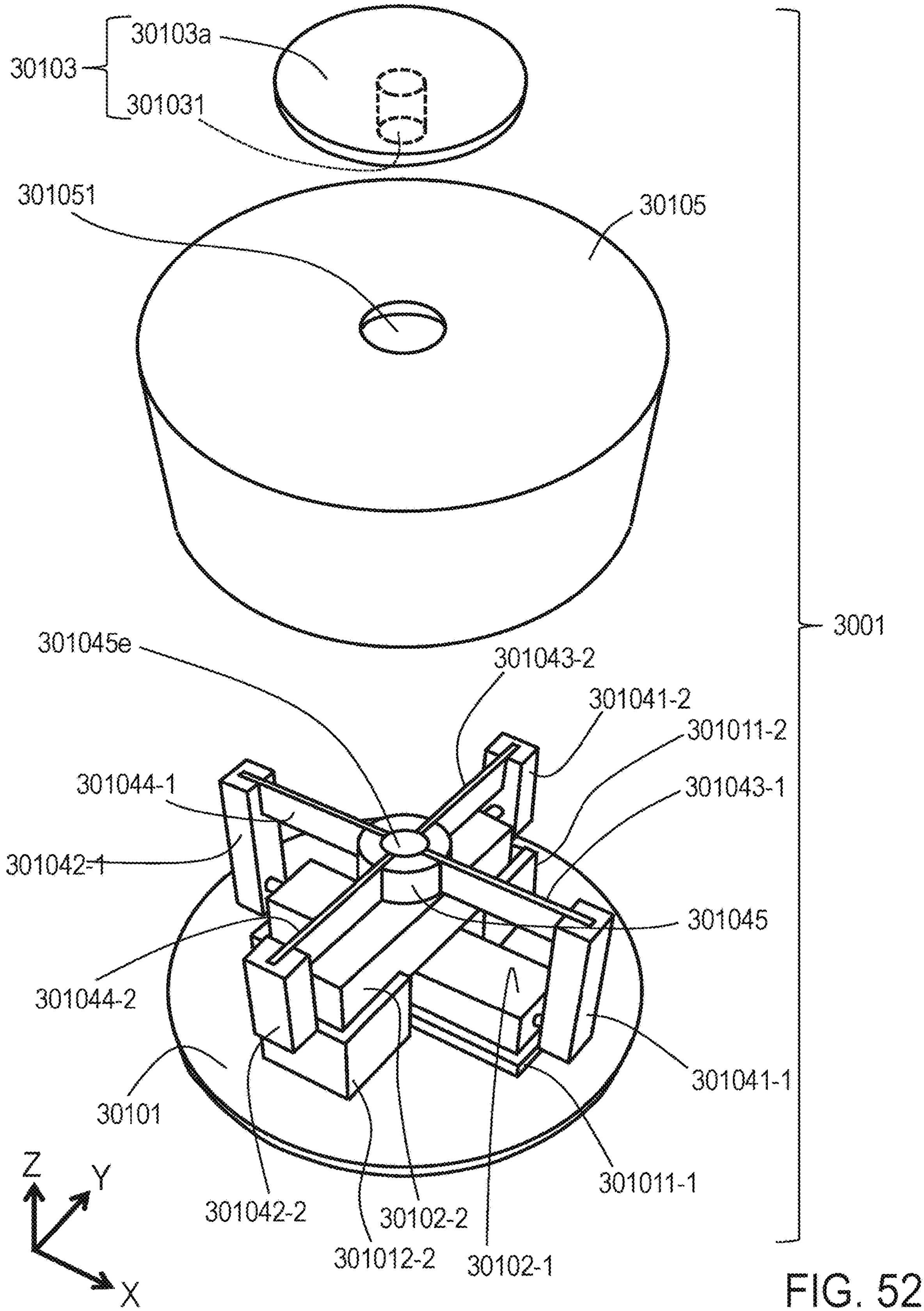
FIG. 52 is an exploded view illustrating the configuration of the pseudo force sense generation apparatus according to the embodiment.
Figure 53:
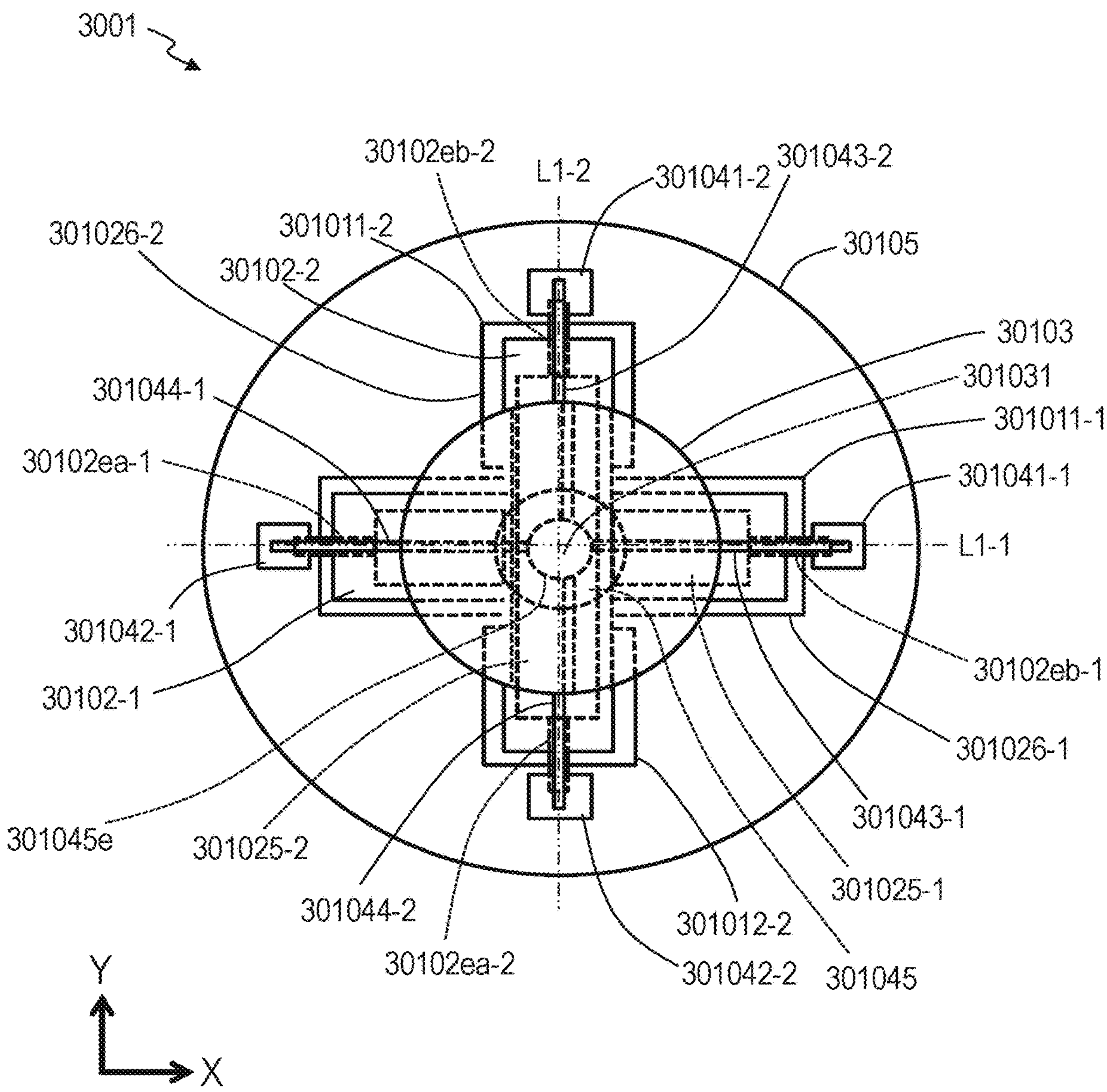
FIG. 53 is a transparent plan view illustrating the configuration of the pseudo force sense generation apparatus according to the embodiment.

There are many variations of arrangement of the contact portion, the body portion, the supporting portion, and the movable portion. For example, like a pseudo force sense generation apparatus 2006 in FIG. 50A, the contact portions 20103-1, 2 of the pseudo force sense generation apparatus 2001 in the tenth embodiment may be replaced with contact portions 20603-1, 2. While the contact portions 20103-1, 2 in the tenth embodiment cover the outside of the longitudinal end of the body portion 20101, the contact portions 20603-1, 2 in a fifteenth embodiment do not cover the outside of the longitudinal end of the body portion 20101. This is the only difference from the tenth embodiment. Also, like a pseudo force sense generation apparatus 2007 in FIG. 50B, the contact portion 20103-1 and the contact portion 20103-2 of the pseudo force sense generation apparatus 2006 may be linked together via intervening portions 20404*a* and 20404*b*. As another alternative, instead of multiple contact portions asymmetrically vibrating in directions parallel or orthogonal to each other, the direction of the asymmetric vibration of each one of the multiple contact portions may be at another angle θ ($0° < θ < 90°$). Also, separate contact portions may be provided on the bottom surface side and side-surface side of the body portion and they may asymmetrically vibrate independently from each other, or separate contact portions may be provided on the side surface side of the body portion and they may asymmetrically vibrate independently from each other, or separate contact portions may be provided on the bottom surface side and the upper surface side of the body portion and they may asymmetrically vibrate independently from each other.

Overview of Sixteenth to Twentieth Embodiments

The pseudo force sense generation apparatuses according to sixteenth to twentieth embodiments have a "base mechanism" and a "contact mechanism" which performs periodical "asymmetric motion" relative to the "base mechanism" and gives force based on the "asymmetric motion" to the skin or mucous membrane with which the contact mechanism is in direct or indirect contact. The "contact mechanism" has a "first movable mechanism" which performs asymmetric vibration along a "first axis" relative to the "base mechanism", a "first leaf spring mechanism" which performs asymmetric vibration together with the "first movable mechanism", and a "contact portion" which is at least partially positioned outside the "first leaf spring mechanism" and performs "asymmetric motion" based on the "asymmetric vibration" of the "first leaf spring mechanism". The "first movable mechanism" is supported by the "base mechanism" such that it can make asymmetric vibration relative to the "base mechanism". The "first leaf spring mechanism" elastically deforms in the direction along a "second axis" having a different orientation than the "first axis" when force in the direction along the "second axis" is given, and gives force in the direction along the "first axis" to the "contact portion" when force in the direction along the "first axis" is given from the "first movable mechanism". In this configuration, force of a sufficient magnitude is transferred from the "contact portion" of the "contact mechanism", which vibrates with the "first movable mechanism", to the skin or mucous membrane. This enables clearer presentation of force sense even with an actuator having the same stroke and output as the conventional scheme. Alternatively, even with an actuator having smaller stroke and output than the conventional scheme, force sense of a similar level to the conventional scheme can be presented. That is, force sense can be presented more efficiently than conventionally done. Also, the "first leaf spring mechanism" elastically deforms in the direction along the "second axis" having a different orientation than the "first axis" when force in the direction along the "second axis" is given. This suppresses hindrance to the given asymmetric vibration in the direction along a "second axis" by the "first movable mechanism", allowing force in the direction along the "second axis" to be efficiently given to the "contact portion". In general, when a radial load is applied to a bearing of an actuator, friction increases and hinders the driving of the actuator; however, such a radial load can be reduced by releasing motion in the direction along the "second axis" by the "second leaf spring mechanism". That is, it also suppresses hindrance to the asymmetric vibration of the "first movable mechanism" by the force in the direction along the "second axis", so that force in the direction along the "first axis" given from the "first movable mechanism" can be efficiently given to the "contact portion". In other words, force in the direction along the "first axis" given from the "first movable mechanism" can be efficiently given to the "contact portion" while releasing the force in the direction along the "second axis" by the "first leaf spring mechanism". As a result, force sense can be efficiently presented in a certain direction. The "first leaf spring mechanism" may be integrally formed from synthetic resin such as ABS resin, and even all of the "base mechanism" and the "contact mechanism" may be formed from the same material. The "base mechanism" and the "contact mechanism" to may be formed by 3D printing.

Thus, the configuration of these embodiments has advantages in terms of downsizing, cost reduction, and easiness of molding. In addition, a configuration that releases force in the direction along the "second axis" with a hinge or a sliding mechanism introduces friction due to sliding and the like and associated noise, whereas such a problem does not occur with a configuration using the "first leaf spring mechanism".

An example of the direction along the "second axis" is a direction substantially orthogonal to the direction along the "first axis". However, the direction along the "second axis" has only to be different from the direction along the "first axis"; the direction along the "second axis" and the direction along the "first axis" may not be substantially orthogonal. Examples of "direction along $\alpha$" are the direction of $\alpha$, a direction alongside $\alpha$, and a direction substantially parallel to $\alpha$. "Substantially $\alpha$" means being $\alpha$ or being approximate to $\alpha$.

Preferably, the "first leaf spring mechanism" has a "first leaf spring portion" and a "second leaf spring portion" arranged in the direction along the "first axis". For example, the "first leaf spring portion" and the "second leaf spring portion" are positioned on a substantially same straight line. One end of the "first movable mechanism" supports one end of the "first leaf spring portion", and the other end of the "first leaf spring portion" supports the "contact portion". The other end of the "first movable mechanism" supports one end of the "second leaf spring portion", and the other end of the "second leaf spring portion" supports the "contact portion". For example, one end of the "first movable mechanism" is fixed to or formed integrally with one end of the "first leaf spring portion", and the other end of the "first leaf spring portion" is fixed to or formed integrally with the "contact portion". For example, the other end of the "first movable mechanism" is fixed to or formed integrally with one end of the "second leaf spring portion", and the other end of the "second leaf spring portion" is fixed to or formed integrally with the "contact portion". For example, one end of the "first movable mechanism", one end of the "first leaf spring portion", the other end of the "first leaf spring portion", the other end of the "first movable mechanism", one end of the "second leaf spring portion", and the other end of the "second leaf spring portion" are positioned on a substantially same straight line. The other end of the "first leaf spring portion" and the other end of the "second leaf spring portion" are positioned between one end of the "first leaf spring portion" and one end of the "second leaf spring portion". With such a configuration, when the "first movable mechanism" moves in the direction from one end toward the other end thereof, the "second leaf spring portion" attracts the "contact portion" in that direction. Conversely, when the "first movable mechanism" moves in the direction from the other end toward one end thereof, the "first leaf spring portion" attracts the "contact portion" in that direction. That is, by being pulled alternately by the "first leaf spring portion" and the "second leaf spring portion", the "contact portion" asymmetrically vibrates in the direction along the "first axis". In the case of a configuration where the "contact portion" is pulled alternately by the "first leaf spring portion" and the "second leaf spring portion", force from the "first movable mechanism" can be sufficiently transmitted to the "contact portion" to allow the "contact portion" to asymmetrically vibrate efficiently even if the "first leaf spring portion" and the "second leaf spring portion" are thin. That is, in a configuration where the "contact portion" is pulled alternately by the "first leaf spring portion" and the "second leaf spring portion", there is no problem of the "first leaf spring portion" and the "second leaf spring portion" becoming buckled to inhibit efficient transmission of force. Accordingly, the thickness of the "first leaf spring portion" and the "second leaf spring portion" can be minimized. In addition, by reducing the thickness of the "first leaf spring portion" and the "second leaf spring portion", force for making the "first leaf spring mechanism" elastically deform in the direction along the "second axis" can be decreased. That is, force in the direction along the "first axis" given from the "first movable mechanism" can be efficiently given to the "contact portion" while releasing vibration in the direction along the "second axis" by the "first leaf spring mechanism" with almost no suppression of the vibration in the direction along the "second axis".

Force in the direction along the "second axis" is, for example, force given from the "second movable mechanism" different from the "first movable mechanism". For example, the "contact mechanism" further has a "second movable mechanism" which performs asymmetric vibration along the "second axis" relative to the "base mechanism" and a "second leaf spring mechanism" which performs asymmetric vibration together with the "second movable mechanism". The "second movable mechanism" is supported by the "base mechanism" such that it can make asymmetric vibration relative to the "base mechanism". The "contact portion" further performs asymmetric motion based on the "asymmetric vibration (second asymmetric vibration)" of the "second leaf spring mechanism". The "second leaf spring mechanism" elastically deforms in the direction along the "first axis" when force in the direction along the "first axis" is given, and gives force in the direction along the "second axis" to the "contact portion" when force in the direction along the "second axis" is given from the "second movable mechanism". In the case of this configuration, the "contact portion" performs asymmetric motion based on the asymmetric vibration of the "first movable mechanism" along the "first axis" and the asymmetric vibration of the "second movable mechanism" along the "second axis".

As with the "first leaf spring mechanism", the "second leaf spring mechanism" preferably has a "third leaf spring portion" and a "fourth leaf spring portion" arranged in the direction along the "second axis". For example, the "third leaf spring portion" and the "fourth leaf spring portion" are positioned on a substantially same straight line. One end of the "second movable mechanism" supports one end of the "third leaf spring portion" and the other end of the "third leaf spring portion" supports the "contact portion". The other end of the "second movable mechanism" supports one end of the "fourth leaf spring portion", and the other end of the "fourth leaf spring portion" supports the "contact portion". For example, one end of the "second movable mechanism" is fixed to or formed integrally with one end of the "third leaf spring portion", and the other end of the "second leaf spring portion" is fixed to or formed integrally with the "contact portion". For example, the other end of the "second movable mechanism" is fixed to or formed integrally with one end of the "fourth leaf spring portion", and the other end of the "fourth leaf spring portion" is fixed to or formed integrally with the "contact portion". For example, one end of the "second movable mechanism", one end of the "third leaf spring portion", the other end of the "third leaf spring portion", the other end of the "second movable mechanism", one end of the "fourth leaf spring portion", and the other end of the "fourth leaf spring portion" are positioned on a substantially same straight line. The other end of the "third leaf spring portion" and the other end of the "fourth leaf spring portion" are positioned between one end of the "third leaf spring portion" and one end of the "fourth leaf spring portion". With such a configuration, when the "second movable mechanism" moves in the direction from one end toward the other end thereof, the "fourth leaf spring portion" attracts the "contact portion" in that direction. Conversely, when the "second movable mechanism" moves in the direction from the other end toward one end thereof, the "third leaf spring portion" attracts the "contact portion" in that direction. That is, by being pulled alternately by the "third leaf spring portion" and the "fourth leaf spring portion", the "contact portion" asymmetrically vibrates in the direction along the "second axis". In the case of a configuration where the "contact portion" is pulled alternately by the "third leaf spring portion" and the "fourth leaf spring portion", force from the "second movable mechanism" can be sufficiently transmitted to the "contact portion" to allow the "contact portion" to asymmetrically vibrate efficiently even if the "third leaf spring portion" and the "fourth leaf spring portion" are thin. That is, in a configuration where the "contact portion" is pulled alternately by the "third leaf spring portion" and the "fourth leaf spring portion", there is no problem of the "third leaf spring portion" and the "fourth leaf spring portion" becoming buckled to inhibit efficient transmission of force. Accordingly, the thickness of the "third leaf spring portion" and the "fourth leaf spring portion" can be minimized. In addition, by reducing the thickness of the "third leaf spring portion" and the "fourth leaf spring portion", force for making the "second leaf spring mechanism" elastically deform in the direction along the "first axis" can be decreased. That is, force in the direction along the "second axis" given from the "second movable mechanism" can be efficiently given to the "contact portion" while releasing vibration in the direction along the "first axis" by the "second leaf spring mechanism" with almost no suppression of the vibration in the direction along the "first axis".

The "contact mechanism" may further have a "third movable mechanism" which performs asymmetric vibration along the "second axis" relative to the "base mechanism". The "contact portion" performs asymmetric vibration together with the "third movable mechanism" and is rotatably supported by a part of the "third movable mechanism". The "contact portion" is capable of rotation about a "rotating shaft" substantially orthogonal to the "first axis". For example, the "contact portion" is capable of rotation about a "rotating shaft" substantially orthogonal to the "first axis" and the "second axis". This can release force in the direction along the "first axis" given from the "first movable mechanism" to the "contact portion" by the rotation of the "contact portion" about the "rotating shaft". This makes it possible to cause the "contact portion" to asymmetrically vibrate with force given from the "first movable mechanism", to cause the "contact portion" to asymmetrically vibrate with force given from the "second movable mechanism", and to cause the "contact portion" to make asymmetric motion with force given from both or one of the "first movable mechanism" and the "second movable mechanism". That is, the "contact portion" can make asymmetric motion that is based on at least one of the asymmetric vibration of the "first leaf spring mechanism" and the asymmetric vibration of the "third movable mechanism".

The pseudo force sense generation apparatus may further have a "third movable mechanism" which performs "third asymmetric vibration" along the "second axis" relative to the "base mechanism", and a "connecting portion" with one end thereof being rotatably supported by a part of the "third movable mechanism". The "contact portion" is supported at the other end of the "connecting portion", is capable of rotation about a rotating shaft substantially orthogonal to the "first axis" and the "second axis", and performs asymmetric motion that is based on at least one of the asymmetric vibration of the "first leaf spring mechanism" and the "third asymmetric vibration" of the "third movable mechanism". In this configuration, it is desirable that the other end of the "connecting portion" and the "contact portion" are attached to a part of the "first leaf spring mechanism". For example, it is desirable that the "first leaf spring mechanism" has a "first leaf spring portion" and a "second leaf spring portion" arranged in the direction along the "first axis", one end of the "first movable mechanism" supports one end of the "first leaf spring portion" and the other end of the "first leaf spring portion" is attached to the other end of the "connecting portion" and the "contact portion", the other end of the "first movable mechanism" supports one end of the "second leaf spring portion", and the other end of the "second leaf spring portion" is attached to the other end of the "connecting portion" and the "contact portion". More preferably, the "contact portion" is attached to a part of the "first leaf spring mechanism" at some position on a virtual plane that is substantially orthogonal to the "second axis" and includes the "first axis". This allows asymmetric vibration in the direction along the "first axis" to efficiently transmit to the "contact portion", efficiently giving force sense components in the direction along the "first axis" to skin or the like.

It is desirable that the "contact portion" includes a "first area" positioned on one surface side of the "base mechanism", a "second area" supported at one end of the "first area", and a "third area" supported at the other end of the "second area" and positioned on the other surface side of the "base mechanism"; the "first area" is supported by a part of the "first leaf spring mechanism"; and at least a part of the "base mechanism", at least a part of the "first movable mechanism", and at least a part of the "first leaf spring mechanism" are positioned between the "first area" and the "third area". Preferably, the "first area" and the "third area" have substantially plate-shaped portions, the substantially plate-shaped portion of the "first area" and the substantially plate-shaped portion of the "third area" are positioned substantially parallel to each other, and the ends of the "first area" and the "third area" are supported by the "second area". The "first area", the "second area", and the "third area" may be integral, or the "second area" may be fixed to one end of the "first area" and the "third area" may be fixed to the other end of the "second area". The user supports the "base mechanism" side with his/her palm, for example, and holds the "first area" and the "third area" of the "contact portion" from opposite sides, perceiving force sense based on the asymmetric motion of the "contact portion". When the user holds the "first area" and the "third area" from opposite sides, at least a part of the force given by the user to the "first area" (for example, force given from the user's thumb) is given to the "third area" via the "second area", and the "third area" is supported by the user (the user's index finger). This can suppress application of the force given by the user to the "first area" onto the "first movable mechanism", reducing the burden on the "first movable mechanism". As a result, wearing-away of the "first movable mechanism" can be reduced or hindrance to the movement of the "first movable mechanism" can be suppressed, allowing a reduced failure rate and/or efficient giving of force sense to skin or the like.

Preferably, the mass of the "contact mechanism" is smaller than the mass of the "base mechanism", or the mass of the "contact mechanism" is smaller than the sum of the mass of the "base mechanism" and the mass of the "mechanism that is attached to the base mechanism". With such a configuration, the mass of the system of the "contact mechanism" is small even when the mass of the entire system is large, so force of a sufficient magnitude is transferred from the "contact portion" of the "contact mechanism" to skin or mucous membrane. As a result, force sense can be presented more efficiently. More preferably, the ratio of the mass of the "base mechanism" to the mass of the "contact mechanism" is greater than zero and not more than one third, or the ratio of the sum of the mass of the "base mechanism" and the mass of the "mechanism that is attached to the base mechanism" to the mass of the "contact mechanism" is greater than zero and not more than one third. This enables pseudo force sense to be perceived more efficiently.

Periodical "asymmetric motion" is such periodic motion that causes pseudo force sense to be perceived with force given from the "contact portion" of the "contact mechanism" to skin or mucous membrane based on that motion, and is periodic motion in which the time-series waveform of motion in a "predetermined direction" is asymmetric with the time-series waveform of motion in the opposite direction to the "predetermined direction". The "asymmetric motion" may be periodical translational motion for presenting pseudo force sense in a translational direction, or periodical rotary motion (asymmetric rotary motion) for presenting pseudo force sense in a rotational direction. An example of the periodical "asymmetric motion" is asymmetric vibration. Preferably, the "asymmetric motion" is such that the "waveform pattern" of force given by the "contact mechanism" to skin or mucous membrane based on the "asymmetric motion" represents force that is in the predetermined direction and has an absolute value equal to or greater than a "first threshold" in a "first time segment", and represents force that is in the opposite direction to the "predetermined direction" and has an absolute value being within a "second threshold" smaller than the "first threshold" in a "second time segment" different from the "first time segment", where the "first time segment" is shorter than the "second time segment". In other words, it is desirably such an "asymmetric motion" that makes the "waveform pattern" a rectangular pattern or a pattern close to a rectangular pattern because this enables clearer presentation of pseudo force sense.

The "asymmetric vibration" is vibration for causing perception of pseudo force sense with force given from the "contact portion" to skin or mucous membrane, meaning vibration in which the time-series waveform of vibration in a "predetermined direction" is asymmetric with the time-series waveform of vibration in the opposite direction to the "predetermined direction". For example, the "asymmetric vibration of the first movable mechanism" is vibration of the "first movable mechanism" such that the time-series waveform of a "physical quantity" of the "first movable mechanism" in a "predetermined direction" is asymmetric with the time-series waveform of "physical quantity" of the "first movable mechanism" in the opposite direction to the "predetermined direction". Examples of the "physical quantity" include force given to the "base mechanism" supporting the "first movable mechanism", the acceleration, velocity, or position of the "base mechanism", force given by the "contact mechanism" to the "first movable mechanism", the acceleration, velocity, or position of the "first movable mechanism".

The "base mechanism" may be configured in a shape that can be attached to a separate object (a shape to be supported) or not be configured in a shape that can be attached to a separate object (a shape to be supported). By attaching the former "base mechanism" to a "separate object", the "base mechanism" is supported by the "separate object". That "$\alpha$ is supported by $\beta$" means that $\alpha$ is supported by $\beta$ directly or indirectly. In other words, "$\alpha$ is supported by $\beta$" means part or all of the motion of $\alpha$ is limited by $\beta$; for example, the degree of freedom of the motion of $\alpha$ is partially or entirely limited by $\beta$. Not only in a case where $\alpha$ is fixed relative to $\beta$ or $\alpha$ is formed integrally with $\beta$ but even when $\alpha$ is able to move or rotate relative to $\beta$, "$\alpha$ is supported by $\beta$" is applicable if some movement of $\alpha$ is limited by $\beta$.

The "skin or mucous membrane with which the "contact mechanism" is in direct or indirect contact" means either skin or mucous membrane that is in contact with the "contact mechanism" with no intervening object therebetween, or skin or mucous membrane that is in contact with the "contact mechanism" via an intervening object. That "$\alpha$ makes contact with $\gamma$ via $\beta$" means entering a state in which force can be given to $\gamma$ from $\alpha$ via $\beta$. That "$\alpha$ makes contact with $\gamma$ via $\beta$" means, for example, entering a state in which $\alpha$ is in direct contact with $\beta$, $\beta$ is in direct contact with $\gamma$, and force can be given to $\gamma$ from $\alpha$ via $\beta$. The intervening object may be a rigid body, an elastic body, a plastic body, fluid, or any object having at least some of their characteristics in combination; however, it has to be able to transfer force from the "contact mechanism" to the skin or mucous membrane.

Sixteenth Embodiment

A sixteenth embodiment will be described.

<Configuration>

Figure 54A:
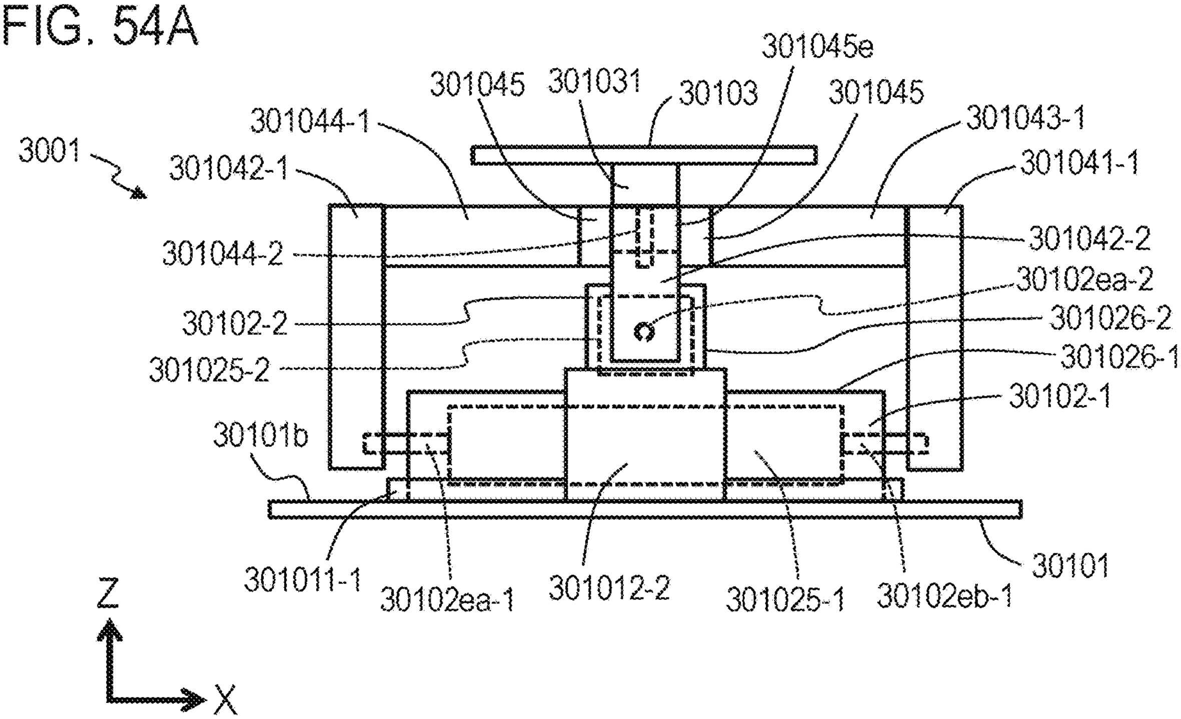
FIG. 54A is a transparent front view (X-Z plan view) illustrating the configuration of the pseudo force sense generation apparatus according to the embodiment.
Figure 54B:
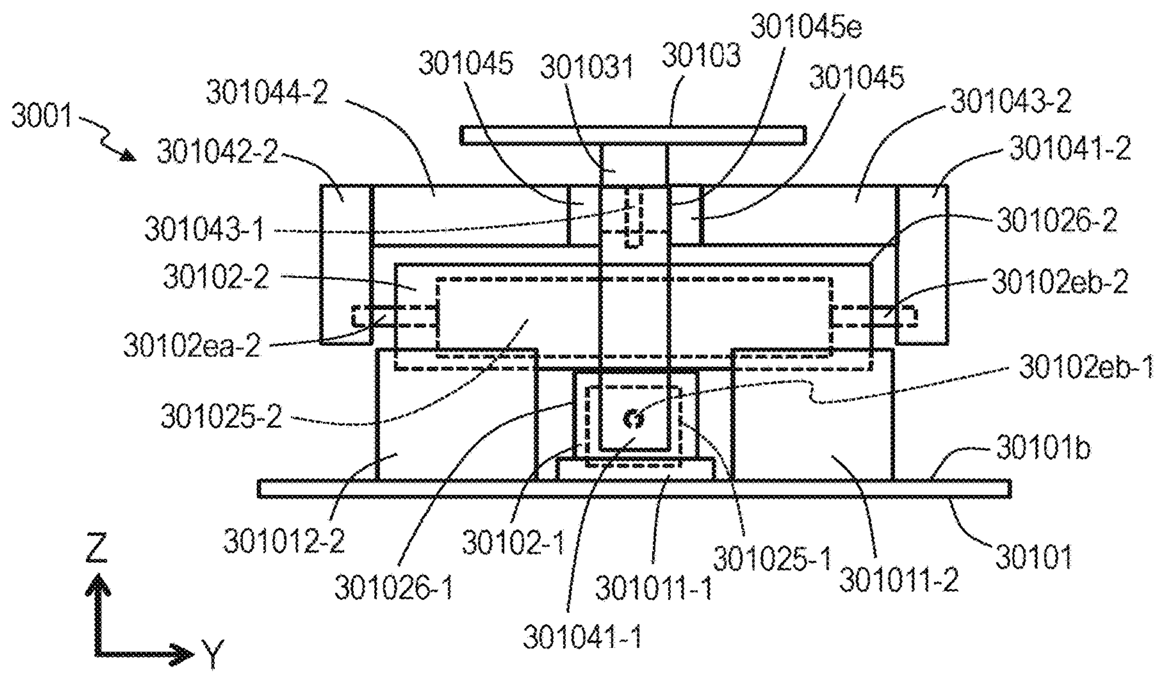
FIG. 54B is a transparent right side view (Y-Z plan view) illustrating the configuration of the pseudo force sense generation apparatus according to the embodiment.

Using FIGS. 51 to 53, 54A, 54B, 55A and 55B, the configuration of a pseudo force sense generation apparatus 3001 in this embodiment is described. In FIGS. 54A and 54B, a case 30105 is omitted. As illustrated in FIGS. 51 to 53, 54A, and 54B, the pseudo force sense generation apparatus 3001 in this embodiment has a body portion 30101, fixed portions 301011-1, 301011-2, 301012-2, vibrators 30102-1, 30102-2, linking portions 301041-1, 301042-1, 301041-2, 301042-2, leaf spring portions 301043-1, 301044-1, 301043-2, 301044-2, a fixed portion 301045, a case 30105, and a contact portion 30103. A vibrator 30102-*i* (where i=1, 2) has a supporting portion 301026-*i*, a movable portion 301025-*i*, a linking portion 30102_ea_-_i_, and a linking portion 30102_eb_-_i_.

A mechanism including the body portion 30101, the case 30105, the supporting portions 301026-1, 301026-2, and the fixed portions 301011-1, 301011-2, 301012-2 (for example, a mechanism composed of them) corresponds to the "base mechanism". A mechanism including the movable portion 301025-*i*, linking portions 30102_ea_-_i_, 30102_eb_-_i_, 301041-*i*, 301042-*i*, leaf spring portions 301043-*i*, 301044-*i* (where i=1, 2), the fixed portion 301045, and the contact portion 30103 (for example, a mechanism composed of them) corresponds to the "contact mechanism". The "contact mechanism" performs periodical asymmetric motion relative to the "base mechanism" and gives force based on the asymmetric motion to the skin or mucous membrane with which the contact mechanism is in direct or indirect contact, thereby presenting pseudo force sense. The mass of the "contact mechanism" is smaller than the mass of the "base mechanism". Preferably, the ratio of the mass of the "base mechanism" to the mass of the "contact mechanism" is greater than zero and not more than one third. A mechanism including the movable portion 301025-1 and the linking portions 30102_ea_-1, 30102_eb_-1, 301041-1, 301042-1 (for example, a mechanism composed of them) corresponds to the "first movable mechanism". A mechanism including the movable portion 301025-2 and the linking portions 30102*ea*-2, 30102*eb*-2, 301041-2, 301042-2 (for example, a mechanism composed of them) corresponds to the "second movable mechanism". A mechanism including the leaf spring portions 301043-1, 301044-1 (for example, a mechanism composed of them) corresponds to the "first leaf spring mechanism", and a mechanism including the leaf spring portions 301043-2, 301044-2 (for example, a mechanism composed of them) corresponds to the "second leaf spring mechanism". The leaf spring portion 301043-1 corresponds to the "first leaf spring portion", the leaf spring portion 301044-1 corresponds to the "second leaf spring portion", the leaf spring portion 301043-2 corresponds to the "third leaf spring portion", and the leaf spring portion 301044-2 corresponds to the "fourth leaf spring portion".

<Body Portion 30101 and Fixed Portions 301011-1, 301011-2, 301012-2>

The body portion 30101 is a disk-shaped component that is or can be considered to be a rigid body. For example, the body portion 30101 is made of synthetic resin such as ABS resin. The body portion 30101 may be a component dedicated for the pseudo force sense generation apparatus 3001 or some part of an electronic unit such as a smartphone terminal device. On one plate face 30101*b* side of the body portion 30101, the fixed portions 301011-1, 301011-2, 301012-2 are fixed or integrally formed. The fixed portion 301011-1 is a rectangular frame fitting to the outer geometries of the bottom surface of the vibrator 30102-1 and the four side surfaces adjacent to the bottom surface. The bottom surface side of the vibrator 30102-1 is fitted in the frame of the fixed portion 301011-1 so that the bottom surface side of the vibrator 30102-1 (the bottom surface side of the supporting portion 301026-1) is fixed to the plate face 30101*b* of the body portion 30101. The fixed portion 301011-2 is a frame fitting to the outer geometries of the bottom surface on one longitudinal end side of the vibrator 30102-2 and the three side surfaces adjacent to the bottom surface. The fixed portion 301012-2 is a frame fitting to the outer geometries of the bottom surface on the other longitudinal end side of the vibrator 30102-2 and the three side surfaces adjacent to the bottom surface. The fixed portion 301011-2 is positioned on one side surface side, in the short direction, of the vibrator 30102-1 fixed to the body portion 30101 as mention above, while the fixed portion 301012-2 is positioned on the other side surface side of the vibrator 30102-1 in the short direction. The thickness of the fixed portions 301011-2, 301012-2 is larger than that of the vibrator 30102-1, and the bottom surface sides at the opposite ends of the vibrator 30102-2 (the bottom surface side of the supporting portion 301026-2 at the opposite ends) are fitted in the frames of the fixed portion 301011-2 and the fixed portion 301012-2 respectively, thereby fixing the bottom surface side at the opposite ends of the vibrator 30102-2 to the plate face 30101*b* of the body portion 30101. The angle formed by the longitudinal direction of the vibrator 30102-1 and the longitudinal direction of the vibrator 30102-2 thus fixed is approximately 90°, with the center of the vibrator 30102-1 being positioned between the center of the vibrator 30102-2 and the plate face 30101*b* of the body portion 30101.

<Vibrator 30102-*i*>

The vibrator 30102-*i* (where i=1, 2) has the supporting portion 301026-*i*, the movable portion 301025-*i* which performs asymmetric vibration relative to the supporting portion 301026-*i*, the rod-like linking portion 30102*eb-i* connected or formed integrally with one longitudinal end of the movable portion 301025-*i* and extending in the longitudinal direction, and the linking portion 30102*ea-i* connected or formed integrally with the other longitudinal end of the movable portion 301025-*i* and extending in the longitudinal direction. The movable portion 301025-*i* is capable of asymmetric vibration relative to the supporting portion 301026-*i* along L1-i axis (the ith axis) passing through the linking portions 30102*ea-i*, 30102*eb-i*, while being supported by the supporting portion 301026-*i*. The directions of these asymmetric vibrations (the axis center direction of L1-i axis) are all substantially parallel to the plate face 30101*b* of the body portion 30101, and the angle formed by L1-1 axis and L1-2 axis is approximately 90°. Exemplary configurations of the vibrator 30102-*i* are shown below.

Figure 55A:
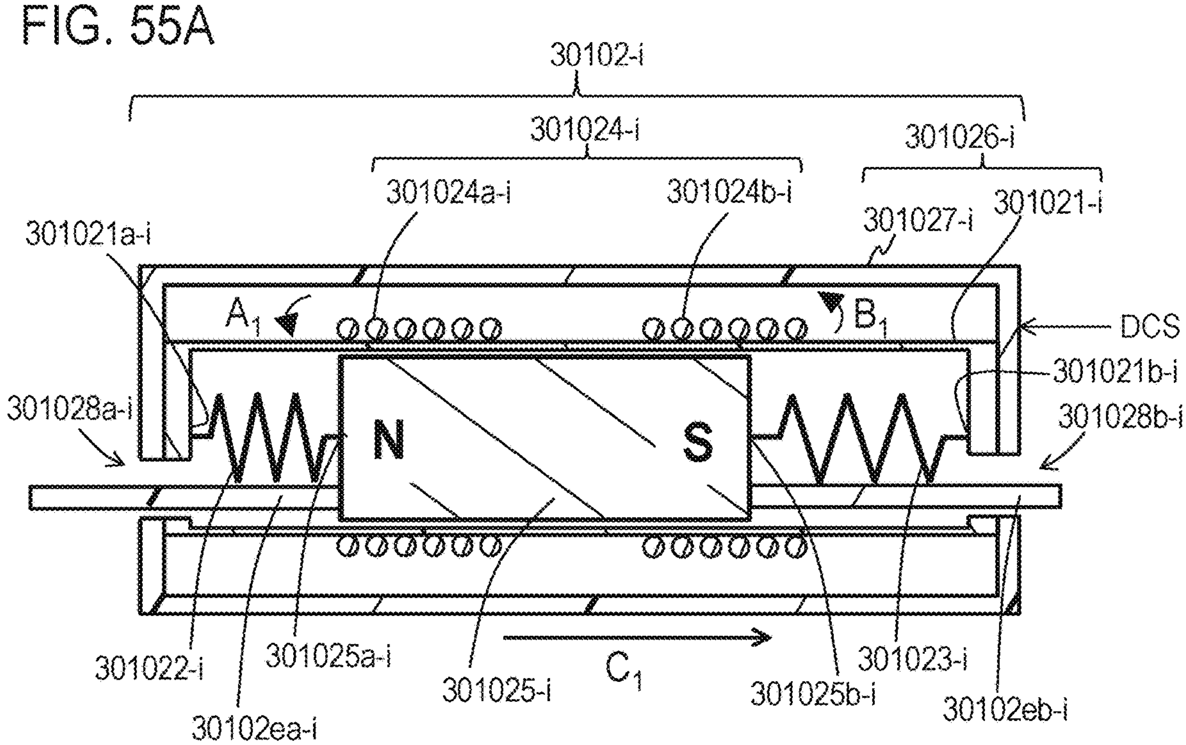
FIGS. 55A and 55B are conceptual diagrams illustrating a configuration of a vibrator according to the embodiment.
Figure 55B:
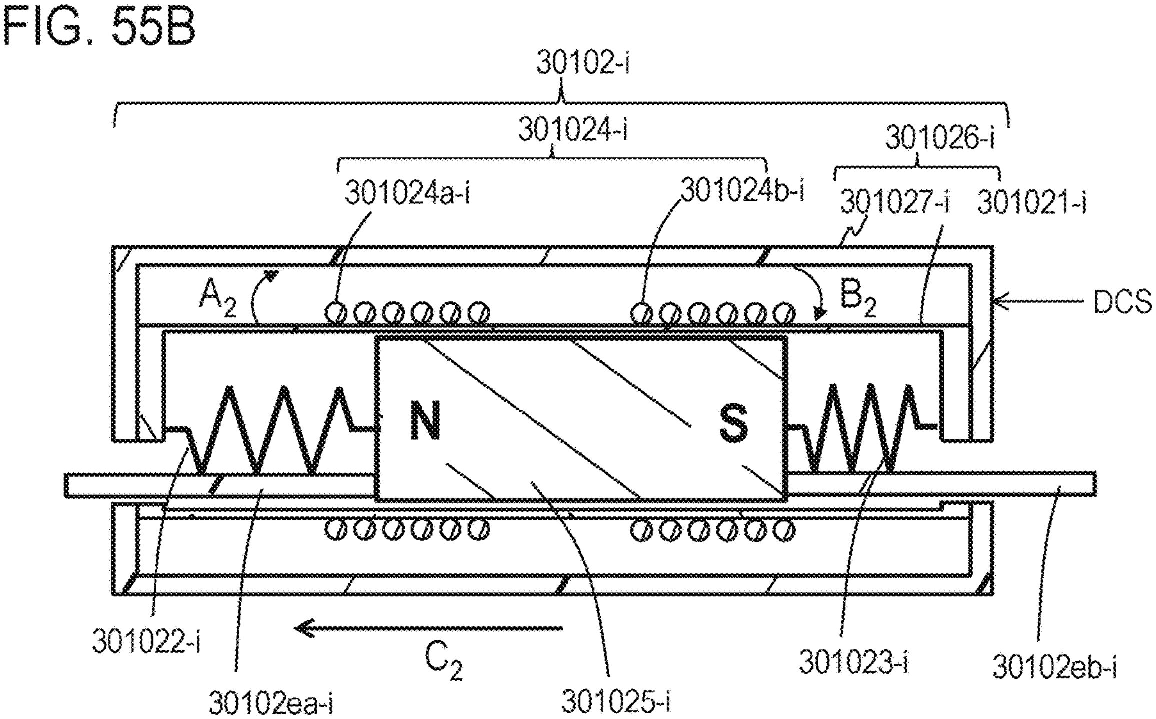

As illustrated in FIGS. 55A and 55B, the vibrator 30102-*i* is, for example, a linear actuator having the supporting portion 301026-*i* including a case 301027-*i* and a guide 301021-*i*, springs 301022-*i*, 301023-*i* (elastic bodies), a coil 301024-*i*, a movable portion 301025-*i* formed from a permanent magnet, and linking portions 30102*ea-i*, 30102*eb-i*. Both the case 301027-*i* and the guide 301021-*i* in this embodiment are hollow components with part of the opposite open ends of a tube (for example, a cylinder or a polyhedral cylinder) being closed. The guide 301021-*i* is smaller than the case 301027-*i* and is sized so that it can be accommodated inside the case 301027-*i*. The case 301027-*i*, the guide 301021-*i*, and the linking portions 30102*ea-i*, 30102*eb-i* are made of synthetic resin such as ABS resin, for example. The springs 301022-*i*, 301023-*i* are helical or leaf springs made of metal, for example. While the moduli of elasticity (spring constants) of the springs 301022-*i*, 301023-*i* are desirably the same, they may be different from each other. The movable portion 301025-*i* is a column-shaped permanent magnet, for example, with one end 301025*a-i* side in the longitudinal direction being the N-pole and another end 301025*b-i* side being the S-pole. The coil 301024-*i* is a string of enameled wire, for example, having a first wound portion 301024*a-i* and a second wound portion 301024*b-i*.

The movable portion 301025-*i* is accommodated inside the guide 301021-*i* and supported therein so as to be slidable in the longitudinal direction. Although details of such a supporting mechanism are not shown in the drawings, a straight rail along the longitudinal direction is provided on an inner wall surface of the guide 301021-*i* and a rail supporting portion that slidably supports the rail is provided on a side surface of the movable portion 301025-*i*, for example. On an inner wall surface 301021*a-i* of the guide 301021-*i* on one longitudinal side thereof, one end of the spring 301022-*i* is fixed (that is, one end of the spring 301022-*i* being supported by the guide 301021-*i*), and the other end of the spring 301022-*i* is fixed to an end 301025*a-i* of the movable portion 301025-*i* (that is, the end 301025*a-i* of the movable portion 301025-*i* being supported at the other end of the spring 301022-*i*). On an inner wall surface 301021*b-i* of the guide 301021-*i* on the other longitudinal side thereof, one end of the spring 301023-*i* is fixed (that is, one end of the spring 301023-*i* being supported by the guide 301021-*i*), and the other end of the spring 301023-*i* is fixed to an end 301025*b-i* of the movable portion 301025-*i* (that is, the end 301025*b-i* of the movable portion 301025-*i* being supported at the other end of the spring 301023-*i*).

On the peripheral side of the guide 301021-*i*, the coil 301024-*i* is wound. Here, the first wound portion 301024*a-i* is wound in $A_1$ direction (the direction from the farther side to the closer side) on the side of the end 301025*a-i* of the movable portion 301025-*i* (the N-pole side), whereas the second wound portion 301024*b-i* is wound in $B_1$ direction opposite to $A_1$ direction (the direction from the closer side to the farther side) on the side of the end 301025*b-i* (the S-pole side). That is, when viewed from the side of the end 301025*a-i* of the movable portion 301025-*i* (the N-pole side), the first wound portion 301024*a-i* is wound clockwise and the second wound portion 301024*b-i* is wound counterclockwise. Also, it is desirable that when the movable portion 301025-*i* is at rest and elastic forces from the springs 301022-*i*, 301023-*i* are balanced, the end 301025*a-i* side (the N-pole side) of the movable portion 301025-*i* is positioned in the area of the first wound portion 301024*a-i*, and the end 301025*b-i* side (the S-pole side) is positioned in the area of the second wound portion 301024*b-i*.

The guide 301021-*i*, the springs 301022-*i*, 301023-*i*, the coil 301024-*i*, and the movable portion 301025-*i* thus arranged are accommodated in the case 301027-*i*, and the guide 301021-*i* is fixed inside the case 301027-*i*. That is, the relative position of the case 301027-*i* to the guide 301021-*i* is fixed. Here, the longitudinal direction of the case 301027-*i* coincides with the longitudinal direction of the guide 301021-*i* and the longitudinal direction of the movable portion 301025-*i*.

A through hole 301028*a-i* is provided in the case 301027-*i* and on the inner wall surface 301021*a-i* side of the guide 301021-*i*, and a through hole 301028*b-i* is provided on the inner wall surface 301021*b-i* side. A rod-like linking portion 30102*ea-i* is inserted in the through hole 301028*a-i*, and a rod-like linking portion 30102*eb-i* is inserted in the through hole 301028*b-i*. One end side of the linking portion 30102*ea-i* is in contact with the end 301025*a-i* side of the movable portion 301025-*i*, and the other end side of the linking portion 30102*ea-i* is positioned outside the case 301027-*i*. One end side of the linking portion 30102*eb-i* is in contact with the end 301025*b-i* side of the movable portion 301025-*i* and the other end side of the linking portion 30102*eb-i* is positioned outside the case 301027-*i*. The one end side of the linking portion 30102*ea-i* may or may not be connected with the end 301025*a-i* side of the movable portion 301025-*i*. The one end side of the linking portion 30102*eb-i* may or may not be connected with the end 301025*b-i* side of the movable portion 301025-*i*. However, the linking portions 30102*ea-i*, 30102*eb-i* need to move along with the motion of the movable portion 301025-*i*. That is, the linking portions 30102*ea-i*, 30102*eb-i* have to move along with the movable portion 301025-*i*. As other alternatives, the one end side of the linking portion 30102*ea-i* may be integral with the end 301025*a-i* side of the movable portion 301025-*i*, or the one end side of the linking portion 30102*eb-i* may be integral with the end 301025*b-i* side of the movable portion 301025-*i*.

The coil 301024-*i* gives the movable portion 301025-*i* force corresponding to the current fed to it, which in turn causes the movable portion 301025-*i* to make periodical asymmetric vibration relative to the guide 301021-*i* (periodical translational reciprocating motion with asymmetry in the axis direction referenced to the guide 301021-*i*). More specifically, when a current is fed to the coil 301024-*i* in $A_1$ direction ($B_1$ direction), force in $C_1$ direction (the direction from the N-pole to the S-pole of the movable portion 301025-*i*; rightward) is applied to the movable portion 301025-*i* (FIG. 55A) due to the reaction of Lorentz force explained by the Fleming's left-hand rule. Conversely, when a current is fed to the coil 301024-*i* in $A_2$ direction ($B_2$ direction), force in $C_2$ direction (the direction from the S-pole to the N-pole of the movable portion 301025-*i*; leftward) is applied to the movable portion 301025-*i* (FIG. 55B). Here, $A_2$ direction is the opposite direction of $A_1$ direction. These actions give motion energy to the system composed of the movable portion 301025-*i* and the springs 301022-*i*, 301023-*i*. This can change the position and acceleration of the movable portion 301025-*i* with respect to the case 301027-*i* (the position and acceleration in the axis direction referenced to the guide 301021-*i*), and accordingly change the positions and accelerations of the linking portions 30102*ea-i*, 30102*eb-i* as well. That is, the movable portion 301025-*i* performs asymmetric vibration relative to the supporting portion 301026-*i* along L1-i axis while being supported by the supporting portion 301026-*i* and based on the driving control signal DCS supplied, along with which the linking portions 30102*ea-i*, 30102*eb-i* also make asymmetric vibration along L1-i axis.

Note that the configuration of the vibrator 30102-*i* is not limited to the one shown in FIGS. 55A and 55B. For example, it may be configured such that the first wound portion 301024*a-i* of the coil 301024-*i* is wound in $A_1$ direction on the end 301025*a-i* side of the movable portion 301025-*i* and the coil 301024-*i* is not wound on the end 301025*b-i* side. Conversely, it may be configured such that the second wound portion 301024*b-i* of the coil 301024-*i* is wound in $B_1$ direction on the end 301025*b-i* side and the coil 301024-*i* is not wound on the end 301025*a-i* side of the movable portion 301025-*i*. Alternatively, the first wound portion 301024*a-i* and the second wound portion 301024*b-i* may be separate coils from each other. That is, the first wound portion 301024*a-i* and the second wound portion 301024*b-i* may be configured such that they are not be electrically interconnected and that they are supplied with different electric signals than each other.

<Linking Portions 301041-*i*, 301042-*i*>

The linking portions 301041-*i*, 301042-*i* (where i=1, 2) are pillar-shaped components that are or can be considered to be a rigid body. The linking portions 301041-*i*, 301042-*i* are made of synthetic resin such as ABS resin, for example. The other end side of the linking portion 30102*ea-i* positioned outside the supporting portion 301026-*i* supports the side surface on the one end side of the linking portion 301042-*i*. The other end side of the linking portion 30102*eb-i* positioned outside the supporting portion 301026-*i* supports the side surface on one end side of the linking portion 301041-*i*. For example, the other end side of the linking portion 30102*ea-i* is fixed to or integral with the side surface on the one end side of the linking portion 301042-*i*, and the other end side of the linking portion 30102*eb-i* is fixed to or integral with the side surface on the one end side of the linking portion 301041-*i*. The linking portion 301041-*i* is positioned outwardly of one longitudinal end side of the vibrator 30102-*i*, and the linking portion 301042-*i* is positioned outwardly of the other longitudinal end side of the vibrator 30102-*i*. The linking portions 301041-*i*, 301042-*i* are substantially orthogonal to L1-i axis, and the linking portion 301041-*i* and the linking portion 301042-*i* are positioned substantially parallel to each other. In this embodiment, L1-i axis is substantially parallel to the plate face 30101*b* of the body portion 30101, the linking portions 301041-1, 301041-2, 301042-1, 301042-2 are substantially parallel to each other, and the linking portions 301041-1, 301041-2, 301042-1, 301042-2 are substantially perpendicular to the plate face 30101*b*.

<Leaf Spring Portions 301043-*i*, 301044-*i* and Fixed Portion 301045>

The leaf spring portion 301043-*i* and the leaf spring portion 301044-*i* are plate-like spring components that elastically deform. For example, the leaf spring portion 301043-*i* and the leaf spring portion 301044-*i* may be thin molded plates of synthetic resin, such as ABS resin. The fixed portion 301045 is a tubular (for example, cylindrical) component with an insertion hole 301045*e* therein. The fixed portion 301045 may be made of synthetic resin such as ABS resin, for example. The leaf spring portion 301043-*i* and the leaf spring portion 301044-*i*, and the fixed portion 301045 may be integrally molded. The leaf spring portion 301043-*i* and the leaf spring portion 301044-*i* (where i=1, 2) are arranged in the direction along L1-i axis (the ith axis), with the fixed portion 301045 being positioned between the leaf spring portion 301043-*i* and the leaf spring portion 301044-*i*. For example, the leaf spring portion 301043-*i* and the leaf spring portion 301044-*i* are positioned along a plane including L1-i axis, and they are positioned along a straight line substantially parallel to L1-i axis. The plane including L1-1 axis and a plane including L1-2 axis are substantially orthogonal to each other, with the fixed portion 301045 being positioned at a position where these planes intersect. The side surface of the linking portion 301041-1 on the other end side (one end of the first movable mechanism) supports one end of the leaf spring portion 301043-1 (the first leaf spring portion), and the other end of the leaf spring portion 301043-1 supports the fixed portion 301045. The side surface of the linking portion 301042-1 on the other end side (the other end of the first movable mechanism) supports one end of the leaf spring portion 301044-1 (the second leaf spring portion), and the other end of the leaf spring portion 301044-1 supports the fixed portion 301045. The side surface of the linking portion 301041-2 on the other end side (one end of the second movable mechanism) supports one end of the leaf spring portion 301043-2 (the third leaf spring portion), and the other end of the leaf spring portion 301043-2 supports the fixed portion 301045. The side surface of the linking portion 301042-2 on the other end side (the other end of the second movable mechanism) supports one end of the leaf spring portion 301044-2 (the fourth leaf spring portion), and the other end of the leaf spring portion 301044-2 supports the fixed portion 301045. For example, the side surface of the linking portion 301041-1 on the other end side is fixed to or integral with one end of the leaf spring portion 301043-1, and the other end of the leaf spring portion 301043-1 is fixed to or integral with the fixed portion 301045. For example, the side surface of the linking portion 301042-1 on the other end side is fixed to or integral with one end of the leaf spring portion 301044-1, and the other end of the leaf spring portion 301044-1 is fixed to or integral with the fixed portion 301045. For example, the side surface of the linking portion 301041-2 on the other end side is fixed to or integral with one end of the leaf spring portion 301043-2, and the other end of the leaf spring portion 301043-2 is integral with the fixed portion 301045. For example, the side surface of the linking portion 301042-2 on the other end side is fixed to or integral with one end of the leaf spring portion 301044-2, and the other end of the leaf spring portion 301044-2 is fixed to or integral with the fixed portion 301045. The other ends of the leaf spring portions 301043-*i*, 301044-*i* are positioned between one end of the leaf spring portion 301043-*i* and one end of the leaf spring portion 301044-*i*. As will be described later, the contact portion 30103 is fixed to the fixed portion 301045 supported at the other ends of the leaf spring portions 301043-*i*, 301044-*i*. The other ends of the leaf spring portions 301043-*i*, 301044-*i* thereby support the contact portion 30103 via the fixed portion 301045.

<Contact Portion 30103 and Case 30105>

The contact portion 30103 and the case 30105 are components that are or can be considered to be rigid bodies, being made of synthetic resin such as ABS resin, for example. The contact portion 30103 has a disk portion 30103*a*, which is a substantially disk-shaped component, and a lug 301031 on the side of one plate face of the disk portion 30103*a*. The case 30105 is a cup-shaped component having the through hole 301051 therein. The case 30105 accommodates a mechanism including the fixed portions 301011-1, 301011-2, 301012-2, the vibrators 30102-1, 30102-2, the linking portions 301041-1, 301042-1, 301041-2, 301042-2, the leaf spring portions 301043-1, 301044-1, 301043-2, 301044-2, and the fixed portion 301045, configured as described above, and is fixed to the body portion 30101. The disk portion 30103*a* of the contact portion 30103 is positioned outside the case 30105, with the lug 301031 inserted in the through hole 301051 of the case 30105 and inserted into the insertion hole 301045*e* of the fixed portion 301045 positioned inside the case 30105. The contact portion 30103 is thereby fixed to the fixed portion 301045.

<Operation>

Using FIGS. 56A to 57B, the operation of the pseudo force sense generation apparatus 3001 will be described. In FIGS. 56A to 57B, the case 30105 and the contact portion 30103 are omitted in order to clarify internal movements associated with the operation, and the position of the contact portion 30103 is represented by a two-dot chain line. In practice, the pseudo force sense generation apparatus 3001 with the case 30105 and the contact portion 30103 mounted thereon (FIGS. 51 to 53) performs the following operations.

The user grips the pseudo force sense generation apparatus 3001 in a state in which the user's skin or mucous membrane is in contact with the contact portion 30103 or cloth and the like is placed between the skin or mucous membrane and the contact portion 30103.

Figure 56A:
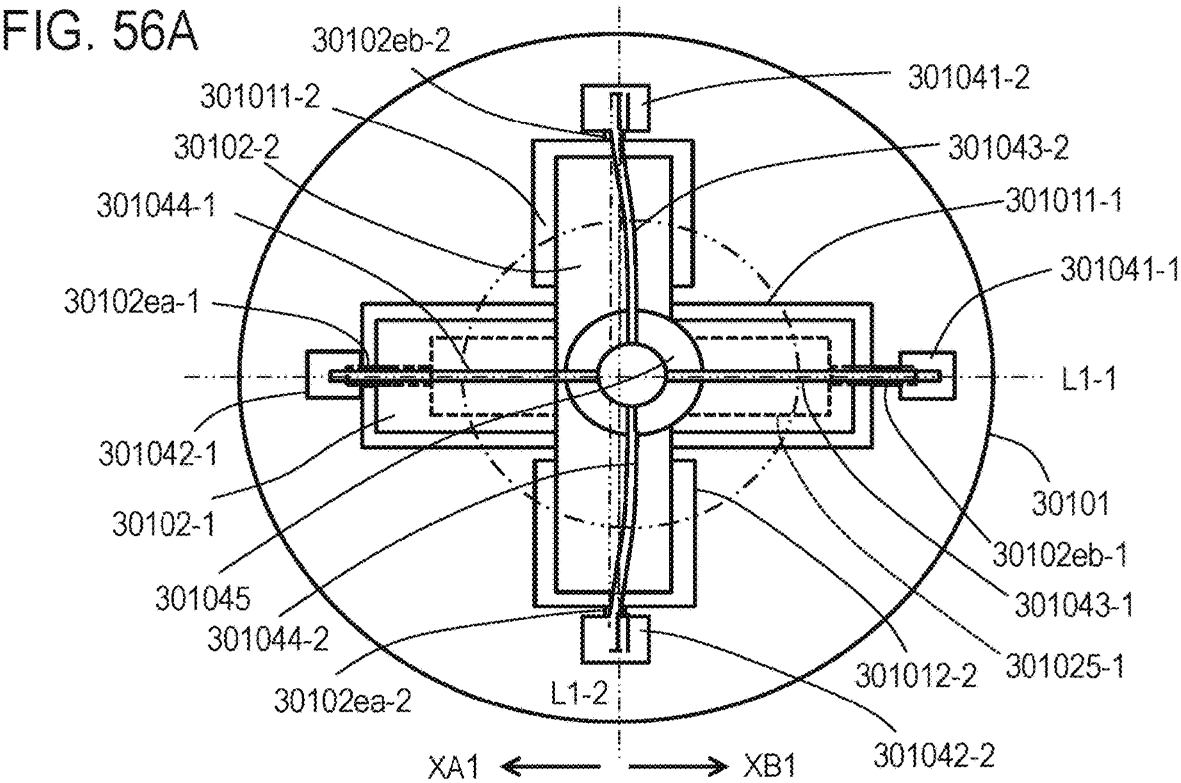
FIGS. 56A and 56B are diagrams for illustrating the operation of the pseudo force sense generation apparatus according to the embodiment.
Figure 56B:
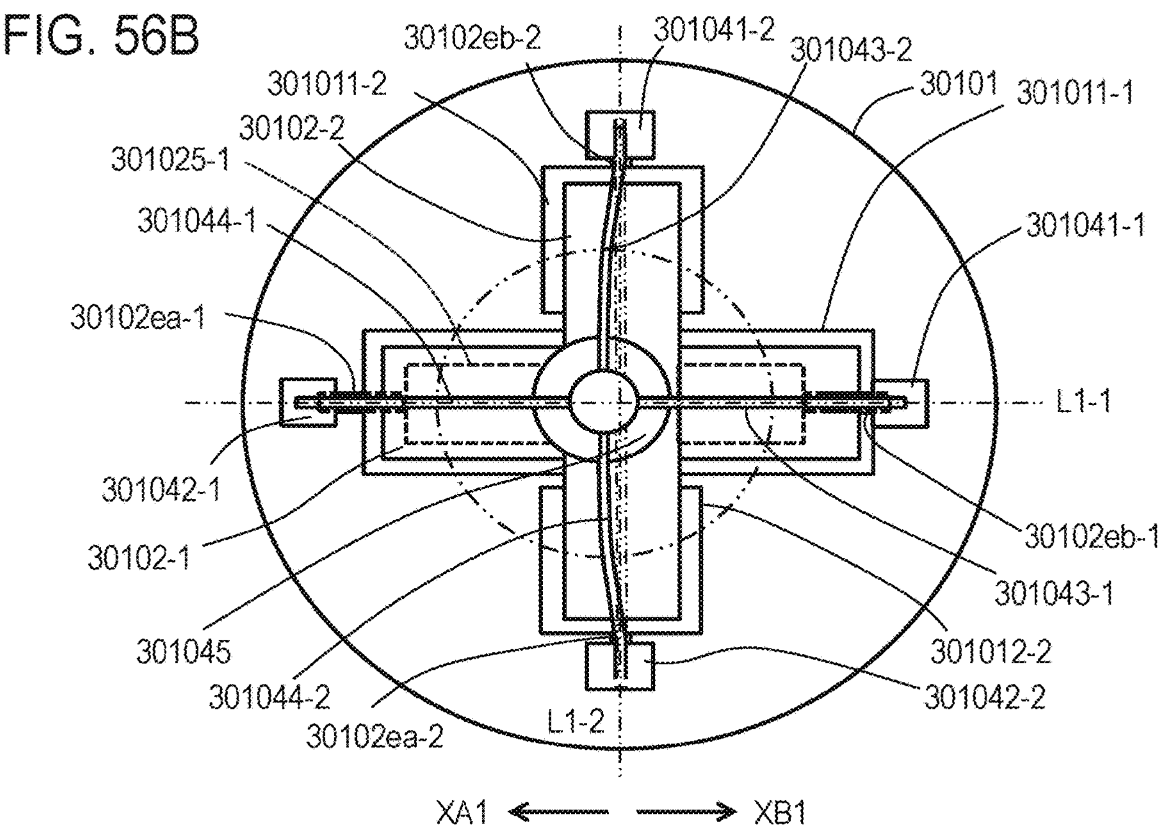

When the vibrator 30102-1 is driven, the movable portion 301025-1 and the linking portions 30102*ea*-1, 30102*eb*-1, 301041-1, 301042-1 (the first movable mechanism) asymmetrically vibrate in XA1-XB1 direction along L1-1 axis (FIGS. 56A and 56B). In response to it, the leaf spring portions 301043-1, 301044-1 (the first leaf spring mechanism) supported by the linking portions 301041-1, 301042-1 are given force in the direction along L1-1 axis. This causes the leaf spring portions 301043-1, 301044-1 to asymmetrically vibrate in XA1-XB1 direction along L1-1 axis with the movable portions 301025-1 and the linking portions 30102*ea*-1, 30102*eb*-1, 301041-1, 301042-1. Upon receiving the force in the direction along L1-1 axis from the linking portions 301041-1, 301042-1, the leaf spring portions 301043-1, 301044-1 give the force in the direction along L1-1 axis to the fixed portion 301045 and the contact portion 30103. This causes the fixed portion 301045 and the contact portion 30103 to asymmetrically vibrate in XA1-XB1 direction, giving force based on the asymmetric vibration to the skin or mucous membrane that is in direct or indirect contact with the contact portion 30103. Meanwhile, the leaf spring portions 301043-2, 301044-2 (the second leaf spring mechanism) are also given force in the direction along L1-1 axis through the fixed portion 301045 so that the leaf spring portions 301043-2, 301044-2 elastically deform (bend) in the direction along L1-1 axis. That is, when force in XB1 direction along L1-1 axis from the linking portion 301042-1 toward the linking portion 301041-1 is given to the leaf spring portions 301043-2, 301044-2, the leaf spring portions 301043-2, 301044-2 elastically deform in this XB1 direction (FIG. 56A). Conversely, when force in XA1 direction along L1-1 axis from the linking portion 301041-1 toward the linking portion 301042-1 is given to the leaf spring portions 301043-2, 301044-2, the leaf spring portions 301043-2, 301044-2 elastically deform in this XA1 direction (FIG. 56B). This can suppress hindrance to the asymmetric vibration of the contact portion 30103 along L1-1 axis by the vibrator 30102-2, allowing efficient presentation of pseudo force sense.

Figure 57A:
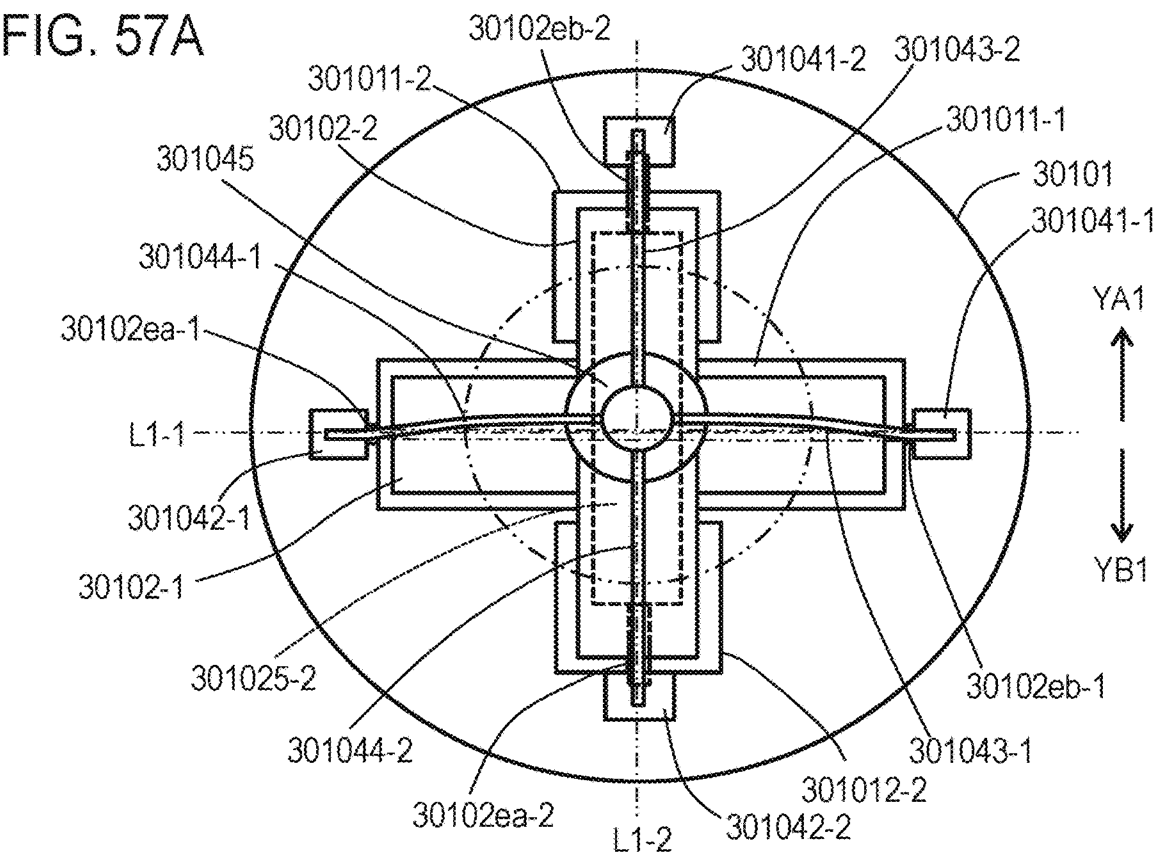
FIGS. 57A and 57B are diagrams for illustrating the operation of the pseudo force sense generation apparatus according to the embodiment.
Figure 57B:
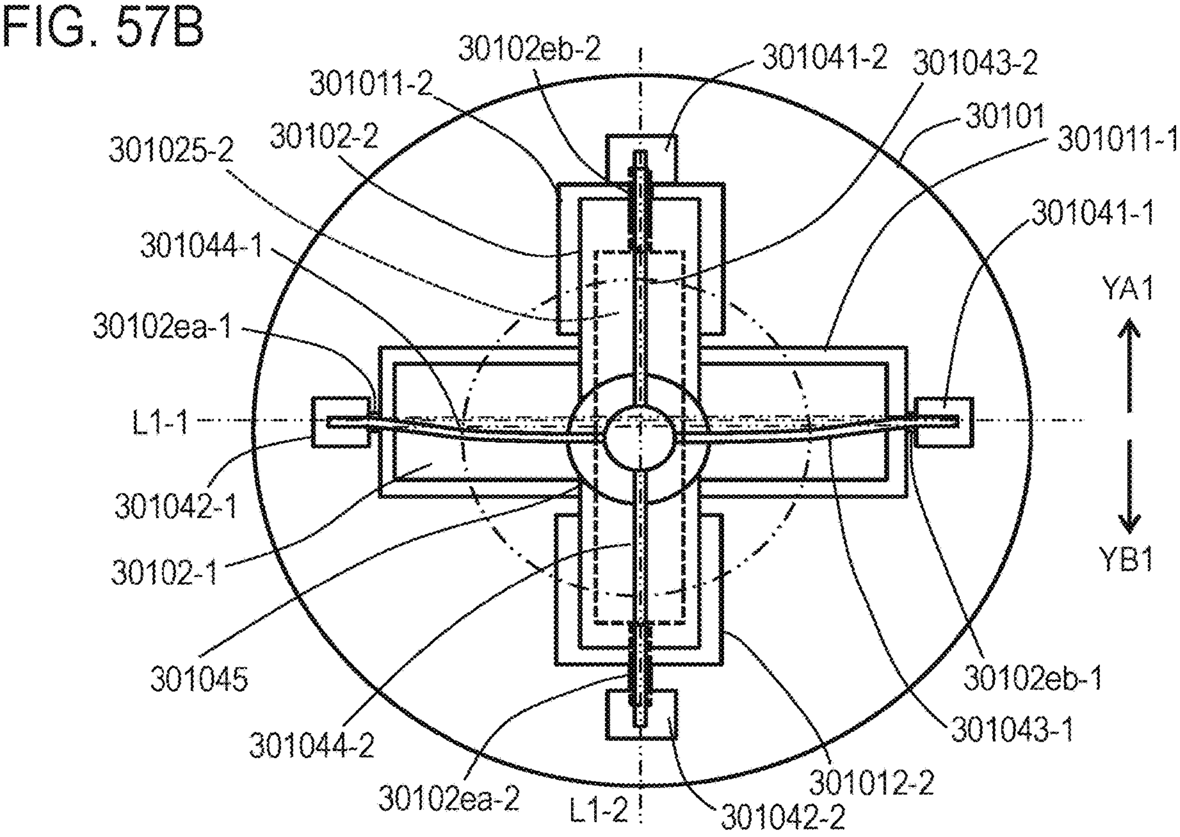
Figure 58:
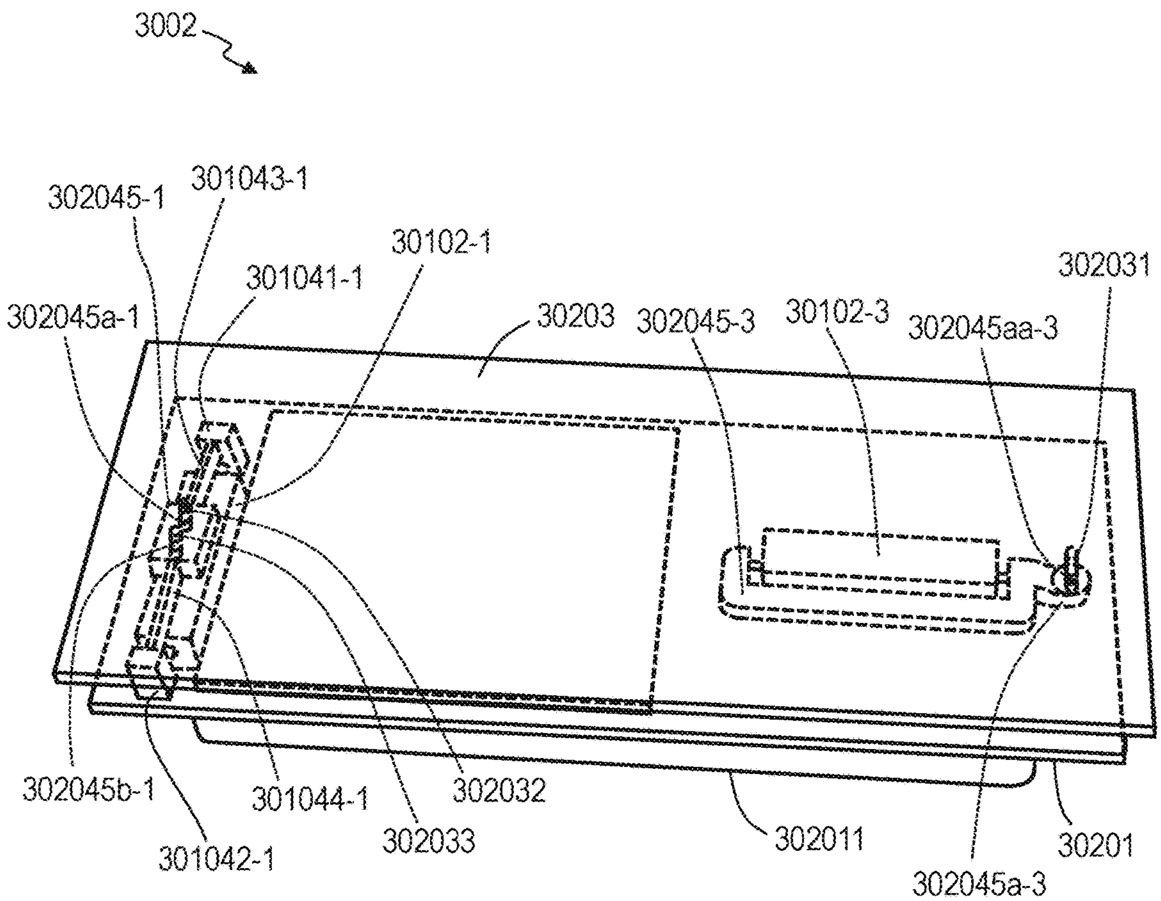
FIG. 58 is a transparent perspective view illustrating a configuration of a pseudo force sense generation apparatus according to an embodiment.
Figure 59:
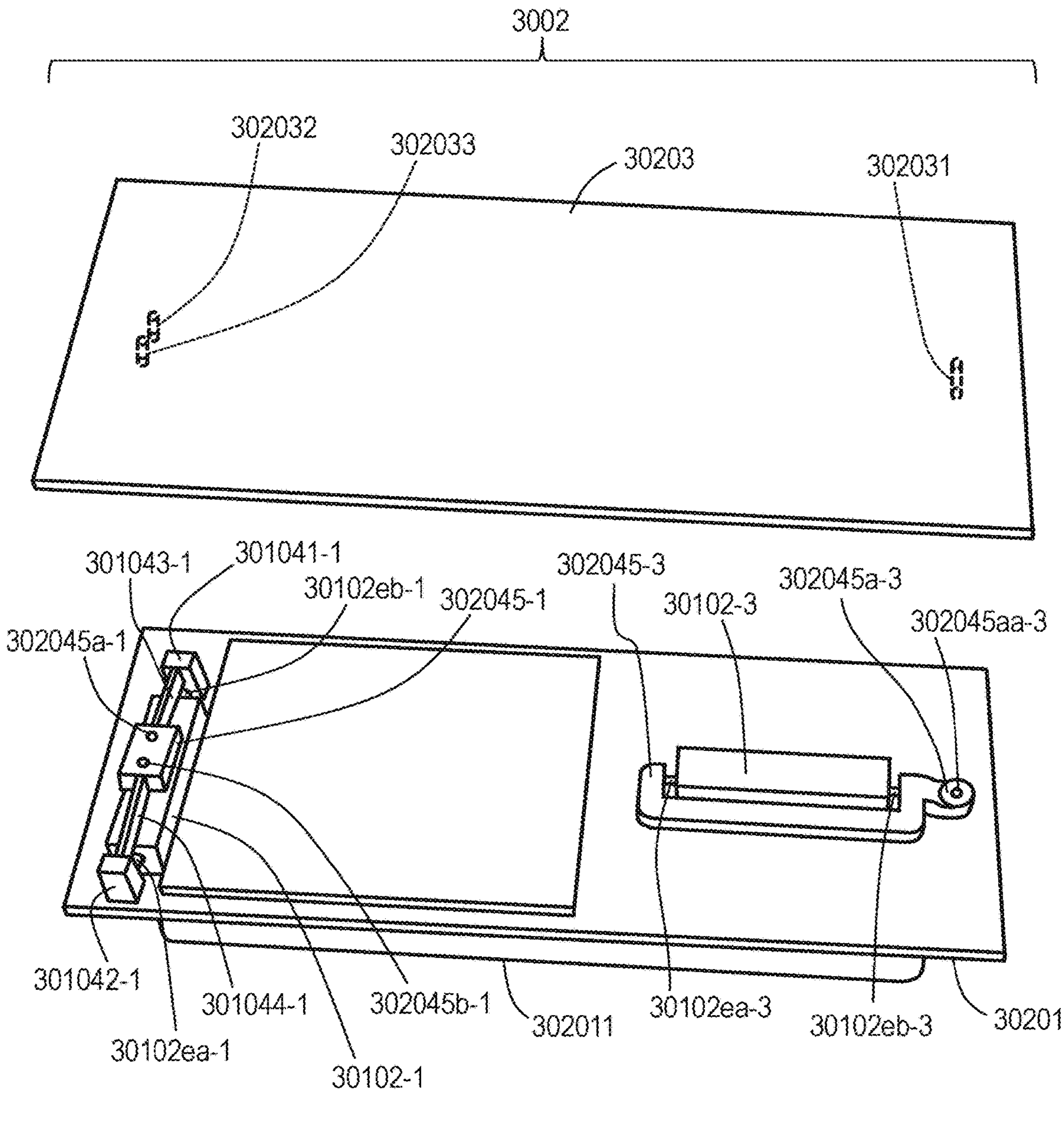
FIG. 59 is an exploded view illustrating the configuration of the pseudo force sense generation apparatus according to the embodiment.
Figure 60A:
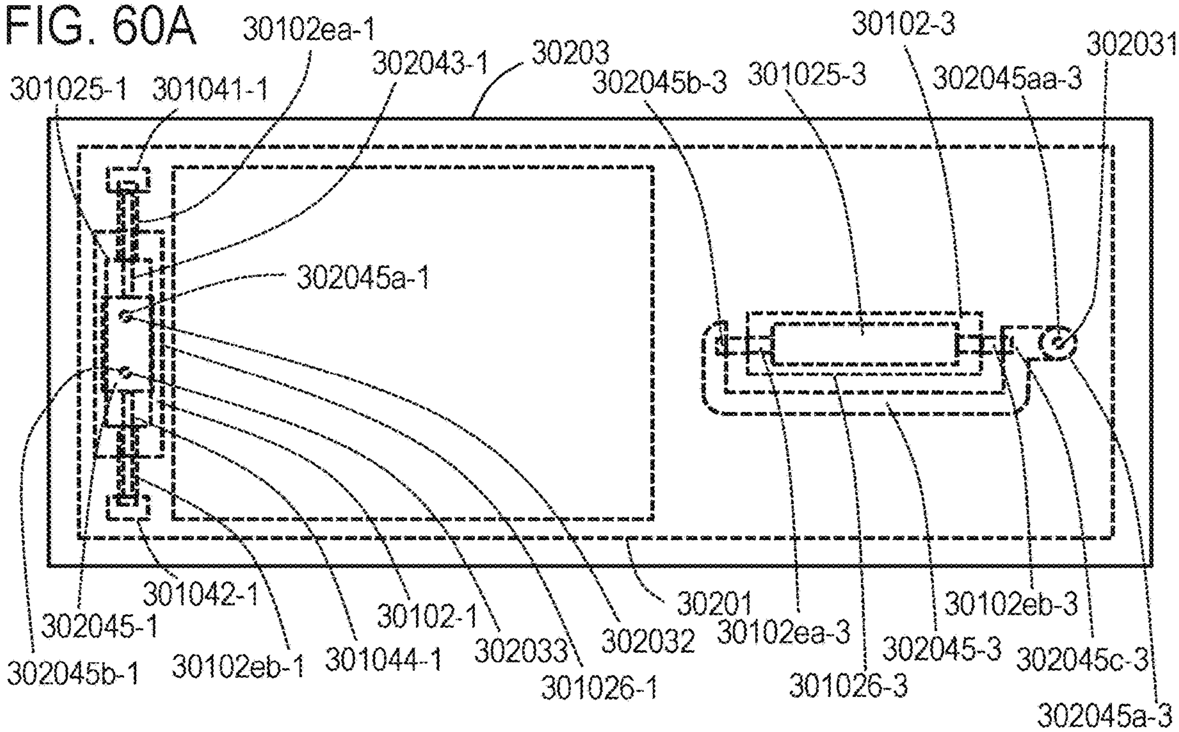
FIG. 60A is a transparent plan view illustrating the configuration of the pseudo force sense generation apparatus according to the embodiment.
Figure 60B:
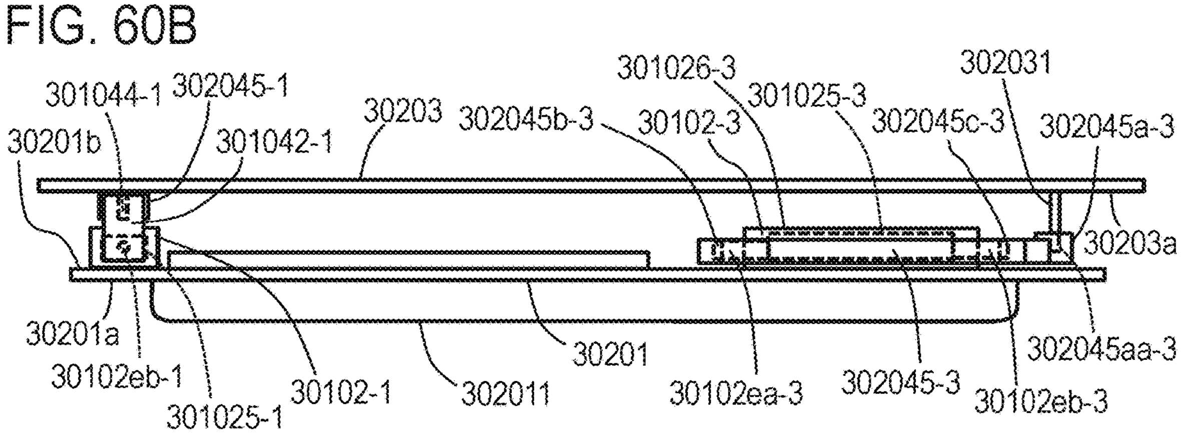
FIG. 60B is a transparent front view illustrating the configuration of the pseudo force sense generation apparatus according to the embodiment.
Figure 60C:
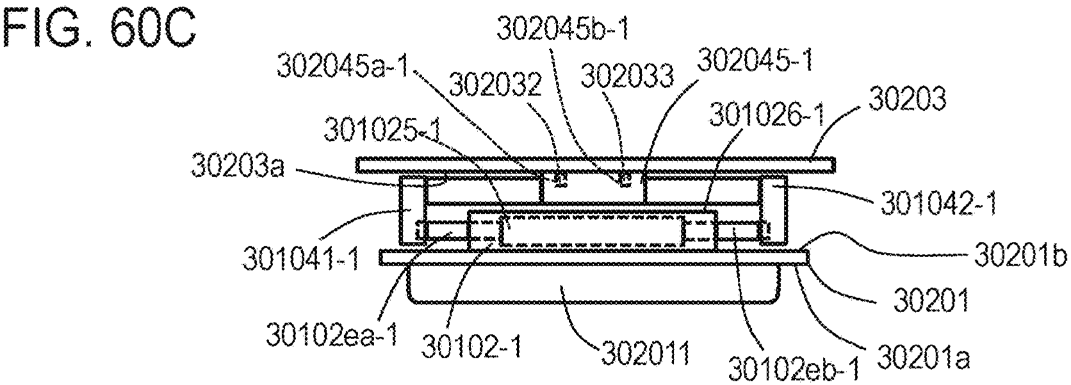
FIG. 60C is a transparent left side view illustrating the configuration of the pseudo force sense generation apparatus according to the embodiment.

Meanwhile, when the vibrator 30102-2 is driven, the movable portion 301025-2 and the linking portions 30102*ea*-2, 30102*eb*-2, 301041-2, 301042-2 (the second movable mechanism) asymmetrically vibrate in YA1-YB1 direction along L1-2 axis (FIGS. 57A and 57B). In response to it, the leaf spring portions 301043-2, 301044-2 (the second leaf spring mechanism) supported by the linking portions 301041-2, 301042-2 are given force in the direction along L1-2 axis. This causes the leaf spring portions 301043-2, 301044-2 to asymmetrically vibrate in YA1-YB1 direction along L1-2 axis with the movable portion 301025-2 and the linking portions 30102*ea*-2, 30102*eb*-2, 301041-2, 301042-2. Upon receiving the force in the direction along L1-2 axis from the linking portions 301041-2, 301042-2, the leaf spring portions 301043-2, 301044-2 give force in the direction along L1-2 axis to the fixed portion 301045 and the contact portion 30103. This causes the fixed portion 301045 and the contact portion 30103 to asymmetrically vibrate in YA1-YB1 direction, giving force based on the asymmetric vibration to the skin or mucous membrane that is in direct or indirect contact with the contact portion 30103. Meanwhile, the leaf spring portions 301043-1, 301044-1 (the first leaf spring mechanism) are also given force in the direction along L1-2 to axis through the fixed portion 301045 so that the leaf spring portions 301043-1, 301044-1 elastically deform (bend) in the direction along L1-2 axis. That is, when force in YA1 direction along L1-2 axis from the linking portion 301042-2 toward the linking portion 301041-2 is given to the leaf spring portions 301043-1, 301044-1, the leaf spring portions 301043-1, 301044-1 elastically deform in this YA1 direction (FIG. 57A). Conversely, when force in YB1 direction along L1-2 axis from the linking portion 301041-2 toward the linking portion 301042-2 is given to the leaf spring portions 301043-1, 301044-1, the leaf spring portions 301043-1, 301044-1 elastically deform in this YB1 direction (FIG. 57B). This can suppress hindrance to the asymmetric vibration of the contact portion 30103 along L1-2 axis by the vibrator 30102-1, allowing efficient presentation of pseudo force sense.

The same applies to the simultaneous driving of the vibrator 30102-1 and the vibrator 30102-2. In this case, upon receiving force in the direction along L1-1 axis from the linking portions 301041-1, 301042-1, the leaf spring portions 301043-1, 301044-1 give force in the direction along L1-1 axis to the fixed portion 301045 and the contact portion 30103; while upon receiving force in the direction along L1-2 axis from the linking portions 301041-2, 301042-2, the leaf spring portions 301043-2, 301044-2 give force in the direction along L1-2 axis to the fixed portion 301045 and the contact portion 30103. This causes the contact portion 30103 to make asymmetric vibration, giving force based on the asymmetric vibration to the skin or mucous membrane that is in direct or indirect contact with the contact portion 30103. Meanwhile, upon receiving the force in the direction along L1-1 axis from the linking portions 301041-1, 301042-1, the leaf spring portions 301043-2, 301044-2 elastically deform in the direction along L1-1 axis; while upon receiving force in the direction along L1-2 axis from the linking portions 301041-2, 301042-2, the leaf spring portions 301043-1, 301044-1 elastically deform in the direction along L1-2 axis. This can suppress hindrance to the asymmetric vibration of the contact portion 30103 along L1-1 axis by the vibrator 30102-2 as well as hindrance to the asymmetric vibration of the contact portion 30103 along L1-2 axis by the vibrator 30102-1, allowing efficient presentation of pseudo force sense in a certain direction.

Seventeenth Embodiment

A seventeenth embodiment will be described. In the following, matters already described are denoted with the same reference characters and are not described in detail again.

<Configuration>

Figure 61A:
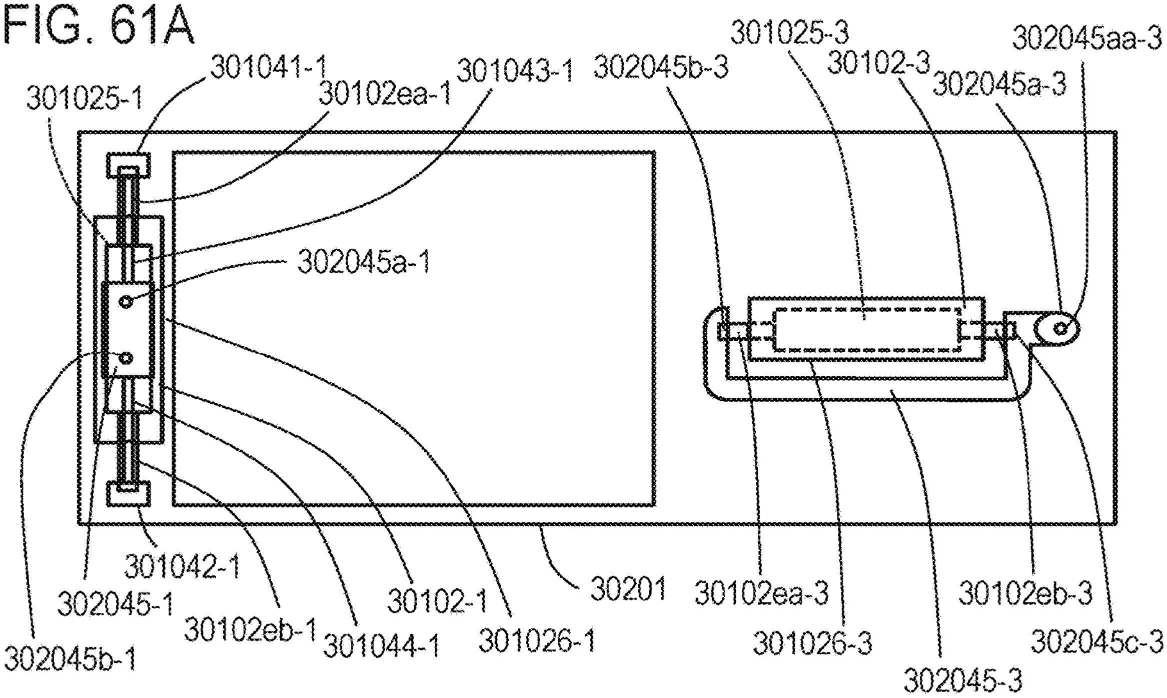
FIG. 61A is a transparent plan view illustrating an internal configuration of the pseudo force sense generation apparatus according to the embodiment.
Figure 61B:
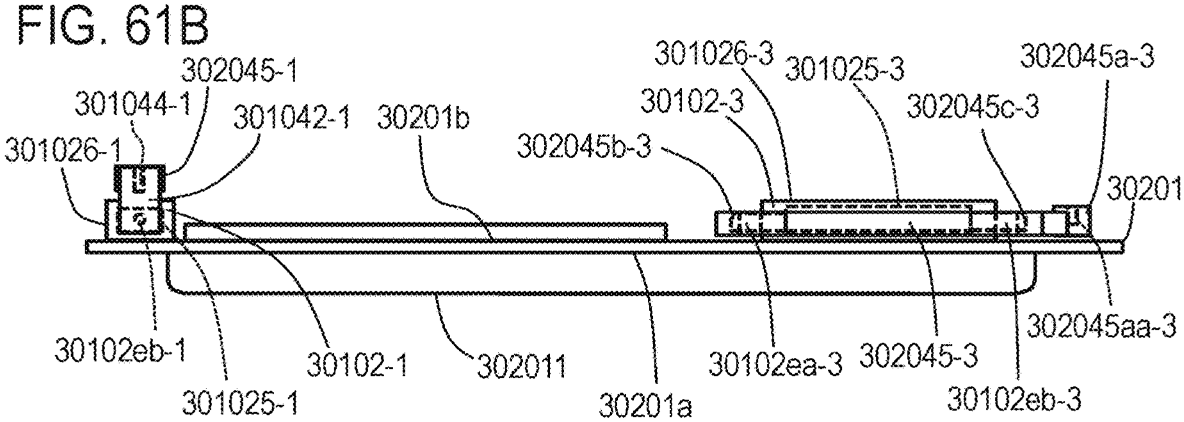
FIG. 61B is a transparent front view illustrating the internal configuration of the pseudo force sense generation apparatus according to the embodiment.
Figure 61C:
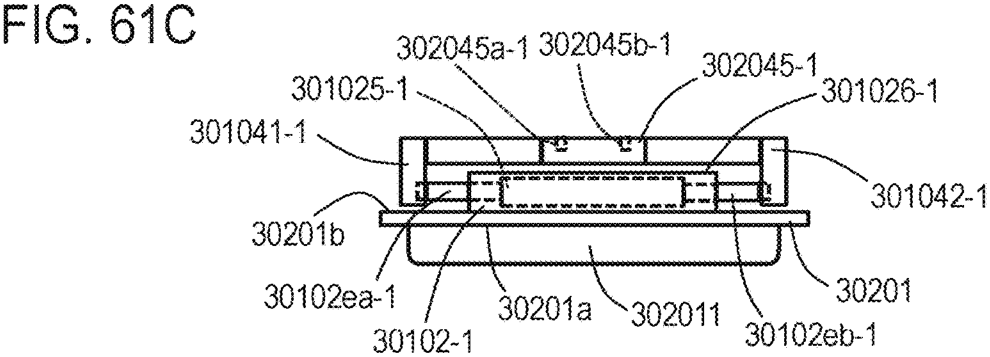
FIG. 61C is a transparent left side view illustrating the internal configuration of the pseudo force sense generation apparatus according to the embodiment.

Using FIGS. 58, 59, 60A to 60C, and 61A to 61C, the configuration of a pseudo force sense generation apparatus 3002 in this embodiment is described. In FIGS. 61A to 61C, a contact portion 30203 is omitted. As illustrated in FIGS. 58, 59, 60A to 60C, and 61A to 61C, the pseudo force sense generation apparatus 3002 in this embodiment has a body portion 30201, an electronic device 302011, a vibrator 30102-*i* (where i=1, 3), leaf spring portions 301043-1, 301044-1, linking portions 301041-1, 301042-1, a fixed portion 302045-1, a linking portion 302045-3, and a contact portion 30203. The vibrator 30102-*i* (where i=1, 3) has a supporting portion 301026-*i*, a movable portion 301025-*i*, a linking portion 30102*ea-i*, and a linking portion 30102*eb-i*.

A mechanism including the body portion 30201, the electronic device 302011, and the supporting portions 301026-1, 301026-3 (for example, a mechanism composed of them) corresponds to the "base mechanism". A mechanism including the movable portion 301025-*i*, the linking portions 30102*ea-i*, 30102*eb-i* (where i=1, 3), the leaf spring portions 301043-1, 301044-1, the fixed portion 302045-1, the linking portion 302045-3, and the contact portion 30203 (for example, a mechanism composed of them) corresponds to the "contact mechanism". The "contact mechanism" performs periodical asymmetric motion relative to the "base mechanism" and gives force based on the asymmetric motion to the skin or mucous membrane with which the contact mechanism is in direct or indirect contact, thereby presenting pseudo force sense. A mechanism including the movable portion 301025-1 and the linking portions 30102*ea*-1, 30102*eb*-1, 301041-1, 301042-1 (for example, a mechanism composed of them) corresponds to a "first movable mechanism". A mechanism including the movable portion 301025-3, the linking portions 30102*ea*-3, 30102*eb*-3, and the linking portion 302045-3 (for example, a mechanism composed of them) corresponds to a "third movable mechanism". A mechanism including the leaf spring portions 301043-1, 301044-1 (for example, a mechanism composed of them) corresponds to a "first leaf spring mechanism". The leaf spring portion 301043-1 corresponds to a "first leaf spring portion" and the leaf spring portion 301044-1 corresponds to a "second leaf spring portion".

<Body Portion 30201 and Electronic Device 302011>

The body portion 30201 is a plate-like component that is or can be considered to be a rigid body. For example, the body portion 30201 is made of synthetic resin. An example of the body portion 30201 is an electronic circuit board (for example, a circuit board of a smartphone terminal device) with electronic components mounted thereon. On one plate face 30201*a* side of the body portion 30201, the electronic device 302011 is fixed. An example of the electronic device 302011 is a power supply device containing a battery. On the other plate face 30201*b* side of the body portion 30201, the bottom surface side of the vibrator 30102-1 (the bottom surface side of the supporting portion 301026-1) and the bottom surface side of the vibrator 30102-3 (the bottom surface side of the supporting portion 301026-3) are fixed. The angle formed by the longitudinal direction of the vibrator 30102-1 and the longitudinal direction of the vibrator 30102-3, both fixed, is approximately 90°. The longitudinal direction of the vibrator 30102-1 is positioned along one side of the body portion 30201, while the longitudinal direction of the vibrator 30102-3 is substantially orthogonal to that side, with the central portion of the vibrator 30102-1 being positioned at a position on an extension of the vibrator 30102-3 in the longitudinal direction.

<Vibrator 30102-*i*>

The vibrator 30102-*i* (where i=1, 3) has the supporting portion 301026-*i*, the movable portion 301025-*i* which performs asymmetric vibration relative to the supporting portion 301026-*i*, the rod-like linking portion 30102*eb*-*i* connected or formed integrally with one longitudinal end of the movable portion 301025-*i* and extending in the longitudinal direction, and the linking portion 30102*ea*-*i* connected or formed integrally with the other longitudinal end of the movable portion 301025-*i* and extending in the longitudinal direction. The movable portion 301025-*i* is capable of asymmetric vibration relative to the supporting portion 301026-*i* along L2-i axis (the ith axis) passing through the linking portions 30102*ea*-*i*, 30102*eb*-*i*, while being supported by the supporting portion 301026-*i*. The directions of these asymmetric vibrations (the axis center direction of L2-i axis) are all substantially parallel to the plate face 30201*b* of the body portion 30201, and the angle formed by L2-1 axis and L2-2 axis is approximately 90°. Exemplary configurations of the vibrator 30102-*i* are as described in the sixteenth embodiment.

<Linking Portions 301041-1, 301042-1>

The configuration of the linking portions 301041-1, 301042-1 is the same as the sixteenth embodiment.

<Leaf Spring Portions 301043-1, 301044-1 and Fixed Portion 302045-1>

The configuration of the leaf spring portions 301043-1, 301044-1 is the same as the sixteenth embodiment. However, the other ends of the leaf spring portions 301043-1, 301044-1 support the fixed portion 302045-1 rather than supporting the fixed portion 301045. The fixed portion 302045-1 is a plate-like component with insertion holes 302045*a*-1, 302045*b*-1 therein. The fixed portion 302045-1 may be made of synthetic resin such as ABS resin, for example. The leaf spring portion 301043-*i* and leaf spring portion 301044-*i*, and the fixed portion 302045-1 may be integrally molded. The leaf spring portion 301043-1 and the leaf spring portion 301044-1 are arranged in the direction along L2-1 axis (the first axis), with the fixed portion 302045-1 being positioned between the leaf spring portion 301043-1 and the leaf spring portion 301044-1. For example, the leaf spring portion 301043-1 and the leaf spring portion 301044-1 are positioned along a plane substantially orthogonal to L2-2 axis and including L2-1 axis, and they are positioned along a straight line substantially parallel to L2-1 axis. The side surface of the linking portion 301041-1 on the other end side (one end of the first movable mechanism) supports one end of the leaf spring portion 301043-1 (the first leaf spring portion), and the other end of the leaf spring portion 301043-1 supports the fixed portion 302045-1. The side surface of the linking portion 301042-1 on the other end side (the other end of the first movable mechanism) supports one end of the leaf spring portion 301044-1 (the second leaf spring portion), and the other end of the leaf spring portion 301044-1 supports the fixed portion 302045-1. For example, the side surface of the linking portion 301041-1 on the other end side is fixed to or integral with one end of the leaf spring portion 301043-1, and the other end of the leaf spring portion 301043-1 is fixed to or integral with the fixed portion 302045-1. For example, the side surface of the linking portion 301042-1 on the other end side is fixed to or integral with one end of the leaf spring portion 301044-1, and the other end of the leaf spring portion 301044-1 is fixed to or integral with the fixed portion 302045-1. The other ends of the leaf spring portions 301043-1, 301044-1 are positioned between one end of the leaf spring portion 301043-1 and one end of the leaf spring portion 301044-1. As will be described later, the contact portion 30203 is fixed to the fixed portion 302045-1 supported at the other ends of the leaf spring portions 301043-1, 301044-1. The other ends of the leaf spring portions 301043-1, 301044-1 thereby support the contact portion 30203 via the fixed portion 302045-1.

<Linking Portion 302045-3>

The linking portion 302045-3 is a substantially G-shaped component that is or can be considered to be a rigid body. For example, the linking portion 302045-3 is made of synthetic resin such as ABS resin. The other end side of the linking portion 30102*ea*-3 positioned outside the supporting portion 301026-3 of the vibrator 30102-3 supports one end 302045*b*-3 of the linking portion 302045-3. The other end side of the linking portion 30102*eb*-3 positioned outside the supporting portion 301026-3 supports another end 302045*c*-3 of the linking portion 302045-3. For example, the other end side of the linking portion 30102*ea*-3 is fixed to or integral with one end 302045*b*-3 of the linking portion 302045-3, and the other end side of the linking portion 30102*eb*-3 is fixed to or integral with the other end 302045*c*-3 of the linking portion 302045-3. In this embodiment, one end 302045*b*-3 of the linking portion 302045-3 is positioned between the vibrator 30102-1 and the other end 302045*c*-3 of the linking portion 302045-3. The one end 302045*b*-3 and the other end 302045*c*-3 of the linking portion 302045-3 and the axis center of the linking portions 30102*ea*-3, 30102*eb*-3 are positioned along L2-2 axis (the second axis). On the other end 302045*c*-3 side of the linking portion 302045-3, a supporting portion 302045*a*-3 with an insertion hole 302045*aa*-3 therein is provided. The angle formed by the axis center of the central axis of the insertion hole 302045*aa*-3 and L2-1 axis and the angle formed by the axis center of the central axis of the insertion hole 302045*aa*-3 and L2-2 axis are both approximately 90°. When the vibrator 30102-3 is driven, the linking portion 302045-3 performs asymmetric vibration along L2-2 axis (the second axis) relative to the body portion 30201.

<Contact Portion 30203>

The contact portion 30203 is a plate-like component that is or can be considered to be a rigid body. For example, the contact portion 30203 is made of synthetic resin such as ABS resin. On one plate face 30203*a* side of the contact portion 30203, lugs 302032, 302033 and a column-shaped rotating shaft 302031 are provided. The contact portion 30203 is positioned such that its plate face 30203*a* side faces the plate face 30201*b* side of the body portion 30201, with the lugs 302032, 302033 being inserted in the insertion holes 302045*a*-1, 302045*b*-1 of the fixed portion 302045-1 and the rotating shaft 302031 being inserted in the insertion hole 302045*aa*-3 of the supporting portion 302045*a*-3. The lugs 302032, 302033 are fixed to the insertion holes 302045*a*-1, 302045*b*-1 and the rotating shaft 302031 is rotatably supported in the insertion hole 302045*aa*-3. The contact portion

30203 is thereby rotatably supported by the supporting portion 302045a-3 of the linking portion 302045-3 (a part of the third movable mechanism) and is capable of rotation about the rotating shaft 302031 substantially orthogonal to L2-1 axis (the first axis). The contact portion 30203 is further capable of making asymmetric vibration with the mechanism including the movable portion 301025-3, the linking portions 30102ea-3, 30102eb-3, and the linking portion 302045-3 (the third movable mechanism).

<Operation>

Using FIGS. 62A to 63B, the operation of the pseudo force sense generation apparatus 3002 will be described. In FIGS. 62A to 63B, the contact portion 30203 is omitted in order to clarify internal movements associated with the operation, and the position of the contact portion 30203 is represented by a two-dot chain line. In practice, the pseudo force sense generation apparatus 3002 with the contact portion 30203 performs the following operations (FIGS. 59 and 60A to 60C).

The user grips the pseudo force sense generation apparatus 3002 in a state in which the user's skin or mucous membrane is in contact with the contact portion 30203 or cloth and the like is placed between the skin or mucous membrane and the contact portion 30203.

Figure 62A:
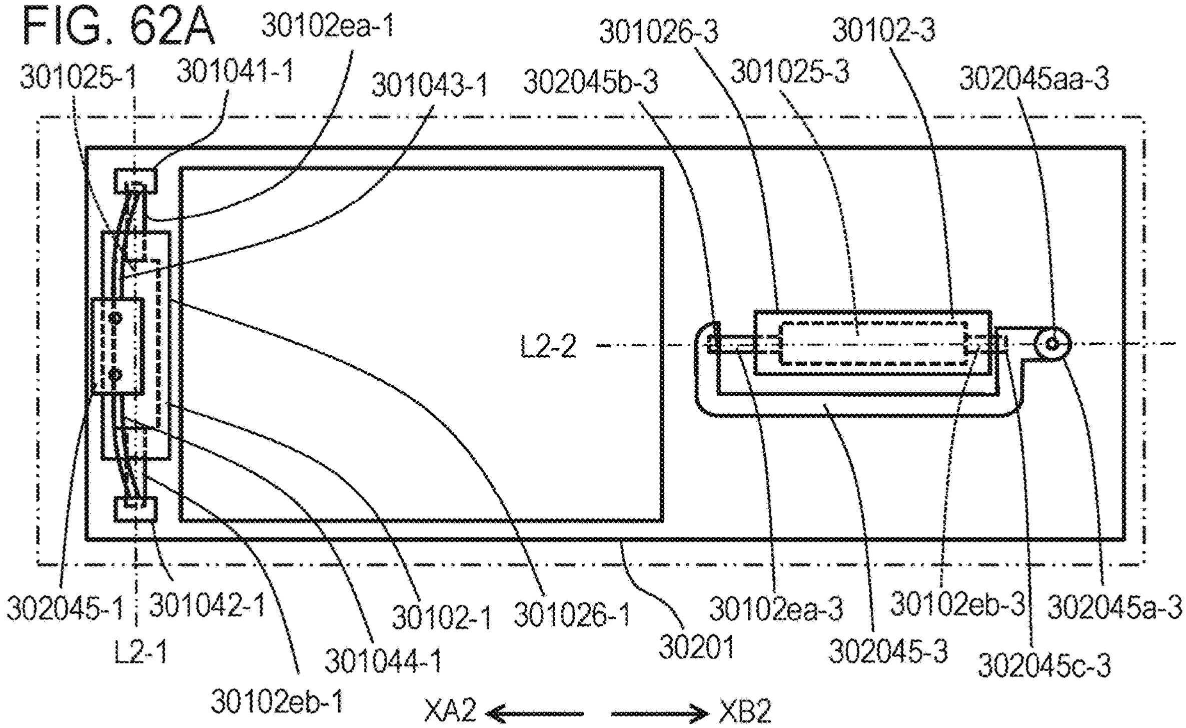
FIGS. 62A and 62B are diagrams for illustrating the operation of the pseudo force sense generation apparatus according to the embodiment.
Figure 62B:
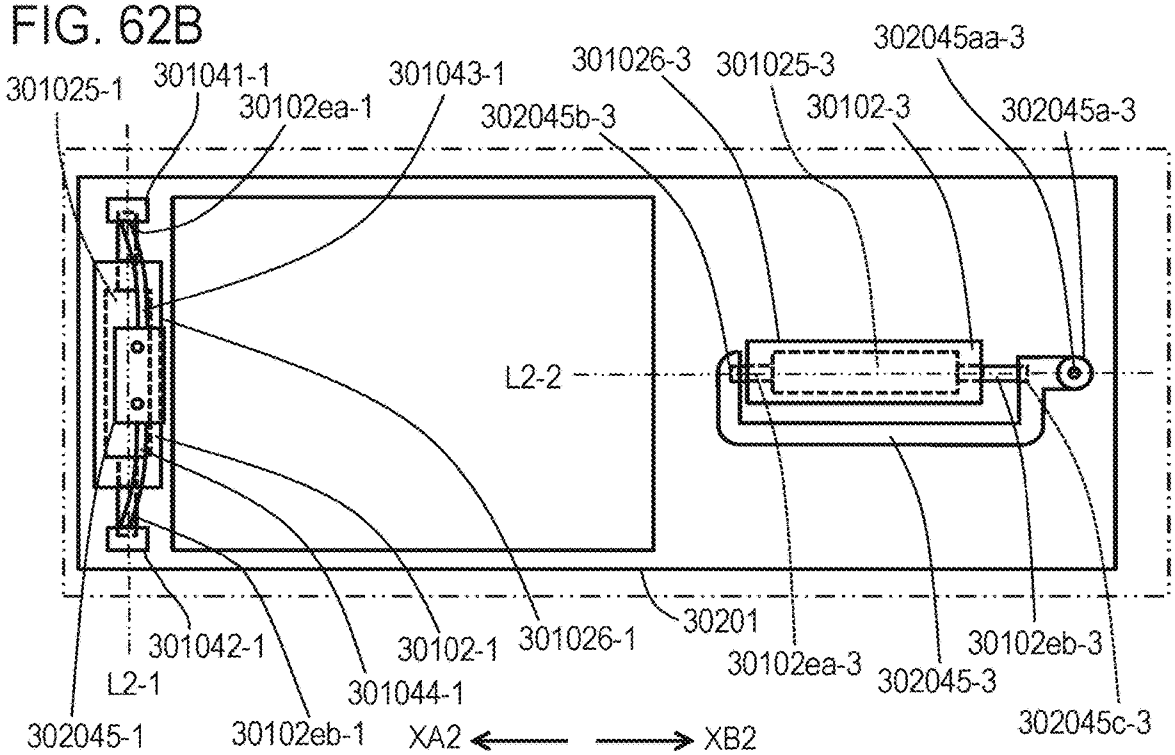

When the vibrator 30102-3 is driven, the movable portion 301025-3, the linking portions 30102ea-3, 30102eb-3, and the linking portion 302045-3 (the third movable mechanism) asymmetrically vibrate in XA2-XB2 direction along L2-2 axis (the second axis) (FIGS. 62A and 62B). In response to it, the contact portion 30203 supported by the linking portion 302045-3 is given force in the direction along L2-2 axis. This causes the contact portion 30203 to make asymmetric vibration with the movable portion 301025-3, the linking portions 30102ea-3, 30102eb-3, and the linking portion 302045-3 (the third movable mechanism). As a result, force based on the asymmetric vibration is given to the skin or mucous membrane that is in direct or indirect contact with the contact portion 30203. The force in the direction along L2-2 axis given to the contact portion 30203 is also given to the fixed portion 302045-1 fixed to the lugs 302032, 302033 of the contact portion 30203, and further to the leaf spring portions 301043-1, 301044-1 (the first leaf spring mechanism). This causes the leaf spring portions 301043-1, 301044-1 to elastically deform (bend) in the direction along L2-2 axis. That is, when force in XA2 direction along L2-2 axis from the vibrator 30102-3 toward the vibrator 30102-1 is given to the leaf spring portions 301043-1, 301044-1, the leaf spring portions 301043-1, 301044-1 elastically deform in this XA2 direction (FIG. 62A). Conversely, when force in XB2 direction along L2-2 axis from the vibrator 30102-1 toward the vibrator 30102-3 is given to the leaf spring portions 301043-1, 301044-1, the leaf spring portions 301043-1, 301044-1 elastically deform in this XB2 direction (FIG. 62B). This can suppress hindrance to the asymmetric vibration of the contact portion 30203 along L2-2 axis by the vibrator 30102-1, allowing efficient presentation of pseudo force sense.

Figure 63A:
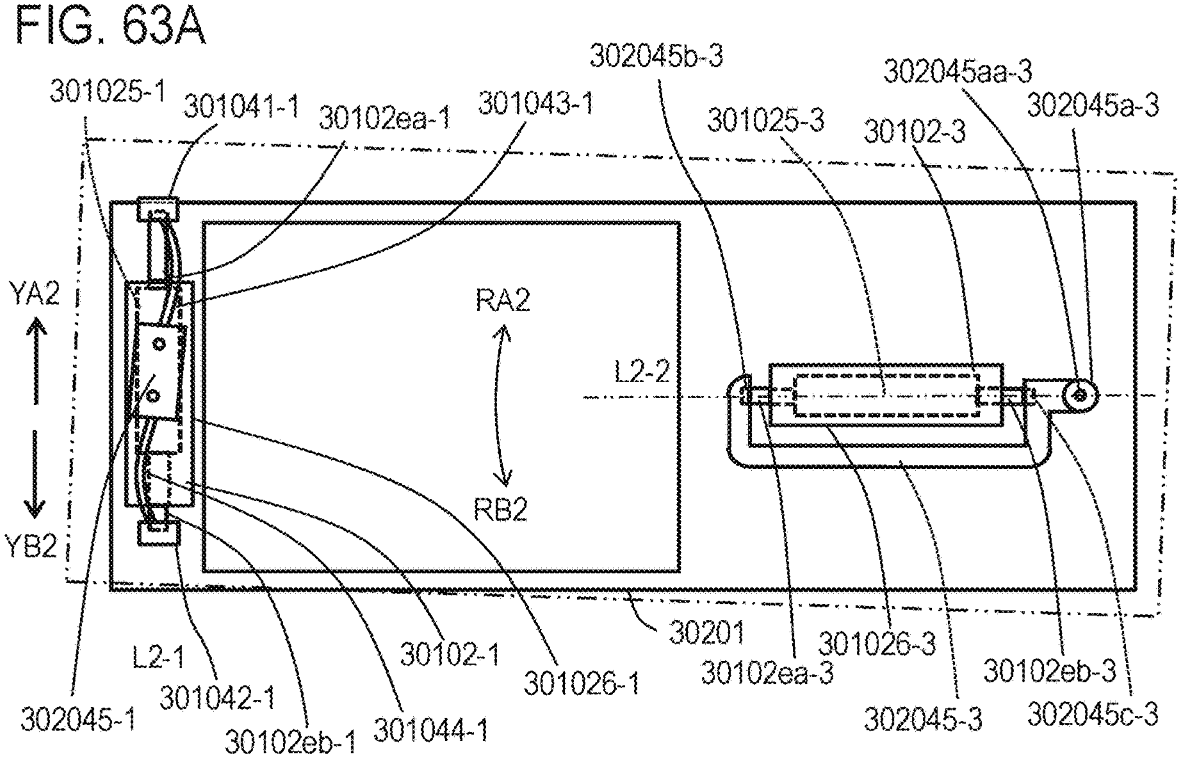
FIGS. 63A and 63B are diagrams for illustrating the operation of the pseudo force sense generation apparatus according to the embodiment.
Figure 63B:
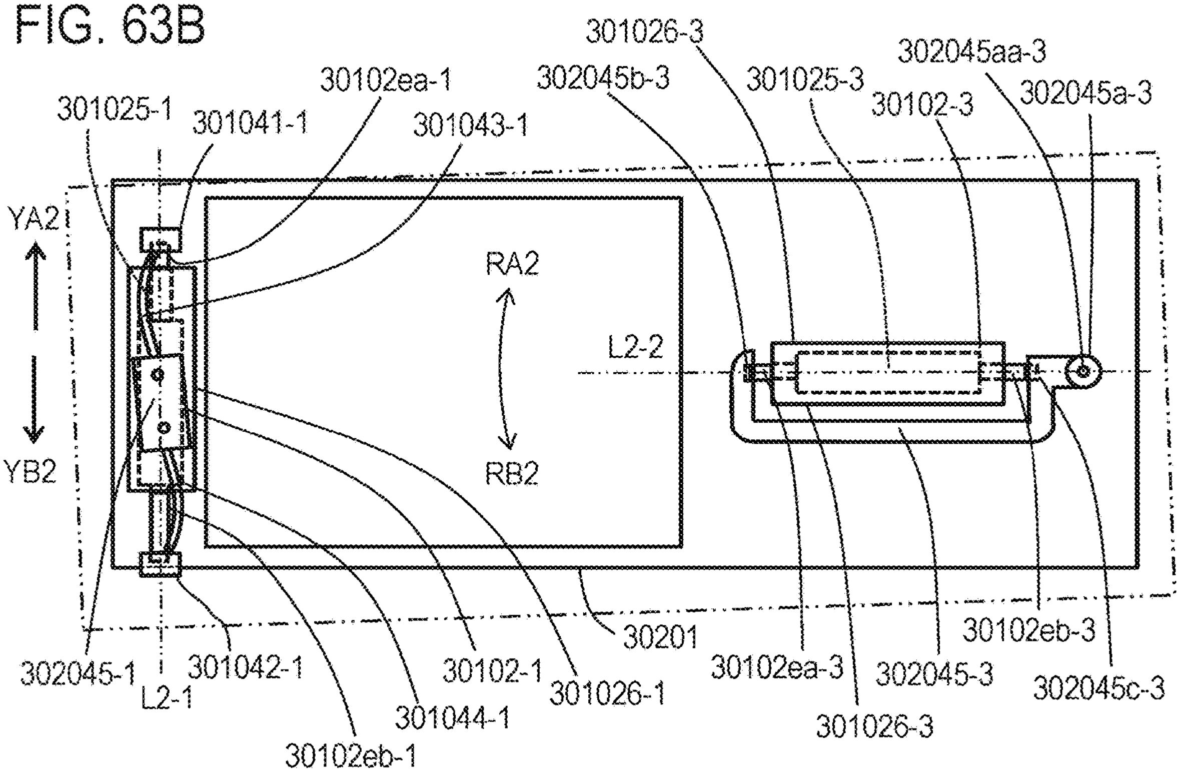

Meanwhile, when the vibrator 30102-1 is driven, the movable portion 301025-1 and the linking portions 30102ea-1, 30102eb-1, 301041-1, 301042-1 (the first movable mechanism) asymmetrically vibrate in YA2-YB2 direction along L2-1 axis (the first axis) (FIGS. 63A and 63B). In response to it, the leaf spring portions 301043-1, 301044-1 (the first leaf spring mechanism) supported by the linking portions 301041-1, 301042-1 are given force in the direction along L2-1 axis. This causes the leaf spring portions 301043-1, 301044-1 to asymmetrically vibrate in YA2-YB2 direction along L2-1 axis with the movable portion 301025-1 and the linking portions 30102ea-1, 30102eb-1, 301041-1, 301042-1. Upon receiving the force in the direction along L2-1 axis from the linking portions 301041-1, 301042-1, the leaf spring portions 301043-1, 301044-1 give force in the direction along L2-1 axis to the fixed portion 302045-1 and the contact portion 30203. This causes the contact portion 30203 to make periodical asymmetric rotary motion about the insertion hole 302045aa-3 of the supporting portion 302045a-3 of the linking portion 302045-3 (asymmetric rotary motion about the rotating shaft 302031 substantially orthogonal to L2-1 axis and L2-2 axis). That is, when the fixed portion 302045-1 moves in YA2 direction, that is, from the linking portion 301042-1 toward the linking portion 301041-1, the contact portion 30203 rotates in RA2 direction about the rotating shaft 302031. Conversely, when the fixed portion 302045-1 moves in YB2 direction, that is, from the linking portion 301041-1 toward the linking portion 301042-1, the contact portion 30203 rotates in RB2 direction about the rotating shaft 302031. This gives force based on the asymmetric rotary motion to the skin or mucous membrane that is in direct or indirect contact with the contact portion 30203. In addition, hindrance to the asymmetric vibration of the contact portion 30203 along L2-1 axis by the vibrator 30102-3 is suppressed, so that pseudo force sense is efficiently given to the skin or mucous membrane that is in direct or indirect contact with the contact portion 30203.

The same applies to the simultaneous driving of the vibrator 30102-1 and the vibrator 30102-3. Specifically, driving of the vibrator 30102-3 causes the movable portion 301025-3, the linking portions 30102ea-3, 30102eb-3, and the linking portion 302045-3 to asymmetrically vibrate in XA2-XB2 direction along L2-2 axis. In response to it, force in the direction along L2-2 axis is given to the contact portion 30203 supported by the linking portion 302045-3. The force in the direction along L2-2 axis given to the contact portion 30203 is also given to the fixed portion 302045-1 fixed to the lugs 302032, 302033 of the contact portion 30203, and further to the leaf spring portions 301043-1, 301044-1. This causes the leaf spring portions 301043-1, 301044-1 to elastically deform in the direction along L2-2 axis. Also, driving of the vibrator 30102-1 causes the movable portion 301025-1 and the linking portions 30102ea-1, 30102eb-1, 301041-1, 301042-1 (the first movable mechanism) to asymmetrically vibrate in YA2-YB2 direction along L2-1 axis (the first axis). In response to it, force in the direction along L2-1 axis is given to the leaf spring portions 301043-1, 301044-1 supported by the linking portions 301041-1, 301042-1. This causes the leaf spring portions 301043-1, 301044-1 to asymmetrically vibrate in YA2-YB2 direction along L2-1 axis with the movable portion 301025-1 and the linking portions 30102ea-1, 30102eb-1, 301041-1, 301042-1. Upon receiving the force in the direction along L2-1 axis from the linking portions 301041-1, 301042-1, the leaf spring portions 301043-1, 301044-1 give force in the direction along L2-1 axis to the fixed portion 302045-1 and the contact portion 30203. Consequently, the contact portion 30203 performs periodical asymmetric motion that has an asymmetric vibration component in the direction along L2-2 axis (XA2-XB2 direction) and an asymmetric rotary motion component in a rotational direction about the insertion hole 302045aa-3 in the supporting portion 302045a-3 of the linking portion 302045-3 (RA2-RB2 direction). This can efficiently present pseudo force sense to the skin or mucous membrane that is in direct or indirect contact with the contact portion 30203.

Eighteenth Embodiment

An eighteenth embodiment will be described.

<Configuration>

Figure 64A:
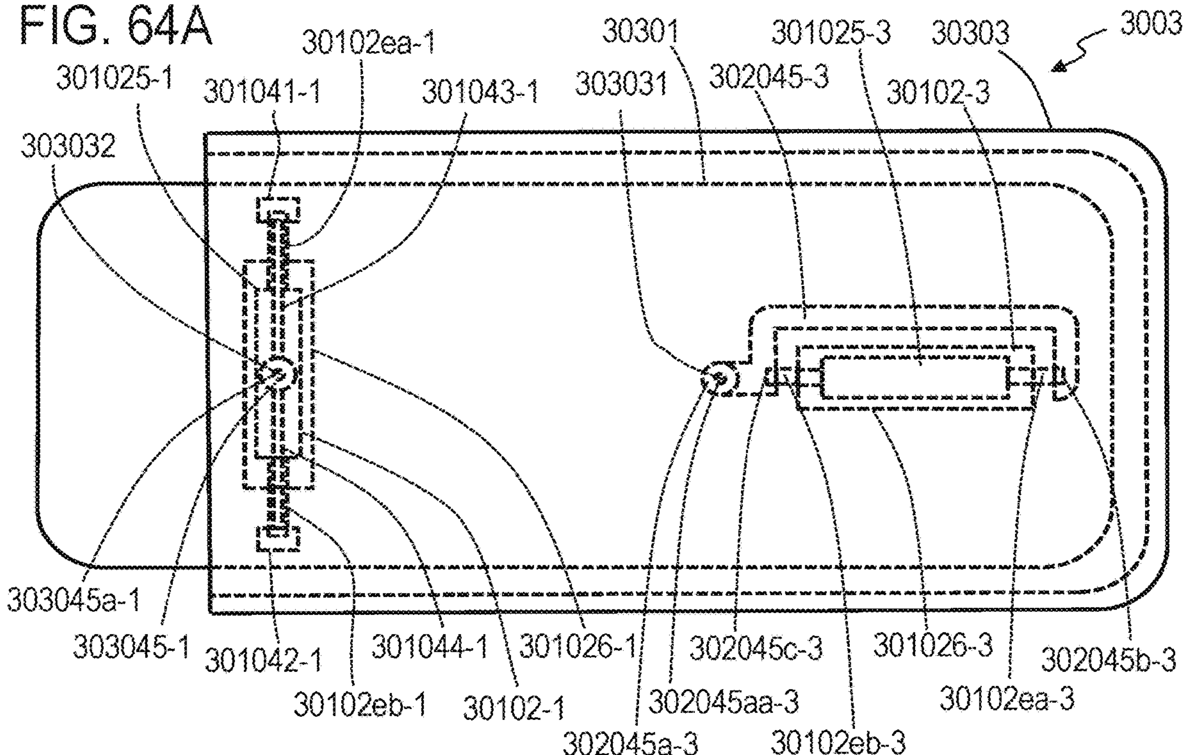
FIG. 64A is a transparent plan view illustrating a configuration of a pseudo force sense generation apparatus according to an embodiment.
Figure 64B:
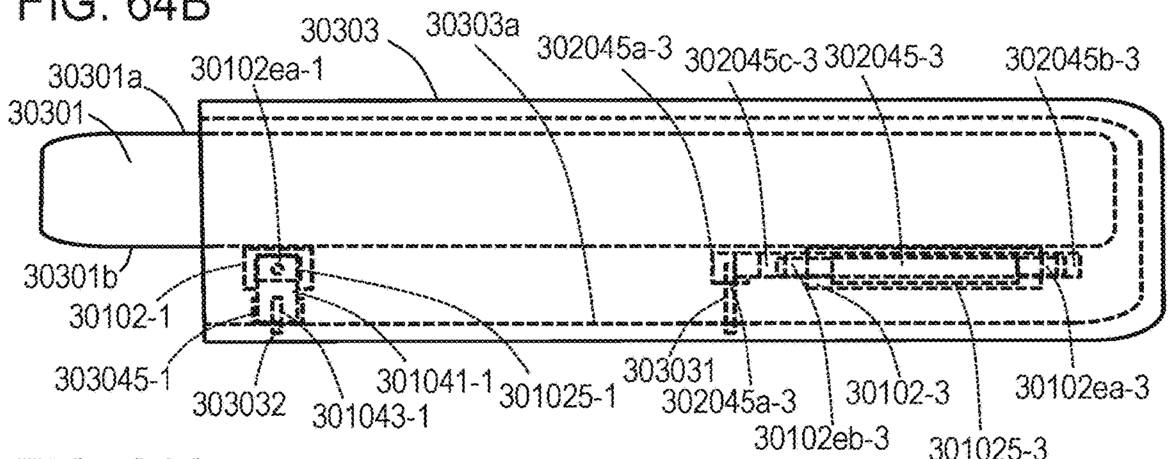
FIG. 64B is a transparent front view illustrating the configuration of the pseudo force sense generation apparatus according to the embodiment.
Figure 64C:
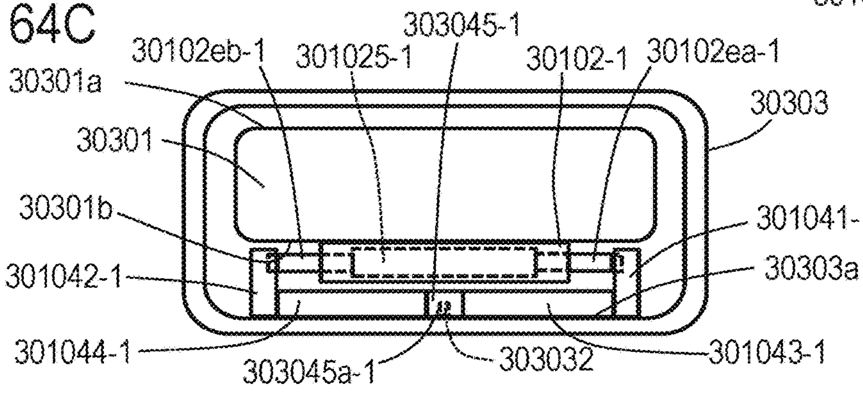
FIG. 64C is a transparent left side view illustrating the configuration of the pseudo force sense generation apparatus according to the embodiment.

Using FIGS. 64A to 64C, the configuration of a pseudo force sense generation apparatus 3003 in this embodiment is described. As illustrated in FIGS. 64A to 64C, the pseudo force sense generation apparatus 3003 in this embodiment has a body portion 30301, a vibrator 30102-*i* (where i=1, 3), leaf spring portions 301043-1, 301044-1, linking portions 301041-1, 301042-1, a fixed portion 303045-1, a linking portion 302045-3, and a contact portion 30303. The vibrator 30102-*i* (where i=1, 3) has a supporting portion 301026-*i*, a movable portion 301025-*i*, a linking portion 30102*ea*-*i*, and a linking portion 30102*eb*-*i*.

A mechanism including the body portion 30301 and the supporting portions 301026-1, 301026-3 (for example, a mechanism composed of them) corresponds to the "base mechanism". A mechanism including the movable portion 301025-*i*, the linking portions 30102*ea*-*i*, 30102*eb*-*i* (where i=1, 3), the leaf spring portions 301043-1, 301044-1, the fixed portion 303045-1, the linking portion 302045-3, and the contact portion 30303 (for example, a mechanism composed of them) corresponds to the "contact mechanism". The "contact mechanism" performs periodical asymmetric motion relative to the "base mechanism" and gives force based on the asymmetric motion to the skin or mucous membrane with which the contact mechanism is in direct or indirect contact, thereby presenting pseudo force sense. A mechanism including the movable portion 301025-1 and the linking portions 30102*ea*-1, 30102*eb*-1, 301041-1, 301042-1 (for example, a mechanism composed of them) corresponds to a "first movable mechanism". A mechanism including the movable portion 301025-3, the linking portions 30102*ea*-3, 30102*eb*-3, and the linking portion 302045-3 (for example, a mechanism composed of them) corresponds to a "third movable mechanism". A mechanism including the leaf spring portions 301043-1, 301044-1 (for example, a mechanism composed of them) corresponds to a "first leaf spring mechanism". The leaf spring portion 301043-1 corresponds to a "first leaf spring portion" and the leaf spring portion 301044-1 corresponds to a "second leaf spring portion".

<Body Portion 30301>

The body portion 30301 is a plate- or rod-like component that is or can be considered to be a rigid body. For example, the body portion 30301 is made of synthetic resin. An example of the body portion 30301 is a part of a controller for a game console or the like. On one plate face 30301*b* side of the body portion 30301, the bottom surface side of the vibrator 30102-1 (the bottom surface side of the supporting portion 301026-1) and the bottom surface side of the vibrator 30102-3 (the bottom surface side of the supporting portion 301026-3) are fixed. The angle formed by the longitudinal direction of the vibrator 30102-1 and the longitudinal direction of the vibrator 30102-3, both fixed, is approximately 90°. The longitudinal direction of the vibrator 30102-1 is positioned substantially parallel to one side of the body portion 30301, while the longitudinal direction of the vibrator 30102-3 is substantially orthogonal to that side, with the central portion of the vibrator 30102-1 being positioned at a position on an extension of the vibrator 30102-3 in the longitudinal direction.

<Vibrator 30102-*i*>

The vibrator 30102-*i* (where i=1, 3) has the supporting portion 301026-*i*, the movable portion 301025-*i* which performs asymmetric vibration relative to the supporting portion 301026-*i*, the rod-like linking portion 30102*eb*-*i* connected or formed integrally with one longitudinal end of the movable portion 301025-*i* and extending in the longitudinal direction, and the linking portion 30102*ea*-*i* connected or formed integrally with the other longitudinal end of the movable portion 301025-*i* and extending in the longitudinal direction. The movable portion 301025-*i* is capable of asymmetric vibration relative to the supporting portion 301026-*i* along L3-i axis (the ith axis) passing through the linking portions 30102*ea*-*i*, 30102*eb*-*i*, while being supported by the supporting portion 301026-*i*. The directions of these asymmetric vibrations (the axis center direction of L3-i axis) are all substantially parallel to the plate face 30301*b* of the body portion 30301, and the angle formed by L3-1 axis and L3-2 axis is approximately 90°. Exemplary configurations of the vibrator 30102-*i* are as described in the sixteenth embodiment.

<Linking Portions 301041-1, 301042-1>

The configuration of the linking portions 301041-1, 301042-1 is the same as the sixteenth embodiment.

<Leaf Spring Portions 301043-1, 301044-1 and Fixed Portion 303045-1>

The configuration of the leaf spring portions 301043-1, 301044-1 is the same as the sixteenth embodiment. However, the other ends of the leaf spring portions 301043-1, 301044-1 support the fixed portion 303045-1 rather than supporting the fixed portion 301045. The fixed portion 303045-1 is a plate-like component with an insertion hole 303045*a*-1 therein. The fixed portion 303045-1 may be made of synthetic resin such as ABS resin, for example. The leaf spring portion 301043-*i* and leaf spring portion 301044-*i*, and the fixed portion 303045-1 may be integrally molded.

<Linking Portion 302045-3>

The configuration of the linking portion 302045-3 is the same as the seventeenth embodiment. In this embodiment, however, it is attached in the opposite orientation to the configuration of the seventeenth embodiment, and a supporting portion 302045*a*-3 with an insertion hole 302045*aa*-3 therein is positioned between the vibrator 30102-1 and one end 302045*b*-3 of the linking portion 302045-3.

<Contact Portion 30303>

The contact portion 30303 is a sheath-shaped component that is or can be considered to be a rigid body. For example, the contact portion 30303 is made of synthetic resin such as ABS resin. On one inner wall surface 30303*a* side of the contact portion 30303, a lug 303032 and a column-shaped rotating shaft 303031 are provided. The contact portion 30303 is positioned such that its inner wall surface 30303*a* side faces the plate face 30301*b* side of the body portion 30301, with the lug 303032 being inserted in the insertion hole 303045*a*-1 of the fixed portion 303045-1 and the rotating shaft 303031 being inserted in the insertion hole 302045*aa*-3 of the supporting portion 302045*a*-3. The lug 303032 is fixed to the insertion hole 303045*a*-1 and the rotating shaft 303031 is rotatably supported in the insertion hole 302045*aa*-3. The contact portion 30303 is thereby rotatably supported by the supporting portion 302045*a*-3 of the linking portion 302045-3 (a part of the third movable mechanism), and is capable of rotation about a rotating shaft 303031 substantially orthogonal to the L3-1 axis (the first axis) and is also capable of making asymmetric vibration with the mechanism including the movable portion 301025-3, the linking portions 30102*ea*-3, 30102*eb*-3, and the linking portion 302045-3 (the third movable mechanism).

<Operation>

Using FIGS. 65A to 66B, the operation of the pseudo force sense generation apparatus 3003 will be described. In FIGS. 65A to 66B, the contact portion 30303 is omitted in order to clarify internal movements associated with the operation, and the position of the contact portion 30303 is represented by a two-dot chain line. In practice, the pseudo force sense generation apparatus 3003 with the contact portion 30303 performs the following operations (FIGS. 64A to 64C).

The user grips the pseudo force sense generation apparatus 3003 in a state in which the user's skin or mucous membrane is in contact with the contact portion 30303 or cloth and the like is placed between the skin or mucous membrane and the contact portion 30303. Preferably, the user grips the contact portion 30303 itself.

Figure 65A:
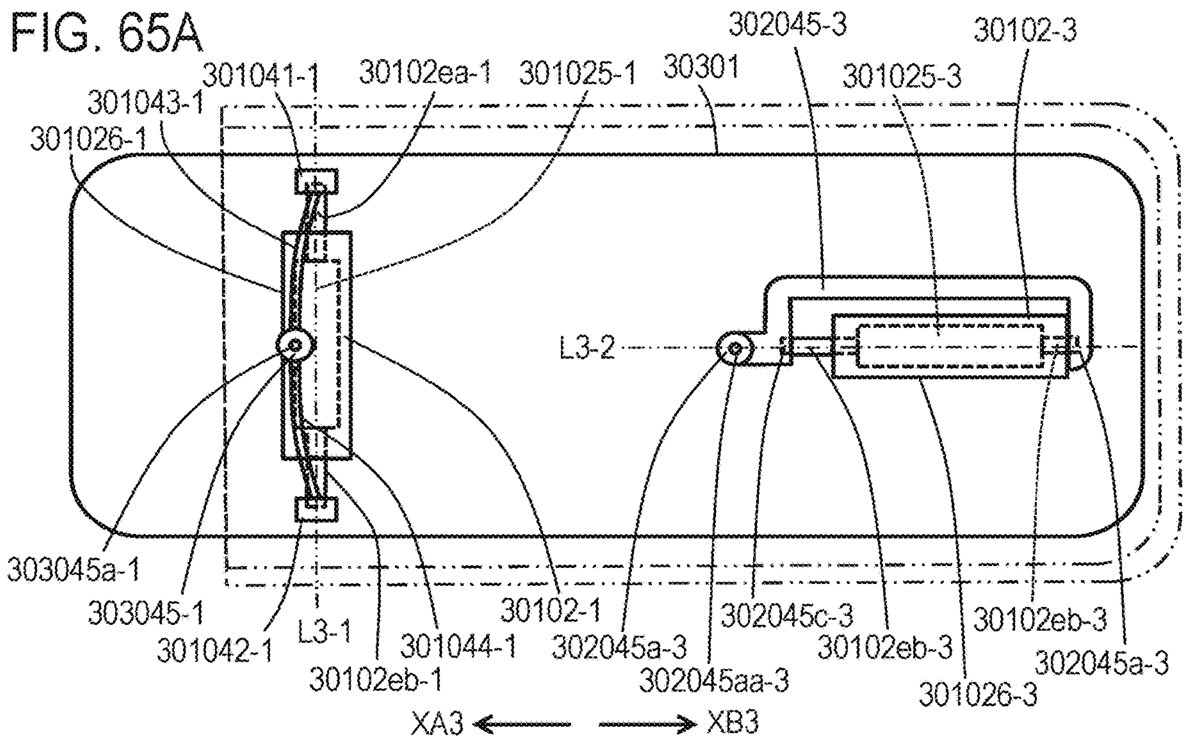
FIGS. 65A and 65B are diagrams for illustrating the operation of the pseudo force sense generation apparatus according to the embodiment.
Figure 65B:
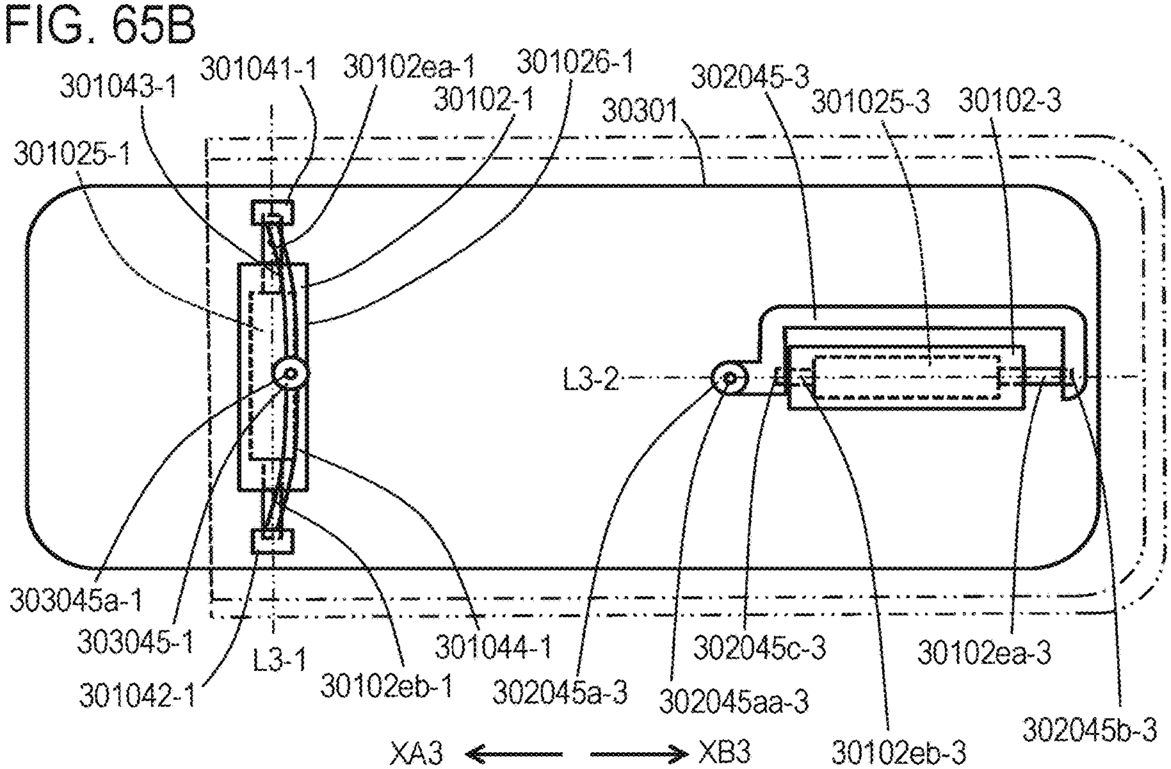

When the vibrator 30102-3 is driven, the movable portion 301025-3, the linking portions **30102*ea*-3, 30102*eb*-3, and the linking portion 302045-3 (the third movable mechanism) asymmetrically vibrate in XA3-XB3 direction along L3-2 axis (the second axis) (FIGS. 65A and 65B). In response to it, the contact portion 30303 supported by the linking portion 302045-3 is given force in the direction along L3-2 axis. This causes the contact portion 30303 to make asymmetric vibration with the movable portion 301025-3, the linking portions 30102*ea*-3, 30102*eb*-3, and the linking portion 302045-3 (the third movable mechanism). As a result, force based on the asymmetric vibration is given to the skin or mucous membrane that is in direct or indirect contact with the contact portion 30303. The force in the direction along L3-2 axis given to the contact portion 30303 is also given to the fixed portion 303045-1 fixed to the lug 303032 of the contact portion 30303, and further to the leaf spring portions 301043-1, 301044-1 (the first leaf spring mechanism). This causes the leaf spring portions 301043-1, 301044-1 to elastically deform in the direction along L3-2 axis. That is, when force in XA3 direction along L3-2 axis from the vibrator 30102-3 toward the vibrator 30102-1 is given to the leaf spring portions 301043-1, 301044-1, the leaf spring portions 301043-1, 301044-1 elastically deform in this XA3 direction (FIG. 65A). Conversely, when force in XB3 direction along L3-2 axis from the vibrator 30102-1 toward the vibrator 30102-3 is given to the leaf spring portions 301043-1, 301044-1, the leaf spring portions 301043-1, 301044-1 elastically deform in this XB3 direction (FIG. 65B). This suppresses hindrance to the asymmetric vibration of the contact portion 30303 along L3-2 axis by the vibrator 30102-1**, efficiently giving pseudo force sense to skin and the like.

Figure 66A:
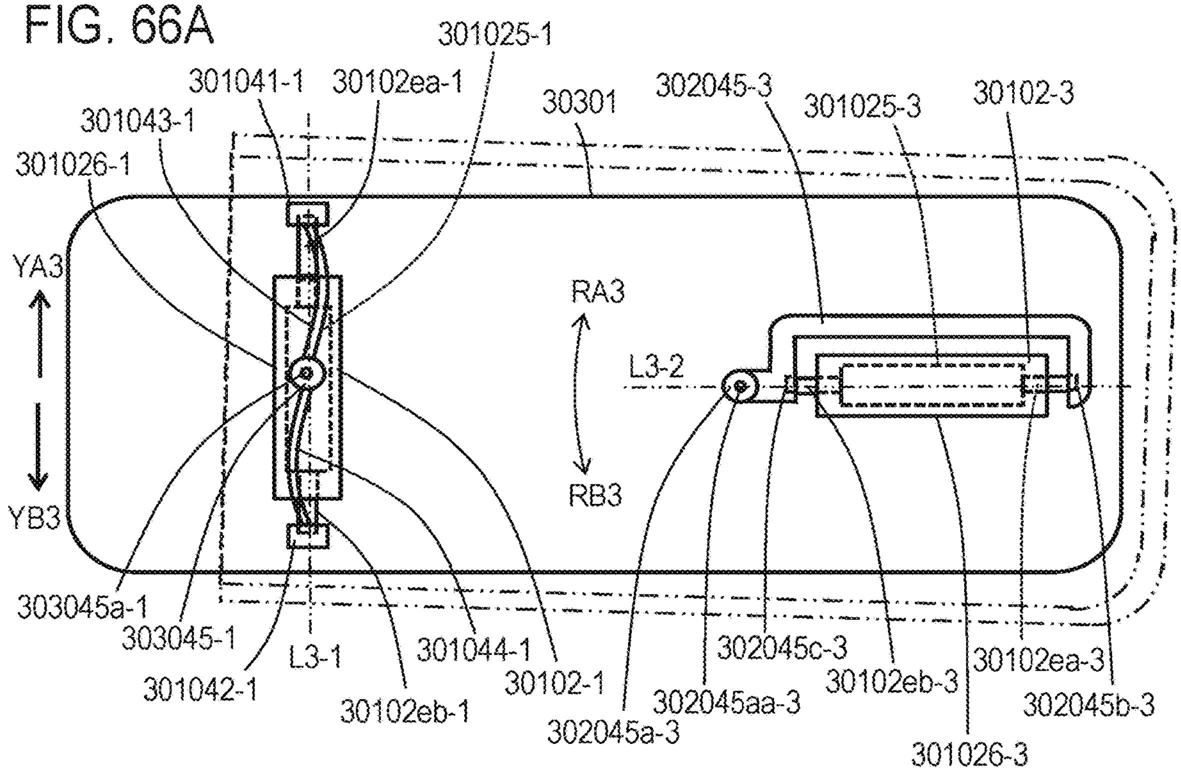
FIGS. 66A and 66B are diagrams for illustrating the operation of the pseudo force sense generation apparatus according to the embodiment.
Figure 66B:
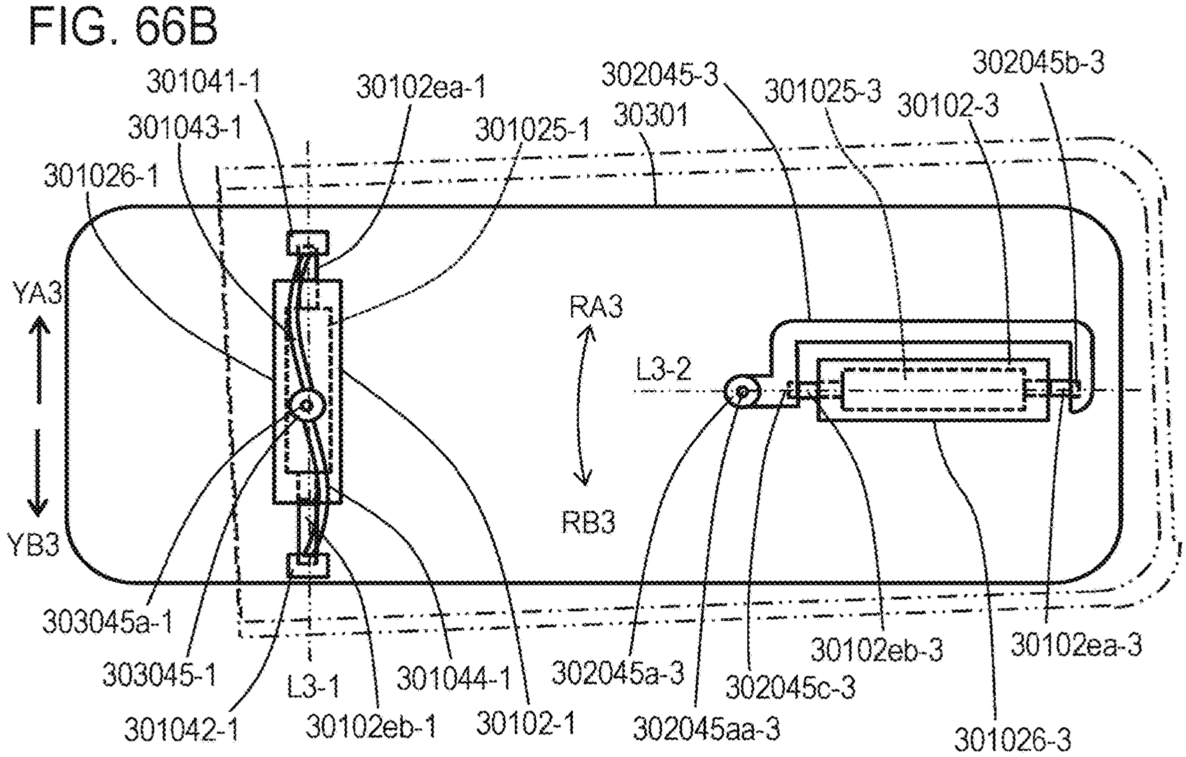
Figure 67:
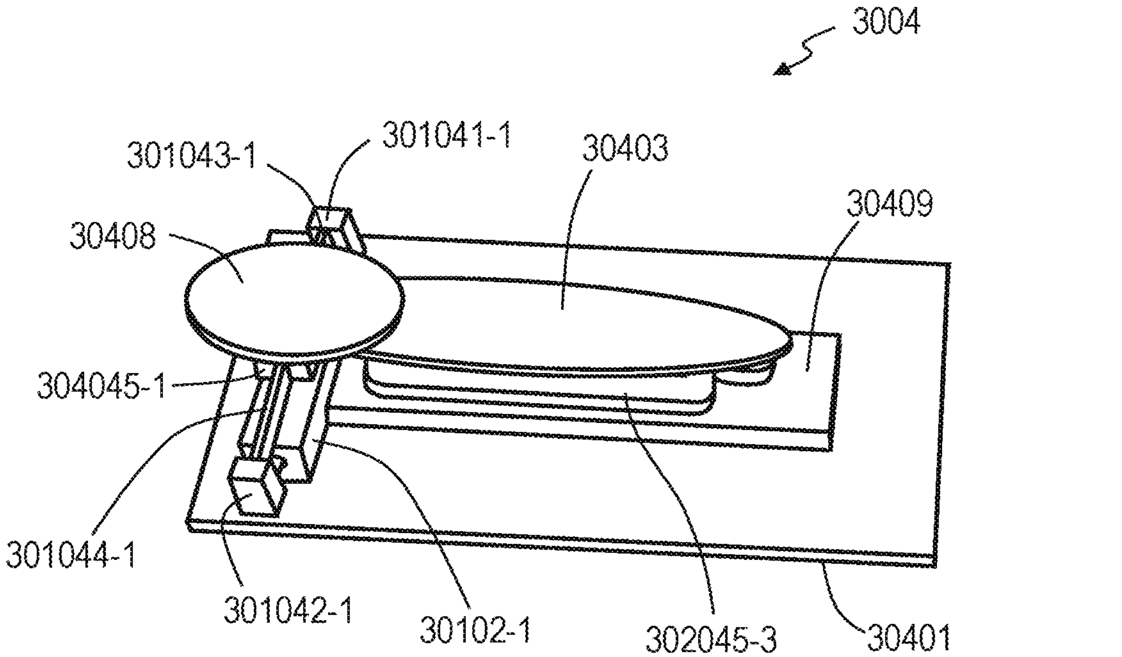
FIG. 67 is a transparent perspective view illustrating a configuration of a pseudo force sense generation apparatus according to an embodiment.
Figure 68:
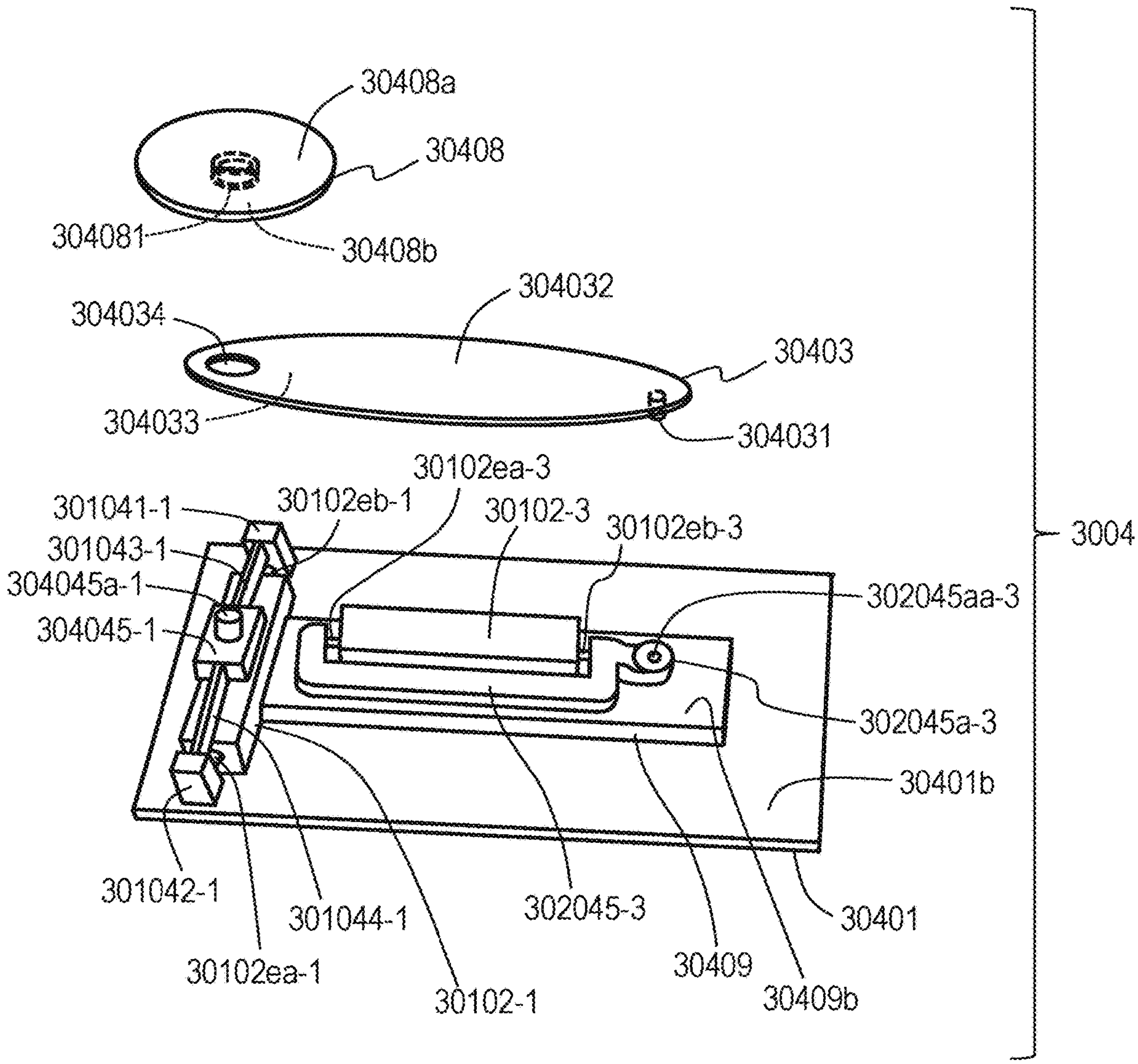
FIG. 68 is an exploded view illustrating the configuration of the pseudo force sense generation apparatus according to the embodiment.
Figure 69A:
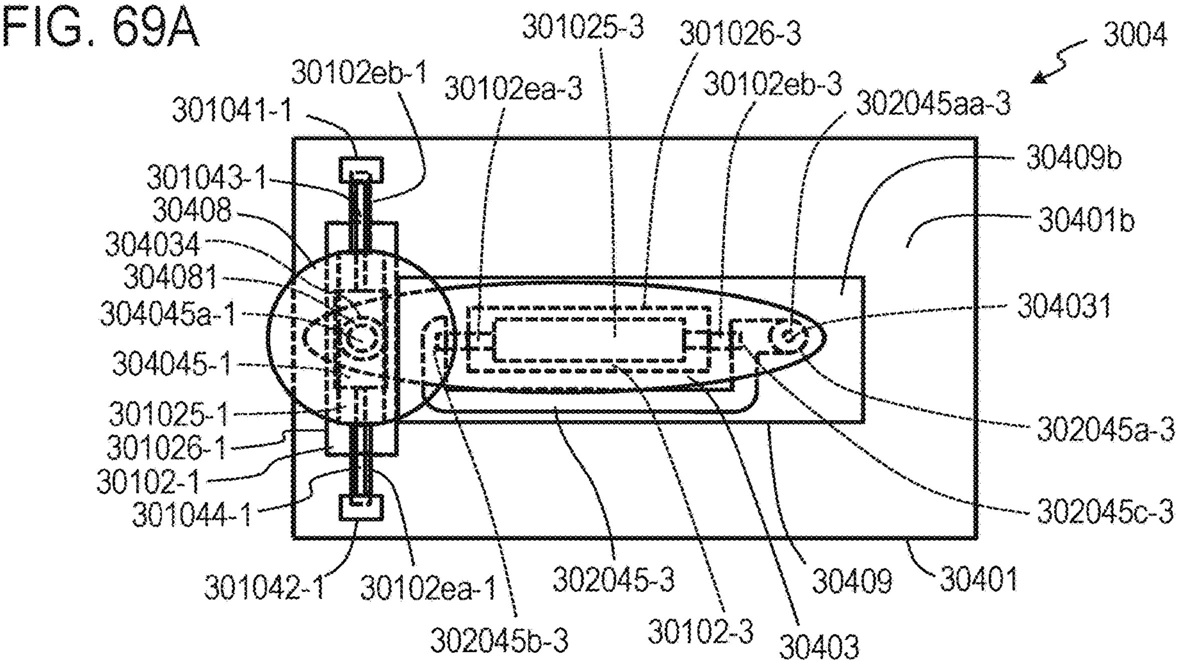
FIG. 69A is a transparent plan view illustrating the configuration of the pseudo force sense generation apparatus according to the embodiment.
Figure 69B:
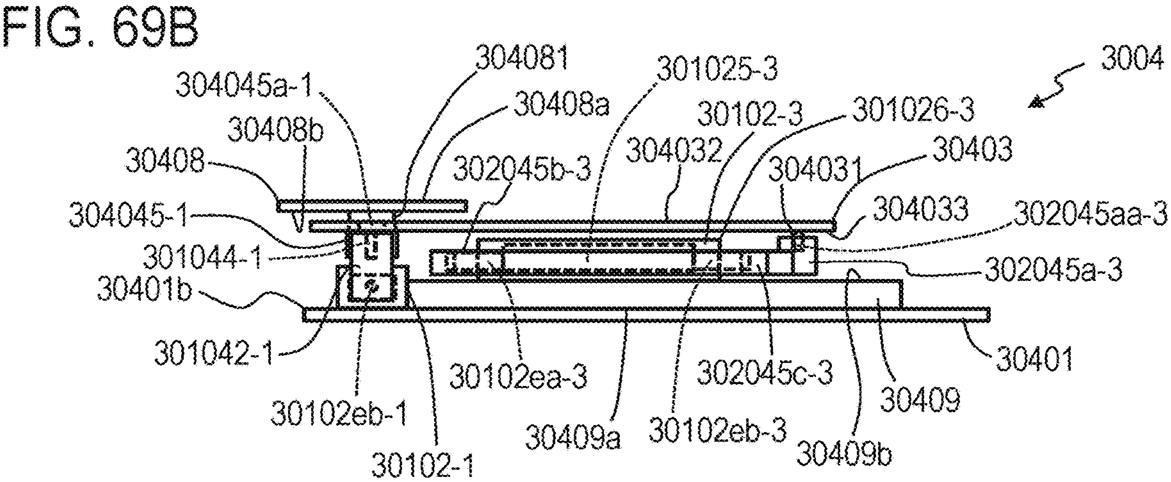
FIG. 69B is a transparent front view illustrating the configuration of the pseudo force sense generation apparatus according to the embodiment.
Figure 69C:
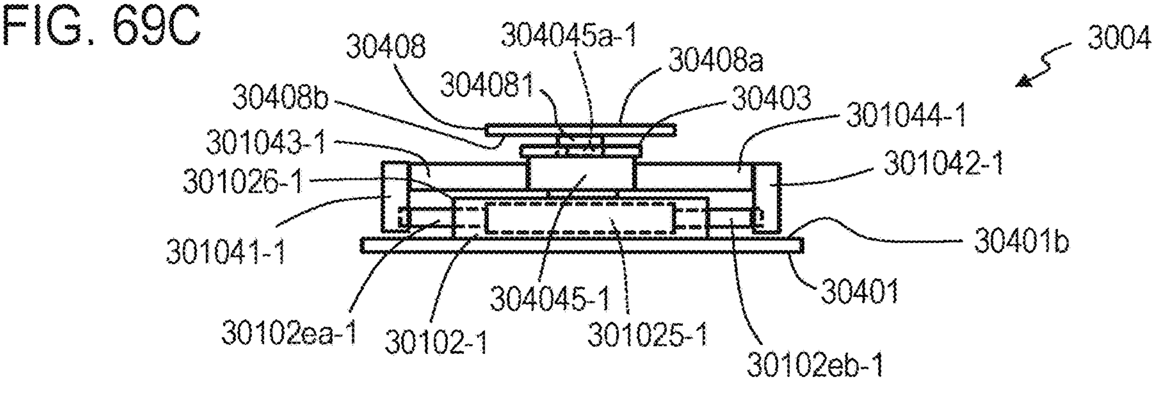
FIG. 69C is a transparent left side view illustrating the configuration of the pseudo force sense generation apparatus according to the embodiment.

Meanwhile, when the vibrator 30102-1 is driven, the movable portion 301025-1 and the linking portions **30102*ea*-1, 30102*eb*-1, 301041-1, 301042-1 (the first movable mechanism) asymmetrically vibrate in YA3-YB3 direction along L3-1 axis (the first axis) (FIGS. 66A and 66B). In response to it, the leaf spring portions 301043-1, 301044-1 (the first leaf spring mechanism) supported by the linking portions 301041-1, 301042-1 are given force in the direction along L3-1 axis. This causes the leaf spring portions 301043-1, 301044-1 to asymmetrically vibrate in YA3-YB3 direction along L3-1 axis with the movable portion 301025-1 and the linking portions 30102*ea*-1, 30102*eb*-1, 301041-1, 301042-1. Upon receiving the force in the direction along L3-1 axis from the linking portions 301041-1, 301042-1, the leaf spring portions 301043-1, 301044-1 give force in the direction along L3-1 axis to the fixed portion 303045-1 and the contact portion 30303. This causes the contact portion 30303 to make periodical asymmetric rotary motion about the insertion hole 302045*aa*-3 of the supporting portion 302045*a*-3 of the linking portion 302045-3 (asymmetric rotary motion about the rotating shaft 303031 substantially orthogonal to L3-1 axis and L3-2 axis). That is, when the fixed portion 303045-1 moves in YA3 direction, that is, from the linking portion 301042-1 toward the linking portion 301041-1, the contact portion 30303 rotates in RA3 direction about the rotating shaft 303031. Conversely, when the fixed portion 303045-1 moves in YB3 direction, that is, from the linking portion 301041-1 toward the linking portion 301042-1, the contact portion 30303 rotates in RB3 direction about the rotating shaft 303031. This gives force based on the asymmetric rotary motion to the skin or mucous membrane that is in direct or indirect contact with the contact portion 30303. In addition, hindrance to the asymmetric vibration of the contact portion 30303 along L3-1 axis by the vibrator 30102-3 is suppressed, so that pseudo force sense is efficiently given to the skin or mucous membrane that is in direct or indirect contact with the contact portion 30303. In this embodiment, however, the supporting portion 302045*a*-3 with the insertion hole 302045*aa*-3 therein is positioned between the vibrator 30102-1 and the one end 302045*b*-3 of the linking portion 302045-3. That is, the contact portion 30303 rotates about the rotating shaft 303031 positioned between the vibrator 30102-1 and the vibrator 30102-3. Thus, the rotation width is small and the temporal change of the angular acceleration is large compared to a configuration where the vibrator 30102-3 is positioned between the rotating shaft 302031 and the vibrator 30102-1** as in the seventeenth embodiment. This enables presentation of pseudo force senses different from those with the configuration of the seventeenth embodiment.

The same applies to the simultaneous driving of the vibrator 30102-1 and the vibrator 30102-3; as in the seventeenth embodiment, the contact portion 30303 performs periodical asymmetric motion that has an asymmetric vibration component in the direction along L3-2 axis (XA3-XB3 direction) and an asymmetric rotary motion component in a rotational direction about the insertion hole **302045*aa*-3 in the supporting portion 302045*a*-3 of the linking portion 302045-3 (RA3-RB3 direction). This can efficiently present pseudo force sense to the skin or mucous membrane that is in direct or indirect contact with the contact portion 30303**.

Nineteenth Embodiment

A nineteenth embodiment will be described. In the following, matters already described are denoted with the same reference characters and are not described in detail again.

<Configuration>

Using FIGS. 67, 68, 69A to 69C, and 70, the configuration of a pseudo force sense generation apparatus 3004 in this embodiment is described. As illustrated in FIGS. 67, 68, 69A to 69C, and 70, the pseudo force sense generation apparatus 3004 in this embodiment has a body portion 30401, a vibrator **30102-*i* (where i=1, 3), leaf spring portions 301043-1, 301044-1, linking portions 301041-1, 301042-1, a fixed portion 304045-1, a linking portion 302045-3, a seat 30409, a connecting portion 30403, and a contact portion 30408. The vibrator 30102-*i* (where i=1, 3) has a supporting portion 301026-*i*, a movable portion 301025-*i*, a linking portion 30102*ea-i*, and a linking portion 30102*eb-i***.

A mechanism including the body portion 30401, the seat 30409, and the supporting portions 301026-1, 301026-3 (for example, a mechanism composed of them) corresponds to the "base mechanism". A mechanism including the movable portion **301025-*i*, the linking portions 30102*ea-i*, 30102*eb-i***

(where i=1, 3), the leaf spring portions 301043-1, 301044-1, the fixed portion 304045-1, the linking portion 302045-3, the connecting portion 30403, and the contact portion 30408 (for example, a mechanism composed of them) corresponds to the "contact mechanism". The "contact mechanism" performs periodical asymmetric motion relative to the "base mechanism" and gives force based on the asymmetric motion to the skin or mucous membrane with which the contact mechanism is in direct or indirect contact, thereby presenting pseudo force sense. A mechanism including the movable portion 301025-1 and the linking portions 30102_ea_-1, 30102_eb_-1, 301041-1, 301042-1 (for example, a mechanism composed of them) corresponds to a "first movable mechanism". A mechanism including the movable portion 301025-3, the linking portions 30102_ea_-3, 30102_eb_-3, and the linking portion 302045-3 (for example, a mechanism composed of them) corresponds to a "third movable mechanism". A mechanism including the leaf spring portions 301043-1, 301044-1 and the fixed portion 304045-1 (for example, a mechanism composed of them) corresponds to a "first leaf spring mechanism". The leaf spring portion 301043-1 corresponds to a "first leaf spring portion" and the leaf spring portion 301044-1 corresponds to a "second leaf spring portion".

<Body Portion 30401>

The body portion 30401 is a plate-like component that is or can be considered to be a rigid body. For example, the body portion 30401 is made of synthetic resin. An example of the body portion 30401 is an electronic circuit board (for example, a circuit board of a smartphone terminal device) with electronic components mounted thereon. On one plate face 30401_b_ side of the body portion 30401, the bottom surface side of the vibrator 30102-1 (the bottom surface side of the supporting portion 301026-1) and one plate face 30409_a_ of the plate-like seat 30409 are fixed. On another plate face 30409_b_ of the seat 30409, the bottom surface side of the vibrator 30102-3 (the bottom surface side of the supporting portion 301026-3) is fixed. The angle formed by the longitudinal direction of the vibrator 30102-1 and the longitudinal direction of the vibrator 30102-3, both fixed, is approximately 90°. The longitudinal direction of the vibrator 30102-1 is positioned along one side of the body portion 30401, while the longitudinal direction of the vibrator 30102-3 is substantially orthogonal to that side, with the central portion of the vibrator 30102-1 being positioned at a position on an extension of the vibrator 30102-3 in the longitudinal direction.

<Vibrator 30102-_i_>

The vibrator 30102-_i_ (where i=1, 3) has the supporting portion 301026-_i_, the movable portion 301025-_i_ which performs asymmetric vibration relative to the supporting portion 301026-_i_, the rod-like linking portion 30102_eb_-_i_ connected or formed integrally with one longitudinal end of the movable portion 301025-_i_ and extending in the longitudinal direction, and the linking portion 30102_ea_-_i_ connected or formed integrally with the other longitudinal end of the movable portion 301025-_i_ and extending in the longitudinal direction. The movable portion 301025-_i_ is capable of asymmetric vibration relative to the supporting portion 301026-_i_ along L4-i axis (the ith axis) passing through the linking portions 30102_ea_-_i_, 30102_eb_-_i_, while being supported by the supporting portion 301026-_i_. The directions of these asymmetric vibrations (the axis center direction of L4-i axis) are all substantially parallel to the plate face 30401_b_ of the body portion 30401, and the angle formed by L4-1 axis and L4-2 axis is approximately 90°. Exemplary configurations of the vibrator 30102-_i_ are as described in the sixteenth embodiment.

<Linking Portions 301041-1, 301042-1>

The configuration of the linking portions 301041-1, 301042-1 is the same as the sixteenth embodiment.

<Leaf Spring Portions 301043-1, 301044-1 and Fixed Portion 304045-1>

The configuration of the leaf spring portions 301043-1, 301044-1 is the same as the sixteenth embodiment. However, the other ends of the leaf spring portions 301043-1, 301044-1 support the fixed portion 304045-1 rather than supporting the fixed portion 301045. The fixed portion 304045-1 is a plate-like component having a column-shaped lug 304045_a_-1. The fixed portion 304045-1 may be made of synthetic resin such as ABS resin, for example. The leaf spring portion 301043-_i_ and leaf spring portion 301044-_i_, and the fixed portion 304045-1 may be integrally molded. The leaf spring portion 301043-1 and the leaf spring portion 301044-1 are arranged in the direction along L4-1 axis (the first axis), with the fixed portion 304045-1 being positioned between the leaf spring portion 301043-1 and the leaf spring portion 301044-1. For example, the leaf spring portion 301043-1 and the leaf spring portion 301044-1 are positioned along a plane substantially orthogonal to L4-2 axis and including L4-1 axis, and they are positioned along a straight line substantially parallel to L4-1 axis. The side surface of the linking portion 301041-1 on the other end side (one end of the first movable mechanism) supports one end of the leaf spring portion 301043-1 (the first leaf spring portion), and the other end of the leaf spring portion 301043-1 supports the fixed portion 304045-1. The side surface of the linking portion 301042-1 on the other end side (the other end to of the first movable mechanism) supports one end of the leaf spring portion 301044-1 (the second leaf spring portion), and the other end of the leaf spring portion 301044-1 supports the fixed portion 304045-1. For example, the side surface of the linking portion 301041-1 on the other end side is fixed to or integral with one end of the leaf spring portion 301043-1, and the other end of the leaf spring portion 301043-1 is fixed to or integral with the fixed portion 304045-1. For example, the side surface of the linking portion 301042-1 on the other end side is fixed to or integral with one end of the leaf spring portion 301044-1, and the other end of the leaf spring portion 301044-1 is fixed to or integral with the fixed portion 304045-1. The other ends of the leaf spring portions 301043-1, 301044-1 are positioned between one end of the leaf spring portion 301043-1 and one end of the leaf spring portion 301044-1. As will be described later, the contact portion 30408 is fixed to the fixed portion 304045-1 supported at the other ends of the leaf spring portions 301043-1, 301044-1. The other ends of the leaf spring portions 301043-1, 301044-1 thereby support the contact portion 30408 via the fixed portion 304045-1. The lug 304045_a_-1 is provided on the outer side of the fixed portion 304045-1 (the opposite side of the vibrator 30102-1 side).

<Linking Portion 302045-3>

The configuration of the linking portion 302045-3 is the same as the seventeenth embodiment. The other end side of the linking portion 30102_ea_-3 positioned outside the supporting portion 301026-3 of the vibrator 30102-3 supports one end 302045_b_-3 of the linking portion 302045-3. The other end side of the linking portion 30102_eb_-3 positioned outside the supporting portion 301026-3 supports another end 302045_c_-3 of the linking portion 302045-3. The one end 302045_b_-3 and the other end 302045_c_-3 of the linking portion 302045-3 and the axis center of the linking portions 30102*ea*-3, 30102*eb*-3 are positioned along L4-2 axis (the second axis). On the other end 302045*c*-3 side of the linking portion 302045-3, a supporting portion 302045*a*-3 with an insertion hole 302045*aa*-3 therein is provided. The angle formed by the axis center of the central axis of the insertion hole 302045*aa*-3 and L4-1 axis and the angle formed by the axis center of the central axis of the insertion hole 302045*aa*-3 and L4-2 axis are both approximately 90°. When the vibrator 30102-3 is driven, the linking portion 302045-3 performs asymmetric vibration along L4-2 axis (the second axis) relative to the body portion 30401.

<Connecting Portion 30403 and Contact Portion 30408>

The connecting portion 30403 is a plate-like component that is or can be considered to be a rigid body, and the contact portion 30408 is a disk-shaped component that is or can be considered to be a rigid body. They are made of synthetic resin such as ABS resin, for example. On one plate face 304033 side at one end of the connecting portion 30403, a column-shaped rotating shaft 304031 is provided. At the other end of the connecting portion 30403, a through hole 304034 is provided between the plate face 304033 and the plate face 304032, which is the reverse side of the plate face 304033. An open end of the through hole 304034 is circular, and the inner diameter of the through hole 304034 is larger than the outer diameter of the end face of the lug 304045*a*-1. In the center on one plate face 30408*b* side of the contact portion 30408, a cylindrical, tubular protrusion 304081 with an open tip is provided. The axis center direction of the tubular protrusion 304081 is substantially orthogonal to the plate face 30408*b*. The outer diameter of the tubular protrusion 304081 is slightly smaller than the inner diameter of the through hole 304034, and the inner diameter of the tubular protrusion 304081 is substantially the same as the outer diameter of the end face of the lug 304045*a*-1.

The connecting portion 30403 is positioned such that its plate face 304033 side faces the plate face 30409*b* side of the seat 30409 (the plate face 30401*b* side of the body portion 30401). The rotating shaft 304031 of the connecting portion 30403 is rotatably supported in the insertion hole 302045*aa*-3. The connecting portion 30403 is thereby rotatably supported by the supporting portion 302045*a*-3 of the linking portion 302045-3 (a part of the third movable mechanism), and is capable of rotation about the rotating shaft 304031 substantially orthogonal to L4-1 axis (the first axis) and L4-2 axis (the second axis). The lug 304045*a*-1 of the fixed portion 304045-1 is inserted in the through hole 304034 of the connecting portion 30403 from the plate face 304033 side. The tubular protrusion 304081 of the contact portion 30408 is inserted in the through hole 304034 of the connecting portion 30403 from the plate face 304032 side. In the tubular protrusion 304081 on its inner wall surface side, the lug 304045*a*-1 passed in the through hole 304034 is inserted and fixed. The other end of the connecting portion 30403 and the contact portion 30408 are thereby attached to the fixed portion 304045-1. The tubular protrusion 304081 of the contact portion 30408 may not or may be fixed to the inner wall surface of the through hole 304034. In the former case, the contact portion 30408 is capable of rotation about the axis center of the through hole 304034 (rotation relative to the connecting portion 30403). Even in the latter case, movement of the movable portion 301025-1 is not hindered by the connecting portion 30403 because the leaf spring portions 301043-1, 301044-1 bend and the connecting portion 30403 is capable of rotation about the rotating shaft 304031. Additionally, since any interstice between the tubular protrusion 304081 and the inner wall surface of the through hole 304034 can cause vibration noise, they should be fixed for reduction of noise. Consequently, the contact portion 30408 is supported at the other end of the connecting portion 30403 and is capable of rotation about the rotating shaft 304031 substantially orthogonal to L4-1 axis (the first axis) and L4-2 axis (the second axis). Further, the contact portion 30408 can make asymmetric vibration with the mechanism including the movable portion 301025-3, the linking portions 30102*ea*-3, 30102*eb*-3, and the linking portion 302045-3 (the third movable mechanism).

<Operation>

Figure 70:
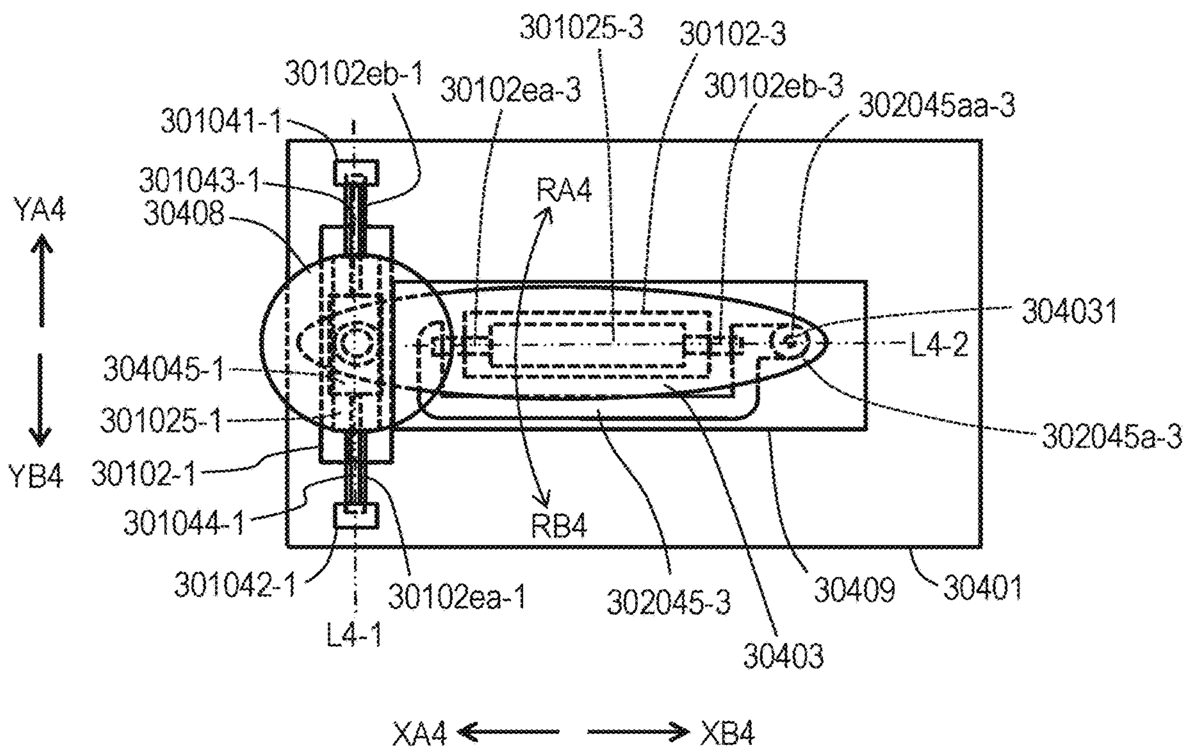
FIG. 70 is a diagram for illustrating the operation of the pseudo force sense generation apparatus according to the embodiment.
Figure 71A:
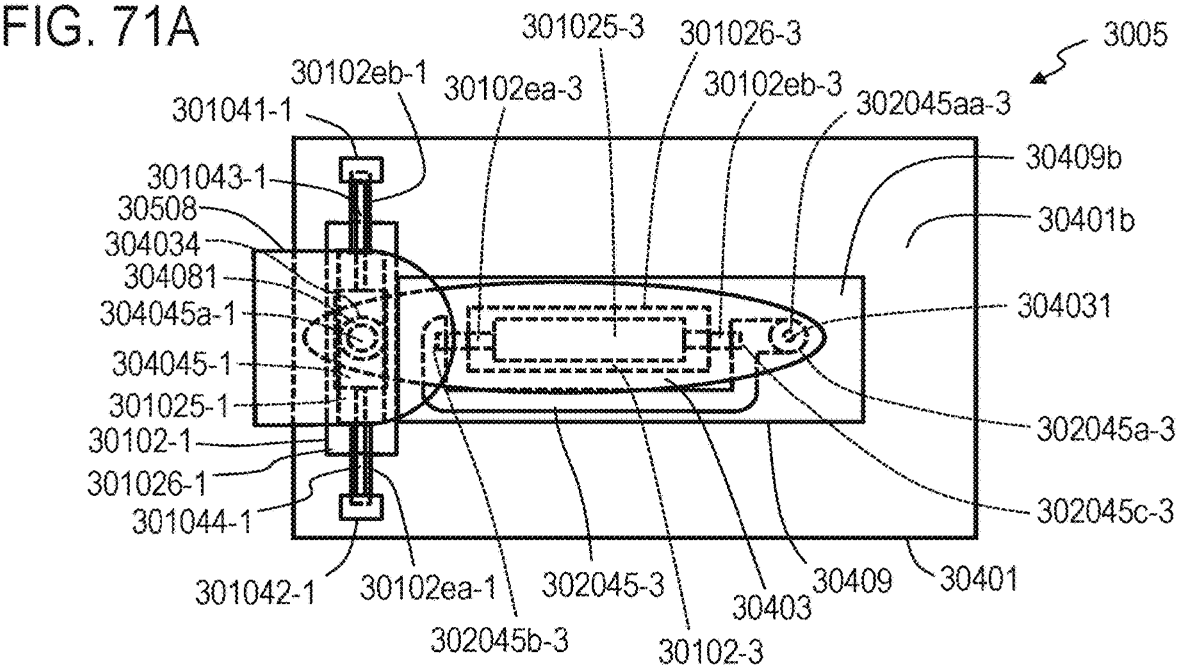
FIG. 71A is a transparent plan view illustrating a configuration of a pseudo force sense generation apparatus according to an embodiment.
Figure 71B:
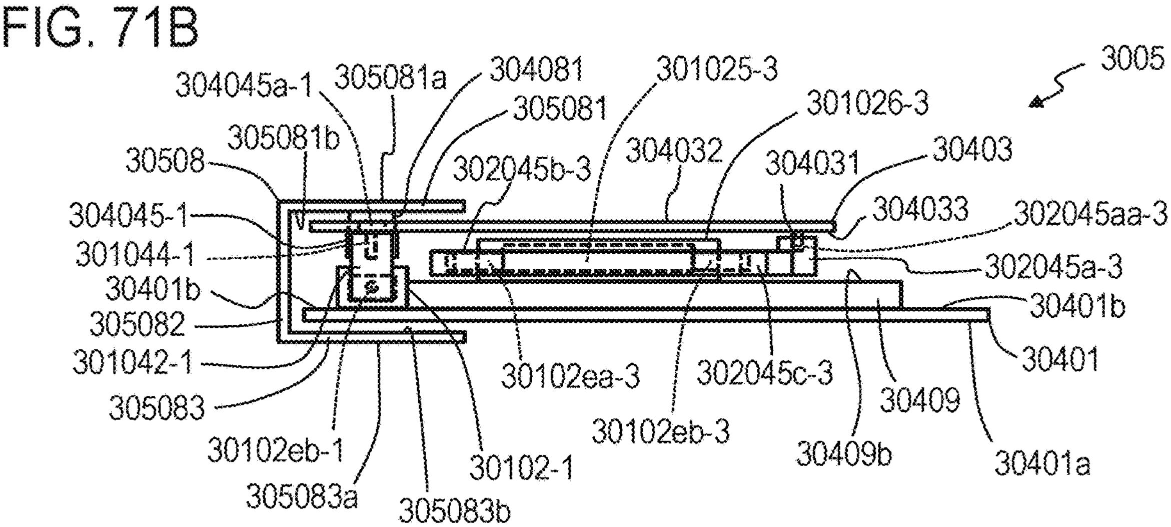
FIG. 71B is a transparent front view illustrating the configuration of the pseudo force sense generation apparatus according to the embodiment.
Figure 71C:
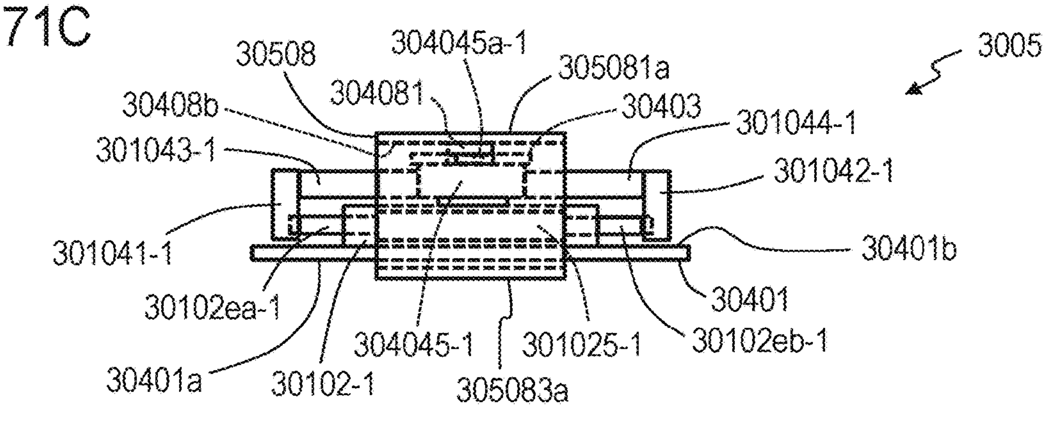
FIG. 71C is a transparent left side view illustrating the configuration of the pseudo force sense generation apparatus according to the embodiment.

Using FIG. 70, the operation of the pseudo force sense generation apparatus 3004 will be described. The user grips the pseudo force sense generation apparatus 3004 in a state in which the user's skin or mucous membrane is in contact with the contact portion 30408 or cloth and the like is placed between the skin or mucous membrane and the contact portion 30408.

When the vibrator 30102-3 is driven, the movable portion 301025-3, the linking portions 30102*ea*-3, 30102*eb*-3, and the linking portion 302045-3 (the third movable mechanism) asymmetrically vibrate in XA4-XB4 direction along L4-2 axis (the second axis). In response to it, the connecting portion 30403 supported by the linking portion 302045-3 is given force in the direction along L4-2 axis, and the contact portion 30408 supported by the connecting portion 30403 is also given force in the direction along L4-2 axis. This causes the contact portion 30408 to make asymmetric vibration with the movable portion 301025-3, the linking portions 30102*ea*-3, 30102*eb*-3, and the linking portion 302045-3 (the third movable mechanism). As a result, force based on the asymmetric vibration is given to the skin or mucous membrane that is in direct or indirect contact with the contact portion 30408. The force in the direction along L4-2 axis given to the contact portion 30408 is given to the leaf spring portions 301043-1, 301044-1 and the fixed portion 304045-1 (the first leaf spring mechanism). This causes the leaf spring portions 301043-1, 301044-1 to elastically deform (bend) in the direction along L4-2 axis. This can suppress hindrance to the asymmetric vibration of the contact portion 30408 along L4-2 axis by the vibrator 30102-1, allowing pseudo force sense to be efficiently presented from the contact portion 30408 supported by the connecting portion 30403.

Meanwhile, when the vibrator 30102-1 is driven, the movable portion 301025-1 and the linking portions 30102*ea*-1, 30102*eb*-1, 301041-1, 301042-1 (the first movable mechanism) asymmetrically vibrate in YA4-YB4 direction along L4-1 axis (the first axis). In response to it, the leaf spring portions 301043-1, 301044-1 and the fixed portion 304045-1 (the first leaf spring mechanism) supported by the linking portions 301041-1, 301042-1 are given force in the direction along L4-1 axis. This causes the leaf spring portions 301043-1, 301044-1 to asymmetrically vibrate in YA4-YB4 direction along L4-1 axis with the movable portion 301025-1 and the linking portions 30102*ea*-1, 30102*eb*-1, 301041-1, 301042-1. Upon receiving the force in the direction along L4-1 axis from the linking portions 301041-1, 301042-1, the leaf spring portions 301043-1, 301044-1 give force in the direction along L4-1 axis to the fixed portion 304045-1. The fixed portion 304045-1 gives the force in this direction to the connecting portion 30403 and the contact portion 30408. This causes the connecting portion 30403 the contact portion 30408 to make periodical asymmetric rotary motion about the insertion hole 302045*aa*-3 of the supporting portion 302045*a*-3 of the linking portion 302045-3 (asymmetric rotary motion about the rotating shaft 304031 substantially orthogonal to L4-1 axis and L4-2 axis). This gives force based on the asymmetric rotary motion to the skin or mucous membrane that is in direct or indirect contact with the contact portion 30408. In addition, hindrance to the asymmetric vibration of the contact portion 30408 along L4-1 axis by the vibrator 30102-3 is suppressed, so that pseudo force sense is efficiently given to the skin or mucous membrane that is in direct or indirect contact with the contact portion 30408.

The same applies to the simultaneous driving of the vibrator 30102-1 and the vibrator 30102-3.

Specifically, while suppressing mutual hindrance of movement between the vibrator 30102-1 and the vibrator 30102-3, the contact portion 30408 performs asymmetric motion that is based on at least one of the asymmetric vibration of the mechanism including the leaf spring portions 301043-1, 301044-1 and the fixed portion 304045-1 (the first leaf spring mechanism) and the asymmetric vibration of the mechanism including the movable portion 301025-3, the linking portions **30102*ea*-3, 30102*eb*-3, and the linking portion 302045-3** (the third movable mechanism). This enables efficient presentation of pseudo force sense.

The contact portion 30408 is attached to the fixed portion 304045-1 (a part of the first leaf spring mechanism). Specifically, the contact portion 30408 is attached to the fixed portion 304045-1 at some position on a virtual plane that is substantially orthogonal to L4-2 axis (the second axis) and includes L4-1 axis (the first axis). This allows asymmetric vibration in YA4-YB4 direction along L4-1 axis (the first axis) generated by driving of the vibrator 30102-1 to be efficiently given to the contact portion 30408, efficiently presenting pseudo force sense.

Twentieth Embodiment

A twentieth embodiment will be described. This embodiment is a modification of the nineteenth embodiment. The difference between the twentieth embodiment and the nineteenth embodiment is the structure of the contact portion.

Using FIGS. 71A to 71C and 72, the configuration of a pseudo force sense generation apparatus 3005 in this embodiment is described. As illustrated in FIGS. 71A to 71C and 72, the pseudo force sense generation apparatus 3005 in this embodiment has a body portion 30401, a vibrator **30102-*i* (where i=1, 3), leaf spring portions 301043-1, 301044-1, linking portions 301041-1, 301042-1, a fixed portion 304045-1, a linking portion 302045-3, a seat 30409, a connecting portion 30403, and a contact portion 30508. The vibrator 30102-*i* (where i=1, 3) has a supporting portion 301026-*i*, a movable portion 301025-*i*, a linking portion 30102*ea*-*i*, and a linking portion 30102*eb*-*i***.

The contact portion 30508 is a component that is or can be considered to be a rigid body. The contact portion 30508 has a first area 305081 positioned on one surface **30401*b* side of the body portion 30401 (one surface side of the base mechanism), a second area 305082 supported at one end of the first area 305081, and a third area 305083 supported at the other end of the second area 305082 and positioned on the other surface 30401*a* side of the body portion 30401 (the other surface side of the base mechanism). The first area 305081, the second area 305082, and the third area 305083 may be integral or may not be integral. The first area 305081, the second area 305082, and the third area 305083 are each substantially plate-shaped. In this embodiment, the substantially plate-shaped portion of the first area 305081 and the substantially plate-shaped portion of the third area 305083 are positioned substantially parallel, and the substantially plate-shaped portion of the second area 305082 is substantially orthogonal to them. However, the substantially plate-shaped portion of the first area 305081 and the substantially plate-shaped portion of the third area 305083 may not be substantially parallel. Also, the substantially plate-shaped portion of the first area 305081 and the substantially plate-shaped portion of the third area 305083 may not be substantially orthogonal to the substantially plate-shaped portion of the second area 305082. At least one of the first area 305081, the second area 305082, and the third area 305083 may include a curved substantially plate-shaped portion. In the center on one plate face 305081*b* side of the first area 305081, the tubular protrusion 304081 described in the nineteenth embodiment is provided. As mentioned above, the connecting portion 30403 is positioned such that its plate face 304033 side faces the plate face 30409*b* side of the seat 30409. The rotating shaft 304031 of the connecting portion 30403 is rotatably supported in the insertion hole 302045*aa*-3. The lug 304045*a*-1 of the fixed portion 304045-1 is inserted in the through hole 304034 of the connecting portion 30403 from the plate face 304033 side. The tubular protrusion 304081 of the contact portion 30508 is inserted in the through hole 304034 of the connecting portion 30403 from the plate face 304032 side. In the tubular protrusion 304081 on its inner wall surface side, the lug 304045*a*-1 passed in the through hole 304034 is inserted and fixed. The first area 305081 is thereby supported by the fixed portion 304045-1 (a part of the first leaf spring mechanism). Also, between the first area 305081 and the third area 305083, at least a part of the mechanism including the seat 30409 and the supporting portions 301026-1, 301026-3 (the base mechanism), at least a part of the mechanism including the movable portion 301025-1 and the linking portions 30102*ea*-1, 30102*eb*-1, 301041-1, 301042-1 (the first movable mechanism), and at least a part of the mechanism including the leaf spring portions 301043-1, 301044-1 and the fixed portion 304045-1** (the first leaf spring mechanism) are positioned.

Figure 72:
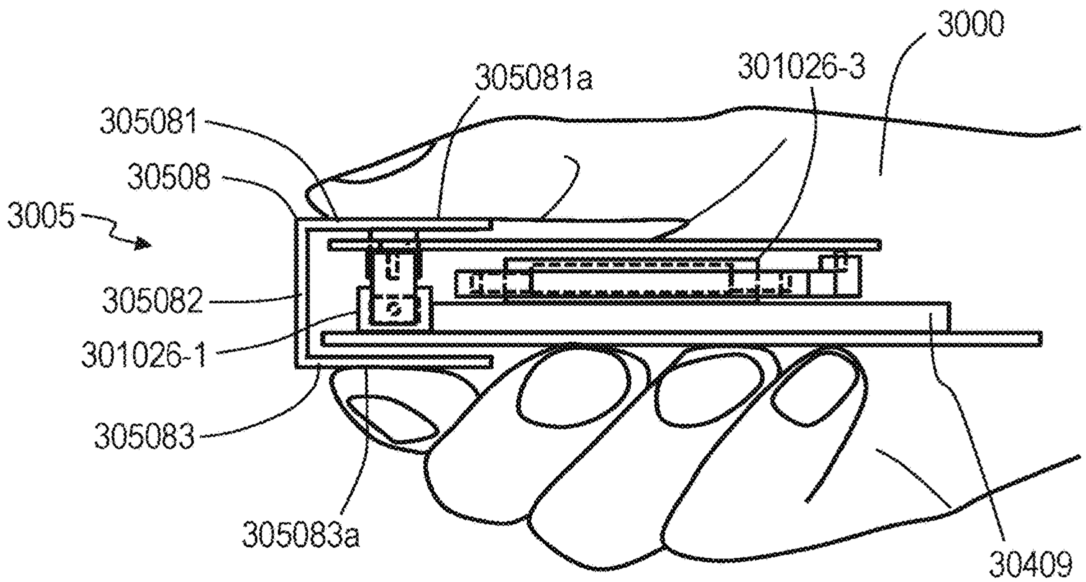
FIG. 72 is a conceptual diagram for describing how the pseudo force sense generation apparatus according to the embodiment is used.

As illustrated in FIG. 72, the user supports the side of the mechanism including the seat 30409 and the supporting portions 301026-1, 301026-3 (the base mechanism) with a palm 3000 and also holds an outer plate face **305081*a* of the first area 305081 of the contact portion 30508 and an outer plate face 305083*a* of the third area 305083 from opposite sides. When the pseudo force sense generation apparatus 3005 is driven in this state to cause the contact portion 30508 to make asymmetric motion, the user perceives force sense based on the asymmetric motion. When the user grips the contact portion 30508 by holding the first area 305081 and the third area 305083 from opposite sides as in this embodiment, at least part of the force given from the user's thumb to the first area 305081 is given to the third area 305083, supported by the user's index finger, via the second area 305082. This can suppress application of the force given by the user to the first area 305081 onto the vibrators 30102-1, 3, reducing burden on the vibrators 30102-1, 3. As a result, wearing-away of the vibrators 30102-1, 3 can be reduced and/or hindrance to the movement of the vibrators 30102-1, 3** can be suppressed, allowing a reduced failure rate and/or efficient giving of force sense to the user.

Other Modifications

The present invention is not limited to the above-described embodiments. For example, in the first to fifth embodiments or modifications thereof, the body portion of the pseudo force sense generation apparatus (for example, a smartphone terminal device) may be removable. In that case, an apparatus having the configuration of the pseudo force sense generation apparatus 1 to 5 or a modification thereof but excluding the body portion 101 may be marketed as a pseudo force sense generation apparatus. Such a body portion 101 corresponds to the "mechanism that is attached to the base mechanism". In this case, the mass $m_1$ of the "contact mechanism" should be smaller than the sum $m_2$ of the mass of the "base mechanism" and the mass of the body portion 101 as the "mechanism that is attached to the base mechanism". More preferably, $0<m_1/m_2\leq 1/3$ holds. Also, the linking portion 102*ea-i* may be fixed to the linking portion 102*da-i*, or the linking portion 102*eb-i* may be fixed to the linking portion 102*db-i*. As other alternatives, the linking portions 102*da-i,* 102*db-i*, 102*ea-i*, 102*eb-i* may be integral, or they may be further integral with other parts such as the movable portion and the contact portion.

Similarly, in the tenth to fifteenth embodiments or modifications thereof, the body portion of the pseudo force sense generation apparatus (for example, a smartphone terminal device) may be removable. In that case, an apparatus having the configuration of the pseudo force sense generation apparatus 2001-2006 or a modification thereof but excluding the body portion 20101 may be marketed as a pseudo force sense generation apparatus. Such a body portion 20101 corresponds to the "mechanism that is attached to the base mechanism". In this case, the mass of each "contact mechanism" should be smaller than the sum $m_2$ of the mass of the "base mechanism" and the mass of the body portion 20101 as the "mechanism that is attached to the base mechanism". More preferably, $0<(m_1-i)/m_2\leq 1/3$ holds. Also, the linking portion 20102*ea-i* may be fixed to the linking portion 20102*da-i*, or the linking portion 20102*eb-i* may be fixed to the linking portion 20102*db-i*. As other alternatives, the linking portions 20102*da-i*, 20102*db-i*, 20102*ea-i*, 20102*eb-i* may be integral, or they may be further integral with other parts such as the movable portion and the contact portion.

In the above-described embodiments, it may be predefined whether each part included in the pseudo force sense generation apparatus belongs to the "contact mechanism", which is the "system that vibrates with the contact portion", or to the "base mechanism", which is the "system supporting the system that vibrates with the contact portion".

As another approach, in a case where the vibrator has the movable portion and the supporting portion, considering the fact that the movable portion and the supporting portion always belong to different mechanisms, a system to which a part belongs may be determined according to whether the movement of that part (temporal change in its position or its amplitude) resembles that of the movable portion or the supporting portion (for example, when the movement of the part resembles the movable portion, that part is determined to belong to the system to which the movable portion belongs). More specifically, whether a part belongs to the "base mechanism" or to the "contact mechanism" may be determined by using the temporal change of the part's position or its amplitude on relative coordinates fixed to either one of the movable portion and the supporting portion. When the coordinate system is fixed to the supporting portion, the position of the supporting portion does not vary and hence the temporal change of the position is zero. In contrast, the position of the movable portion in that coordinate system periodically changes in concert with asymmetric vibration. Therefore, it may be determined whether the temporal change of the position of a part in question in this coordinate system resembles a "case of zero temporal change of the position" or a "case of periodical change of the position", and the part is determined to belong to the system to which it has greater resemblance. Determination of resemblance may be done by determining the "amplitude of the temporal change of the position" of the part in question and determining that it is the "case of zero temporal change of position" if the amplitude is a predetermined threshold or below. The predetermined threshold may be the amplitude value of the position change in the case of "periodical change of the position" multiplied by a predetermined number from 0 to 1, inclusive (for example, 0.5).

In a case where the coordinate system is fixed to the movable portion, from the perspective of this coordinate system, a part that moves with the same pattern as the movable portion exhibits a position change in which "temporal change of the position is close to zero", and the supporting portion relatively to which the movable portion performs periodical asymmetric motion and a part that moves with the same pattern as the supporting portion "changes in position periodically". Thus, the system to which a part belongs can be determined in a similar way to the case where the coordinate system is fixed to the supporting portion.

If the pseudo force sense generation apparatus has multiple vibrators (each with a movable portion and a supporting portion), the base mechanism and the contact mechanism may be determined for each vibrator in a similar manner to the case of a single vibrator. In determining the temporal change of the position of each part or the amplitude thereof on relative coordinates fixed to either portion, the temporal change or the amplitude thereof at a position along the direction of the axis on which the vibrator in question moves may be used.

As another alternative, a part with a motion amplitude which is a predetermined threshold or above may be determined to belong to the "contact mechanism", or a part with a motion amplitude which is a predetermined threshold or below may be determined to belong to the "base mechanism". Further, depending on the degree of strength with which the "base mechanism" of the pseudo force sense generation apparatus is supported, the magnitude of the amplitude of the temporal positon change of each part as seen from an external coordinate system varies. Thus, the magnitude of the amplitude of the temporal positon change of each part may be determined at multiple predetermined supporting strengths, and the amplitude at the supporting strength at which the magnitude of the amplitude is maximum may be used for the aforementioned determination, for example.

Further, in the sixteenth to twentieth embodiments, the pseudo force sense generation apparatus has two vibrators, and one of the vibrators that performs asymmetric vibration along the first axis gives force in the direction along the first axis to the first leaf spring mechanism, while the other vibrator that performs asymmetric vibration along the second axis gives force in the direction along the second axis to the first leaf spring mechanism, as described above. However, one of the vibrators that performs asymmetric vibration along the first axis may give force in the direction along the first axis to the first leaf spring mechanism and a mechanism other than a vibrator may give force in the direction along the second axis to the first leaf spring mechanism. In that case, the first leaf spring mechanism also elastically deforms in the direction along the second axis when force in the direction along the second axis is given, and gives force in the direction along the first axis to the contact portion when force in the direction along the first axis is given from the first movable mechanism. Also, the position of fixing the vibrators to the body portion is not limited unless the directions of vibration of the two vibrators are substantially the same. Also, a similar mechanism may be provided not only on one plate face of the body portion but on the other face of the body portion as well. For example, the mechanism including the fixed portions 301011-1, 301011-2, 301012-2, the vibrators 30102-1, 30102-2, the linking portions 301041-1, 301042-1, 301041-2, 301042-2, the leaf spring portions 301043-1, 301044-1, 301043-2, 301044-2, the fixed portion 301045, and the contact portion 30103 described in the sixteenth embodiment may be provided on each of the front and back surfaces of the body portion 30101. Likewise, the mechanism including the electronic device 302011, the vibrator 30102-*i* (where i=1, 3), the leaf spring portions 301043-1, 301044-1, the fixed portion 302045-1, the linking portion 302045-3, and the contact portion 30203 described in the seventeenth embodiment may be provided on each of the front and back surfaces of the body portion 30201. This enables presentation of force sense in diverse directions and manners. As another alternative, such a mechanism may be provided on multiple surfaces of a three-dimensional object. For example, the mechanism including the fixed portions 301011-1, 301011-2, 301012-2, the vibrators 30102-1, 30102-2, the linking portions 301041-1, 301042-1, 301041-2, 301042-2, the leaf spring portions 301043-1, 301044-1, 301043-2, 301044-2, the fixed portion 301045, and the contact portion 30103 described in the sixteenth embodiment may be provided on each of the six surfaces of a cube.

Other applications of the present technique may be stuffed animals and other kinds of toy, for example. In such a case, pseudo force sense such as sensation of being pulled can be given to the user by making a body portion positioned within a toy or the like have a large mass and making the mass of a contact portion with which the user makes direct or indirect contact smaller than that of the body portion.

When the configurations of the driving control devices 100, 20100 are implemented by a computer, the processing details of the functions supposed to be provided in the devices are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called ASP (application service provider)-type service by which the processing functions are implemented only by an instruction for execution thereof and result acquisition.

In the above-described embodiments, processing functions of the present apparatus are implemented as a result of a predetermined program being executed on the computer, but at least part of these processing functions may be implemented by hardware.

DESCRIPTION OF REFERENCE NUMERALS

1-12, 2001-2007, 3001-3005 pseudo force sense generation apparatus

What is claimed is:

1. A pseudo force sense generation apparatus comprising:

a base mechanism; and a contact mechanism that performs periodical asymmetric translational motion relative to the base mechanism and gives force based on the asymmetric translational motion to a user with which the contact mechanism is in direct or indirect contact, wherein a mass of the contact mechanism is smaller than a mass of the base mechanism, or the mass of the contact mechanism is smaller than a mass of a system supporting the contact mechanism where the system has the base mechanism and a mechanism that is attached to the base mechanism, the base mechanism includes a base mechanism-side component, the contact mechanism includes a contact mechanism-side component that performs asymmetric translational vibration relative to the base mechanism-side component and a contact portion which is at least partially positioned outside the contact mechanism-side component and performs asymmetric translational motion based on the asymmetric translational vibration of the contact mechanism-side component, wherein the asymmetric translational vibration is performed such that a force given by the contact mechanism to the user is in a predetermined direction and has an absolute value higher than a force that is in the opposite direction to the predetermined direction, among components of the base mechanism and the contact mechanism, only the contact portion performing the asymmetric translational motion relative to the base mechanism-side component is a part that makes direct or indirect contact with the user, and the pseudo force sense generation apparatus presents force sense to the user by the asymmetric translational motion of the contact portion relative to the base mechanism-side component in a condition that the user supports reaction force of weight of the pseudo force sense generation apparatus via only the contact portion performing the asymmetric translational motion relative to the base mechanism-side component, wherein directions of the asymmetric translational motion of the contact portion relative to the base mechanism-side component contain directional components parallel to surface of the contact portion where the user supports reaction force of weight of the pseudo force sense generation apparatus, the contact portion is a case that covers at least part of an external area of a mobile terminal device included in a body portion supporting the base mechanism-side component thereon, and the body portion is a mechanism included in the base mechanism or the mechanism that is attached to the base mechanism.

2. The pseudo force sense generation apparatus according to claim 1, wherein the mass of the contact mechanism is greater than zero and not more than one third of the mass of the base mechanism, or the mass of the contact mechanism is greater than zero and not more than one third of the mass of the system.

3. The pseudo force sense generation apparatus according to claim 1, wherein an average amplitude of vibration of the contact mechanism is greater than an average amplitude of vibration of the base mechanism, or than an average amplitude of vibration of the system.

4. The pseudo force sense generation apparatus according to claim 1, further comprising: an intervening component; and a second intervening component, wherein the base mechanism further includes a second base mechanism-side component, the contact mechanism further includes a second contact mechanism-side component which performs second asymmetric vibration relative to the second base mechanism-side component, the contact mechanism-side component is a component that performs the asymmetric vibration relative to the base mechanism-side component along a first axis, the second contact mechanism-side component is a component that performs the second asymmetric vibration relative to the second base mechanism-side component along a second axis, the intervening component is positioned between the contact portion and a body portion that supports the base mechanism-side component and the second base mechanism-side component, the second intervening component is positioned between the body portion and the contact portion, the body portion is a mechanism included in the base mechanism or the mechanism that is attached to the base mechanism, the intervening component is a component that gives force having a directional component along the first axis to the contact portion and that permits movement of the contact portion relative to the body portion in a direction along an axis having a different orientation than the first axis, the second intervening component is a component that gives force having a directional component along the second axis to the contact portion based on the second asymmetric vibration and that permits movement of the contact portion relative to the body portion in a direction along an axis having a different orientation than the second axis, the contact portion is a component that is given force which is based on at least one of the asymmetric vibration and the second asymmetric vibration and that performs asymmetric motion based on at least one of the asymmetric vibration and the second asymmetric vibration, and the intervening component and the second intervening component connect the body portion side to the contact portion side which performs asymmetric motion relative to the body portion based on at least one of the asymmetric vibration and the second asymmetric vibration.

5. The pseudo force sense generation apparatus according to claim 4, wherein the intervening component is a hinge including a first attachment portion and a second attachment portion capable of rotating relative to the first attachment portion about a hinge shaft, the hinge shaft of the hinge is positioned in an orientation along the first axis, and the first attachment portion is attached to the base mechanism-side component side and the second attachment portion is attached to the body portion side, or the first attachment portion is attached to the contact mechanism-side component side and the second attachment portion is attached to the contact portion side, and the second intervening component is a second hinge including a third attachment portion and a fourth attachment portion capable of rotating relative to the third attachment portion about a hinge shaft, the hinge shaft of the second hinge is positioned in an orientation along the second axis, and the third attachment portion is attached to the second base mechanism-side component side and the fourth attachment portion is attached to the body portion side, or the third attachment portion is attached to the second contact mechanism-side component side and the fourth attachment portion is attached to the contact portion side.

6. The pseudo force sense generation apparatus according to claim 4, wherein the intervening component is a sliding mechanism including a rail portion and a sliding portion slidably supported in the rail portion, the rail portion is positioned in an orientation along a sliding axis having a different orientation than the first axis, the sliding portion is slidable along the sliding axis, and the rail portion is attached to the base mechanism-side component side and the sliding portion is attached to the body portion side, or the rail portion is attached to the contact mechanism-side component side and the sliding portion is attached to the contact portion side, and the second intervening component is a second sliding mechanism including a second rail portion and a second sliding portion slidably supported in the second rail portion, the second rail portion is positioned in an orientation along a second sliding axis having a different orientation than the second axis, the second sliding portion is slidable along the second sliding axis, and the second rail portion is attached to the second base mechanism-side component side and the second sliding portion is attached to the body portion side, or the second rail portion is attached to the second contact mechanism-side component side and the second sliding portion is attached to the contact portion side.

7. The pseudo force sense generation apparatus according to claim 1, wherein the base mechanism further includes a second base mechanism-side component, the contact mechanism further includes a second contact mechanism-side component which performs second asymmetric vibration relative to the second base mechanism-side component, the contact mechanism-side component is a component that performs the asymmetric vibration relative to the base mechanism-side component along the first axis, the second contact mechanism-side component is a component that performs the second asymmetric vibration relative to the second base mechanism-side component along the second axis, a body portion is attached to the base mechanism-side component or integral with the base mechanism-side component, and the contact mechanism-side component is capable of vibrating relative to the base mechanism-side component along the first axis, the contact portion is attached to the second contact mechanism-side component or integral with the second contact mechanism-side component, and is capable of vibrating relative to the second base mechanism-side component along the second axis, the first axis and the second axis are in different orientations, and a relative position of the second axis to the first axis is fixed or limited, the contact portion is a component that is given force which is based on at least one of the asymmetric vibration and the second asymmetric vibration and that performs asymmetric motion based on at least one of the asymmetric vibration and the second asymmetric vibration, the contact mechanism-side component is attached to the second base mechanism-side component or the contact mechanism-side component and the second base mechanism-side component are integral, and the contact mechanism-side component and the second base mechanism-side component connect the body portion side to the contact portion side which performs asymmetric motion relative to the body portion based on at least one of the asymmetric vibration and the second asymmetric vibration.

8. The pseudo force sense generation apparatus according to any one of claim 1, 2 or 3, further comprising:

a third contact mechanism that performs periodical third asymmetric motion relative to the base mechanism and gives force based on the third asymmetric motion to a user with which the third contact mechanism is in direct or indirect contact, wherein a mass of the third contact mechanism is smaller than the mass of the base mechanism, or the mass of the third contact mechanism is smaller than the mass of the system.

9. The pseudo force sense generation apparatus according to claim 8, wherein the asymmetric motion of the contact mechanism and the third asymmetric motion of the third contact mechanism are independent from each other relative to the base mechanism.

10. The pseudo force sense generation apparatus according to claim 8, wherein the asymmetric motion of the contact mechanism and the third asymmetric motion of the third contact mechanism are asymmetric vibrations relative to the base mechanism-side component along axes different from each other.

11. The pseudo force sense generation apparatus according to claim 1, wherein a waveform pattern of force given by the contact mechanism to the user represents force that is in a predetermined direction and has an absolute value equal to or greater than a first threshold in a first time segment, and force that is in an opposite direction to the predetermined direction and has an absolute value within a second threshold smaller than the first threshold in a second time segment different from the first time segment, and the first time segment is shorter than the second time segment.

12. A pseudo force sense generation method using a pseudo force sense generation apparatus comprising:

a base mechanism; and a contact mechanism that performs periodical asymmetric translational motion relative to the base mechanism and gives force based on the asymmetric translational motion to a user with which the contact mechanism is in direct or indirect contact, wherein a mass of the contact mechanism is smaller than a mass of the base mechanism, or the mass of the contact mechanism is smaller than a mass of a system supporting the contact mechanism where the system has the base mechanism and a mechanism that is attached to the base mechanism, the base mechanism includes a base mechanism-side component, the contact mechanism includes a contact mechanism-side component that performs asymmetric translational vibration relative to the base mechanism-side component and a contact portion which is at least partially positioned outside the contact mechanism-side component and performs asymmetric translational motion based on the asymmetric translational vibration of the contact mechanism-side component, wherein the asymmetric translational vibration is performed such that a force given by the contact mechanism to the user is in a predetermined direction and has an absolute value higher than a force that is in the opposite direction to the predetermined direction, and among components of the base mechanism and the contact mechanism, only the contact portion performing the asymmetric translational motion relative to the base mechanism-side component is a part that makes direct or indirect contact with the user, wherein the pseudo force sense generation method comprises presenting force sense to the user by the asymmetric translational motion of the contact portion relative to the base mechanism-side component in a condition that the user supports reaction force of weight of the pseudo force sense generation apparatus via only the contact portion performing the asymmetric translational motion relative to the base mechanism-side component, wherein directions of the asymmetric translational motion of the contact portion relative to the base mechanism-side component contain directional components parallel to surface of the contact portion where the user supports reaction force of weight of the pseudo force sense generation apparatus, the contact portion is a case that covers at least part of an external area of a mobile terminal device included in a body portion supporting the base mechanism-side component thereon, and the body portion is a mechanism included in the base mechanism or the mechanism that is attached to the base mechanism.

* * * * *